(12) United States Patent
An et al.

(10) Patent No.: US 12,516,346 B2
(45) Date of Patent: Jan. 6, 2026

(54) INTELLIGENT GENETIC BREEDING AND SEED PRODUCTION SYSTEM FOR CROP CROSS BREEDING AND HYBRID SEED PRODUCTION, AND APPLICATION THEREOF

(71) Applicant: Hainan Bolian Technology Co., Ltd., Hainan (CN)

(72) Inventors: Baoguang An, Hainan (CN); Tuan Long, Hainan (CN); Xinpeng Li, Hainan (CN); Xiang Zeng, Hainan (CN); Yongzhong Wu, Hainan (CN); Peijin Huang, Hainan (CN)

(73) Assignee: Hainan Bolian Technology Co., Ltd., Hainan (CN)

( * ) Notice: Subject to any disclaimer, the term of this patent is extended or adjusted under 35 U.S.C. 154(b) by 202 days.

(21) Appl. No.: 18/052,800

(22) Filed: Nov. 4, 2022

(65) Prior Publication Data

US 2023/0332173 A1  Oct. 19, 2023

Related U.S. Application Data

(63) Continuation of application No. PCT/CN2021/092017, filed on May 7, 2021.

(30) Foreign Application Priority Data

May 7, 2020 (CN) .......................... 202010379287.9

(51) Int. Cl.
*C12N 15/82* (2006.01)

(52) U.S. Cl.
CPC ..... *C12N 15/8289* (2013.01); *C12N 15/8212* (2013.01); *C12N 15/8218* (2013.01); *C12N 15/8274* (2013.01)

(58) Field of Classification Search
CPC .................................................. C12N 15/8289
USPC ....................................................... 800/282
See application file for complete search history.

(56) References Cited

U.S. PATENT DOCUMENTS

2019/0338305 A1   11/2019  Ma et al.

FOREIGN PATENT DOCUMENTS

| CN | 104206268 | * | 12/2014 |
|----|-----------|---|---------|
| CN | 104429935 |   | 3/2015 |
| CN | 105886526 |   | 8/2016 |
| CN | 105907782 |   | 8/2016 |
| CN | 106282209 |   | 1/2017 |
| CN | 109112158 |   | 1/2019 |
| CN | 109566396 | * | 4/2019 |
| CN | 109593778 |   | 4/2019 |
| CN | 110408646 |   | 11/2019 |

OTHER PUBLICATIONS

Wang et al. Genomics Proteomics Bioinformatics 16:393-396 (Year: 2018).*
Madagascar Patent Application No. 2022/29, Office Action dated Jun. 5, 2023.
South African Patent Application No. 2022/12707, Notice of Allowance mailed Feb. 7, 2024.
Chang et al., "Construction of a Male Sterility System for Hybrid Rice Breeding and Seed Production Using a Nuclear Male Sterility Gene." PNAS Early Edition, pp. 1-6, (2016).
Wu et al., "Construction of Male-Sterility System Using Biotechnology and Application in Crop Breeding and Hybrid Seed Production" China Biotechnology, 38(1), pp. 78-87, (2018).

* cited by examiner

*Primary Examiner* — Li Zheng
(74) *Attorney, Agent, or Firm* — Levine Bagade Han LLP

(57) ABSTRACT

An intelligent genetic breeding and seed production system for crop cross breeding and hybrid seed production are disclosed. The system comprises a GAT system carrier. The carrier comprises five functional element expression cassettes: a plant male fertility restoration genetic element expression cassette, used for restoring the male fertility of a recessive genic male sterile mutant; a plant pollen abortion genetic element expression cassette, used for clearing GAT-containing pollen and maintaining a heterozygous state or a hemizygous state of a GAT maintainer line; a chemical herbicide positive selection expression cassette, used for gene transformation and impurity removal and purification for the GAT maintainer line; a chemical herbicide negative selection expression cassette, used for clearing pollen and seed escape of a herbicide-sensitive GAT maintainer line and impurity removal and purification for a GAT sterile line; and a seed screening element expression cassette, used for mechanical sorting of seeds.

3 Claims, 22 Drawing Sheets

Specification includes a Sequence Listing.

pUC57-Simple Vector Map

GAT maintainer line      GAT sterile line

GAT maintainer line      GAT sterile line

SEQUENCE LISTING

```
Sequence total quantity: 40
SEQ ID NO: 1           moltype = DNA  length = 24548
FEATURE                Location/Qualifiers
source                 1..24548
                       mol_type = other DNA
                       organism = synthetic construct
SEQUENCE: 1
ctgcaggatc tagtaacata gatgacaccg cgcgcgataa tttatcctag tttgcgcgct   60
atattttgtt ttctatcgcg tattaaatgt ataattgcgg gactctaatc ataaaaaccc  120
atctcataaa taacgtcatg cattacatgt taattattac atgcttaacg taattcaaca  180
gaaattatat gataatcatc gcaagaccgg caacaggatt caatcttaag aaactttatt  240
gccaaatgtt tgaacgatct cagctgtgcc ccagtttgct aggcaggtcg cagtacctgg  300
ccacagccat ctcgtgctgc tccacgtagg tctctttgtc ggcctccttg attctttcca  360
gtctcctgtc cacgaagtag aagccgggca tcttgaggtt cttagcgggt ttcttggatc  420
tgtatgtggt cttgagggag cagtgcaggt agccccccgcc cacgagcttc agggcatct  480
ggctatggcc tctcaggccg ctgtcagcgg ggtacagcat ctcggtgctg gcctcccagc  540
cgagtgtttt cttctgcatc acagggccgt tggatgggaa gttgaccccg ttgatcttga  600
cgttgtagat gaggcagccg ttctggaggc tggtgtcctg ggtagcggtc agcacgcccc  660
cgtcttcgta tgtggtgatc ctctcccatg tgaagccctc agggaaggac tgcttaaaga  720
agtcggggat gccctgggtg tggttgataa aggttttgct gccgtacatg aagctggtag  780
ccaggatgtc gaaggcgaag gggagagggc cgccctcgac caccttgatc ttcatggtct  840
gggtgccctc gtagggcttg ccttcgccct cggatgtgca cttgaagtgg tggtcgttca  900
cggtgccctc catgtagagt ttcatgtgca tgttctcggt gatcagcacg ctatcctcac  960
ccactgcgga agcgttgcat gcaacaatag caaggagagc aaatacgaaa atgatcttca 1020
tttttgtagg attctactac tatgcttcaa ctataatgtt tgaattgtgt gaaggatgag 1080
gagggttttc attatgcttg tctatttata gatgtttccc tatcggttgc tttagagtgt 1140
tagttttgct tgatgctata ttaggatcta agtgagtcat attatttgga tattctgtta 1200
ggtgcaccta aaaatgttct ttgatatcat catcaaagta acttttatgc ccatcatata 1260
tacatgatgg tgagcaaaaa aataatgaca tgactcatcg ctcactttat gtgtcaatgt 1320
gataaggatt gcaactttg aaactaagtt tgttatgttt tgtaagctat tattttgata 1380
atgcactaca cgtggaactt tacgactgtg tgggtttatg ctcttttgaat tatataattt 1440
cagtaagaaa aaaaattata gtatgttcaa tggtttttcat tgttccatta atactcttgt 1500
gaaaacttgt ttgtgatacg aaataagtta atgcaataac ttttaaatta acttttgcaga 1560
gctttacaat aactcaccaa cttactctaa ttgtggttgg ggattgattt aattcatact 1620
tttatagacc aaattgatat tgtgttgcta aataaaaatt atagtggtgt tgctacacct 1680
acacagacac agaaggaatc ctgatatcat cagctatcta ctgcttcctc cacatggact 1740
caagaagcag aagcaaaaaa gaagaaggca tttgctccaa caaagttttc cggtgaaagg 1800
caacacattg ttctgaactt cctggcatgt attatgtgaa tctagcaaat taaccaaaca 1860
ttgacacaat gcgacacctt gtaatgtagc cgtgccgaga attgtatatc tcacttacca 1920
ttgtatatca cacgtgccga gaataggaga ttgatttttg ccaaccaaaa cgctctaggc 1980
agaccaattg ggcgcccggg cagcgctgaa gaacttcccc gatctagtaa catagatgac 2040
accgcgcgcg ataatttatc ctagtttgcg cgctatattt tgttttctat cgcgtattaa 2100
atgtataatt gcgggactct aatcataaaa acccatctca taaataacgt catgcattac 2160
atgttaatta ttacatgctt aacgtaattc aacagaaatt atatgataat catcgcaaga 2220
ccggcaacag gattcaatct taagaaacca cctgcaagtg acttcctcag caggcctact 2280
agttttattg ccaaatgttt gaacgatcgg ggaaattcca gtgcaccaga gtcacagaaa 2340
cacatcacac attcgtgagc tcagcttagc catggataac gcctacatta ttgccattct 2400
ctctgtagct atcctcttct tgctccacta ctacctcctc ggccgcggca atggcggggc 2460
ggcgcggctg ccgccgggtc caccggccgt cccgatcctg ggacacctcc acctcgtcaa 2520
gaagccgatg cacgccacca tgtcccgcct cgccgagcgg tacgggccgg tgttctcgct 2580
gcgcctcggg tcgcggcgcg ccgtggtggt gtcgtcgccg gggtgcgcca gggagtgctt 2640
caccgagcac gacgtgacct tcgcgaaccg gcccaggttc gagtcgcagc tgctggtctc 2700
gttcaacggc gccgcgctcg ccacggcgag ctacggcgca acctccgccg 2760
gatcgtcgcc gtgcagctgc tctccgcgca ccgcgtcggc ctcatgtctg aaaatctcga 2820
aacagccgtg tcatagtcaa tcattaggtg ttataggaac aatcaaaggt ttttttcaagt 2880
gttaatcttc atactaatat atacagtggg tactctttat ctactgccgt ggaactgtca 2940
tattgatta tgaaattta gctctagaaa atattgatc atcaatgtca agactttatg 3000
accttgcaaa atacatttcc taattgagaa cagggtaaaa ttatgaacta tgcctctgaa 3060
ccttcataca caggcagcac atttttttgtt gtaaattca tcttaatatc agcggaaaga 3120
ctggaccaga gaaagaaaaa gttaagacag gcatatactc ttgatcctct aaaagagatg 3180
aggcggtaca atgatcaacc atgaacatta aagtgatacg tggaacatga gaacacaaat 3240
aattgtcact ggaacataaa tacaaaaagg tttgtagtaa cttaccgaca tgaggccgac 3300
gcggtgcgcg gagagcagct gcacggcgac gatccggcgg aggttgcgcc agtgcgcgcc 3360
gtagctcgcc gtggcgagcg cggcgccgtt gaacgagacc agcagctgcg actcgaacct 3420
gggccggttc gcgaaggtca cgtcgtgctc ggtgaagcac tccctggcgc accccggcga 3480
```

```
cgacaccacc acggcgcgcc gcgaccgag gcgcagcgag aacaccggcc cgtaccgctc  3540
ggcgaggcgg gacatggtgg cgtgcatcgg cttcttgacg aggtggaggt gtcccaggat  3600
cgggacggcc ggtggacccg gcggcagccg cgccgccccg ccattgccgc ggccgaggag  3660
gtagtagtgg agcaagaaga ggatagctac agagagaatg gcaataatgt aggcgttatc  3720
catggctaag ctgagctcac gaatgtgtga tgtgttttctg tgactctggt cgactgggat  3780
cccctgaggg gtcaccgact tcaggtcaag taacaccaaa caacagggtg agcatcgaca  3840
aaagaaacag taccaagcaa ataaatagcg tatgaaggca gggctaaaaa aatccacata  3900
tagctgctgc atatgccatc atccaagtat atcaagatca aaataattat aaaacatact  3960
tgtttattat aatagatagg tactcaaggt tagagcatat gaatagatgc tgcatatgcc  4020
atcatgtata tgcatcagta aaacccacat caacatgtat acctatccta gatcgatatt  4080
tccatccatc ttaaactcgt aactatgaag atgtatgaca cacacataca gttccaaaat  4140
taataaatac accaggtagt ttgaaacagt attctactcc gatctagaac gaatgaacga  4200
ccgcccaacc acaccacatc atcacaacca agcgaacaaa aagcatctct gtatatgcat  4260
cagtaaaacc cgcatcaaca tgtataccta tcctagatcg atatttccat ccatcatctt  4320
caattcgtaa ctatgaatat gtatggcaca cacatacaga tccaaaatta ataaatccac  4380
caggtagttt gaaacagaat tctactccga tctagaacga ccgcccaacc agaccacatc  4440
atcacaacca agacaaaaaa aagcatgaaa agatgacccg acaaacaagt gcacggcata  4500
tattgaaata aaggaaaagg gcaaaccaaa ccctatgcaa cgaaacaaaa aaaatcataa  4560
aatcgatccc gtctgcggaa cggctagagc catcccagga ttccccaaag agaaacactg  4620
gcaagttagc aatcagaacg tgtctgacgt acaggtcgca tccgtgtacg aacgctagca  4680
gcacggatct aacacaaaca cggatctaac acaaacatga acagaagtag aactaccggg  4740
ccctaaccat ggaccgggaac gccgatctag agaaggtaga gaggggggg gggggaggac  4800
gagcggcgta ccttgaagcg gaggtgccga cgggtggatt tggggggagat ctggttgtgt  4860
gtgtgtgcgc tccgaacaac acgaggttgg ggaaagaggg tgtggagggg gtgtctatttt  4920
attacgcgg gcgaggaagg gaaagcgaag gagcggtggg aaaggaatcc cccgtagctg  4980
ccggtgccgc gagaggagga ggaggccgcc tgccgtgccg gctcacgtct gccgctccgc  5040
cacgcaattt ctggatgccg acagcggagc aagtccaacg gtggagcgga actctcgaga  5100
ggggtccaga ggcagcgaca gagatgccgt gccgtctgct tcgcttggcc cgacgcgacg  5160
ctgctggttc gctggttggt gtccgttaga ctcgtcgacg gcgtttaaca ggctggcatt  5220
atctactcga aacaagaaaa atgtttcctt agttttttta atttcttaaa gggtatttgt  5280
ttaattttta gtcactttat tttattctat tttatatcta aattattaaa taaaaaaact  5340
aaaatagagt tttagttttc ttaatttaga ggctaaaata gaataaaata gatgtactaa  5400
aaaaattagt ctataaaaac cattaaccct aaacctaaa tggatgtact aataaaatgg  5460
atgaagtatt ataggtga agctatttgc aaaaaaaaag gagaacacat gcacactaaa  5520
aagataaaac tgtagagtcc tgttgtcaaa atactcaatt gtcctttaga ccatgtctaa  5580
ctgttcattt atatgattct ctaaaacact gatattattg tagtactata gattatatta  5640
tccgtagagt aaagtttaaa tatatgtata aagatagata aactgcactt caaacaagtg  5700
tgacaaaaaa aatatgtggt aatttttat aacttagaca tgcaatgctc attatctcta  5760
gagaggggca cgaccgggtc acgctgcacg ttaacgcac ctgtctccgg attaattaag  5820
acaaatttgt ttgtcagatc aaattttttaa gcaaaacata agaaacagca caaagggta  5880
tagcagaagc aaaatttgga cacaatgatt agggatcact tattcattat agttcttcca  5940
tgctgctcta ccacagcaaa acgtttcaga caccatcaaa ccagacttaa ggatacacat  6000
tacaggtaaa tagtacacaa tgaaacggga cacgaccaag gaccagacca gcaaccata  6060
gctccattgg ggaagacaaa taggcagact tgtgaaccct agaacagcag cagctctatg  6120
gctgaggacg gtacctctag aggcgcgccc actttgtgag gcctttaata cacagtcctg  6180
ccatcaccat ccaggatcat gtccttgaat gcgcccccaa ttgggatcat aggcagcaca  6240
tgctcctggt gcggacgat gatatccaac aagtatggcc ctggagtctc agcatcttc  6300
ttgatggcgg cacgacttc actcttcttt gttacacgga ctgccggaat attgaacccc  6360
ttagcaatag tcacaaaatc tggatatatc tcgctctcac attccgggtt gcccaagtat  6420
gtatgcgccc tattcgcctt gtaaaaccta tcctccaatt gcaccaccat acccaaatgt  6480
tggttgttca acaccatcac cttcacaggg aggttctcaa tgcggatcaa tgccagctcc  6540
tgaatgttca tgaggaagct accatcccca tcaatatcaa caactgtgac acctgggtta  6600
gccacagaag caccagctgc ggcaggcagc ccaaatccca ttgcgcccag accagccgaa  6660
gacagccact gccgtggccg cttgtaggt taatattgtg ccgcccacat ctggtgctgc  6720
ccaacaccag tagcgatgat tgcctcacct ttcgtcagct catccagcac ctgaatggca  6780
tattgcggtg ggatctcttc accaaaagtt ttgtacccca gaggaaactc cctcttctgt  6840
tggtccaact cattgtgcca tgcactaaaa tcagaacttg tctttgttgt gctctgttgt  6900
agcagagcat tcagcctg taaagcgagc ttaacatctg cgcaaattga cacatgtggt  6960
tgcttgttct ttccaatctc tgctggatca atgtcaatgt gcacaattct ggccctgctt  7020
gcaaaagcct caattttccc tgtcacacga tcatcaaacc gcacaccaaa cgcaagcaac  7080
aggtcagcct tatccacggc ataatttgcg tacaccgtgc catgcatccc aagcatccgc  7140
agggacaacg ggtcgtcact ggggaaattg ccgaggccca tcagagtggt tgtaactggg  7200
ataccagtca gctcaacaaa ccagcgcaat tcgtcaccag atgcagagca gccaccaccg  7260
acatagagaa tcgggcgccg tgactcgcca accagacga agacctgctc aagcaattct  7320
gtcgcgggtg gcttgggcag gcgtgcgatg taccctggta gattcatcga ggtgtcccag  7380
accggcacgg ccatctgctg ctggatgtcc ttggggatgt ccaccagcac cgggccagga  7440
cggcccgagg acgcgaggaa gaaggcttcc tgtatgacgc gggggatgtc ctccacatca  7500
aggacaaggt aattgtgctt ggtgatggag cgggtgacct cgactatggg cgtctcctgg  7560
aaggcgtcgg tgccgatcat gcggcggggg acctggccgg tgatgcgac catcgggacg  7620
gagtcgagca gcgcgtcggc gagcgcggac acgaggctgg ttgcgccggg gccggaggtg  7680
gcgacgcaga ccccgacgcg gccggacgcg gcgcgtacc cggacgccgc gaacgcctcg  7740
ccctgctcgt ggcggaagag gtggttggtg atgaccgggg agcgcgtcag cgcctggtgg  7800
atctccatcg acgcgccgcc tgggtaggcg aacacgtcgc tgacgccgca ccgctccagc  7860
gcctccacga ggatgtccgc gccctgcggg ggctcggccg cgtggaggcc  7920
gtggccggcg gcgccgggga cgcggggtg accgggaca ccgccgagca cctgaccgcc  7980
gccgccccca cccggcctcg agcgggaagg acgtggtgtc gctggtggtt cttacggccg  8040
gtcttggcc tcgcggcggc ggacagggcg cggccgcgg ccgcggcggt cgtagccatg  8100
gtgggtggtg gcggcggcgg cggcggcgag ggttctgg tttgggcgag agggagagag  8160
gggtggagag tgtggggtgg tgggtgtttt gtccgcgcgc ggtgacgcag cgtgaggcga  8220
```

```
tgtgtggctc ggatgggatc gtgtggggcc acgtcacagt gggcccccata tgtcggtggg   8280
ataggatgac acacagccac gtcggggtcg atctcgggccc gcgtgtcagt cgattggatg   8340
aggatgacag gtgggtcagt cccaataacg ggtggagggt acagaacccg ataaaaaatc   8400
gatctcaaag tcgatgcgg atgcaaccgc gagacctagc agtctagcac ccgcacccgc    8460
acccgcacaa acgcagcgca agatgagcag tggcggcgag aagtccggct cgggcggcgg   8520
cggcggtggc ggcggcggcg gggcggtgaa gacgccctcc gacttcctca agtccatcag   8580
ggggcgcccc gtcgtcgtca agctcaactc cggcgtcgac taccgcggta accccctgct   8640
caattccctc cccctttttg cctcaaccct agacccgcct cccgaaaacc ctagcacgag   8700
acgaatgcga tgtttgttgt accccgtatc tctttctcct taattggaac tctgcgtttc   8760
ttttcgttaa ttagtggggg gaaggaaagg cgtggactct gtaggatttt cttttcgatt   8820
tgatgaccaa gggagatact tatttttagtg ctgtttaaga tcctgctagt gcccggtgta  8880
gctaggccat ttgagaagca gataaccgtg tttttctgta ggaccttctc taatcttgag   8940
ctattttgat attctaatta cttatggtta aaccctagaa cctcagtatg ttttaactta   9000
gtaagagatt gctacagtat ttttatttgt aggaacaaca ttgtaggtgg ttatcatgct   9060
actgactgtc ttgtgtagag ccctcctatc attaaggggc ttttatgttt actaatagtt   9120
agttttagta cccatttttc tgtgagctac taaaaagaat atttccaatt caacctatgg   9180
taatttaaag tactttatgc tgtatgtcca tttactgagg attatgatta atatttaaga   9240
gggaggacat ctgtgcttaa ggtttgcatt gcaatatttg atagatttat gctaaacaaa   9300
ggtaattgtg catgcttgag atagaaaggg atttcccttc tttgggtttg ataataaggg   9360
gttggcattc catgatcagg agcatagtgc atttatattt tataatgtgg ctatgtgtat   9420
gcagttctca atttcacatt ggcggtacac ccatgatata tttaattgtt acccagaacc   9480
ataataagc ctaataagag catatggtat tccattgatt ggggccttcg gaagtgtacc    9540
tgtgtatgta actatgcata taaggttac tttctggtag ttcttttcttc tcctcatcac   9600
ttaagacatc tggatcgctg ttatcaagtc gtagactagt cataacgtca gtcaagtcag   9660
acgactagag ggctacgact cgaccaaata gcaagtcgca caattagtcg tagattagtc   9720
atagcaaatc atcatttcac catgctaatt ggcttattgt gtttagtact ttaaatttat   9780
ttcttgttaa cttattgtct tgctggctac tccataaacc gtagtttata atactatata   9840
tagtgcttag tacaatagaa tagtactaga gactatatag tgcatccatt gttttcacac   9900
gaccaaatca tggactagtc gtggactaga ttttgaatgg aacagttta ccagaaatac    9960
acttgttctt ttttttttctg aatagtgttg aatcagtagc tgcaatgcat agcttgtgca 10020
ataaaatcat tatatactat caccaatttc atggaatctt acttattgga aatttgtaac 10080
aaatctattt tatcccctga gttaccgtgt tggtctaaaa tcaactcgca tgtgagacaa  10140
gatgaagagg accatgaaga ttgcctcttt catttattca tttgctgact gcttgcaatg 10200
ccactataaa cctaatcgga tgactggttg tcatgtctcc gctaactaga gagaaggggg  10260
gaggagtgaa gactttacgt gtacacagtc tttcaccagg acggttgtat cggttcagca  10320
gtcgcgatcg catgcgcatt ctagaggatc cctcagagtc tcagtccact agccttgtcc  10380
acgtcgccaa tgtttaaatc cagtcccacc atttgtagcg tagaatggaa cagctttcga  10440
taaaatttct caaccattta gatgaaattc gcaccgtttc aagcagggtc taggaccaac  10500
aaatcctaga atcaaacatg gtacattcaa atttcaaatt caaaccagat tacataggct  10560
tatttactac tccggtaagc gatacgggcg gcggcggcgc ggctgccggc gagcggcggc  10620
gggggtcaga cggaggtgga gacgcggacc ttgaggccgt gagccatgga gaggatggtc  10680
atcatccggt acttgacggg gtggtcctcg acgaggtcga aggtgtagaa gcggaagagg  10740
atggcgagcg ccatcttcat ctggaggtag gcggagtcct tgccgaggca gatccgcggc  10800
ccggcctgga acgcggtgaa cttgaacggc gaggcgttgc ggaacgcgcc gccgtcgccg  10860
ctgagccacc gctccggccg gaagctcgcc gcgtcggggc cccagttgta ctccatcctc  10920
cccatcgagt agggcacgta cgtcaccatc ccgccgcgc gcaccttggt gccgtcgggg  10980
agcacgtcgt cctccacgat cccctgggg tcctgcgca cgccgggta gaggcggagc     11040
gtctccgtca cgcaggcgtg caggtacacc agcttcccca ccgtcgta gctcagcagc    11100
gacgcgaact gcgccacgcg cgccgcgaat gacgcctcgc cggcggcgtc ggcgagcgcg  11160
acgccctcct cgcgcgcgcg ctcagcctcg aacgcggcca gctcgcgccg gagcttgtcg  11220
gcgacgggct ggtgcgtcat cgccatgtac gtgaaccacg acagcgtcgt ccgtcgtcg   11280
tcacgcccgg cgatcacgaa gttgagcacc acgtcgcgga ggctcttgtc gtccccgaag  11340
ctgccgcccc cctcgtcgcc gccggcctcc cccagctcga tgaaccgcga cagtatgtcg  11400
tgcttgatct gctcgccatt acaaatcaac catatcaaga aacaaaacct tttccgatct  11460
gatcatgcc attaccatgt cagttcagtt ctactgattc tttgagcaag agaggaagga   11520
tcaccttctc ttgcttgccg ctggctcgag cctgcaagat ctcagccttg cggcggcgga  11580
tcacgctgta ggtgaagtca tcaaccagct tcatgctctg ctcgaggaga gcctctgatc  11640
cgacgtgcaa gaacttcttg agacgccaca gaggatcgat gaaccgcagc gtgacgatga  11700
tgttggcagc gtcgaaggcc tgggcaaagc tgttctccgg gagatcaggt gacagcgtcc  11760
cgatctcaac cccaaacccg accttgcaga tcgagtccag tgtcatcctc atgaacaatt  11820
cctgaatttt ggttagttct tgcatcacaa ttctgaacaa tttggttct caagaaatgt    11880
ttagatatta ggcaaggaaa tcagttggtt acctgcatgt ctacaactct gccggccttg  11940
cacgcttggc tcagaatgct tgatagcttc agggagtact ccctgaacac cacagtgctg  12000
aagtctctca agttcttgga ggcaaactcg aagctcgcca tcttcctttg cttcctccac  12060
atctcgccgt cggcattgaa tatgccatca ccgagcagca catccatgta agacctgtag  12120
acttcacccct gcatatttc agacattttt tgtgtcagtg ttagtactgt gcaaggcaca   12180
ttttacagta cactgaagat cctatggttc ttttaccttg gggtaattgg tgaagttggt  12240
cttcaggaca tgctcgacgt tcaccgggtc ggcaatgtag gtgtaggagg tgaaaggcat  12300
gtcgacggtc accgtcctgt ccttcgacaa gtactcgaca agccagtcat gatcctgtg   12360
gtagttcttc agttgctcca ctgtcgcgcc gatgattggc catgatcttg gccctttctg   12420
gttcctcagg ctccacttgt ggaccaagat ccatgagagg acaacaagga agatagctat  12480
gagcttgtgg attcctgcta ctgggaagaa tgatgtcact ggcattgcat gagcttcctc   12540
catggggctc ttcatgaagg gttcagtcta caagagatgc tatgtagcat tttggatgcc  12600
atagttaggt gatatattgg gaactgatgc taccaacctg agacaactct ttgtgtgcac  12660
aagaattaag attgtctcat tcatatggtg tccctaacct aacacccta ggagttggat    12720
cttagcttta gttttctttt tgtgatctgt ccacctagaa aagaatcgtt actcatgtaa  12780
acacaaaatg aatgctacag tatttttttc ccctgctcag ccaagttcgt tgttttgttc  12840
agataactga agcgtttgca gcgactaaag gtatggcacc ttctaatatc agaaccatat  12900
ccatctgaat tctgttaaat tgtcaccaac tgaaaccagg cttaccattt tctgtcgata  12960
```

```
ttgtctagtc tttgatgaca actaaaatga aatggggtat cctcaaaaga aatataaatt   13020
gtgaacccaa agtagttggt ttctacttca cctgaattct acttcatctg aataggctat   13080
tttaatgaag agaaaatcca agaaatgcca tttacaaaca cccaaatcca agaaatgcta   13140
tcgacgagta cgagttccat aaaatgctat tgtagaagcg attttgtccc agaaatcagt   13200
tgccatctag ttaaaacatt ctcacataaa caagcaatat aaaatactat tgccaagata   13260
tatccaatac tttgcatctc taaaacttct agttattgac aactaatttc ttttccagtc   13320
aatacaaata agccatctat caaagatttg agaaattgca gggcacaatt ctacagaaaa   13380
ttaaagaaca tcacttgaaa aggaagattt tttctataga acttatcctt tgtgatgtaa   13440
caacaaatac tcgaatgaat tgagaaataa ccaatgtcaa cactgaaaca agtctgaaac   13500
caagatcaga agagcatgaa aatagtgctc ttatggattg accttgattc ttgcccacac   13560
tcttattaca accttcgagc aaaccggagc atttgctgaa taaatctctc atctgttact   13620
gaagatacta ggtaactaaa taaacaatca atcaagagta tcaaaacatt taaatttcga   13680
aacgcgtcgg accggcaccg gacactgtct ggtggcatac cagacagtcc ggtgtgccag   13740
atcagggcac ccttcggttc ctttgctcct ttgcttttga accctaactt tgatcgttta   13800
ttggttttgtg ttgaacccttt atgcacctgt ggaatatata atctagaaca aactagttag   13860
tccaatcatt tgtgttgggc attcaaccac caaaattatt tataggaaaa ggttaaacct   13920
tatttccctt tcaatctccc ccttttttggt gattgatgcc aacacaaacc aaagaaaata   13980
tataagtgca gaattgaact agtttgcata aggtaagtgc ataggttact tagaattaaa   14040
tcaatttata cttttacttg atatgcatgg ttgcttctt ttattttaac attttggacc   14100
acatttgcac cacttgtttt gttttttgca aatctttttg gaaattcttt ttcaaagtct   14160
tttgcaaata gtcaaaggta tatgaataag attgtaagaa gcattttcaa gatttgaaat   14220
ttctccccct gtttcaaatg cttttccttt gactaaacaa aactcccct gaataaaatt   14280
ctcctcttag ctttcaagag ggttttaaat agatatcaat tggaaatata tttagatgct   14340
aattttgaaa ataccaat tgaaatcaa cataccaatt tgaaattaaa caaccaatt   14400
taaaaaattt caaaaagtgg tggtgcggtc cttttgcttt gggcttaata tttctccccc   14460
tttggcatta atcgccaaaa acggagactt tgtgagccat ttatactttc tcccccattgg   14520
taaatgaaat atgagtgaaa gattataccaa aatttggaca gtgatgcgga gtgacggcga   14580
aggataaacg ataccgttag agtggagtgg aagccttgtc ttcgccgaag actccatttc   14640
cctttcaatc tacgacttag catagaaata cacttgaaaa cacattagtc gtagccacga   14700
aagagatatg atcaaaggta tacaaatgag ctatgtgtgt aatgttttcaa tcaaagtttc   14760
gagaatcaag aatattttagc tcattcctaa gtttgctaaa ggttttatca tctaatggtt   14820
tggtaaagat atcgactaat tgtctcttgg tgctaacata agcaatctcg atatcaccccc   14880
tttgttggtg atccctcaaa aagtgatacc gaatgtctat gtgcttagtg cggctgtgtt   14940
caacgggatt atccgccatg cagatagcac tctcattgtc acataggaga gggacttttgc   15000
tcaatttgta gccatagtcc ctaaggtttt gcctcatcca agtaattgc acacaacaat   15060
gtcctgcggc aatatacttg gcttcggcgg tagaaagagc tattgagttt tgtttctttg   15120
aagtccaaga caccagggat ctccctagaa actgacaagt ccctgatgtg ctcttcctat   15180
caatttaca ccctgcccaa tcggcatctg aatatcctat taaatcaaag gtggatccct   15240
tggggtacca aagaccaaat ttaggagtgt aaactaaata tctcatgatt cttttcacgg   15300
ccctaaggtg aacttcctta ggatcggctt ggaatcttgc acacatgcat atagaaagca   15360
tactatctgg tcgagatgca cataaataga gtaaagatcc tatcatcgac cggtatacct   15420
tttggtctac ggatttacct cccgtgtcga ggtcgagatg cccattagtt cccatgggtg   15480
tcctgatggg cttggcatcc ttcattccaa acttgttgag tatgtcttga atgtactttg   15540
tttggctgat gaaggtgcca tcttggagtt gcttgacttg aaatcctaga aaatatttca   15600
acttccccat catagacatc tcgaatttcg gaatcatgat cctactaaac tcttcacaag   15660
tagatttgtt agtagaccca aatataatat catcaacata aatttggcat acaaacaaaa   15720
cttttgaaat ggttttagta aagagagtag gatcggcttt actgactctg aagccattag   15780
tgataagaaa atctcttagg cattcatacc atgctgttgg ggcttgcttg agcccataaa   15840
gcgcctttga gagtttataa acatggttag ggtactcact atcttcaaag ccgagaggtt   15900
gctcaacata gacctattca ccccatttga tcacttttttt ggtccttcag gatctaatag   15960
ttatgtataa tttagagtct cttgtttaat ggccagatat ttctaattaa tctaagaatt   16020
tatgatattt tttaattttt tatcatgtct gatgagaatt aacataaagg ctcaattggg   16080
tcctgaatta ataatagagt gaaaattaat ccagaggctc tattagaacc ttcaattagt   16140
aataccaaga tatatataag atagtagagt atagtttaaa tgttggcatt gttcattctt   16200
tcttttgtta tttaatttat gctttccacg gtggttagtg gttacttctg aagggtccaa   16260
ataatgcatg aagagtttga ggacaagaag tctgccctaa aaatagcgat gcaaaggcat   16320
ggtgtccaag ccatacatat agcgcactaa ttttatcagc agaacaatgg tatttatagg   16380
tcctagtgcc caggcaacaa gagacacgaa taaagcatcg atcacgacaa gatgctgtgt   16440
ctcacctcct cttcctcctc cgcgccccgct ccgtccttcc cctctctcgc tgatcgaccg   16500
agcccaggaa tcgcgggcgg gggtggcaat gttcgcctga gcgtggtttc ttcgccgcgg   16560
cggtcgtggc ctggaaaggt caagaccaat ttctcagttc ctgcgactgc gcgaaaaaac   16620
aaaaccatgt gactgttgt ggaggagatc gcttgttctg gtactggatc tggatttgaa   16680
atattgtgtc aaggatttaa ctgggaatct cataagtcag gaaaatggta tgtggaactt   16740
ggctcaaagg ccaaggagtt gtcatccatg ggtttcacca ttgtctggtc accaccacct   16800
actgattctg tgtcgcctga aggatacatg ccaagggatt tgtataatct aaattccaga   16860
tatgggacca tggaagagtt gaaggaggct gtgaaacgtt tcatgaagc cggtatgaag   16920
gttcttggtg atgccgtcct gaatcacagg tgtgctcaat ttcagaacca aaatggcgtc   16980
tggaatatt ttggtggacg ccttaactgg gatgatcgag cagttgttgc agatgatgca   17040
catttccagg gaagaggaaa caagcacagt ggagataact tccatgcagc cccaaacatt   17100
gatcactcgc aagagtttgt gaggagtgat cttaaagaat ggcttgttg gatgagaaag   17160
gaagttggat acgatggatg gcgacttgat tttgttcgcg gattttgggg tggatatgtc   17220
cacgattact ggaagcaag cgaaccatat tttgcagtag gagagtactg ggattctctc   17280
agttacacct atggtgaaat ggattataat caagatgccc acaggcagag aatagttgat   17340
tggataaatg ctacaaatgg aactgctggt gcatttgatg ttaccacgaa aggaatactt   17400
cactctgcac tggaaagatc tgagtactgg cgtctgtctg atgaaaaagg aaaaccccct   17460
ggagtgttag gttggtggcc ttcgcgtgct gtcacattta tagaaaatca tgacactggt   17520
tctactcagg gtcattggag attccccttt ggtatggagt gcaaggctca tgtctacatc   17580
ttaactcacc caggcactcc tgcaatcttc tatgatcata tatttcgca tttacagcca   17640
gagattgcta aattaatttc tattagaaat cgccaaaaga tccattgccg tagcaagatc   17700
```

```
aagatactga aagcagaggg aaatttatat gcggcagaga ttgatgagag ggtaacaatg   17760
aagattggcg caggacattt tgagccaagc ggcccacaa  actgggtagt tgctgccgag   17820
ggacaggatt acaaggtctg ggaagtgtca tcgtagactt gccgcgctgg tacttgcaga   17880
acttctattg tagacagtat acaaccattc ggtatagctc acaaaaggga tcgttcaaac   17940
atttggcaat aaagtttctt aagattgaat cctgttgccg gtcttgcgat gattatcata   18000
taatttctgt tgaattacgt taagcatgta ataattaaca tgtaatgcat gacgttattt   18060
atgagatggg tttttatgat tagagtcccg caattataca tttaatacgc gatagaaaac   18120
aaaatatagc gcgcaaacta ggataaatta tcgcgcgcgg tgtcatctat gttactagat   18180
ccctaggcac gtgtacgtat tttttaccag gtgaactcca agtcctggac ccttttttg   18240
gcactggccg tcgttttaag cttgtaaacc taagagaaaa gagcgtttat tagaataacg   18300
gatatttaaa agggcgtgaa aaggtttatc cgttcgtcca tttgtatgtg catgccaacc   18360
acaggggttcc cctcgggatc aaagtacttt gatccaaccc ctccgctgct atagtgcagt   18420
cggcttctga cgttcagtgc agccgtcttc tgaaaacgac atgtcgcaca agtcctaagt   18480
tacgcgacag gctgccgccc tgcccttttc ctggcgtttt cttgtcgcgt gttttagtcg   18540
cataaagtag aatacttgcg actagaaccg gagacattac gccatgaaca agagcgccgc   18600
cgctggcctc ctgggctatg cccgcgtcag caccgacgac caggacttga ccaaccaacg   18660
ggccgaactg cacgcggccg gctgcaccaa gctgttttcc gagaagatca ccggcaccag   18720
gcgcgaccgc ccggagctgg ccaggatgct tgaccaccta cgccctggcg acgttgtgac   18780
agtgaccagg ctagaccgcc tggcccgcag caccgcgac  ctactggaca ttgccgagcg   18840
catccaggag gccggcgcgg gcctgcgtag cctggcagag ccgtgggccg acaccaccac   18900
gccggccggc cgcatggtgt tgaccgtgtt cgccggcatt gccgagttcg agcgttccct   18960
aatcatcgac cgcacccgga gccgcaag   gcccgaggcg tgaagtttgg                19020
cccccgccct accctcaccc cggcacagat cgcgcacgcc cgcgagctga tcgaccagga   19080
aggccgcacc gtgaaagagg cggctgcact gcttggcgtg catcgctcga ccctgtaccg   19140
cgcacttgag cgcagcgagg aagtgacgcc caccgaggcc aggcggcgcg gtgccttccg   19200
tgaggacgca ttgaccgagg ccgacgccct gggcgccgc  gagaatgaac gccaagagga   19260
acaagcatga aaccgcacca ggacggccag gacgaaccgt ttttcattac cgaagagatc   19320
gaggcggaga tgatcgcggc cgggtacgtg ttcgagccgc ccgcgcacgt ctcaaccgtg   19380
cggctgcatg aaatcctggc cggttttgtct gatgccaagc tggcggcctg gccggccagc   19440
ttggccgtcg aagaaaccga gcgccgccgt ctaaaaaggt gatgtgtatt tgagtaaaac   19500
agcttgcgtc atgcggtcgc tgcgtatatg atgcgatgag taaataaaca aatacgcaag   19560
gggaacgcat gaaggttatc gctgtactta accagaaagg cgggtcaggc aagacgacca   19620
tcgcaaccca tctagcccgc gccctgcaac tcgccggggc cgatgttctg ttagtcgatt   19680
ccgatcccca gggcagtgcc cgcgattggg cggccgtgcg ggaagatcaa ccgctaaccg   19740
ttgtcggcat cgaccgcccg acgattgacc gcgacgtgaa ggccatcggc cggcgcgact   19800
tcgtagtgat cgacggagcg ccccaggcgg cggacttggc tgtgtccgcg atcaaggcag   19860
ccgacttcgt gctgattccg gtgcagccaa gcccttacga catatgggcc accgccgacc   19920
tggtggagct ggttaagcag cgcattgagg tcacggatgg aaggctacaa gcggcctttg   19980
tcgtgtcgcg ggcgatcaaa ggcacgcgca tcggcggtga ggttgccgag ggtgctggcg   20040
ggtacgagct gcccattctt gagtcccgta tcacgcagcg cgtgagctac ccaggcactg   20100
ccgccgccgg cacaaccgtt cttgaatcag aacccgaggg cgacgctgcc cgcgaggtcc   20160
aggcgctggc cgctgaaatt aaatcaaaac tcatttgagt taatgaggta aagagaaaat   20220
gagcaaaagc acaaacacgc taagtgccgg ccgtccgagc gcacgcagca gcaaggctgc   20280
aacgttggcc agcctggcag acacgccagc catgaagcgg gtcaactttc agttgccggc   20340
ggaggatcac accaagctga agatgtacgc ggtacgccaa gcaagacca  ttaccgagct   20400
gctatctgaa tacatcgcgc agctaccaga gtaaatgagc aaatgaataa atgagtagat   20460
gaattttagc ggctaaagga gcggcatgg  aaaatcaaca acaaccagcc accgacgccg   20520
tggaatgccc catgtgtgga ggaacgggcg gttggccagg cgtaagcggc tgggttgtct   20580
gccgccctg  caatggcact ggaaccccca agcccgagga atcggcgtga cggtcgcaaa   20640
ccatccggcc cggtacaaat cggcgcgcg  ctgggtgatg acctggtgga gaagttgaag   20700
gccgcgcagg ccgcccagcg gcaacgcatc gaggcagaag cacgccccgg tgaatcgtgg   20760
caagcggccg ctgatcgaat ccgcaaagaa tcccggcaac cgccggcagc cggtgcgccg   20820
tcgattagga agccgcccaa gggcgacgag caaccagatt ttttcgttcc gatgctctat   20880
gacgtgggca cccgcgatag tcgcagcatc atggacgtgg ccgttttccg tctgtcgaag   20940
cgtgaccgac gagctggcga ggtgatccgc tacgagcttc cagacgggca cgtagaggtt   21000
tccgcagggc cggccggcat ggccagtgtg tgggattacg acctggtact gatgccggtt   21060
tcccatctaa ccgaatccat gaaccgatac cggaaggga  agggagacaa gcccggccgc   21120
gtgttccgtc cacacgttgc ggacgtactc aagttctgcc ggcgagccga tggcggaaag   21180
cagaaagacg acttggtaga aacctgcatt cggttaaaca ccacgcacgt tgccatgcag   21240
cgtacgaaga aggccaagaa cggccgcctg gtgacggtat ccgagggtga agccttgatt   21300
agccgctaca agatcgtaaa gagcgaaacc gggcggccgg agtacatcga gatcgagcta   21360
gctgattgga tgtaccgcga gatcacgaaa gcaagaacc  cggacgtgct gacgttcac   21420
cccgattact ttttgatcga tcccggcatc ggccgttttc tctaccgcct ggcacgccgc   21480
gccgcaggca aggcagaagc cagatggttg ttcaagacga tctacgaacg cagtggcagc   21540
gccggagagt tcaagaagtt ctgtttcacc gtgcgcaagc tgatcgggtc aaatgacctg   21600
ccggagtacg atttgaagga ggaggcgggg caggctggcc cgatcctagt catgcgctac   21660
cgcaacctga tcgagggcga agcatccgcc ggttcctaat gtacgagca  gatgctaggg   21720
caaattgccc tagcagggga aaaaggtcga aaaggtctct ttcctgtgga tagcacgtac   21780
attgggaacc caaagccgta cattgggaac cggaacccgt acattgggaa cccaaagccg   21840
tacattggga accggtcaca catgtaagtg actgatataa aagagaaaaa aggcgatttt   21900
tccgcctaaa actctttaaa acttattaaa actcttaaaa cccgcctggc ctgtgcataa   21960
ctgtctggca agcgcacagc cgaagagctg caaaaagcgc ctacccttcg gtcgctgcgc   22020
tccctacgcc ccgccgcttc gcgtcggcct atcgcggccg ctggccgctc aaaaatggct   22080
ggcctacggc caggcaatct accagggcgc ggacaagccg cgccgtcgcc actgcgccgc   22140
cggcgcccac atcaaggcac cctgcctcgc gcgtttcggt gatgacggtg aaaacctctg   22200
acacatgcag ctcccggaga cggtcacagc ttgtctgtaa gcggatgccg ggagcagaca   22260
agcccgtcag ggcgcgtcag cgggtgttgg cgggtgtcgg ggcgcagcca tgacccagtc   22320
acgtagcgat agcggagtgt atactggctt aactatgcgg catcagagca gattgtactg   22380
agagtgcacc atatgcggtg tgaaataccg cacagatgcg taaggagaaa ataccgcatc   22440
```

```
aggcgctctt ccgcttcctc gctcactgac tcgctgcgct cggtcgttcg gctgcggcga   22500
gcggtatcag ctcactcaaa ggcggtaata cggttatcca cagaatcagg ggataacgca   22560
ggaaagaaca tgtgagcaaa aggccagcaa aaggccagga accgtaaaaa ggccgcgttg   22620
ctggcgtttt tccataggct ccgcccccct gacgagcatc acaaaaatcg acgctcaagt   22680
cagaggtggc gaaacccgac aggactataa agataccagg cgtttccccc tggaagctcc   22740
ctcgtgcgct ctcctgttcc gaccctgccg cttaccggat acctgtccgc ctttctccct   22800
tcgggaagcg tggcgctttc tcatagctca cgctgtaggt atctcagttc ggtgtaggtc   22860
gttcgctcca agctgggctg tgtgcacgaa ccccccgttc agcccgaccg ctgcgcctta   22920
tccggtaact atcgtcttga gtccaacccg gtaagacacg acttatcgcc actggcagca   22980
gccactggta acaggattag cagagcgagg tatgtaggcg gtgctacaga gttcttgaag   23040
tggtggccta actacggcta cactagaagg acagtatttg gtatctgcgc tctgctgaag   23100
ccagttacct tcggaaaaag agttggtagc tcttgatccg gcaaacaaac caccgctggt   23160
agcggtggtt tttttgtttg caagcagcag attacgcgca gaaaaaaagg atctcaagaa   23220
gatcctttga tcttttctac ggggtctgac gctcagtgga acgaaaactc acgttaaggg   23280
attttggtca tgcattctag gtactaaaac aattcatcca gtaaaatata atattttatt   23340
ttctcccaat caggcttgat ccccagtaag tcaaaaaata gctcgacata ctgttcttcc   23400
ccgatatcct ccctgatcga ccggacgcag aaggcaatgt cataccactt gtccgccctg   23460
ccgcttctcc caagatcaat aaagccactt actttgccat ctttcacaaa gatgttgctg   23520
tctcccaggt cgccgtggga aaagacaagt tcctcttcgg gcttttccgt cttaaaaaa   23580
tcatacagct cgcgcggatc tttaaatgga gtgtcttctt cccagttttc gcaatccaca   23640
tcggccagat cgttattcag taagtaatcc aattcggcta agcggctgtc taagctattc   23700
gtataggac aatccgatat gtcgatggag tgaaagagct tgatgcactc cgcatacagc   23760
tcgataatct tttcagggct tgttcatct tcatactctt ccgagcaaag gacgccatcg   23820
gcctcactca tgagcagatt gctccagcca tcatgccgtt caaagtgcag gacctttgga   23880
acaggcagct ttccttccag ccatagcatc atgtccttt cccgttccac atcataggtg   23940
gtcccttat accggctgtc cgtcattttt aaatatggt tttcattttc tcccaccagc   24000
ttatatacct tagcaggaga cattccttcc gtatctttta cgcagcggta tttttcgatc   24060
agttttttca attccggtga tattctcatt ttagccattt attatttcct tcctctttc   24120
tacagtattt aaagataccc caagaagcta attataacaa gacgaactcc aattcactgt   24180
tccttgcatt ctaaaacctt aaataccaga aacagctt ttcaaagttg tttcaaagt   24240
tggcgtataa catagtatcg acggagccga ttttgaaacc gcggtgatca caggcagcaa   24300
cgctctgtca tcgttacaat caacatgcta ccctccgcga gatcatccgt gtttcaaacc   24360
cggcagctta gttgccgttc ttccgaatag catcggtaac atgagcaaag tctgccgcct   24420
tacaacggct ctcccgctga cgccgtcccg gactgatggg ctgcctgtat cgagtggtga   24480
ttttgtgccg agctgccggt cggggagctg ttggctggct ggtggcagga tatattgtgg   24540
tgtaaaca                                                             24548
```

SEQ ID NO: 2        moltype = DNA  length = 28365
FEATURE           Location/Qualifiers
source            1..28365
                    mol_type = other DNA
                    organism = synthetic construct
SEQUENCE: 2

```
ctgcaggata atgacagcct aggcggaggt gcggtaaagc ttgccgaaaa catgcagaag     60
agcaacgacg gcaatgaacc caatgctcat gatgaggact gagttcgggg acatcttgcg    120
cccagcagcc tcatcggtgt agaactggag cattgtgctg gcaccgcctc caccagtgcc    180
actgctggtg gttctacgcc tgcgcaagct tgcagcagct gctgcactcc ctctagccgg    240
ggcatctcca ttggccacca tcttgcttta tccctctgca tgataatatg agtttcaaat    300
gtaaggtttg cagcactaat attacagaaa ccaacagaa caacagagtt tcatccaaag    360
tcgtattgca tatacatagg aagtgttaaa atatgtctat cattttggaa gatacggttt    420
atgctgtcac acagcatttt ggaagtgact attttataag cacagaagtt tcttcaatgt    480
ggaatatgtc aaaaggcaaa ataagaagca cagaagtttc ttcaatgtgg aatatgtcag    540
aaggcagaat aaggtacaca tcttggaagt gtatgatagt actacaccaa taccagtgaa    600
gttttagttg tcatttga gtgctaataa aaatataaaa agaaatggt tgctgttgct    660
catgcctata tacattcata atctatcaaa ctaactgctc ctggatgctg cataactata    720
actaaacaag cttaagttaa atttaccaca gaaaaagaaa aaatgacaac tagtcccaga    780
attctgctga aaaattttgg ggctgtcctg ggcttggcca acacccatt gacatgatgc    840
tgcccaagtg taagaactgt aaaacaagta tagtgtctgt gtatgtacag ggatggcagc    900
atattcattg ctgcaacaca agctacgcta catgaaacca atttcttacg ctggaatatg    960
aacaaacaac atggaggaga gatttcgtaa tagaattttg agcaaatatg ttggtacgga   1020
caaaatgatc ccccacaaaa atccgcgag aagatcatga gtgacacgcg atatatgagg   1080
taacacacga acatcttatc aagaattcag atccattccc agatcctgac aaaagcactag   1140
aactacaaca gaaatacttc gataaaacaa ttcgatttcc cttcatgaca catcctaaca   1200
tcacatcaaa ccccccgcag ccaatctgaa ttctgaacag caagatctgg aacagaaggg   1260
gtacccatcc cagaattcta atcggccaa accaaacaag cccgatctaa gacatcgatt   1320
caacatgaac gcgtacggaa tcaaagcagg ctaatcggag agatggcgaa aagaggatga   1380
ttttcgcgcg cacctgatga atctgccctg cccaatcgc tcgtgctccc gtcccaactt   1440
ggtcactcgt cttctcgccc gaaaatctga gtgcggaatt cagaattctc tccgcgtctg   1500
aaccccgcgc ctgtatctca cccaactggc tggattaacg ggttccgttc aagatccgat   1560
atcaagtgac gtggtcggcg cgatctgatt ggccggagcg cgtctccgcg cgtcgatctg   1620
agccgtccga ttcgttgccg ggtcccgatc gcgcggcctg tgtgaaacg ggtggcgtca   1680
ccgcgtgcgc cgtggcactg tgacgtggca acggttatgc ggttatgcac agtcatgggc   1740
tggacctttt ggcccaacat ctgtggactc gtggaccggg tttcggccct tttatccgct   1800
ctacggacga gtccacgtc agcgacgtg ggtcccacca cgaaggcgt gcctccctct   1860
aaaaattgcc aatgacgata agagcaaaga cggacgggag ggagggggtc caaattaaaa   1920
ctccaaaatc cattcgaaca gcgaaggaaa tttgttggaa attttgaga tttggatttt   1980
tgttctagga gaggggaagg ttagaagaag ttgagatcgg tggagaactg agatcgagg   2040
ggagatgctg tgtctcacct cctcttcctc ctccgcgccc gctccgctcc ttccctctct   2100
cgctgatcga ccgagcccag gaatcgcggg cggggggtgc aatgttcgcc tgagcgtggt   2160
```

```
ttcttcgccg cgccggtcgt ggcctggaaa ggtcaagacc aatttctcag ttcctgcgac 2220
tgcgcgaaaa aacaaaacca tggtgactgt tgtggaggag atcgcgtccg gccaccaagt 2280
cctctttcag gggttcaact gggagtcgtg gaagcagagc ggcgggtggt acaacatgat 2340
gatgggcaag gtcgacgaca tcgccgctgc cggagtcacc cacgtctggc tgccaccgcc 2400
gtcgcactcc gtctccaacg aaggttacat gcctggtcgc ctgtacgaca tcgacgcgtc 2460
caagtacggc aacgcggcgg agctcaagtc gctcatcggc gcgctccacg gcaagggcgt 2520
gcaggccatc gccgacatcg tcatcaacca ccgctgcgcc gactacaagg atagccgcgg 2580
catctactgc atcttcgagg gcggcacctc cgacggccgc ctcgactggg cccccacat 2640
gatctgtcgc gacgacacca aatactccga tggcaccgca aacctcgaca ccggagccgg 2700
cttcgccgcc gcgcccgaca tcgaccacct caacgaccgg gtccagcgcg agctcaagga 2760
gtggctcctc tggctcaaga gcgacctcgg cttcgacgcg tggcgccttg acttcgctag 2820
gggctactcg ccggagatgg ccaaggtgta catcgacggc acatccccga gcctcgccgt 2880
ggccgaggtg tgggacaata tggccaccgg cggcgacggc aagcccaact acgaccagga 2940
cgcgcaccgg cagaatctgg tgaactgggt ggacaaggtg ggcgcgcggg cctcggcagg 3000
catggtgttc gacttcacga ccaaagggat actgaacgct gccgtggagg gcgagctgtg 3060
gaggctgatc gacccgcagg ggaaggcccc cggcgtgatg ggatggtggc cggccaaggc 3120
cgccaccttc gtcgacaacc acgatacagg ctccacgcag gccatgtggc cattcccctc 3180
cgacaaggtc atgcagggct acgcgtacat cctcacccac cccggcatcc catgcatctt 3240
ctacgaccat ttcttcaact gggggtttaa ggaccagatc gcggcgctgg tggcgatcag 3300
gaagcgcaac ggcatcacgg cgacgagcgc cctgaagatc ctcatgcacg aaggagatgc 3360
ctacgtcgcc gagatagacg gcaaggtggt ggtgaagatc gggtccaggt acgacgtcgg 3420
ggcggtgatc ccggccgggt tcgtgacctc ggcacacggc aacgactacg ccgtctggga 3480
gaagaacggt gccgcggcaa cactacaacg gagctgaagt ctgcactgat ccgtcattgc 3540
atcggacaaa gcagcattag tccgttgatc ggtggaagac cactcgtcag tgttgagttg 3600
aatgtttgat caataaaata cggcaatgct gtaagggttg tttttatgc cattgataat 3660
acactgtact gttcagttgt tgaactctat ttcttagcca tgccaagtgc ttttcttatt 3720
ttgaataaca ttacagcaaa aagttgaaag acaaaaaaaa aaaccccga acagagtgct 3780
ttggcgatcg cgcccgggct taattaactg caggatctag taacatagat gacaccgcgc 3840
gcgataattt atcctagttt gcgcgctata ttttgttttc tatcgcgtat taatgtata 3900
attgcgggac tctaatcata aaaacccatc tcataaataa cgtcatgcat tacatgttaa 3960
ttattacatg cttaacgtaa ttcaacagaa attatatgat aatcatcgca agaccggcaa 4020
caggattcaa tcttaagaaa ctttattgcc aaatgtttga acgatctcag ctgtgcccca 4080
gtttgctagg caggtcgcag tacctggcca cagccatctc gtgctgctcc acgtaggtct 4140
ctttgtcggc ctccttgatt cttccagtc cctgtccac gaagtagaag ccgggcatct 4200
tgaggttctt agcgggtttc ttggatctgt atgtggtctt gagggagcag tgcaggtagc 4260
ccccgcccac gagcttcagg gccatctggc tatggcctct caggccgctg tcagcggggt 4320
acagcatctc ggtgctggcc tcccagccga gtgttttctt ctgcatcaca gggccgttgg 4380
atgggaagtt gaccccgttg atcttgacgt tgtagatgag cagccgttc tggaggctgg 4440
tgtcctgggt agcggtcagc acgccccgt cttcgtatgt ggtgatcctc tcccatgtgg 4500
agccctcagg gaaggactgc ttaaagaagt cggggatgcc ctgggtgtgg ttgataaagg 4560
ttttgctgcc gtacatgaag ctggtagcca ggatgtcgaa ggcgaagggg agagggccgc 4620
cctcgaccac cttgatcttc atggtctggg tgccctcgta gggcttgcct tcgccctcgg 4680
atgtgcactt gaagtggtgg tcgttcacgg tgccctccat gtagagtttc atgtgccatgt 4740
tctcggtgat cagcacgcta tcctcaccca ctgcggaagc gttgcatgca acaatagcaa 4800
ggagagcaaa tacgaaaatg atcttcatt ttgtaggatt ctactactat gcttcaacta 4860
taatgtttga attgtgtgaa ggatgaggag ggttttcatt atgcttgtct atttatagat 4920
gtttccctat cggttgcttt agagtgttag ttttgcttga tctatatta ggatctaagt 4980
gagtcatatt atttggatat tctgttaggt gcacctaaaa atgttctttg atatcatcat 5040
caaagtaact tttatgccca tcatatatac atgatggtga gcaaaaaaat aatgacatga 5100
ctcatcgctc actttatgtg tcaatgtgat aaggattgca acttttgaaa ctaagtttgt 5160
tatgttttgt aagctattat tttgataatg cactacacgt ggaacttttgc gactgttgta 5220
gtttatgctc tttgaattat ataatttcag taagaaaaaa aattatagta tgttcaatgt 5280
ttttcattgt tccattaata ctcttgtgaa aacttgtttg tgatacgaaa taagttaatg 5340
caataacttt taaattaact ttgcagagct ttacaataac tcaccaactt actctaattg 5400
tggttgggga ttgatttaat tcatactttt atagaccaaa ttgatattgt gttgctaaat 5460
aaaaattata gtggtgttgc tacacctaca cagacacaga aggaatcctg atatcatcag 5520
ctatctactg cttcctccac atggactcaa gaagcagaag caaaaagaa gaaggcattt 5580
gctccaacaa agttttccgg tgaaaggcaa cacattgttc tgaacttcct ggcatgtatt 5640
atgtgaatct agcaaattaa ccaaacattg acacaatgca acaccttgta atgtagccgt 5700
gccgagaatt gtatatctca cttaccattg tatatcacac gtgccgagaa taggagattg 5760
atttttgcca accaaaacgc tctaggcaga ccaattgggc gcccggccgg attaattaag 5820
acaaatttgt tgtcagatc aaatttttaa gcaaaacata agaaacagca caaagggta 5880
tagcagaagc aaaatttgga cacaatgatt agggatcact tattcattat agttcttcca 5940
tgctgctcta ccacagcaaa acgtttcaga caccatcaaa ccagacttaa ggatacacat 6000
tacaggtaaa tagtacacaa tgaaacggga cacgaccaag gaccagacca gacaaccata 6060
gctccattgg gaagacaaa taggcagact tgtgaaccct agaacagcag cagctctatg 6120
gctgaggacg gtacctctag aggcgcgccc actttgtgag gcctttaata cacagtcctg 6180
ccatcaccat ccaggatcat gtccttgaat gcgcccaa ttgggatcat aggcagcaca 6240
tgctcctggt gcgggacgat gatatccaac aagtatggcc tctgagcatc cttc 6300
ttgatggcgg cacggacttc actcttcttt gttacacgga ctgccggaat attgaacccc 6360
ttagcaaatag tcacaaaatc tggatatatc tcgctctcac attccgggtt gcccaagtat 6420
gtatgcgccc tattcgcctt gtaaaaccta tcctccaatt gcaccaccat acccaaatgt 6480
tggttgttca acaccatcac cttcacaggg aggttctcaa tgcggatcaa tgccagctcc 6540
tgaatgttca tgaggaagct accatcccca tcaatatcaa caactgtgac acctgggtta 6600
gccacagaag caccagctgc ggcaggcagc ccaaatccca ttgcgcccag accagccgaa 6660
gacagccact gccgtggccg cttgtaggtg taatattgtg ccgcccacat ctggtgctgc 6720
ccaacaccag tagcgatgat tgcctcacct ttcgtcagct catccagcac ctgaatggca 6780
tattgcggtg ggatctcttc accaaaagtt ttgtacccca gaggaaactc cctcttctgc 6840
tggtccaact cattgtgcca tgcactaaaa tcagaacttg tctttgttgt gctctgttgt 6900
```

```
agcagagcat tcaagccctg taaagcgagc ttaacatctg cgcaaattga cacatgtggt   6960
tgcttgttct ttccaatctc tgctggatca atgtcaatgt gcacaatctt ggccctgctt   7020
gcaaaagcct caattttccc tgtcacacga tcatcaaacc gcacaccaaa cgcaagcaac   7080
aggtcagcct tatccacggc ataatttgcg tacaccgtgc catgcatccc aagcatccgc   7140
agggacaacg ggtcgtcact ggggaaattg ccgaggccca tcagagtggt tgtaactggg   7200
ataccagtca gctcaacaaa ccagcgcaat tcgtcaccag atgcagagca gccaccaccg   7260
acatagagaa tcgggcgccg tgactcgcca accagacgca agacctgctc aagcaattct   7320
gtcgcgggtg gcttgggcag gcgtgcgatg taccctggta gattcatcga ggtgtcccag   7380
accggcacgg ccatctgctg ctggatgtcc ttggggatgt ccaccagcac cgggccagga   7440
cggcccgagg acgcgaggaa gaaggcttcc tgtatgacgc gggggatgtc ctccacatca   7500
aggacaaggt aattgtgctt ggtgatggag cgggtgacct cgactatggg cgtctcctgg   7560
aaggcgtcgg tgccgatcat gcggcggggg acctggcccg tgatggcgac catcgggacg   7620
gagtcgagca gcgcgtcggc gagcgcggac acgaggttgg ttgcgccggg gccggaggtg   7680
gcgacgcaga ccccgacgcg gccggacgcg cgcgcgtcca cggacgccgc gaacgcctcg   7740
ccctgctcgt ggcggaagag gtggttggtg atgaccgggg agcgcgtcag cgcctggtgg   7800
atctccatcg acgcgccgcc tgggtaggcg aacacgtcgc tgacgccgca ccgctccagc   7860
gcctccacga ggatgtccgc gcccttgcgg ggctcggccg gcccccacgg ccggagcggc   7920
gtggccgacg gcgccgggga cggcggggtg accgggaca ccgccgagca cctgaccgcc   7980
gccgccccca cccggcctcg agcgggaagg acgtggtgtc gctggtggtt cttacggccg   8040
gtcttggccg tcgcggcggc ggacagggcg gcggccgcgg ccgcggcggt cgtagccatg   8100
gtgggtggtg gcggcggcgg cggcggcgag ggttctcggg tttgggcgag agggagagag   8160
gggtgagagg tgtggggggtg tgggtgtttt gtccgcggcg ggtgacgcag cgtgaggcga   8220
tgtgtggctc ggatgggatc gtgtggggcc acgtcacagt gggcccccata tgtcggtggg   8280
ataggatgac acacagccac gtcggggtcg atctgggccc gcgtgtcagt cgattggatg   8340
aggatgacag gtgggtcagt cccaataacg ggtggagggt acagaacccg ataaaaaatc   8400
gatctcaaag tcggatgcgg atgcaaccgc gagacctagc agtctagcac ccgcaccgc   8460
acccgcacaa acgcagcgca agatgagcag tggcggcgaa aagtccggct cgggcggcgg   8520
cggcggtggc ggcggcggcg gggcggtgaa gacgccctcc gacttcctca agtccatcag   8580
ggggcgcccc gtcgtcgtca agctcaactc cggcgtcgac taccgcggta accccctgct   8640
caattccctc ccctttttg cctcaacct agaccccgcc cccgaaaacc ctagcacgag   8700
acgaatgcga tgtttgttgt accccgtatc tctttctcct taattggaac tctgcgtttc   8760
ttttcgttaa ttagtggggg gaaggaaagg cgtggactct gtaggatttt cttttcgatt   8820
tgatgaccaa gggagatact tatttagtg ctgtttaaga tcctgctagt gcccggtgta   8880
gctaggccat ttgagaagca gataaccgtg tttttctgta ggaccttctc taatcttgag   8940
ctattttgat attctaatta cttatggtta aaccctagaa cctcagtatg ttttaactta   9000
gtaagagatt gctacagtat tttattgt aggaacaaca ttgtaggtgg ttatcatgct   9060
actgactgtc ttgtgtagag ccctcctatc attaaggggc ttttatgttt actaatagtt   9120
agttttagta cccatttttc tgtgagctac taaaaagaat atttccaatt caacctatgg   9180
taattttaaag tactttatgc tgtatgtcca tttactgagg attatgatta atatttaaga   9240
gggaggacat ctgtgcttaa ggtttgcatt gcaatatttg atagatttat gctaaacaaa   9300
ggtaattgtg catgcttgag atagaaaggg atttcccttc tttgggtttg ataataaggg   9360
gttggcattc catgatcagg agcatagtgc atttatattt tataatgtgg ctatgtgtat   9420
gcagttctca atttcacatt ggcggtacac ccatgatata tttaattgtt acccagaacc   9480
atataatagc ctaataagag catatggtat tccattgatt gggcccttcg gaagtgtacc   9540
tgtgtatgta actatgcata taaggttac tttctggtag ttcttcttc tcctcatcac   9600
ttaagacatc tggatcgctg ttatcaagtc gtagactagt cataacgtca gtcaagtcag   9660
acgactagag ggctacgact cgaccaaata gcaagtcgca caattagtcg tagattagtc   9720
atagcaaatc atcatttcac catgctaatt ggcttattgt gtttagtact ttaaatttat   9780
ttcttgttaa cttattgtct tgctggctac tccataaacc gtagtttata atactatata   9840
tagtgcttag tacaatagaa tagtactaga gactatatag tgcatccatt gttttcacac   9900
gaccaaatca tggactagtc gtggactaga ttttgaatgg aacagtttta ccagaaatac   9960
acttgttctt ttttttttctg aatagtgttg aatcagtagc tgcaatgcat agcttgtgca  10020
ataaaatcat tatatactat caccaatttc atggaatctt acttattgga aatttgtaac  10080
aaatctattt tatccctga gttaccgtgt tggtctaaaa tcaactcgca tgtgagacaa  10140
gatgaagagg accatgaaga ttgcctcttt catttattca tttgctgact gcttgcaatg  10200
ccactataaa cctaatcgga tgactggttg tcatgtctcc gctaactaga gagaaagggg  10260
gaggagtgaa gactttacgt gtacacagtc tttcaccagg acggttgtat cggttcagca  10320
gtcgcgatcc gggcagcgct gaagaacttc cccgatctag taacatagat gacaccgcgc  10380
gcgataattt atcctagttt gcgcgctata ttttgttttc tatcgcgtat taaatgtata  10440
attgcgggac tctaatcata aaaacccatc tcataaataa cgtcatgcat tacatgttaa  10500
ttattacatg cttaacgtaa ttcaacagaa attatatgat aatcatcgca agaccggcaa  10560
caggattcaa tcttaagaaa ccacctgcaa gtgacttcct cagcaggcct actagtttta  10620
ttgccaaatg ttttgaacgat cggggaaatt ccagtgcacc agagtcacag aaacacatca  10680
cacattcgtg agctcagctt agccatggat aacgcctaca ttattgccat tctctctgta  10740
gctatcctct tcttgctcca ctactacctc ctcggccgcg gcaatggcgg ggcggcgcgg  10800
ctgccgccgg gtccaccggc cgtcccgatc ctggacacc tccacctcgt caagaagccg  10860
atgcacgcca ccatgtcccg cctcgccgag cggtacgggc cggtgttctc gctgcgcctc  10920
gggtcgcggc gcgccgtggt ggtgtcgtcg ccggggtgcg ccaggagtg cttcaccgag  10980
cacgacgtga ccttcgcgaa ccggcccagg ttcgagtcgc agctgctggt ctcgttcaac  11040
ggcgccgcgc tcgccacggc gagctacggc gcgcactgg gcaacctccg ccggatcgtc  11100
gccgtgcagc tgctctccgc gcaccgcgtc ggcctcatgt ctgaaaatct cgaaacagcc  11160
gtgtcatagt caatcattag gtgttatagg aacaatcaaa ggtttttca agtgttaatc  11220
ttcatactaa tatatacagt gggtactctt tatctactgc cgtggaactg tcatatttga  11280
ttatgaaatt ttagctctag aaaatatttg atcatcaatg tcaagacttt atgaccttgc  11340
aaaatacatt tcctaattga gaacagggta aaattatgaa ctatgcctct gaaccttcat  11400
acacaggcag cacatttttt gttgtaaaat tcatcttaat atcagcggaa agactggacc  11460
agagaaagaa aaagttaaga caggcatata ctcttgatcc tctaaagag atgaggcggt  11520
acaatgatca accatgaaca ttaaagtgat acgtggaaca tgaacacaca ataattgtc  11580
actggaacat aaatacaaaa aggtttgtag taacttaccg acatgaggcc gacgcggtgc  11640
```

```
gcggagagca gctgcacggc gacgatccgg cggaggttgc gccagtgcgc gccgtagctc   11700
gccgtggcga gcgcggcgcc gttgaacgag accagcagct gcgactcgaa cctgggccgg   11760
ttcgcgaagg tcacgtcgtg ctcggtgaag cactccctgg cgcacccgg cgacgacacc    11820
accacgcgc gccgcgaccc gaggcgcagc gagaacaccg gcccgtaccg ctcggcgagg    11880
cgggacatgg tggcgtgcat cggcttcttg acgaggtgga ggtgtcccga gatcgggacg   11940
gccggtggac ccggcggcag ccgcgccgcc ccgccattgc cgcggccgag gaggtagtag   12000
tggagcaaga agaggatagc tacagagaga atggcaataa tgtaggcgtt atccatggct   12060
aagctgagct cacgaatgtg tgatgtgttt ctgtgactct ggtgcactgg gatccctga    12120
ggggtcaccg acttcaggtc aagtaacacc aaacaacagg gtgagcatcg acaaaagaaa   12180
cagtaccaag caaataaata gcgtatgaag gcagggctaa aaaaatccac atatagctgc   12240
tgcatatgcc atcatccaag tatatcaaga tcaaaataat tataaaacat acttgtttat   12300
tataatagat aggtactcaa ggttagagca tatgaataga tgctgcatat gccatcatgt   12360
atatgcatca gtaaaaccca catcaacatg tatacctatc ctagatcgat atttcatcc    12420
atcttaaact cgtaactatg aagatgtatg acacacacat acagttccaa aattaataaa   12480
tacaccaggt agtttgaaac agtattctac tccgatctag aacgaatgaa cgaccgccca   12540
accacaccac atcatcacaa ccaagcgaac aaaaagcatc tctgtatatg catcagtaaa   12600
acccgcatca acatgtatac ctatcctaga tcgatatttc catccatcat cttcaattcg   12660
taactatgaa tatgtatggc acacacatac agatccaaaa ttaataaatc caccaggtag   12720
tttgaaacag aattctactc cgatctagaa cgaccgccca accagaccac atcatcacaa   12780
ccaagacaaa aaaaagcatg aaaagatgac ccgacaaaca agtgcacggc atatattgaa   12840
ataaggaaa agggcaaacc aaaccctatg caacgaaaca aaaaaaatca tgaaatcgat    12900
cccgtctgcg gaacggctag agccatccca ggattcccca aagagaaaca ctggcaagtt   12960
agcaatcaga acgtgtctga cgtacaggtc gcatccgtgt acgaacgcta gcagcacgga   13020
tctaacacaa acacgatct aacacaaaca tgaacagaag tagaactacc gggccctaac    13080
catggaccgg aacgccgatc tagagaaggt agagaggggg ggggggggag gacgagcggc   13140
gtaccttgaa gcggaggtgc cgacgggtgg atttggggga gatctggttg tgtgtgtgtg   13200
cgctccgaac aacacgaggt tggggaaaga gggtgtggag gggtgtcta tttattacgg    13260
cgggcgagga agggaaagcg aaggagcggt gggaaaggaa tccccgtag ctgccggtgc    13320
cgtgagagga ggaggaggcc gcctgccgtg ccggctcacg tctgccgctc cgccacgcaa   13380
tttctggatg ccgacagcgg agcaagtcca acggtggagc ggaactctcg agaggggtcc   13440
agaggcagcg acagagatgc cgtgccgtct gcttcgcttg gcccgacgcg acgctgctgg   13500
ttcgctggtt ggtgtccgtt agactcgtcg acggcgttta acaggctggc attatctact   13560
cgaaacaaga aaaatgtttc cttagttttt ttaatttctt aaagggtatt tgtttaattt   13620
ttagtcactt tatttattc tattttatat ctaaattatt aaataaaaaa actaaaatag    13680
agttttagtt ttcttaattt agaggctaaa atagaataaa atagatgtac taaaaaaatt   13740
agtctataaa aaccattaac cctaaaccct aaatggatgt actaataaaa tggatgaagt   13800
attatatagg tgaagctatt tgcaaaaaaa aaggagaaca catgcacact aaaaagataa   13860
aactgtagag tcctgttgtc aaaatactca attgtccttt agaccatgtc taactgttca   13920
tttatatgat tctctaaaac actgatatta ttgtagtact attagttatt ttattcgtag   13980
agtaaagttt aaatatatgt ataaagatag ataaactgca cttcaaacaa gtgtgacaaa   14040
aaaaatatgt ggtaattttt tataacttag acatgcaatg ctcattatct ctagagaggg   14100
gcacgaccgg gtcacgctgc acgttaacga cacctgtctc cggatcgcat gcgcattcta   14160
gaggatccct cagagtctca gtccactagc ctttgtccacg tcgccaatgt ttaaatccag   14220
tcccaccatt tgtagcgtag aatggaacag ctttcgataa aatttctcaa ccatttagat   14280
gaaattcgca ccgtttcaag cagggtctag gaccaacaaa tcctagaatc aaacatggta   14340
cattcaaatt tcaaattcaa accagattac ataggcttat ttactactcc ggtaagcgat   14400
acgggcggcg gcggcgcggc tgccggcgag cggcggcggg ggtcagacgg aggtggagac   14460
gcggaccttg aggccgtgag ccatggagag gatggtcatc atccggtact tgacgggtgt   14520
gtcctcgacg aggtcgaagg tgtagaagcg gaagaggatg gcgagcgcca tcttcatctg   14580
gaggtaggcg gagtccttgc cgaggcagat ccgcggcccg gcctgaacg cggtgaactt    14640
gaacgcggag gcgttgcgga acgcgccgcc gtcgccgctg agccaccgct ccggccggag   14700
gctcgccgcg tcggggcccc agttgtactc catcctcccc atcgagtagg gcacgtacgt   14760
caccatcccg ccggcgcgca ccttggtgcc gtcggggagc acgtcgtcct ccacgatccc   14820
cttgggtcc tgcggcaccg ccgggtagag gcggagcgtc tccgtcacgc aggcgtgcag    14880
gtacaccagc ttccccaccg cgtcgtagct cagcagcgac gcgaactgcg ccacgcgcgc   14940
cgcgaatgac gcctcgccgg cggcgtcggc gagcgcgacg ccctcctcgc gcgcgcgctc   15000
agcctcgaac gcggccagct cgcgccggag ctttgtcggcg acggctgggt gcgtcatcgc    15060
catgtacgtg aaccacgaca gcgtcgtcgc cgtcgtgtca cgcccggcga tcacgaagtt   15120
gagccaccacg tcgcggaggc tcttgtcgtc cccgaagctg ccgccccct cgtcgccgcc    15180
ggcctccccc agctcgatga accgcgcacg tatgtcgtgc ttgatctgct cgccattaca   15240
aatcaaccat atcaagaaac aaaaccttttt ccgatctgat catcgccatt accatgtcag   15300
ttcagttcta ctgattcttt gagcaagaga ggaaggatca ccttctcttg cttgccgctg    15360
gctcgagcct gcaagatctc agccttgcgg cggcggatca cgctgtaggt gaagtcatca   15420
accagcttca tgctctgctc gaggagagcc tctgatccga cgtcaagaa cttcttgaga   15480
cgccacagag gatcgatgaa ccgcagcgtg acgatgatgt tggcagcgtc gaaggcctga   15540
gcaaagctgt tctccgggag atcaggtgac agcgtcccga tctcaacccc aaacccgacc   15600
ttgcagatcg agtccagtgt catcctcatg aacaattcct gaattttggt tagttcttgc   15660
atcacaattc tgaacaattt ggtttctcaa gaaatgttta gatattaggc aaggaaatca   15720
gttggttacc tgcatgtcta caactctgcc ggccttgcac gcttcgtca gaatgcttga    15780
tagcttcagg gagtactccc tgaacaccac agtgctgaag tctctcaagt tcttggaggc   15840
aaaactcgaag ctcgccgtct tcctttgctt cctccacatc tcgccgtcgg cattgaatat   15900
gccatcaccg agcagcacat ccatgtaaga cctagact tcaccctgca tatttcaga    15960
catttttttgt gtcagtgtta gtactgtgca aggcacattt tacagtacac tgaagatcct   16020
atggttcttt taccttggg taattggtga agttggtctc caggacatgc tcgacgttca   16080
ccgggtcggc aatgtaggtg taggaggtga aaggcatgtc gacggtcacc gtcctgtcct   16140
tcgacaagta ctcgacaagc cagtcatgca tcctgtggta gttcttcagt tgctccactg   16200
tcgcgccgat gattggccat gatcttgcc cttttctggtt cctcaggctc cacttgtgga    16260
ccaagatcca tgagaggaca acaaggaaga tagctatgag cttgtggatt cctgctactg   16320
ggaagaatga tgtcactggc attgcatgag cttcctccat ggggctcttc atgaagggtt   16380
```

```
cagtctacaa gagatgctat gtagcatttt ggatgccata gttaggtgat atattgggaa    16440
ctgatgctac caaccttgag acaatctttg tgtgaccaag aattaagatt gtctcattca    16500
tatggtgtcc ctaacctaac acccttagga gttggatctt agctttagtt ttcttttgt     16560
gatctgtcca cctagaaaag aatcgttact catgtaaaca caaatgaat gctacagtat     16620
tttttcccc tgctcagcca agttcgttgt ttttgttcaga taactgaagc gtttgcagcg    16680
actaaaggta tggcacccttc taatatcaga accatatcca tctgaattct gttaaattgt   16740
caccaactga aaccaggctt accatttttct gtcgatattg tctagtcttt gatgacaact   16800
aaaatgaaat ggggtatcct caaaagaaat ataaattgtg aacccaaagt agttggtttc    16860
tacttcacct gaattctact tcatctgaat aggctatttt aatgaagaga aaatccaaga    16920
aatgccattt acaaacaccc aaatccaaga aatgctatcg acgagtacga gttccataaa    16980
atgctattgt agaagcgatt ttgtcccaga aatcagttgc catctagtta aaacattctc    17040
acataaacaa gcaatataaa atactattgc caagatatat ccaatacttt gcatctctaa    17100
aacttctagt tattgacaac taatttcttt tccagtcaat acaaataagc catctatcaa    17160
agatttgaga aattgcaggg cacaattcta cagaaaatta aagaacatca cttgaaaagg    17220
aagatttttt ctatagaact tatccttttg gatgtaacaa caaatactcg aatgaattga    17280
gaaataacca atgtcaacac tgaaacaagt ctgaaaccaa gatcagaaga gcatgaaaat    17340
agtgctctta tggattgacc ttgattcttg cccacactct tattcaaacc ttcgagcaaa    17400
ccggagcatt tgctgaataa atctctcatc tgttactgaa gatactaggt aactaaataa    17460
acaatcaatc aagagtatca aaacatttaa atttcgaaac gcgtcggacc ggcaccggac    17520
actgtctggt ggcataccag acagtccggt gtgccagatc agggcaccct tcggttcctt    17580
tgctcctttg cttttgaacc ctaactttga tcgtttattg gtttgtgttg aacctttatg    17640
cacctgtgga atatataatc tagaacaaac tagttagtcc aatcatttgt gttgggcatt    17700
caaccaccaa aattatttat aggaaaaggt taaaccttat ttccctttca atctcccct     17760
ttttggtgat tgatgccaac acaaaccaaa gaaatatat aagtgcagaa ttgaactagt     17820
ttgcataagg taagtgcata ggttacttag aattaaatca atttatactt ttacttgata    17880
tgcatggttg cttttctttta ttttaacatt ttggaccaca tttgcaccac ttgttttgtt    17940
ttttgcaaat cttttttgaa attcttttc aaagtctttt gcaaatagtc aaaggtatat     18000
gaataagatt gtaagaagca ttttcaagat ttgaaatttc tcccctgtt tcaaatgctt     18060
ttcctttgac taaacaaaac tccccctgaa taaaattctc ctcttagctt tcaagagggt    18120
tttaaataga tatcaattgg aaatatattt agatgctaat tttgaaaata taccaattga    18180
aaatcaacat accaattttga aattaaacat accaattttaa aaatttcaa aaagtggtgg    18240
tgcggtcctt ttgctttggg cttaatattt ctcccccttt ggcattaatc gccaaaacg    18300
gagactttgt gagccattta tacttctcc ccattggtaa atgaaatatg agtgaaagat     18360
tataccaaat ttggacagtg atgcggagtg acggcgaagg ataaacgata ccgttagagt    18420
ggagtggaag ccttgtcttc gccgaagact ccatttccct ttcaatctac gacttagcat    18480
agaaatacac ttgaaaacac attagtcgta gccacgaaag agatatgatc aaaggtatac    18540
aaatgagcta tgtgtgtaat gtttcaatca aagtttcgag aatcaagaat atttagctca    18600
ttcctaagtt tgctaaaggt tttatcatct aatggtttgg taaagatatc gactaattgt    18660
tctttggtgc taacataagc aatctcgata tcaccccctt gttggtgatc cctcaaaaag    18720
tgataccgaa tgtctatgtg cttagtgcgg ctgtgttcaa cgggattatc cgccatgcag    18780
atagcactct cattgtcaca taggagaggg actttgctca atttgtagcc atagtcccta    18840
aggttttgcc tcatccaaag taattgcaca caacaatgtc ctgcggcaat atacttggct    18900
tcggcgtag aaagagctat tgagtttttgt ttctttgaag tccaagacac cagggatctc    18960
cctagaaact gacaagtccc tgatgtgctc ttcctatcaa ttttacaccc tgcccaatcg    19020
gcatctgaat atcctattaa atcaaaggtg gatcccttgg ggtaccaaag accaaattta    19080
ggagtgtaaa ctaaatatct catgattctt ttcacggccc taaggtgaac ttccttagga    19140
tcggcttgga atcttgcaca catgcatata gaaagcatac tatctggtcg agatgcacat    19200
aaatagagta aagatcctat catcgaccgg tataccttt ggtctacgga tttacctccc     19260
gtgtcgaggt cgagatgccc attagttccc atgggtgtcc tgatgggctt ggcatccttc    19320
attccaaact tgttgagtat gtcttgaatg tactttgttt ggctgatgaa ggtgccatct    19380
tggagttgct tgacttgaaa tcctagaaaa tatttcaact tcccccatcat agacatctcg    19440
aatttcggaa tcatgatcct actaaactct tcacaagtag atttgttagt agacccaaat    19500
ataatatcat caacataaat ttggcataca aacaaaactt ttgaaatggt tttagtaaag    19560
agagtaggat cggctttact gactctgaag ccattagtga taagaaaatc tcttaggcat    19620
tcataccatg ctgttgggc ttgcttgagc ccataaaagcg ccttttgagg tttataaaca    19680
tggttagggt actcactatc ttcaaagccg agaggttgct caacatagac ctattcaccc    19740
catttgatca cttttttggt ccttcaggat ctaatagtta tgtataattt agagtctctt    19800
gtttaatggc cagatatttc taattaatct aagaatttat gatattttt aatttttat      19860
catgtctgat gagaattaac ataaaggctc aatttgggtcc tgaattaata atagagtgaa    19920
aattaatcca gaggctctat tagaacctcc aattagtaat accaagatat atataagata    19980
gtagagtata gtttaaatgt tggcattgtt cattctttct tttgttattt aatttatgct    20040
ttccacggtg gttagtggtt acttctgaag ggtccaaata atgcatgaag agtttgagga    20100
caagaagtct gccctaaaaa tagcgatgca aaggcatggt gtccaagcca tacatatagc    20160
gcactaattt tatcagcaga acaatggtat ttatagctcc tagtgcccag gcaacaagag    20220
acacgaataa agcatcgatc acgacaagat gctgtgtctc acctcctctt cctcctccgc    20280
gcccgctccg ctccttcccct ctctcgctga tcgaccgagc ccaggaatcg cgggcggggg    20340
tggcaatgtt cgcctgagcg tggtttcttc gccgcggcgg tcgtgcctg gaaaggtcaa     20400
gaccaatttc tcagttcctg cgactgcgcg aaaaaacaaa accatggtga ctgttgtgga    20460
ggagatcgct tgttctggta ctggatctgg atttgaaata ttgtgtcaag gatttaactg    20520
ggaatctcat aagtcaggaa aatggtatgt ggaacttggc tcaaaggcca aggagttgtc    20580
atccatgggt ttcaccattg tctggtcacc accacctact gattctgtgt cgcctgaagg    20640
atacatgcca agggatttgt ataatctaaa ttccagatat gggaccatgg aagagttgaa    20700
ggaggctgtg aaacgttttc atgaagcgg tatgaaggtt cttggtgatg ccgtcctgaa    20760
tcacaggtgt gctcaatttc agaaccaaaa tggcgtctgg aatattttg gtggacgcct    20820
taactgggat gatcgagcag ttgttgcaga tgatccacat ttccagggaa gaggaaacaa    20880
gagcagtgga gataacttcc atgcagcccc aaacattgat cactcgcaag agtttgtgag    20940
gagtgatctt aaagaatggc tttgttggat gagaaaggaa gttggatacg atggatggcg    21000
acttgattt gttcgcggat tttggggtgg atatgtccac gattacttgg aagcaagcga    21060
accatatttt gcagtaggag agtactggga ttctctcagt tacacctatg gtgaaatgga    21120
```

```
ttataatcaa gatgcccaca ggcagagaat agttgattgg ataaatgcta caaatggaac   21180
tgctggtgca tttgatgtta ccacgaaagg aatacttcac tctgcactgg aaagatctga   21240
gtactggcgt ctgtctgatg aaaaaggaaa accccctgga gtgttaggtt ggtggccttc   21300
gcgtgctgtc acatttatag aaaatcatga cactggttct actcagggtc attggagatt   21360
cccctttggt atggagttgc aaggctatgt ctacatctta actcacccag gcactcctgc   21420
aatcttctat gatcatatat tttcgcattt acagccagag attgctaaat taatttctat   21480
tagaaatcgc caaaagatcc attgccgtag caagatcaag atactgaaag cagagggaaa   21540
tttatatgcg gcagagattg atgagagggt aacaatgaag attggcgcag acattttga   21600
gccaagcggc cccacaaact gggtagttgc tgccgaggga caggattaca aggtctggga   21660
agtgtcatcg tagacttgcc gcgctggtac ttgcagaact tctattgtag acagtataca   21720
accattcggt atagctcaca aaagggatcg ttcaaacatt tggcaataaa gtttcttaag   21780
attgaatcct gttgccggtc ttgcgatgat tatcatataa tttctgttga attacgttaa   21840
gcatgtaata attaacatgt aatgcatgac gttatttatg agatgggttt ttatgattag   21900
agtcccgcaa ttatacattt aatacgcgat agaaaacaaa atatagcgcg caaactagga   21960
taaattatcg cgcgcggtgt catctatgtt actagatccc taggcacgtg tacgtatttt   22020
ttaccaggtg aactccaagt cctgaccct tttttggca ctggccgtcg ttttaagctt    22080
gtaaacctaa gagaaaagag cgtttattag aataacggat atttaaaagg gcgtgaaaag   22140
gtttatccgt tcgtccattt gtatgtgcat gccaaccaca gggttcccct cgggatcaaa   22200
gtactttgat ccaacccctc cgctgctata gtgcagtcgg cttctgacgt tcagtgcagc   22260
cgtcttctga aaacgacatg tcgcacaagt cctaagttac gcgacaggct gccgccctgc   22320
cctttttcctg gcgttttctt gtcgcgtgtt ttagtcgcat aaagtagaat acttgcgact   22380
agaaccggag acattacgcc atgaacaaga gcgccgcgc tggcctgctg ggctatgccc    22440
gcgtcagcac cgacgaccag gacttgacca accaacgggc cgaactgcac gcggccggct   22500
gcaccaagct gttttccgag aagatcaccg gcaccaggcg cgaccgcccg gagctggcca   22560
ggatgcttga ccacctacgc cctggcgacg ttgtgacagt gaccaggcta gaccgcctgg   22620
cccgcagcac ccgcgaccta ctggacattg ccgagcgcat ccaggaggcc cggcgcggcc   22680
tgcgtagcct ggcagagccg tgggccgaca ccaccacgcc ggccggccgc atggtgttga   22740
ccgtgttcgc cggcattgcc gagttcgagc gttcccaat catcgaccgc acccggagcg   22800
ggcgcgaggc cgccaaggcc cgaggcgtga agtttggccc cgccctacc ctcacccgg     22860
cacagatcgc gcacgcccgc gagctgatcg accaggaagg ccgcaccgtg aaagaggcgg   22920
ctgcactgct tggcgtgcat cgctcgaccc tgtaccgcgc acttgagcgc agcgaggaag   22980
tgacgcccac cgaggccagg cggcgcggtg ccttccgtga ggacgcattg accgaggccg   23040
acgccctggc ggccgccgag aatgaacgcc aagaggaaca agcatgaaac cgcaccagga   23100
cggccaggac gaaccgtttt tcattaccga agagatcgag gcggagatga tcgcggccgg   23160
gtacgtgttc gagccgcccg cgcacgtctc aaccgtgcgg ctgcataaaa tcctggccgg   23220
tttgtctgat gccaagctgg cggcctggcc ggccagcttg gccgctgaag aaaccgagcg   23280
ccgccgtcta aaaggtgat gtgtatttga gtaaaacagc ttgcgtcatg cggtcgctgc    23340
gtatatgatg cgatgagtaa ataaacaaat acgcaagggg aacgcatgaa ggttatcgct   23400
gtacttaacc agaaaggcgg gtcaggcaag acgaccatcg caaccatct agcccgcgcc   23460
ctgcaactcg ccggggccga tgttctgtta gtcgattccg atcccaggg cagtgccgc    23520
gattgggcgg ccgtgcggga agatcaaccg ctaaccgttg tcggcatcga ccgcccgacg   23580
attgaccgcg acgtgaaggc catcggccgg cgcgacttcg tagtgatcga cggagcgccc   23640
caggcggcga acttggctgt gtccgcgatc aaggcagcg acttcgtgct gattccggtg    23700
cagccaagcc cttacgacat atgggccacc gccgacctgg tggagctggt taagcagcgc   23760
attgaggtca cggatggaag gctacaagcg gccttgtcg tgtcgcgggc gatcaaaggc    23820
acgcgcatcg gcgtgaggt tgccgaggcg ctggccgggt acgagctgcc cattcttgag   23880
tcccgtatca cgcagcgcgt gagctaccca ggcactgccg ccgcggcac aaccgttctt   23940
gaatcagaac ccgagggcga cgctgcccgc gaggtccagg cgctggccgc tgaaattaaa   24000
tcaaaactca tttgagttaa tgaggtaaag agaaaatgag caaaagcaca acacgctaa    24060
gtgccggccg tccgagcgca cgcagcagca aggctgcaac gttggccagc ctggcagaca   24120
cgccagccat gaagcgggtc aactttcagt tgccggcgga ggatcacaca aagctgaaga   24180
tgtacgcggt acgccaaggc aagaccatta ccgagctgct atctgaatac atcgcgcagc   24240
taccagagta aatgagcaaa tgaataaatg agtagatgaa ttttagcggc taaggaggc    24300
ggcatgaaa atcaagaaca accaggcacc gacgccgtgg aatgccccat gtgtggagga   24360
acgggcggtt ggcaggcgt aagcggctgg gttgtctgcc ggccctgcaa tggcactgga   24420
accccccaagc ccgaggaatc ggcgtgacgg tcgcaaacca tccggcccgg tacaaatcgg   24480
cgcggcgctg ggtgatgacc tggtggagaa gttgaaggcc gcgcaggccg cccagcggca   24540
acgcatcgag gcagaagcac gccccggtga atcgtggcaa gcggccgctg atcgaatccg   24600
caaagaatcc cggcaaccgc cggcagccgg tgcgccgtca attaggaagc cgcccaaggg   24660
cgacgagcaa ccagatttt tcgttccgat gctctatgac gtgggcaccc gcgatagtcg   24720
cagcatcatg gacgtggccg ttttccgtct gtcgaagcgt gaccgacgag ctggcgaggt   24780
gatccgctac gagcttccag acgggcacgt agaggtttcc gcagggccgg ccggcatggc   24840
cagtgtgtgg gattacgacc tggtactgat ggcggttcc catctaaccg aatccatgaa   24900
ccgataccgg gaagggaagg gagacaagcc cggccgcgtg ttccgtccac acgttgcgga   24960
cgtactcaag ttctgccggc gagccgatgc cggaaagcag aaagacgacc tggtagaaac   25020
ctgcattcgg ttaaacacca cgcacgttgc catgcagcgt acgaagaagg ccaagaacgg   25080
ccgcctggt acggtatccg agggtgaagc cttgattagc cgctacaaga tcgtaaagag   25140
cgaaaccggg cggccggagt acatcgagat cgagctagct gattggatgt accgcgagat   25200
cacagaaggc aagaacccgg acgtgctgac ggttcacccg gattacttt tgatcgatcc   25260
cggcatcggc cgttttctct accgcctggc acgccgcgcc gcaggcaagg cagaagccag   25320
atggttgttc aagacgatct acgaacgcag tggcagcgcc ggagagttca agaagttctg   25380
tttcaccgtg cgcaagctga tcgggtcaaa tgacctgccg gagtacgatt tgaaggagga   25440
ggcggggcag gctggcccga tcctagtcat gcgctaccgc aacctgatcg agggcgaagc   25500
atccgccggt tcctaatgta cggagcagat gctagggcaa attgccctag caggggaaaa   25560
aggtcgaaaa ggtctctttc ctgtggatag cacgtacatt gggaacccaa agccgtacat   25620
tgggaaccgg aacccgtaca ttgggaaccc aaagccgtac attgggaacc ggtcacacat   25680
gtaagtgact gatataaaag agaaaaaagg cgatttttcc gcctaaaact ctttaaaact   25740
tattaaaact cttaaaaccc gcctggcctg tgcataactg tctggccagc gcacagccga   25800
agagctgcaa aaagcgccta cccttcggtc gctgcgctcc ctacgccccg ccgcttcgcg   25860
```

```
tcggcctatc gcggccgctg gccgctcaaa aatggctggc ctacggccag gcaatctacc    25920
agggcgcgga caagccgcgc cgtcgccact cgaccgccgg cgcccacatc aaggcaccct    25980
gcctcgcgcg tttcggtgat gacggtgaaa acctctgaca catgcagctc ccggagacgg    26040
tcacagcttg tctgtaagcg gatgccggga gcagacaagc ccgtcagggc gcgtcagcgg    26100
gtgttggcgg gtgtcggggc gcagccatga cccagtcacg tagcgatagc ggagtgtata    26160
ctggcttaac tatgcggcat cagagcagat tgtactgaga gtgcaccata tgccggtgtga   26220
aataccgcac agatgcgtaa ggagaaaata ccgcatcagg cgctcttccg cttcctcgct    26280
cactgactcg ctgcgctcgg tcgttcggct gcggcgagcg gtatcagctc actcaaaggc    26340
ggtaatacgg ttatccacag aatcagggga taacgcagga aagaacatgt gagcaaaagg    26400
ccagcaaaag gccaggaacc gtaaaaaggc cgcgttgctg gcgttttttcc ataggctccg   26460
cccccctgac gagcatcaca aaaatcgacg ctcaagtcag aggtggcgaa acccgacagg    26520
actataaaga taccaggcgt ttccccctgg aagctccctc gtgcgctctc ctgttccgac    26580
cctgccgctt accggatacc tgtccgcctt tctcccttcg ggaagcgtgg cgctttctca    26640
tagctcacgc tgtaggtatc tcagttcggt gtaggtcgtt cgctccaagc tgggctgtgt    26700
gcacgaaccc cccgttcagc ccgaccgctg cgccttatcc ggtaactatc gtcttgagtc    26760
caacccggta agacacgact tatcgccact ggcagcagcc actggtaaca ggattagcag    26820
agcgaggtat gtaggcggtg ctacagagtt cttgaagtgg tggcctaact acggctacac    26880
tagaaggaca gtatttggta tctgcgctct gctgaagcca gttaccttcg gaaaaagagt    26940
tggtagctct tgatccggca aacaaaccac cgctggtagc ggtggttttt ttgtttgcaa    27000
gcagcagatt acgcgcagaa aaaaaggatc tcaagaagat cctttgatct tttctacggg    27060
gtctgacgct cagtggaacg aaaactcacg ttaagggatt ttggtcatgc attctaggta    27120
ctaaaacaat tcatccagta aaatataata ttttattttc tcccaatcag gcttgatccc    27180
cagtaagtca aaaatagctc gacatactgt tcttccccg atatcctccc tgatcgaccg    27240
gacgcagaag gcaatgtcat accacttgtc cgccctgccg cttctcccaa gatcaataaa    27300
gccacttact ttgccatctt tcacaaagat gttgctgtct cccaggtcgc cgtgggaaaa    27360
gacaagttcc tcttcgggct tttccgtctt taaaaaatca tacagctcgc gcggatcttt    27420
aaatggagtg tcttcttccc agttttcgca atccacatcg gccagatcgt tattcagtaa    27480
gtaatccaat tcggctaagc ggctgtctaa gctattcgta tagggacaat ccgatatgtc    27540
gatggagtga aagagcctga tgcactccgc atacagctcg ataatctttt cagggctttg    27600
ttcatcttca tactcttccg agcaaaggac gccatccgct tcactcatga gcagattgct    27660
ccagccatca tgccgttcaa agtgcaggac ctttggaaca ggcagctttc cttccagcca    27720
tagcatcatg tccttttccc gttccacatc ataggtggtc cctttatacc ggctgtccgt    27780
cattttaaaa tataggtttt cattttctcc caccagctta tataccttag caggagacat    27840
tccttccgta tcttttacgc agcggtattt tcgatcagt tttttcaatt ccggtgatat    27900
tctcatttta gccatttatt atttccttcc tcttttctac agtatttaaa gatacccaa    27960
gaagctaatt ataacaagac gaactccaat tcactgttcc ttgcattcta aaaccttaaa    28020
taccagaaaa cagcttttc aaagttgttt tcaaagttgg cgtataacat agtatcgacg    28080
gagccgattt tgaaaccgcg gtgatcacag gcagcaacgc tctgtcatcg ttacaatcaa    28140
catgctaccc tccgcgagat catccgtgtt tcaaacccgg cagcttagtt gccgttcttc    28200
cgaatagcat cggtaacatg agcaaagtct gccgccttac aacggctctc ccgctgacgc    28260
cgtcccggac tgatgggctg cctgtatcga gtggtgatttt tgtgccgagc tgccggtcgg    28320
ggagctgttg gctggctggt ggcaggatat attgtggtgt aaaca               28365
```

SEQ ID NO: 3        moltype = DNA  length = 28361
FEATURE             Location/Qualifiers
source              1..28361
                       mol_type = other DNA
                       organism = synthetic construct
SEQUENCE: 3

```
ctgcaggata atgacagcct aggcggaggt gcggtaaagc ttgccgaaaa catgcagaag      60
agcaacgacg gcaatgaacc caatgctcat gatgaggact gagttcgggg acatcttgcg    120
cccagcagcc tcatcggtgt agaactggag cattgtgctg gcaccgcctc caccagtgcc    180
actgctggtg gttctacgcc tgcgcaagct gcagcagct gctgcactcc ctctagccgg     240
ggcatctcca tttgccacca tcttgcttta tccctctgca tgataatatg agtttcaaat    300
gtaaggtttg cagcactaat attacagaaa accaacagaa caacagagtt tcatccaaag    360
tcgtattgca tatacatagg aagtgttaaa atatgtctat cattttggaa gatacggttt    420
atgctgtcac acagcatttt ggaagtgact attttataag cacagaagtt tcttcaatgt    480
ggaatatgtc aaaaggcaaa ataagaagca cagaagtttc ttcaatgtgg aatatgtcag    540
aaggcagaat aaggtacaca tcttggaagt gtatgatagt actacaccaa taccagtgaa    600
gttttagttg tcacatttga gtgctaataa aaatataaaa aagaaatggt tgctgttgct    660
catgcctata tacattcata atctatcaaa ctaactgctc ctggatgctg cataactata    720
actaaacaag cttaagttaa atttaccaca gaaaagaaa aatgacaac tagtcccaga     780
attctgctga aaaattttgg ggctgtcctg ggcttggcca acacccatt gacatgatgc     840
tgcccaagtg taagaactgt aaaacaagta tagtgtctgt gtatgtacag ggatggcgag    900
atattcattg ctgcaacaca agctacgcta catgaaacca atttcttacg ctggaatatg    960
aacaaacaac atgaaggaga gatttcgtaa tagaattttg agcaaatatg ttggtacgga   1020
caaaatgatc ccccacaaaa atccgcagag aagatcatga gtgacacgcg atatatgagg   1080
taacacacga acatcttatc aagaattcag atccattccc agatcctgac aaagcactag   1140
aactacaaca gaaatacttc gataaaacaa ttcgatttc cttcatgaca catcctaaca   1200
tcacatcaaa ccccccgcag ccaatctgaa ttctgaacag caagatctgg aacagaagcg    1260
gtacccatcc cagaattcta aatcggccaa accaaacaag cccgatcaa gacatcgatt    1320
caacatgaac gcgtacggaa tcaaagcagg ctaatcggag agatggcgaa agaggatga    1380
ttttcgcgcg cacctgatga atctgccctg cgccaatcgc tcgtctccc gtcccaactt   1440
ggtcactcgt cttctcgccc gaaaatctga gcgggaatt cagaatttc tccgcgtctc    1500
aacccgcgcg ctgatatcta cccaactggc tggattaacg ggttccgttc aagatccgat   1560
atcaagtgac gtggtcggcg cgatctgatt ggccggagcg cgtctccgcg cgtcgatctg    1620
agccgtccga ttcgttgccg gtcccgatc gcgcggcctg tgtgaaacg ggtggcgtca     1680
ccgcgtgcgg cgtggcactg tgacgtgtca acggttatgc ggttatgcac agtcatgggc    1740
tggacctttt ggcccaacat ctgtggactc gtggaccggg ttcggccct tttatccgct    1800
```

```
ctacggacgc agtccacgtc agccgacgtg ggtcccacca cgaagggcgt gcctccctct   1860
aaaaattgcc aatgacgata agagcaaaga cggacgggag gggaggggtc caaattaaaa   1920
ctccaaaatc cattcgaaca gcgaaggaaa tttgttggaa aattttgaga tttggatttt   1980
tgttctagga gaggggaagg ttagaagaag ttgagatcgg tggagaactg gagatcgagg   2040
ggagatgctg tgtctcacct cctcttcctc ctccgcgtcc gctccgctcc ttccctctct   2100
cgctgatcga ccgagcccag gaatcgcggg cggggtggc aatgttcgcc tgagcgtggt   2160
ttcttcgccg cgccggtcgt ggcctggaaa ggtcaagacc aatttctcag ttcctgcgac   2220
tgcgcgaaaa aacaaaacca tggtgactgt tgtggaggaa atcgcgtccg gccaccaagt   2280
cctcttcag gggttcaact gggagtcgtg gaagcagagc ggcgggtggt acaacatgat   2340
gatgggcaag gtcgacgaca tcgccgctgc cggagtcacc cacgtctggc tgccaccgcc   2400
gtcgcactcc gtctccaacg aaggttacat gcctggtcgg ctgtacgaca tcgacgcgtc   2460
caagtacgga aacgcggcgg agctcaagtc gctcatcggc gcgctccacg gcaagggcgt   2520
gcaggccatc gccgacatcg tcatcaacca ccgctgcgcc gactacaagg atagccgcgg   2580
catctactgc atcttcgagg gcggcacctc cgacggccgc ctcgactggg gccccccacat   2640
gatctgtcgc gacgacacca aatactccga tggcaccgca aacctcgaca ccggagccga   2700
cttcgccgcc gcgcccgaca tcgaccacct caacgaccgg gtccagcgcg agctcaagga   2760
gtggctcctc tggctcaaga gcgacctcgg cttcgacgcg tggcgccttg acttcgctag   2820
gggctactcg ccggagatgg ccaaggtgta catcgacggc acatcccga gcctcgccgt   2880
ggccgaggtg tgggacaata tggccaccgg cggcgacggc aagcccaact cgaccaggga   2940
cgcgcaccgg cagaatctgg tgaactgggg ggacaaggtg ggcggcgcgg cctcggcagg   3000
catggtgttc gacttcacga ccaaagggat actgaacgct gccgtggagg cgagctgtg   3060
gaggctgatc gacccgcagg ggaaggcccc cggcgtgatg gatggtggcc ggcaaggc    3120
cgccaccttc gtcgacaacc acgatacagg ctccacgcag gccatgtggc cattcccctc   3180
cgacaaggtc atgcagggct acgcgtacat cctcacccac cccggcatcc catgcatctt   3240
ctacgaccat ttcttcaact gggggtttaa ggaccagatc gcggcgctgg tggcgatcag   3300
gaagcgcaac ggcatcacgg cgacgagcgc cctgaactgc ctcatgcacg aaggagatgc   3360
ctacgtcgcc gagatagacg gcaaggtggt ggtgaagatc gggtccaggt acgacgtcgg   3420
ggcggtgatc ccggccgggt tcgtgaccgt ggcacacggc aacgactacg ccgtctggga   3480
gaagaacggt gccgcggcaa cactacaacg gagctgaagt ctgcactgat ccgtcattcg   3540
atcggacaaa gcagcattag tccgttgatc ggtggaagac cactcgtcag tgttgagttg   3600
aatgtttgat caataaaata cggcaatgct gtaaggggttg tttttttatgc cattgataat   3660
acactgtact gttcagttgt tgaactctat ttccttagcca tgccaagtgc ttttcttatt   3720
ttgaataaca ttacagcaaa aagttgaaag acaaaaaaaa aaaccccga acagagtgct   3780
ttggcgatcg cgcccgggct taattaagac aaatttgttt gtcagatcaa attttaagc    3840
aaaacataag aaacagcaca aaagggtata gcagaagcaa aatttggaca caatgattag   3900
ggatcactta ttcattatag ttcttccatg ctgctctacc acagcaaaac gtttcagaca   3960
ccatcaaacc agcttaagg atacacatta caggtaaaata gtacaaatg aaacgggaca   4020
cgaccaagga ccagaccaga caaccatagc tccattgggg aagacaaata ggcagacttg   4080
tgaaccctag aacagcagca gctctatggc tgaggacggt accctctagag gcgcgccac   4140
tttgtgaggc ctttaataca cagtcctgcc atcaccatcc aggatcatgt ccttgaatgc   4200
gcccccaatt gggatcatag gcagcacatg ctcctggtgc gggacgatga tatccaacaa   4260
gtatggccct ggagtctcga gcatcttctt gatggcggca cggacttcac tcttctttgt   4320
tacacggact gccggaatat tgaaccctt agcaatagtc acaaaatctg gatatatctc   4380
gctctcacat tccgggttgc ccaagtatgt atgcgcccta ttcgccttgt aaaacctatc   4440
ctccaattgc accaccatac ccaaatgttg gttgttcaac accatcacct tcacagggag   4500
gttctcaatg cggatcaatg ccagctcctg aatgttcatg aggaagctac catcccactc   4560
aatatcaaca actgtgacac ctgggttagc cacagaagca ccagctgcg caggcagccc   4620
aaatcccatt gcgcccagac cagccgaaga cagccactgc cgtggccgct tgtaggtgta   4680
atattgtgcc gcccacatct ggtgctgccc aacaccagta gcgatgattg cctcacctt   4740
cgtcagctca tccagcacct gaatggcata ttgcggtggg atctcttcac caaaagtttt   4800
gtaccccaga ggaaactccc tcttctgctg gtccaactca ttgtgccatg cactaaaatc   4860
agaacttgtc tttgttgtgc tctgttgtag cagagcattc aagccctgta aagcgagctt   4920
aacatctgcg caaattgaca catgtggttg cttgttcttt ccaatctctg ctggatcaat   4980
gtcaatgtgc acaatcttgg ccctgcttgc aaaagcctca atttttcctg tcacacgatc   5040
atcaaaccgc acaccaaacg caagcaacag gtcagcctta tccacggcat aatttgcgta   5100
caccgtgcca tgcatcccaa gcatccgcag ggacaacggg tcgtcactgg ggaaattgcc   5160
gaggccatc agagtggttg taactgggat accagtcagc tcaacaaacc agcgcaattc   5220
gtcaccagat gcagagcagc caccaccgac atagagaatc gggcgccgtg actcgccaac   5280
cagacgcaag acctgctcaa gcaattcctg cgcgggtggc ttgggcaggc gtgcgatgta   5340
ccctggtaga ttcatcgagg tgtcccagac cggcacggcc atctgctgct ggatgtcctt   5400
ggggatgtcc accagcaccg ggccaggacg gcccgaggac gcgaggaaga aggcttcctg   5460
tatgacgcg gggatgtcct ccacatcaag gacaaggtaa ttgtgcttgg tgatggagcg   5520
ggtgacctcg actatgggcg tctcctggaa ggcgtcggtg ccgatcatgc ggcggggac    5580
ctggcccgtg atggcgacca tcgggacgga gtcggacagc ggtcggacag gcgcggacac   5640
gaggttggtt gcgccgggc cggaggtggc gacgcagacc ccgacgcggc cggacgcgcg   5700
cgcgtacccg gacgccgcga acgctcgcc ctgctcgtgg cggaagaggt ggttggtgat   5760
gaccggggag cgcgtcagcg cctggtggat ctccatcgac gcgccgcctg gtaggcgaa    5820
cacgtcgctg acgccgcacc gctccagcgc ctccacgagg atgtccgcgc cctgcgggg    5880
ctcggccgga cccccacggcg gagcggcgt gccggggacg gccggggtac    5940
cggggacacc gccgagcacc tgaccgccgc cgccccacc cggcctcgag cgggaaggac   6000
gtggtgtcgc tggtggttct tacggccggt cttggccgtc gcggcggcgg acagggcggc   6060
ggccgcggcc gcgcggtcg tagccatggt gggtggtggc ggcggcggcg gcggcgaggg   6120
tttctgggtt tgggcgagag ggagagaggg gtggagagtg tgggggtgtg ggtgttttgt   6180
ccgcgcgcgg tgacgcagcg tgaggcgatg tgtggctcgg atgggatcgt gtggggcgac   6240
gtcacagtgg gccccatatg tcggtgggat aggatgacac acagccacgt cggggtcgat   6300
ctgggccgc gtgtcagtcg attgatgag gatgacaggt gggtcagtcc caataacggg   6360
tggagggtac agaacccgat aaaaaatcga tctcaaagtc ggatgcggat gcaaccgcga   6420
gacctagcag tctagcaccc gcacccgcac ccgcacaaac gcagcgcaag atgagcagtg   6480
gcggcgagaa gtccggctcg gcggcggcg cggtggcgg cggcggcggg gcggtgaaga   6540
```

```
cgccctccga cttcctcaag tccatcaggg ggcgccccgt cgtcgtcaag ctcaactccg    6600
gcgtcgacta ccgcggtaac ccctgctca attccctccc cctttttgcc tcaaccctag    6660
acccgcctcc cgaaaaccct agcacgagac gaatgcgatg tttgttgtac cccgtatctc    6720
tttctccttc attggaactc tgcgtttctt ttcgttaatt agtgggggga aggaaaggcg    6780
tggactctgt aggattttct tttcgatttg atgaccaagg gagatactta ttttagtgct    6840
gtttaagatc ctgctagtgc ccggtgtagc taggccattt gagaagcaga taaccgtgtt    6900
tttctgtagg accttctcta atcttgagct attttgatat tctaattact tatggttaaa    6960
ccctagaacc tcagtatgtt ttaacttagt aagagattgc tacagtattt ttatttgtag    7020
gaacaacatt gtaggtggtt atcatgctac tgactgtctt gtgtagagcc ctcctatcat    7080
taagggcttt ttatgtttac taatagttag ttttagtacc catttttctg tgagctacta    7140
aaaagaatat ttccaattca acctatggta atttaaagta ctttatgctg tatgtccatt    7200
tactgaggat tatgattaat atttaagagg gaggacatct gtgcttaagg tttgcattgc    7260
aatatttgat agatttatgc taaacaaagg taattgtgca tgctgtgagat agaaagggat    7320
ttcccttctt tgggtttgat aataagggt tggcattcca tgatcaggag catagtgcat    7380
ttatattta taatgtggct atgtgtatgc agttctcaat ttcacattgg cggtacaccc    7440
atgatatatt taattgttac ccagaaccat ataatagcct aataagagca tatggtattc    7500
cattgattgg ggccttcgga agtgtacctg tgtatgtaac tatgcatata aggtttactt    7560
tctggtagtt cttcttctc ctcatcactt aagcatctg gatcgctgtt atcaagtcgt    7620
agactagtca taacgtcagt caagtcgac gactagaggg ctacgactcg accaaatagc    7680
aagtcgcaca attagtcgta gattagtcat agcaaatcat catttcacca tgctaattgg    7740
cttattgtgt ttagtacttt aaatttattt cttgttaact tattgtcttg ctggctactc    7800
cataaaccgt agtttataat acatatata gtgcttagta caatagaata gtactagaga    7860
ctatatagtg catccattgt tttcacacga ccaaatcatg gactagtcgt ggactagatt    7920
ttgaatggaa cagttttacc agaaatacac ttgttctttt tttttctgaa tagtgttgaa    7980
tcagtagctg caatgcatag cttgtgcaat aaaatcatta tatactatca ccaatttcat    8040
ggaatcttac ttattggaaa tttgtaacaa atctattta tccctagt taccgtgttg    8100
gtctaaaatc aactcgcatg tgagacaaga tgaagaggac catgaagatt gcctctttca    8160
tttattcatt tgctgactgc ttgcaatgcc actataaacc taatcggatg actggttgtc    8220
atgtctccgc taactagaga gaaagggga ggagtgaaga ctttacgtgt acacagtctt    8280
tcaccaggac ggttgtatcg gttcagtgct cgcgatccgg gcagcgctga agaacttccc    8340
cgatctagta acatagatga caccgcgcgc gataatttat cctagtttgc gcgctatatt    8400
ttgtttctta tcgcgtatta aatgtataat tgcgggactc taatcataaa acccatctc    8460
ataaataacg tcatgcatta catgttaatt attacatgct taacgtaatt caacagaaat    8520
tatatgataa tcatcgcaag accggcaaca ggattcattc ttaagaaacc acctgcaagt    8580
gacttcctca gcaggcctac tagttttatt gccaaatgtt tgaacgatcg gggaaattcc    8640
agtgcaccag agtcacgaaa acacatcaca cattcgtgag ctcagcttag ccatggataa    8700
cgcctacatt attgccattc tctctgtagc tatcctcttc ttgctccact actacctcct    8760
cggccgcggc aatggcgggg cggcgcggct gccgccgggt ccaccggccg tcccgatcct    8820
gggacccctc cacctcgtca agaagccgat gcacgccacc atgtcccgcc tcgccgagcg    8880
gtacgggccg gtgttctcgc tgcgcctcgg gtcgcggcgc gccgtggtgg tgtcgtcgcc    8940
ggggtgcgcc agggagtgct tcaccgagca cgacgtgacc ttcgcgaacc ggcccaggtt    9000
cgagtcgcag ctgctggtct cgttcaacgg cgccgcgctc gccacggcga gctacggcgc    9060
gcactgggca aacctccgcc ggatcgtcgc cgtgcagctg ctctccgcgc accgcgtcgg    9120
cctcatgtct gaaaatctcg aaacagccgt gtcatagtca atcattaggt gttataggaa    9180
caatcaaagg tttttttcaag tgttaatctt catactaata tatacagtgg gtactctta    9240
tctactgccg tggaactgtc atatttgatt atgaaatttt agctctagaa aatatttgat    9300
catcaatgtc aagactttat gaccttgcaa aatacattc ctaattgaga acagggtaaa    9360
attatgaact atgcctctga accttcatac acaggcagca catttttgt tgtaaaattc    9420
atcttaatat cagcggaaag actgaccag agaaagaaaa agtaagaca ggcatatact    9480
cttgatcctc taaaagagat gaggcggtac aatgatcaac catgaacatt aaagtgatac    9540
gtggaacatg agaacacaaa taattgtcac tggaacataa atacaaaaag gttttgtagta    9600
acttaccgac atgaggccga cgccggtgcgc ggagagcagc tgcacggcga cgatccggcg    9660
gaggttgcgc cagtgcgcgc cgtagctcgc cgtggcgagc gcggcgccgt tgaacgagac    9720
cagcagctgc gactcgaacc tgggccggtt cgcgaaggtc acgtcgtgct cggtgaagca    9780
ctccctggcg caccccggcg acgacaccac cacggccgcc cgcgacccga gcgcagcga    9840
gaacaccggc ccgtaccgct cggcgaggcg ggacatggtg gcgtgcatcg gcttcttgac    9900
gaggtggagg tgtcccagga tcgggacggc cggtggaccc ggcggcagcc gcgccgcccc    9960
gccattgccg cggccgagga ggtagtagtg gagcaagaag aggatagcta cagagagaat   10020
ggcaataatg taggcgttat ccatggctaa gctgagctca cgaatgtgtg atgtgtttct   10080
gtgactctgg tgcactggga tcccctgagg ggtcaccgac ttcaggtcaa gtaaccaccaa   10140
acaacagggt gagcatcgac aaaagaaaca gtaccaagca aataaatagc gtatgaaggc   10200
agggctaaaa aaatccacat atagctgctg catatgccat catccaagta tatcaagatc   10260
aaaataatta taaaacatac ttgttttatta taatagatag gtactcaagg ttagagcata   10320
tgaatagatg ctgcatatgc catcatgtat atgcatcagt aaaacccaca tcaacatgta   10380
tacctatcct agatcgatat ttccatccat cttaaactcg taactatgaa gatgtatgac   10440
acacacatac agttccaaaa ttaataaata caccaggtag tttgaaacag tattctactc   10500
cgatctagaa cgaatgaacg accgcccaac cacaccacat catcacaacc aagcgaacaa   10560
aaagcatctc tgtatatgca tcagtaaaac ccgcatcaac atgtatacct atcctagatc   10620
gatatttcca tccatcatct tcaattcgta actatgaata tgtatggcac acacatacag   10680
atccaaaatt aataaatcca ccaggtagtt tgaaacagaa ttctactccg atctagaacg   10740
accgcccaac cagaccacat catcacaacc aagacaaaaa aaagcatgaa aagatgaccc   10800
gacaaacaag tgcacggcat atattgaaat aaaggaaaag gcaaaccaa accctatgca   10860
acgaaacaaa aaaaatcatg aaatcgatcc cgtctgcgga acggctagag ccatcccagg   10920
attccccaaa gagaaacact ggcaagttag caatgacaaa gtgtctgacg tacaggtccgc   10980
atccgtgtac gaacgctagc agcacgatc taacacaaac acggatctaa cacaaacatg   11040
aacagaagta gaactaccgg gccctaacca tggaccggaa cgccgatcta gagaaggtag   11100
agagggggg gggggggagga cgagcggcgt accttgaagc ggaggtgccg acgggtggat   11160
ttgggggaga tctggttgtg tgtgtgtgcg ctccgaacaa cacgagggttg gggaagagg   11220
gtgtggaggg ggtgtctatt tattacggcg ggcgaggaag ggaaagcgaa ggagcggtgg   11280
```

```
gaaaggaatc ccccgtagct gccggtgccg tgagaggagg aggaggccgc ctgccgtgcc  11340
ggctcacgtc tgccgctccg ccacgcaatt tctggatgcc gacagcggag caagtccaac  11400
ggtggagcgg aactctcgag aggggtccag aggcagcgac agagatgccg tgccgtctgc  11460
ttcgcttggc ccgacgcgac gctgctggtt cgctggttgg tgtccgttag actcgtcgac  11520
ggcgtttaac aggctggcat tatctactcg aaacaagaaa aatgtttcct tagtttttt   11580
aatttcttaa agggtatttg tttaattttt agtcacttta ttttattcta ttttatatct  11640
aaattattaa ataaaaaaac taaaatagag ttttagtttt cttaatttag aggctaaaat  11700
agaataaaat agatgtacta aaaaaattag tctataaaaa ccattaaccc taaaccctaa  11760
atgatgtac taataaaatg gatgaagtat tatataggtg aagctatttg caaaaaaaaa   11820
ggagaacaca tgcacactaa aaagataaaa ctgtagagtc ctgttgtcaa aatactcaat  11880
tgtcctttag accatgtcta actgttcatt tatatgattc tctaaaacac tgatattatt  11940
gtagtactat agattatatt attcgtagag taaagtttaa atatatgtat aaagatagat  12000
aaactgcact tcaaacaagt gtgacaaaaa aaatatgtgg taatttttta taacttagac  12060
atgcaatgct cattatctct agagaggggc acgacggggt cacgctgcac gttaacgaca  12120
cctgtctccg gatcgcatgc gcattctaga ggatccctca gagtctcagt ccactagcct  12180
tgtccacgtc gccaatgttt aaatccagtc ccaccatttg tagcgtagaa tggaacagct  12240
ttcgataaaa tttctcaacc atttagatga aattcgcacc gtttcaagca gggtctagga  12300
ccaacaaatc ctagaatcaa acatggtaca ttcaaatttc aaattcaaac cagattacat  12360
aggcttattt actactccgg taagcgatac gggcggcggc ggcgcggctg ccggcgagcg  12420
gcggcggggg tcagacggag gtggagacgc ggaccttgag gccgtgagcc atggagagga  12480
tggtcatcat ccggtacttg acggggtggt cctcgacgag gtcgaaggtg tagaagcgga  12540
agaggatggc gagcgccatc ttcatctgga ggtaggcgga gtccttgccg aggcagatcc  12600
gcggccggc ctggaacgcg gtgaacttga acgcgaggc gttcggaac gcgccgcgt    12660
cgccgctgag ccaccgctcc ggccggaagc tcgccgcgtc ggggcccag ttgtactcca   12720
tcctccccat cgagtagggc acgtacgtca ccatcccgcc ggcgcgcacc ttggtgccgt  12780
cggggagcac gtcgtcctcc acgatcccct tggggtcctg cgacaccgcc gggtagaggc  12840
ggagcgtctc cgtcacgcag gcgtgcaggt acaccagctt ccccaccgcg tcgtagctca  12900
gcagcgacgc gaactgcgcc acgcgcgccg cgaatgacgc ctccgccgcg gcgtcggcga  12960
gcgcgacgcc ctcctcgcgc gcgcgctcag cctcgaacgc ggccagctcg cgccggagct  13020
tgtcggcgac ggctgggtgc gtcatcgcca tgtacgtgaa ccacgacagc gtcgtcgccg  13080
tcgtgtcacg cccggcgatc acgaagttga gcaccacgtc gcggaggctc ttgtcgtccc  13140
cgaagctgcc gccccctcg tcgccgccgg cctcccccag ctcgatgaac cgcgacagta   13200
tgtcgtgctt gatctgctcg ccattacaaa tcaaccatat caagaaacaa aacctttcc   13260
gatctgatca tcgccattac catgtcagtt cagttctact gattctttga gcaagagagg  13320
aaggatcacc ttctcttgct tgccgctggc tcgagcctgc aagatctcag ccttgcggcg  13380
gcggatcacg ctgtaggtga agtcatcaac cagcttcatg ctctgctcga ggagagcctc  13440
tgatccgacg tgcaagaact tcttgagacg ccacagagga tcgatgaacc gcagcgtgac  13500
gatgatgttg gcagcgtcga aggcctgggc aaagctgttc tccgggagat caggtgacag  13560
cgtcccgata tcaaccccaa acccgacctt gcagatcgag tccagtgtca tcctcatgaa  13620
caattcctga attttggtta gttcttgcat cacaattctg aacaatttgg tttctcaaga  13680
aatgtttaga tattaggcaa ggaaatcagt tggttacctg catgtctaca actctgccgg  13740
ccttgcacgc ttggctcaga atgcttgata gcttcaggga gtactcctg aacaccacag   13800
tgctgaagtc tctcaagttc ttggaggcaa actcgaagct cgccgtcttc ctttgcttcc  13860
tccacatctc gccgtcggca ttgaatatgc catcaccgag cagcacatcc atgtaagacc  13920
tgtagacttc acctgcata ttttcagaca tttttgtgt cagtgttagt actgtcaag    13980
gcacatttta cagtacactg aagatcctat ggttctttta ccttgggta attggtgaag   14040
ttggtcttca ggacatgctc gacgttcacc gggtcggcaa tgtaggtgta ggaggtgaaa  14100
ggcatgtcga cggtcaccgt cctgtccttc gacaagtact cgacaagcca gtcatgcatc  14160
ctgtggtagt tcttcagttg ctccactgtc gcgccgatga ttggccatga tcttggccct  14220
ttctggttcc tcaggctcca cttgtggacc aagatccatg agaggacaac aaggaagata  14280
gctatgagct tgtggattcc tgctactggg aagaatgatg tcactgtgcat tgcatgagct  14340
tcctccatgg ggctcttcat gaagggttca gtctacaaga gatgctatgt agcattttgg  14400
atgccatagt taggtgatat attgggaact gatgctacca accttgagac aatctttgtg  14460
tgaccaagaa ttaagattgt ctcattcata tggtgtccct aacctaacac ccttaggagt  14520
tggatcttag ctttagtttt cttttttgtga tctgtccacc tagaaaagaa tcgttactca  14580
tgtaaacaca aaatgaatgc tacagtattt tttccctg ctcagccaag ttcgttgttt    14640
tgttcagata actgaagcgt ttgcagcgac taaaggtatg gcaccttcta atatcagaac  14700
catatccatc tgaattctgt taaattgtca ccaactgaaa ccaggcttac catttcttgt  14760
cgatattgtc tagtctttga tgacaactaa aatgaaatgg ggtatcctca aaagaaatat  14820
aaattgtgaa cccaaagtag ttggtttcta cttcacctga attctacttc atctgaatag  14880
gctatttaa tgaagagaaa atccaagaaa tgccatttac aaaacacccaa atccaagaaa   14940
tgctatcgac gagtacgagt tccataaaat gctattgtag aagcgatttt gtcccagaaa  15000
tcagttgcca tctagttaaa acattctcac ataaacaagc aatataaaat actattgcca  15060
agatatatcc aatactttgc atctctaaaa cttctagtta ttgacaacta atttctttta  15120
cagtcaatac aaataagcca tctatcaaag atttgagaaa ttgcagggca caattctaca  15180
gaaaattaaa gaacatcact tgaaaaggaa gatttttct atagaactta tccttttgtga  15240
tgtaacaaca aatactcgaa tgaattgaga ataaccaat gtcaacactg aaacaagtct    15300
gaaaccaaga tcagagagc atgaaaatag tgctcttatg gattgacctt gattcttgcc   15360
cacactctta ttacaaccctt cgagcaaacc ggagcatttg ctgaataaat ctctcatctg 15420
ttactgaaga tactaggtaa ctaaataaac aatcaatcaa gagtatcaaa acattttgca  15480
ggatctagta acatagatga caccgcgcgc gataatttat cctagtttgc gcgctatatt  15540
ttgttttcta tcgcgtatta aatgtataat tgcgggactc taatcataaa aacccatctc  15600
ataaataacg tcatgcatta catgttaatt attacatgct taacgtaatt caacagaaat  15660
tatatgataa tcatcgcaag accggcaaca ggattcaatc ttaagaaact ttattgccaa  15720
atgtttgaac gatctcagct gtgccccagt ttgctaggca ggtcgcagta cctggccaca  15780
gccatctcgt gctgctccac gtaggtctct ttgtcggcct ccttgattct ttccagtctc  15840
ctgtccacga agtagaagcc gggcatcttg aggttcttag cgggtttctt ggatctgtat  15900
gtggtcttga gggagcagtg caggtagccc ccgcccacga gcttcagggc catctggcta  15960
tggcctctca ggccgctgtc agcggggtac agcatctcgg tgctggcctc ccagccgagt  16020
```

```
gttttcttct gcatcacagg gccgttggat gggaagttga ccccgttgat cttgacgttg    16080
tagatgaggc agccgttctg gaggctggtg tcctgggtag cggtcagcac gcccccgtct    16140
tcgtatgtgg tgatcctctc ccatgtgaag ccctcaggga aggactgctt aaagaagtcg    16200
gggatgccct gggtgtggtt gataaaggtt ttgctgccgt acatgaagct ggtagccagg    16260
atgtcgaagg cgaaggggag agggccgccc tcgaccacct tgatcttcat ggtctgggtg    16320
ccctcgtagg gcttgccttc gccctcggat gtgcacttga agtggtggtc gttcacggtg    16380
ccctccatgt agagtttcat gtgcatgttc tcggtgatca gcacgctatc ctcacccact    16440
gcggaagcgt tgcatgcaac aatagcaagg agagcaaata cgaaaatgat cttcattttt    16500
gtaggattct actactatgc ttcaactata atgtttgaat tgtgtgaagg atgaggaggg    16560
ttttcattat gcttgtctat ttatagatgt ttccctatcg gttgcttag agtgttagtt    16620
ttgcttgatg ctatattagg atctaagtga gtcatattat ttggatattc tgttaggtgc    16680
acctaaaaat gttctttgat atcatcatca aagtaacttt tatgcccatc atatatacat    16740
gatggtgagc aaaaaaataa tgacatgact catcgctcac tttatgtgtc aatgtgataa    16800
ggattgcaac ttttgaaact aagtttgtta tgttttgtaa gctattattt tgataatgca    16860
ctacacgtgg aactttacga ctgtgtgggt ttatgctctt tgaattatat aatttcagta    16920
agaaaaaaaa ttatagtatg ttcaatggtt ttcattgttc cattaatact cttgtgaaaa    16980
cttgtttgtg atacgaaata agttaatgca ataacttta aattaacttt gcagagcttt    17040
acaataactc accaacttac tctaattgtg gttgggatt gatttaattc atactttat    17100
agaccaaatt gatattgtgt tgctaaataa aaattatagt ggtgttgcta cacctacaca    17160
gacacagaag gaatcctgat atcatcagct atctactgct tcctccacat ggactcaaga    17220
agcagaagca aaaagaaga aggcatttgc tccaacaaag ttttccggtg aaaggcaaca    17280
cattgttctg aacttcctgg catgtattat gtgaatctag caaattaacc aaacattgac    17340
acaatgcgac accttgtaat gtagccgtgc cgagaattgt atatctcact taccattgta    17400
tatcacacgt gccgagaata ggagattgat ttttgccaac caaaacgctc taggcagacc    17460
aattgggcgc ccgccggat taataaattt cgaaacgcgt cggaccggca ccggacactg    17520
tctggtggca taccagacag tccggtgtgc cagatcaggg caccctttcgg ttccttttgct    17580
cctttgcttt tgaaccctaa ctttgatcgt ttattggttt tgtgttgaacc tttatgcacc    17640
tgtgaatat ataatctaga acaaactagt tagtccaatc atttgtgttg ggcattcaac    17700
caccaaaatt atttatagga aaaggttaaa ccttatttcc ctttcaatct cccccttttt    17760
ggtgattgat gccaacacaa accaaagaaa atatataagt gcagaattga actagtttga    17820
ataaggtaag tgcataggtt acttagaatt aaatcaattt atacttttac ttgatatgca    17880
tggttgcttt cttttatttt aacattttgg accacatttg caccacttgt tttgtttttt    17940
gcaaatcttt ttggaaattc tttttcaaag tcttttgcaa atagtcaaag gtatatgaat    18000
aagattgtaa gaagcatttt caagatttga aatttctccc cctgttttca atgctttcc    18060
tttgactaaa caaactccc cctgaataaa attctcctct tagctttcaa gagggtttta    18120
aatagatatc aattggaaat atatttagat gctaattttg aaaatatacc aattgaaaat    18180
caacatacca atttgaaatt aaacatacca atttaaaaaa tttcaaaaag tggtggtgcg    18240
gtccttttgc tttgggctta atatttctcc cccttttggca ttaatcgcca aaaacggaga    18300
ctttgtgagc catttatact ttctcccccat tggtaaatga aatatgagtg aaagattata    18360
ccaaatttgg acagtgatgc ggagtgacgg cgaaggataa acgataccgt tagagtggga    18420
tggaagcctt gtcttcgccg aagactccat ttccctttca atctacgact tagcatagaa    18480
atacacttga aaacacatta gtcgtagcca cgaaagagat atgatcaaag gtatacaaat    18540
gagctatgtg tgtaatgttt caatcaaagt ttcgagaatc agaataattt agctcattcc    18600
taagtttgct aaaggttta tcatctaatg gtttggtaaa gatatcgact aattgttctt    18660
tggtgctaac ataagcaatc tcgatatcac ccctttgttg gtgatccctc aaaaagtgat    18720
accgaatgtc tatgtgctta gtgcggctgt gttcaacggg attatccgcc atgcagatag    18780
cactctcatt gtcacataggg agagggactt tgctcaattt gtagccatag tccctaaggt    18840
tttgcctcat ccaaagtaat tgcacacaac aatgtcctgc ggcaatatac ttggcttcgg    18900
cggtagaaag agctattgag ttttgttttct ttgaagtcca agacaccagg gatctcccta    18960
gaaactgaca agtccctgat gtgctcttcc tatcaatttt acaccctgcc caatcggcat    19020
ctgaatatcc tattaaatca aaggtggatc ccttgggatg ccaaagacca aatttaggag    19080
tgtaaactaa atatctcatg attcttttca cggcccttaag gtgaacttcc ttaggatcgg    19140
cttggaatct tgcacacatg catatagaaa gcatactatc tggtcgagat gcacataaat    19200
agagtaaaga tcctatcatc gaccggtata cctttttggtc tacggattta cctcccgtgt    19260
cgaggtcgag atgcccatta gttccatgg gtgtcctgat gggcttggca tccttcattc    19320
caaacttgtt gagtatgtct tgaatgtact ttgtttggct gatgaaggtg ccatcttgga    19380
gttgcttgac ttgaaatcct agaaaatatt tcaacttccc catcatagac atctcgaatt    19440
tcggaatcat gatcctacta aactcttcac aagtagattt gttagtagac ccaaatataa    19500
tatcatcaac ataaatttgg catacaaaca aacttttag aatgttttta gtaaagagag    19560
taggatcggc tttactgact ctgaagccat tagtgataag aaaatctctt aggcattcat    19620
accatgctgt tggggcttgc ttgagcccat aaagcgcctt tgagagttta taaacatggt    19680
tagggtactc actatcttca aagccgagag gttgctcaac atagacctat tcaccccatt    19740
tgatcacttt tttggtcctt caggatctaa tagttatgta taatttagag tctcttgttt    19800
aatgccaga tattctaat taatctaaga atttatgtga tttttttaatt tttttatcatg    19860
tctgatgaga attaacataa aggctcaatt gggtcctgaa ttaataatag agtgaaaatt    19920
aatccagagg ctctattaga accttcaatt agtaatacca agatatatat aagatagtag    19980
agtatagttt aaatgttggc attgttcatt ctttcttttg ttatttaatt tatgctttcc    20040
acggtggtta gtggttactt ctgaagggtc caaataatgc atgaagagtt tgaggacaag    20100
aagtctgccc taaaaatagc gatgcaaagg catggtgtcc aagccataca tatagcgcac    20160
taattttatc agcagaacaa tggtatttat aggtcctagt gcccaggcaa caagagacac    20220
gaataaagca tcgatcacga caagatgctg tgtctcacct cctcttcctc ctccgcgccc    20280
gctccgctcc ttccctctct cgctgatcga ccgagcccag gaatcgcggg cggggtggc    20340
aatgttcgcc tgagcgtggt ttcttcgccg cggcggtcgt ggcctggaaa ggtcaagacc    20400
aatttctcag ttcctgcgac tgcgcgaaaa aacaaaacca tggtgactgt tgtggaggag    20460
atcgcttgtt ctggtactgg atctggattt gaaatattgt gtcaaggatt taactggaa    20520
tctcataagt caggaaaatg gtatgtgaaa cttggctcaa aggccaagga gttgtcatcc    20580
atgggtttca ccattgtctg gtcaccacca cctactgatt ctgtgtcgcc tgaaggatac    20640
atgccaaggg atttgtataa tctaaattcc agatatggga ccatggaaga gttgaaggag    20700
gctgtgaaac gttttcatga agccggtatg aaggttcttg gtgatgccgt cctgaatcac    20760
```

```
aggtgtgctc aatttcagaa ccaaaatggc gtctggaata ttttggtgg  acgccttaac  20820
tgggatgatc gagcagttgt tgcagatgat ccacatttcc agggaagagg aaacaagagc  20880
agtggagata acttccatgc agccccaaac attgatcact cgcaagagtt tgtgaggagt  20940
gatcttaaag aatggctttg ttggatgaga aaggaagttg gatacgatgg atggcgactt  21000
gatttgttc  gcggattttg gggtggatat gtccacgatt acttggaagc aagcgaacca  21060
tattttgcag taggagagta ctgggattct ctcagttaca cctatggtga aatggattat  21120
aatcaagatg cccacaggca gagaatagtt gattggataa atgctacaaa tggaactgct  21180
ggtgcatttg atgttaccac gaaaggaata cttcactctg cactgaaaag atctgagtac  21240
tggcgtctgt ctgatgaaaa aggaaaaccc cctggagtgt taggttggtg gccttcgcgt  21300
gctgtcacat ttatagaaaa tcatgacact ggttctactc agggtcattg gagattcccc  21360
tttggtatgg agttgcaagg ctatgtctac atcttaactc acccaggcac tcctgcaatc  21420
ttctatgatc atatatttc  gcatttacag ccagagatt  ctaaattaat ttctattaga  21480
aatcgccaaa agatccattg ccgtagcaag atcaagatac tgaaagcaga gggaaattta  21540
tatgcggcag agattgatga gagggtaaca atgaagattg gcgcaggaca ttttgagcca  21600
agcggcccca caaactgggt agttgctgcc gagggacagg attacaaggt ctgggaagtg  21660
tcatcgtaga cttccgcgc  tggtacttgc agaacttcta ttgtagacag tatacaacca  21720
ttcggtatag ctcacaaaag ggatcgttca aacatttggc aataaagttt cttaagattg  21780
aatcctgttg ccggtcttgc gatgattatc atataattc  tgttgaatta cgttaagcat  21840
gtaataatta acatgtaatg catgacgtta tttatgagat gggttttat  gattagagtc  21900
ccgcaattat acatttaata cgcgatagaa aacaaaatat agcgcgcaaa ctaggataaa  21960
ttatcgcgcg cggtgtcatc tatgttacta gatccctagg cacgtgtacg tatttttac   22020
caggtgaact ccaagtcctg gacccttttt ttggcactgg ccgtcgtttt aagcttgtaa  22080
acctaagaga aaaagagcgt tattagaata acgatatt   aaaagggcgt gaaaaggttt  22140
atccgttcgt ccatttgtat gtgcatgcca accacagggt tcccctcggg atcaaagtac  22200
tttgatccaa ccctccgct  gctatagtgc agtcggcttc tgacgttcag tgcagccgtc  22260
ttctgaaaac gacatgtcgc acaagtccta agttacgcga caggctgccg ccctgccctt  22320
ttcctggcgt tttcttgtcg cgtgttttag tcgcataaag tagaatactt gcgactagaa  22380
ccggagacat tacgccatga acaagagcgc cgccgctggc ctgctgggct atgcccgcgt  22440
cagcaccgac gaccaggact tgaccaacca acgggccgaa ctgcacgcgg ccggctgcac  22500
caagctgttt tccgagaaga tcaccggcac caggcgcgac cgcccggagc tggccaggat  22560
gcttgaccac ctacgccctg gcgacgttgt gacagtgacc aggctagacc gcctggcccg  22620
cagcacccgc gacctactgg acattgccga gcgcatccag gaggccggcg cgggcctgcg  22680
tagcctggca gagccgtggg ccgacaccac cacgccggcc ggccgcatgg tgttgaccgt  22740
gttcgccggc attgccgagt tcgagcgttc cctaatcatc gaccgcaccc ggagcgggca  22800
cgaggccgcc aaggccgag  gcgtgaagtt tggcccccgc cctaccctca ccccggcaca  22860
gatcgcgcac gcccgcgagc tgatcgacca ggaaggccgc accgtgaaag aggcggctgc  22920
actgcttggc gtgcatcgct cgaccctgta ccgcgcactt gagcgcagcg aggaagtgac  22980
gcccaccgag gccaggcggc gcggtgcctt cgtgaggac  gcattgaccg aggcgacgc   23040
cctggcgcc  gccgagaatg aacgccaaga gaaccaagca tgaaaccgca ccaggacgcc  23100
caggacgaac cgtttttcat taccgaagag atcgaggcgg agatgatcgc ggccgggtac  23160
gtgttcgagc cgcccgcgca cgtctcaacc gtgcggctgc atgaaatcct ggccggtttg  23220
tctgatgcca agctggcggc ctggccgcc  agcttggccg ctgaagaaac cgagcgccgc  23280
cgtctaaaaa ggtgatgtgt atttgagtaa aacagcttgc gtcatgcggt cgctgcgtaa  23340
atgatgcgat gagtaaataa acaaatacgc aaggggaacg catgaaggtt atcgctgtac  23400
ttaaccagaa aggcgggtca ggcaagacga ccatcgcaac ccatctagcc cgcgccctgc  23460
aactcgccgg ggccgatgtt ctgttagtcg attccgatcc ccaggcagt  gccgcgatt   23520
gggcggccgt gcgggaagat caaccgctaa ccgttgtcgg catcgaccgc ccgacgattg  23580
accgcgacgt gaaggccatc ggccggcgcg acttcgtagt gatcgacgga gcgccccagg  23640
cggcggactt ggctgtgtcc gcgatcaagg cagccgactt cgtgctgatt ccggtgcagc  23700
caagcccta  cgacatatgg gccaccgccg acctggtgga gctggttaag cagcgcattg  23760
aggtcacgga tggaaggcta caagcggcct ttgtcgtgtc gcgggcgatc aaaggcacgc  23820
gcatcggcgg tgaggttgcc gaggcgctgg ccgggtacga gctgcccatt cttgagtccc  23880
gtatcacgca gcgcgtgagc tacccaggca ctgccgccgc cggcacaacc gttcttgaat  23940
cagaacccga gggcgacgct gcccgcgagg tccaggcgct ggccgctgaa attaaatcaa  24000
aactcatttg agttaatgag gtaaagagaa aatgagcaaa agcacaaaca cgctaagtgc  24060
cggccgtccg agcgcacgca gcagcaaggc tgcaacgttg gccagcctgg cagacacgcc  24120
agccatgaag cgggtcaact ttcagttgcc ggcggaggat cacaccaagc tgaagatgta  24180
cgcggtacgc caaggcaaga ccattaccga gctgctatct gaatacatcg cgcagctacc  24240
agagtaaatg agcaaatgaa taaatgagta gatgaatttt agcggctaaa ggaggcggca  24300
tggaaaatca agaacaacca ggcaccgacg ccgtggaatg ccccatgtgt ggaggaacgg  24360
gcggttggcc aggcgtaagc ggctgggttg tctgccggcc ctgcaatggc actggaaccc  24420
ccaagcccga ggaatcggcg tgacggtcgc aaaccatccg gcccggtaca aatcggcgcg  24480
gcgctggggt atgacctggt ggagaagttg aaggccgcgc aggccgccca gcggcaacgc  24540
atcgaggcag aagcacgccc cggtgaatcg tggcaagcgg ccgctgatcg aatccgcaaa  24600
gaatcccggc aaccgccggc agccggtgcg ccgtcgatta ggaagccgcc caagggcgac  24660
gagcaaccag attttttcgt tccgatgctc tatgacgtgg gcaccgcga  tagtcgcagc  24720
atcatggacg tggccgtttt ccgtctgtcg aagcgtgacc gacgagctgg cgaggtgatc  24780
cgctacgagc ttccagacgg gcactagag  gttccgcag  ggccggccgg catgccagt   24840
gtgtgggatt acgacctggt actgatgccg gtttcccatc taaccgaatc catgaaccag  24900
taccgggaag ggaagggaga caagcccggc cgcgtgttcc gtccacacgt tgcggacgta  24960
ctcaagttct gccggcgagc cgatggcgga aagcagaaag acgacctggt agaaacctgc  25020
attcggttaa acaccacgca cgttgccatg cagcgtacga agaaggccaa gaacggccgc  25080
ctggtgacgg tatccgaggg tgaagccttg attagccgct acaagatcgt aaagagcgaa  25140
accgggcggc cggagtacat cgagatcgag ccagatcaca gaaggcaaga acccgacgt   25200
gctgacggtt caccccgatt actttttgat cgatcccggc  25260
atcgccgtt  ttctctaccg cctggcacgc cgcgccgcag gcaaggcaga agccagatgg  25320
ttgttcaaga cgatctacga acgcagtggc agcgccggag agttcaagaa gttcgttc    25380
accgtgcgca agctgatcgg gtcaaatgac ctgccggagt acgatttgaa ggaggaggcg  25440
gggcaggctg gcccgatcct agtcatgcgc taccgcaacc tgatcgaggg cgaagcatcc  25500
```

```
gccggttcct aatgtacgga gcagatgcta gggcaaattg ccctagcagg ggaaaaaggt   25560
cgaaaaggtc tctttcctgt ggatagcacg tacattggga acccaaagcc gtacattggg   25620
aaccggaacc cgtacattgg gaacccaaag ccgtacattg ggaaccggtc acacatgtaa   25680
gtgactgata taaaagagaa aaaaggcgat ttttccgcct aaaactcttt aaaacttatt   25740
aaaactctta aaacccgcct ggcctgtgca taactgtctg gccagcgcac agccgaaagg   25800
ctgcaaaaag cgcctaccct tcggtcgctg cgctccctac gccccgccgc ttcgcgtcgg   25860
cctatcgcgg ccgctggccg ctcaaaaatg gctggcctac ggccaggcaa tctaccaggg   25920
cgcggacaag ccgcgccgtc gccactcgac cgccggcgcc cacatcaagg caccctgcct   25980
cgcgcgtttc ggtgatgacg gtgaaaacct ctgacacatg cagctcccgg agacggtcac   26040
agcttgtctg taagcggatg ccgggagcag acaagcccgt cagggcgcgt cagcgggtgt   26100
tggcgggtgt cggggcgcag ccatgaccca gtcacgtagc gatagcggag tgtatactgg   26160
cttaactatg cggcatcaga gcagattgta ctgagagtgc accatatgcg gtgtgaaata   26220
ccgcacagat gcgtaaggag aaaataccgc atcaggcgct cttccgcttc ctcgctcact   26280
gactcgctgc gctcggtcgt tcggctgcgg cgagcggtat cagctcactc aaaggcggta   26340
atacggttat ccacagaatc aggggataac gcaggaaaga acatgtgagc aaaaggccag   26400
caaaaggcca ggaaccgtaa aaaggccgcg ttgctggcgt ttttccatag gctccgcccc   26460
cctgacgagc atcacaaaaa tcgacgctca agtcagaggt ggcgaaaccc gacaggacta   26520
taaagatacc aggcgtttcc ccctggaagc tccctcgtgc gctctcctgt tccgaccctg   26580
ccgcttaccg gatacctgtc cgcctttctc ccttcgggaa gcgtggcgct ttctcatagc   26640
tcacgctgta ggtatctcag ttcggtgtag gtcgttcgct ccaagctggg ctgtgtgcac   26700
gaaccccccg ttcagcccga ccgctgcgcc ttatccggta actatcgtct tgagtccaac   26760
ccggtaagac acgacttatc gccactggca gcagccactg gtaacaggat tagcagagcg   26820
aggtatgtag gcggtgctac agagttcttg aagtggtggc ctaactacgg ctacactaga   26880
aggacagtat ttggtatctg cgctctgctg aagccagtta ccttcggaaa aagagttggt   26940
agctcttgat ccggcaaaca aaccaccgct ggtagcggtg gtttttttgt ttgcaagcag   27000
cagattacgc gcagaaaaaa aggatctcaa gaagatcctt tgatcttttc tacggggtct   27060
gacgctcagt ggaacgaaaa ctcacgttaa gggattttgg tcatgcattc taggtactaa   27120
aacaattcat ccagtaaaat ataatatttt attttctccc aatcaggctt gatccccagt   27180
aagtcaaaaa atagctcgac atactgttct tccccgatat cctccctgat cgaccggacg   27240
cagaaggcaa tgtcatacca cttgtccgcc ctgccgcttc tcccaagtca aataaagcca   27300
cttactttgc catctttcac aaagatgttg ctgtctccca ggtcgccgtg ggaaaagaca   27360
agttcctctt cgggcttttc cgtctttaaa aaatcataca gctcgcgcgg atctttaaat   27420
ggagtgtctt cttcccagtt ttcgcaatcc acatcggcca gatcgttatt cagtaagtaa   27480
tccaattcgg ctaagcggct gtctaagcta ttcgtatagg gacaatccga tatgtcgatg   27540
gagtgaaaga gcctgatgca ctccgcatac agctcgataa tcttttcagg gctttgttca   27600
tcttcatact cttccgagca aaggacgcca tcggcctcac tcatgagcag attgctccag   27660
ccatcatgcc gttcaaagtg caggaccttt ggaacaggca gctttccttc cagccatagc   27720
atcatgtcct tttccgttc cacatcatag gtggtccctt tataccggct gtccgtcatt   27780
tttaaatata ggttttcatt ttctcccacc agcttatata ccttagcagg agacattcct   27840
tccgtatctt ttacgcagcg gtattttcg atcagttttt tcaattcgg tgatattctc   27900
attttagcca tttattattt ccttcctctt ttctacagta tttaaagata ccccaagaag   27960
ctaattataa caagacgaac tccaattcac tgttccttgc attctaaaac cttaaatacc   28020
agaaaacagc tttttcaaag ttgtttttcaa agttggcgta taacatagta tcgacggagc   28080
cgattttgaa accgcggtga tcacaggcag caacgctctg tcatcgttac aatcaacatg   28140
ctaccctccg cgagatcatc cgtgtttcaa accggcagc ttagttgccg ttcttccgaa   28200
tagcatcggt aacatgagca aagtctgccg ccttacaacg gctctcccgc tgacgccgtc   28260
ccggactgat gggctgcctg tatcgagtgg tgattttgtg ccagctgcc ggtcggggag   28320
ctgttggctg gctggtggca ggatatattg tggtgtaaac a               28361
SEQ ID NO: 4         moltype = DNA   length = 28723
FEATURE              Location/Qualifiers
source               1..28723
                     mol_type = other DNA
                     organism = synthetic construct
SEQUENCE: 4
aattgacgct tagacaactt aataacacat tgcggacgtt tttaatgtat gctccaccat     60
gttggcaagc tgctctagcc aatacgcaaa ccgcctctcc ccgcgcgttg gccgattcat    120
taatgcagct ggcacgacag gtttcccgac tggaaagcgg gcagtgagcg caacgcaatt    180
aatgtgagtt agctcactca ttaggcaccc caggctttac actttatgct tccggctcgt    240
atgttgtgtg gaattgtgag cggataacaa tttcacacag gaaacagcta tgaccatgat    300
tacctgcagg ataatgacag cctaggcgga ggtgcggtaa agcttgccga aaacatgcag    360
aagagcaacg acggcaatga acccaatgct catgatgagg actgagttcg gggacatctt    420
gcgcccagca gcctcatcgg tgtagaactg gagcattgtg ctggcaccgc ctccaccagt    480
gccactgctg gtggttctac gcctgcgcaa gcttgctgag gctgctgcac tccctctagc    540
cggggcatct ccattggcca ccatcttgct ttatccctct gcatgataat atgagtttca    600
aatgtaaggt ttgcagcact aatattacag aaaaccaaca gaacaacaga gtttcatcca    660
aagtcgtatt gcatatacat aggaagtgtt aaaatatgtc tatcattttg gaagatacgg    720
tttatgctgt cacacagcat tttggaagtg actattttat aagcacagaa gtttcttcaa    780
tgtggaatat gtcaaaaggc aaaataagaa gcacagaagt ttcttcaatg tggaatatgt    840
cagaaggcag aataaggtac acatcttgga agtgtatgat agtactacac caataccagt    900
gaagttttag ttgtcacatt tgagtgctaa taaaaatata aaaagaaat ggttgctgtt    960
gctcatgcct atatacattc ataatctatc aaactaactg ctcctggatg ctgcataact   1020
ataactaaac aagcttaagt taaatttacc acagaaaaag aaaaatgac aactagtccc    1080
agaattctgc tgaaaatttt tggggctgtc ctgggcttgg ccaaacaccc attgacatga   1140
tgctgcccaa gtgtaagaac tgtaaaacaa gtatagtgtc tgtgtatgta cagggatggc   1200
agcatattca ttgctgcaac acaagctacg ctacatgaaa ccaatttctt acgctggaat   1260
atgaacaaac aacatggagg agagatttcg taatagaatt ttgagcaaat atgttggtac   1320
ggacaaaatg atcccccaca aaaatccgca gagaagatca tgagtgacac gcgatatatg   1380
aggtaacaca cgaacatctt atcaagaatt cagatccatt cccagatcct gacaaagcac   1440
```

```
tagaactaca acagaaatac ttcgataaaa caattcgatt tcccttcatg acacatccta  1500
acatcacatc aaaccccccg cagccaatct gaattctgaa cagcaagatc tggaacagaa  1560
gcggtaccca tcccagaatt ctaaatcggc caaaccaaac aagcccgatc taagacatcg  1620
attcaacatg aacgcgtacg gaatcaaagc aggctaatcg gagagatggc gaaaagagga  1680
tgattttcgc gcgcacctga tgaatctgcc ctgcgccaat cgctcgtgct cccgtcccaa  1740
cttggtcact cgtcttctcg cccgaaaatc tgagtgcgga attcagaatt ctctccgcgt  1800
ctgaacccgc gcgctgatat ctacccaact ggctggatta acgggttccg ttcaagatcc  1860
gatatcaagt gacgtggtcg gcgcgatctg attggccgga gcgcgtctcc gcgcgtcgat  1920
ctgagccgtc cgattcgttg ccgggtcccg atcgcgcggc ctggtgtgaa acgggtggcg  1980
tcaccgcgtg cggcgtggca ctgtgacgtg gcaacggtta tgccgtttatg cacagtcatg  2040
```

```
ggctggacct tttggcccaa catctgtgga ctcgtggacc gggtttcggc cctttttatcc  2100
gctctacgga cgcagtccac gtcagccgac gtgggtccca ccacgaaggg cgtgcctccc  2160
tctaaaaatt gccaatgacg ataagagcaa agacggacgg gaggggaggg gtccaaatta  2220
aaactccaaa atccattcga acagcgaagg aaatttgttg gaaaatttg agatttggat  2280
ttttgttcta ggagagggga aggttagaag aagttgagat cggtggagaa ctggagatcg  2340
aggggagatg ctgtgtctca cctcctcttc ctcctccgcg cccgctccgc tccttccctc  2400
tctcgctgat cgaccgagcc caggaatcgc gggcgggggt ggcaatgttc gcctgagcgt  2460
ggtttcttcg ccgcgccggt cgtggcctgg aaaggtcaag accaatttct cagttcctgc  2520
gactgcgcga aaaacaaaa ccatggtgac tgttgtggag gagatcgcgt ccggccacca  2580
agtcctcttt caggggttca actgggagtc gtggaagcag agcggcgggt ggtacaacat  2640
gatgatgggc aaggtcgacg acatcgccgc tgccggagtc acccacgtct ggctgccacc  2700
gccgtcgcac tccgtctcca acgaaggtta catgcctggt cgtcgtacg acatcgacgc  2760
gtccaagtac ggcaacgcgg cggagctcaa gtcgctcatc ggcgcgctcc acggcaaggg  2820
cgtgcaggcc atcgccgaca tcgtcatcaa ccaccgctgc gccgactaca aggatagccg  2880
cggcatctac tgcatcttcg agggcggcac ctccgacggc cgcctcgact ggggccccca  2940
catgatctgt cgcgacgaca ccaaatactc cgatgccgcc gcaaacctcg acaccggagc  3000
cgacttcgcc gccgcgcccg acatcgacca cctcaacgac cgggtccagc gcgagctcaa  3060
ggagtggctc ctctggctca agagcgacct cggcttcgac gcgtggcgcc ttgacttcgc  3120
taggggctac tcgccggaga tggccaaggt gtacatcgac ggcacatccc cgagcctcgc  3180
cgtggccgag gtgtgggaca atatggccac cggcggcgac ggcaagccca actacgacca  3240
ggacgcgcac cggcagaatc tggtgaactg ggtggacaag gtgggcggcg cggcctcggc  3300
aggcatggtt ttcgacttca cgaccaaagg gatactgaac gctgccgtgg agggcgagct  3360
gtggaggctg atcgacccgc aggggaaggc ccccggcgtg atgggatggt ggccggccaa  3420
ggccgccacc ttcgtcgaca accacgatac aggctccacg caggccattc ggccattcca  3480
ctccgacaag gtcatgcagg gctacgcgta catcctcacc caccccggca tcccatgcat  3540
cttctacgac catttcttca actggggtt taaggaccag atcgcggcgc tggtggcgat  3600
caggaagcgc aacggcatca cggcgacgag cgccctgaag atcctcatgc acgaaggaga  3660
tgcctacgtc gccgagatag acggcaaggt ggtggtgaag atcgggtcca ggtacgacgt  3720
cggggcggtg atcccggccg ggttcgtgac ctcggcacac ggcaacgact acgccgtctg  3780
ggagaagaac ggtgccgcgg caacactaca acgagctgga agtctgcact gatccgtcat  3840
tcgatcggac aaagcagcat tagtccgttg atcggtggaa gaccactcgt cagtgttgag  3900
ttgaatgttt gatcaataaa atacggcaat gctgtaaggg ttgttttta tgccattgat  3960
aatacactgt actgttcagt tgttgaactc tatttcttag ccatgccaag tgcttttctt  4020
attttgaata acattacagc aaaaagttga aagacaaaaa aaaaaacccc gaacagagt   4080
gctttggcga tcgcgcccgg gcttaattaa gacaaatttg tttgtcagat caaatttta   4140
agcaaaacat aagaaacagc acaaaggggt atagcagaag caaaatttgg acacaatgat  4200
tagggatcac ttattcatta tagttcttcc atgctgctct accacagcaa aacgtttcag  4260
acaccatcaa accagactta aggatacaca ttacaggtaa atagtacaca atgaaacggg  4320
acacgaccaa ggaccagacc agacaaccat agctccattg gggaagacaa ataggcagac  4380
ttgtgaaccc tagaacagca gcagctctat ggctgaggac ggtacctcta gaggcgcgcc  4440
cacttttgtga ggccttaat acacagtcct gccatccata tccaggatca tgtccttgaa  4500
tgcgccccca attgggatca taggcagcac atgctcctgg tgcgggacga tgatatccaa  4560
caagtatggc cctggagtct cgagcatctt cttgatggcg gcacggactt cactcttctt  4620
tgttacacgg actgccggaa tattgaaccc cttagcaata gtcacaaaat ctggatatat  4680
ctcgctctca cattccgggt tgcccaagta tgtatgcgcc ctattcgcct tgtaaaacct  4740
atcctccaat tgcaccacca tacccaaatg ttggttgttc aacaccatca ccttcacagg  4800
gaggttctca atgcggatca atgccagctc ctgaatgttc atgaggaagc taccatcccc  4860
atcaatatca acaactgtga cacctgggtt agccacagaa gcaccagctg cggcaggcag  4920
cccaaatccc attgcgccca gaccaccgcga agacagccac tgccgtggcc gcttgtaggt  4980
gtaatattgt gccgcccaca tctggtgctg cccaacacca gtagcgatga ttgcctcacc  5040
tttcgtcagc tcatccagca cctgaatggc atattgcggt gggatctctt caccaaaagt  5100
tttgtaccc agaggaaact ccctcttctg ctggtccaac tcattgtgcc atgcactaaa  5160
atcagaactt gtctttgttg tgctctgttg tagcagagca ttcaagccct gtaaagcgag  5220
cttaacatct gcgcaaattg acacatgtgg ttgcttgttc tttccaatct ctgtctgatc  5280
aatgtcaatg tgcacaatct tggccctgct tgcaaaagcc tcaattttcc ctgtcacacg  5340
atcatcaaac cgcacaccaa acgcaagcaa caggtcagcc ttatccacgg cataatttgc  5400
gtacaccgtc ccatgcatcc caagcatccg cagggacaac gggtcgtcac tgggaaatt   5460
gccgaggccc atcagagtgg ttgtaactgg gataccagtc agctcaacaa accagcgcaa  5520
ttcgtcacca gatgcagagc agccaccacc gacatagaca atcgggcgcc gtgactcgcc  5580
aaccagacgc aagacctgct caagcaattc tgtcgcgggt ggcttgggca ggcgtgcgat  5640
gtaccctggt agattcatcg aggtgtccca gaccggcacg gccatctgct gctggatgtc  5700
cttggggatg tccaccagca ccgggccagg acggcccgag gacgcgagga agaaggcttc  5760
ctgtatgacg cgggggatgt cctccacatc aaggacaagg taattgtgct tggtgatgga  5820
gcgggtgacc tcgactatgg gcgtctcctg gaaggcgtcg gtgccgatca tgccggggga  5880
gacctggccc gtgatggcga ccatcgggac ggagtcgacg agcgccgtcg cgagcgcggg  5940
cacgaggttg gttgcgccgg ggcggaggt ggcgacgcag accccgacgc ggccggacgc  6000
gcgcgcgtac ccggacgccg cgaacgccct gccctgctcg tggcggaaga ggtggttggt  6060
gatgaccggg gagcgcgtca gcgcctggtg gatctccatc gacgcgccgc ctgggtaggc  6120
gaacacgtcg ctgacgccgc accgctccag cgcctccacg aggatgtccg cgcccttgcg  6180
```

```
gggctcggcc ggcccccacg gccggagcgg cgtggccggc ggcgccgggg acggcgggt    6240
gaccggggac accgccgagc acctgaccgc cgccgccccc acccggcctc gagcgggaag   6300
gacgtggtgt cgctggtggt tcttacggcc ggtcttggcc gtcgcggcgg cggacagggc   6360
ggcggccgcg gccgcggcgg tcgtagccat ggtgggtggt ggcggcggcg gcggcggcga   6420
gggtttctgg gtttgggcga gagggagaga ggggtggaga gtgtggggat gtgggtgttt   6480
tgtccgcgcg cggtgacgca gcgtgaggcg atgtgtggct cggatgggat cgtgtggggc   6540
cacgtcacag tgggcccat atgtcggtgg ataggatga cacacagcca cgtcggggtc     6600
gatctggcc cgcgtgtcag tcgattggat gaggatgaca ggtgggtcag tcccaataac    6660
gggtggaggg tacagaaccc gataaaaaat cgatctcaaa gtcggatgcg gatgcaaccg   6720
cgagacctag cagtctagca cccgcacccg cacccgcaca aacgcagcgc aagatgagca   6780
gtggcggcga gaagtccggc tcgggcggcg gcgcggtgg cggcggccgc ggggcggtga    6840
agacgccctc cgacttcctc aagtccatca gggggcgccc cgtcgtcgtc aagctcaact   6900
ccggcgtcga ctaccgcggt aaccccctgc tcaattccct ccccctttt gcctcaaccc    6960
tagacccgcc tcccgaaaac cctagcacga gacgaatgcg atgtttgttg taccccgtat   7020
ctctttctcc ttaattggaa ctctgcgttt cttttcgtta attagtgggg ggaaggaaag   7080
gcgtggactc tgtaggattt tcttttcgat ttgatgacca agggagatac ttattttagt   7140
gctgtttaag atcctgctag tgcccggtgt agctaggcca tttgagaagc agataaccgt   7200
gtttttctgt aggaccttct ctaatcttga gctattttga tattctaatt acttatggtt   7260
aaaccctaga acctcagtat gttttaactt agtaagagat tgctacagta ttttttatttg  7320
taggaacaac attgtaggtg gttatcatgc tactgactgt cttgtgtaga gccctcctat   7380
cattaagggg cttttatgtt tactaatagt tagttttagt acccattttt ctgtgagcta   7440
ctaaaaagaa tatttccaat tcaacctatg gtaatttaaa gtactttatg ctgtatgtcc   7500
atttactgag gattatgatt aatatttaag agggaggaca tctgtgctta aggtttgcat   7560
tgcaatattt gatagattta tgctaaacaa aggtaattgt gcatgcttga gatagaaagg   7620
gatttcccctt ctttgggttt gataataagg ggttggcatt ccatgatcag gagcatagtg   7680
cattatatt ttataatgtg gctagtgta tgcagttctc aatttcacat tggcggtaca     7740
cccatgatat atttaattgt tacccagaac catataatag cctaataaga gcatatggta    7800
ttccattgat tggggccttc ggaagtgtac ctgtgtatgt aactatgcat ataaggttta   7860
cttttctggta gttctttctt ctcctcatca cttaagacat ctggatcgct gttatcaagt   7920
cgtagactag tcataacgtc agtcaagtca gacgactaga gggctacgac tcgaccaaat   7980
agcaagtcgc acaattagtc gtagattagt catagcaaat catcatttca ccatgctaat   8040
tggcttattg tgtttagtac tttaaattta tttcttgtta acttattgtc ttgctggcta   8100
ctccataaac cgtagtttat aatactatat atagtgctta gtacaataga atagtactag   8160
agactatata gtgcatccat tgttttcaca cgaccaaatc attggactagt cgtagactag  8220
attttgaatg gaacagttt accagaaata cacttgttct tttttttct gaatagtgtt     8280
gaatcagtag ctgcaatgca tagccttgtc aataaaatca ttatatacta tcaccaattt   8340
catgaatct tacttattgg aaatttgtaa caaatctatt ttatccctg agttaccgtg     8400
ttggtctaaa atcaactcgc atgtgagaca agatgaagag gaccatgaag attgcctctt   8460
tcatttattc atttgctgac tgcttgcaat gccactataa acctaatcgg atgactggtt   8520
gtcatgtctc cgctaactag agagaaaggg ggaggagtga agactttacg tgtacacagt   8580
cttttcaccag gacggttgta tcggttcagc agtcgcgatc cgggcagcgc tgaagaactt   8640
ccccgatcta gtaacataga tgacaccgcg cgcgataatt tatcctagtt tgcgcgctat    8700
atttttgtttt ctatcgcgta ttaaatgtat aattgcgaga ctctaatcat aaaaacccat   8760
ctcataaata acgtcatgca ttacatgtta attattcat gcttaacgta attcaacaga    8820
aattatatga taatcatcgc aagaccggca acaggattca atcttaagaa accacctgca   8880
agtgacttcc tcagcaggcc tactagtttt attgccaaat gtttgaacga tcggggaaat   8940
tccagtgcac cagagtcaca gaaacacatc acacattcgt gagctcagct tagccatgga   9000
taacgcctac attattgcca ttctctctgt agctatcctc ttcttgctcc actactacct   9060
cctcggccgc ggcaatggcg gggcggcgcg gctgccgccg ggtccaccgg ccgtcccgat   9120
cctgggacac ctccacctcg tcaagaagcc gatgcacgcc accatgtccc gcctcgccga   9180
gcggtacggg ccggtgttct cgctgcgcct cgggtcgcgg cgcgccgtgg tggtgtcgtc   9240
gccggggtgc gccagggagt gcttcaccga gcacgacgtg accttcgcga accggccag    9300
gttcgagtcg cagctgctgg tctcgttcaa cggcgccgcg ctcgccacgg cgagctacgg   9360
cgcgcactgg cgcaacctcc gccggatcgt cgccgtgcag ctgctctccg cgcaccgcgt   9420
cggcctcatg tctgaaaatc tcgaaacagc cgtgtcatag tcaatcatta ggtgttatag   9480
gaacaatcaa aggttttttc aagtgttaat cttcatacta atatatacag tgggtactct   9540
ttatctactg ccgtggaact gtcatatttg attatgaaat tttagctcta gaaaatattt   9600
gatcatcaat gtcaagactt tatgaccttg caaaatacat ttcctaattg agaacagggt   9660
aaaattatga actatgcctc tgaaccttca tacacaggca gcacattttt tgttgtaaaa   9720
ttcatcttaa tatcagcgga aagactggac cagagaaaga aaaagttaag acaggcatat   9780
actcttgatc ctctaaaaga gatgaggcgg tacaatgatc aaccatgaac attaaagtga   9840
tacgtggaac atgagaacac aaataaattgt cactggaaca taaatacaaa aaggtttgta   9900
gtaacttacc gacatgaggc cgacgcggtg cgcggagagc agctgcacgg cgacgatccg   9960
gcggaggttg cgccagtgcg cgccgtagct cgccgtgcga agcgcggcgc cgttgaacga  10020
gaccagcagc tgcgactcga acctgggccg gttcgcgaag gtcacgtcgt gctcggtgaa  10080
gcactccctg gcgcacccg cgacgcacac caccacggcg cgccgcgacc cgaggcgcag   10140
cgagaacacc ggcccgtacc gctcggcgag gcggacatg gtgccgtgca tcggcttctt    10200
gacgaggtgg aggtgtccca ggatcgggac ggccggttgga cccgccggca gccgcgccgc  10260
cccgccattg ccgcggccga ggaggtagta gtggagcaag aagaggatag ctacagagga  10320
aatggcaata atgtaggcgt tatccatggc taagctgagc tcacgaatgt gtgatgtgtt  10380
tctgtgactc tggtcgcactg ggatcccctg aggggtcacc gacttcaggt caagtaacac  10440
caaacaacag ggtgagcatc gacaaaagaa acagtaccaa gcaaataaat agcgtatgaa  10500
ggcagggcta aaaaaatcca catatagctg ctgcatatgc catcatccaa gtatatcaag  10560
atcaaaatga tcataaaaca tacttgttta ttataataga taggtactca aggttagagc  10620
atatgaatag atgctgcata tgccatcatg tatatgcatc agtaaaaccc acatacaacat  10680
gtataccat cctagatcga tatttccatc catcttaaac tcgtaactat gaagatgtat   10740
gacacacaca tacagttcca aaattaataa atacaccagg tagtttgaaa cagtattcta  10800
ctccgatcta gaacgaatga acgaccgccc aaccacacca catcatcaca accaagcgaa  10860
caaaaagcat ctctgtatat gcatcagtaa aacccgcatc aacatgtata cctatcctag 10920
```

```
atcgatattt ccatccatca tcttcaattc gtaactatga atatgtatgg cacacacata  10980
cagatccaaa attaataaat ccaccaggta gtttgaaaca gaattctact ccgatctaga  11040
acgaccgccc aaccagacca catcatcaca accaagacaa aaaaaagcat gaaaagatga  11100
cccgacaaac aagtgcacgg catatattga aataaaggaa aagggcaaac caaaccctat  11160
gcaacgaaac aaaaaaaatc atgaaatcga tcccgtctgc ggaacggcta gagccatccc  11220
aggattcccc aaagagaaac actggcaagt tagcaatcag aacgtgtctg acgtacaggt  11280
cgcatccgtg tacgaacgct agcagcacgg atctaacaca aacacggatc taacacaaac  11340
atgaacagaa gtagaactac cgggcccaa ccatggaccg gaacgccgat ctagagaagg  11400
tagagagggg ggggggggga ggacgagcgg cgtaccttga agcggaggtg ccgacgggtg  11460
gatttgggg agatctggtt gtgtgtgtgt gcgctccgaa caacacgagg ttgggganag  11520
agggtgtgga ggggggtgtct attattacg gcgggcgagg aagggaaagc gaaggagcgg  11580
tgggaaagga atccccgta gctgccggtg ccgtgagagg aggaggaggc cgcctgccgt  11640
gccggctcac gtctgccgct ccgccacgca atttctggat gccgacagcg gagcaagtcc  11700
aacggtggag cggaactctc gagagggtc cagaggcagc gacagagatg ccgtgccgtc  11760
tgcttcgctt ggcccgacgc gacgctgctg gttcgctggt tggtgtccgt tagactcgtc  11820
gacggcgttt aacaggctgg cattatctac tcgaaacaag aaaaatgttt ccttagtttt  11880
tttaatttct taaagggtat ttgttttaatt tttagtcact ttattttatt ctattttata  11940
tctaaattat taaataaaaa aactaaaata gagttttagt tttcttaatt tagaggctaa  12000
aatagaataa aatagatgta ctaaaaaaat tagtctataa aaaccattaa ccctaaaccc  12060
taaatggatg tactaataaa atggatgaag tattatatag gtgaagctat ttgcaaaaaa  12120
aaaggagaac acatgcacac taaaaagata aaactgtaga gtcctgttgt caaaatactc  12180
aattgtcctt tagaccatgt ctaactgttc atttatatga ttctctaaaa cactgatatt  12240
attgtagtac tatagattat attattcgta gagtaaagtt taaatatatg tataaagata  12300
gataaactgc acttcaaaca agtgtgacaa aaaaaatatg tggtaattt ttataactta  12360
gacatgcaat gctcattatc tctagagagg gcacgaccg gtcacgctg cacgttaacg  12420
acacctgtct ccggatcgca tgcgcattct agaggatccg tcagagtctc agtccactag  12480
ccttgtccac gtcgccaatg tttaaatcca gtcccaccat ttgtagcgta gaatgaaca   12540
gctttcgata aaatttctca accatttaga tgaaattcgc accgttcaa gcagggtcta   12600
ggaccaacaa atcctagaat caaacatggt acattcaaat ttcaaattca aaccagatta  12660
cataggctta tttactactc cggtaagcga tacgggcggc ggcgcgcgg ctgccggcga  12720
gcggcggcgg gggtcagacg gaggtggaga cgcggaccct gaggccgtga gccatggaga  12780
ggatggtcat catccggtac ttgacgggt ggtcctcgac gaggtcgaag gtgtagaagc   12840
ggaagaggat ggcgagcgcc atcttcatct ggaggtaggc ggagtccttg ccgaggcaga  12900
tccgcggccc ggcctggaac gcggtgaact tgaacggcga ggcgttgcgg aacgcgccgc  12960
cgtcgccgct gagccaccgc tccggccgga agctcgccgc gtcggggccc cagttgtact  13020
ccatcctccc catcgagtag ggcacgtacg tcaccatccc gccggcgcgc accttggtgc  13080
cgtcggggag cacgtcgtcc tccacgatcc ccttgggggtc ctgcggcacc gccgggtaga  13140
ggcggagcgt ctccgtcacg caggcgtgca ggtacaccag cttccccacc gcgtcgtagc  13200
tcagcagcga cgcgaactgc gccacgcgcg ccgtgaaccg ccctcgccg gcggcgtcgg  13260
cgagcgcgac gccctcctcg cgcgcgcgct cagcctcgaa cgcggccagc tcgcgccgga  13320
gcttgtcggc gacggctggg tgcgtcatcg ccatgtacgt gaaccacgac agcgtcgtcg  13380
ccgtcgtgtc acgccggcg atcacgaagt tgagcaccac gtcgcggagg ctcttgtcgt  13440
ccccgaagct gccgcccccc tcgtcgccgc cggcctcgatg aaccgcgaca  13500
gtatgtcgtg cttgatctgc tcgccattac aaatcaacca tatcaagaaa caaaaccttt  13560
tccgatctga tcatcgccat taccatgtca gttcagttct actgattctt tgagcaagag  13620
aggaaggatc accttctctt gcttgccgct ggctcgagcc tgcaagatct cagccttgcg  13680
gcggcgatc acgctgtagg tgaagtcatc aaccagcttc atgctctgct cgaggagagc  13740
ctctgatccg acgtgcaaga acttcttgag acgccacaga ggatcgatga accgcagcgt  13800
gacgatgatg ttggcagcgt cgaaggcctg ggcaaagctg ttctccggga gatcaggtga  13860
cagcgtcccg atctcaaccc caaacccgac cttgcagatc gagtccagtg tcatcctcat  13920
gaacaattcc tgaattttgg ttagttcttg catcacaatt ctgaacaatt tggttttctca  13980
agaaatgttt agatattagg caaggaaatc agttggttac ctgcatgtct acaactctgc  14040
cggccttgca cgcttggctc agaatgcttg atagcttcag ggagtactcc ctgaacacca  14100
cagtgctgaa gtctctcaag ttcttggagg caaactcgaa gctcgccgtc ttcctttgct  14160
tcctccacat ctcgccctcg gcattgaata tgccatcacc gacagcaca tccatgtaag   14220
acctgtagac ttcaccctgc ctattttcag acattttttg tgtcagtgtt agtactgtgc  14280
aaggcacatt ttacagtaca ctgaagatcc tatggttctt ttaccttggg gtaattggtg  14340
aagttggtct tcaggacatg ctcgacgttc accgggtcgg caatgtaggt gtaggaggtg  14400
aaaggcatgt cgacggtcac cgtcctgtcc ttcgacaagt actcgacaag ccagtcatgc  14460
atcctgtggt agttcttcag ttgctccact gtcgcgccga tgattggcca tgatcttgcc  14520
cctttctggt tcctcaggct ccacttgtgg accaagatcc atgagaggac aacaaggaag  14580
atagctatga gcttgtggat tcctgctact gggaagaatg atgtcactgg cattgcatga  14640
gcttcctcca tgggggctctt catgaagggt tcagtctaca agagatgcta tgtagcattt  14700
tggatgccat agttaggtga tatattggga actgatgcta ccaaccttga gacaatcttt  14760
gtgtgaccaa gaattaagat tgtctcattc atatggtgtc cctaacctaa cacccttagg  14820
agttggatct tagctttagt tttctttttg tgatctgtcc acctagaaa gaatcgttac  14880
tcatgtaaac acaaaatgaa tgctacagta tttttttccc ctgctcagcc aagttcgttg  14940
ttttgttcag ataactgaag cgtttgcagc gactaaaggt atggcacctt ctaatatcag  15000
aaccatatcc atctgaattc tgttaaattg tcaccaactg aaaccaggct taccattttc  15060
tgtcgatatt gtctagtctt tgatgacaac taaaatgaaa tggggtatcc tcaaaagaaa  15120
tataaattgt gaaccaaag tagttggttt ctacttcacc tgaattctac ttcatctgaa  15180
taggctattt taatgaagag aaaatccaag aaatgccatt tacaaacacc caaatccaag  15240
aaatgctatc gacgagtacg agttccataa aatgctattg tagaagcgat tttgtcccag  15300
aaatcagttg ccatctagtt aaaacattct cacataaaca agcaatataa aatactattg  15360
ccaagatata tccaatactt tgcatctcta aaacttctag ttattgacaa ctaatttctt  15420
ttccagtcaa tacaaataag ccatctatca aagatttgag aaattgcagg gcacaattct  15480
acagaaaatt aaagaacatc acttgaaaag gaagattttt tctatagaac ttatcctttg  15540
tgatgtaaca acaaatactc gaatgaattg agaaataacc aatgtcaaca ctgaaacaag  15600
tctgaaacca agatcagaag agcatgaaaa tagtgctctt atgattgac cttgattctt  15660
```

```
gcccacactc ttattacaac cttcgagcaa accggagcat ttgctgaata aatctctcat   15720
ctgttactga agatactagg taactaaata aacaatcaat caagagtatc aaaacatttt   15780
gcaggatcta gtaacataga tgacaccgcg cgcgataatt tatcctagtt tgcgcgctat   15840
attttgtttt ctatcgcgta ttaaatgtat aattgcggga ctctaatcat aaaaacccat   15900
ctcataaata acgtcatgca ttacatgtta attattacat gcttaacgta attcaacaga   15960
aattatatga taatcatcgc aagaccggca acaggattca atcttaagaa acttttattgc  16020
caaatgtttg aacgatctca gctgtgcccc agtttgctag gcaggtcgca gtacctggcc   16080
acagccatct cgtgctgctc cacgtaggtc tctttgtcgg cctccttgat tctttccagt   16140
ctcctgtcca cgaagtagaa gccgggcatc ttgaggttct tagcgggttt cttggatctg   16200
tatgtggtct tgagggagca gtgcaggtag cccccgccca cgagcttcag ggccatctgg   16260
ctatggcctc tcaggccgct gtcagcgggg tacagcatct cggtgctggc ctcccagccg   16320
agtgttttct tctgcatcac agggccgttg gatgggaagt tgaccccgtt gatcttgacg   16380
ttgtagatga ggcagccgtt ctggaggctg gtgtcctggg tagcggtcag cacgcccccg   16440
tcttcgtatg tggtgatcct ctcccatgtg aagccctcag ggaaggactg cttaaagaag   16500
tcggggatgc cctgggtgtg gttgataaag gttttgctgc cgtacatgaa gctggtagcc   16560
aggatgtcga aggcgaaggg gagagggccg ccctcgacca cctgatctt catggtctgg    16620
gtgccctcgt agggcttgcc ttcgccctcg gatgtgcact tgaagtggtg gtcgttcacg   16680
gtgccctcca tgtagagttt catgtgcatg ttctcggtga tcagcacgct atcctcaccc   16740
actgcggaag cgttgcatgc aacaatagca aggagagcaa atacgaaaat gatcttcatt   16800
tttgtaggat tctactacta tgcttcaact ataatgtttg aattgtgtga aggatgagga   16860
gggttttcat tatgcttgtc tatttataga tgtttcccta tcggttgctt tagagtgtta   16920
gttttgcttg atgctatatt aggatctaag tgagtcatat tatttggata ttctgttagg   16980
tgcacctaaa aatgttcttt gatatcatca tcaaagtaac ttttatgccc atcatatata   17040
catgatggtg agcaaaaaaa taatgacatg actcatcgct cactttatgt gtcaatgtga   17100
taaggattgc aactttgaa actaagtttg ttatgttttg taagctatta ttttgataat    17160
gcactacacg tggaacttta cgactgtgtg ggtttatgct ctttgaatta tataattca    17220
gtaagaaaaa aaattatagt atgttcaatg gttttcattg ttccattaat actcttgtga   17280
aaacttgttt gtgatacgaa ataagttaat gcaataactt ttaaattaac tttgcagagc   17340
tttacaataa ctcaccaact tactctaatt gtggttgggg attgatttaa ttcatacttt   17400
tatagaccaa attgatattg tgttgctaaa taaaaattat agtggtgttg ctacacctac   17460
acagacacag aaggaatcct gatatcatca gctatctact gcttcctcca catggactca   17520
agaagcagaa gcaaaaaaga agaaggcatt tgctccaaca aagttttccg gtgaaaggca   17580
acacattgtt ctgaacttcc tggcatgtat tatgtgaatc tagcaaatta accaaacatt   17640
gacacaatgc gacaccttgt aatgtagccg tgccagaaat tgtatatctc acttaccatt   17700
gtatatcaca cgtgccgaga ataggagatt gattttgcc aaccaaaacg ctctaggcag    17760
accaattggg cgcccggccg gattaataaa tttcgaaacg cgtcggaccg gcaccggaca   17820
ctgtctggtg gcataccaga cagtccggtg tgccagatca gggcacccct cggttccttt   17880
gctccttgc ttttgaaccc taactttgat cgttattgg tttgtgttga accttatgc      17940
acctgtggaa tatataatct agaacaaact agttagtcca atcattttgtg ttgggcattc   18000
aaccaccaaa attatttata ggaaaaggtt aaaccttatt tcccttctcaa tctcccccttt  18060
tttggtgatt gatgccaaca caaaccaaag aaaatatata agtgcagaat tgaactagtt   18120
tgcataaggt aagtgcatag gttacttaga attaaatcaa tttatacttt tacttgatat   18180
gcatggttgc tttctttat tttaacatttt tggaccacat ttgcaccact tgttttgttt    18240
tttgcaaatc ttttttggaaa ttcttttca aagtcttttg caaatagtca aaggtatatg    18300
aataagattg taagaagcat tttcaagatt tgaaattct ccccctgttt caaatgcttt    18360
tcctttgact aaacaaaact cccctgaat aaaatttctc tcttagcttt caagaggggtt    18420
ttaaatagat atcaattgga aatattta gatgctaatt ttgaaaatat accaattgaa      18480
aatcaacata ccaatttgaa attaaacata ccattttaaa aaatttcaaa aagtggtggt   18540
gcggtccttt tgctttgggc ttaatatttc tccccctttg gcattaatcg ccaaaaacgg   18600
agactttgtg agcatttat actttctccc cattggtaaa tgaaatatga gtgaaagatt    18660
ataccaaatt tggacagtga tgcggagtga cggcgaagga taaacgatac cgttagagtg   18720
gagtggaagc cttgtcttcg ccgaagactc catttccctt tcaatctacg acttagcata   18780
gaaatacact tgaaaacaca ttagtcgtag ccacgaaaga gatatgatca aaggtataca   18840
aatgagctat gtgtgtaatg tttcaatcaa agtttcgaga atcaagaata tttagctcat   18900
tccttaagttt gctaaaggtt ttatcatcta atggtttggt aaagatatcg actaattgtt   18960
ctttggtgct aacataagca atctcgatat caccccttg ttggtgatcc ctcaaaaagt    19020
gataccgaat gtctatgtgc ttagtgcggc tgtgttcaac gggattatcc gccatgcaga   19080
tagcactctc attgtcacat aggagaggga ctttgctcaa tttgtagcca tagtccctaa    19140
ggttttgcct catccaaagt aattgcacac aacaatgtcc tgcggcaata tacttggctt   19200
cggcggtaga aagagctatt gagttttgtt tctttgaagt ccaagacacc agggatctcc   19260
ctagaaactg acaagtccct gatgtgctct tcctatcaat tttacaccct gcccaatcgg   19320
catctgaata tcctattaaa tcaaaggtgg atcccttggg gtaccaaaga ccaaatttag   19380
gagtgtaaac taaatatctc atgattcttt tcacggccct aaggtgaact tccttaggat   19440
cggcttggaa tcttgcacac atgcatatag aaagcatatt atctggtcga gatgcacata   19500
aatagagtaa agatcctatc atcgaccggt ataccttttg gtctacggat ttacctcccg   19560
tgtcgaggtc gagatgccca ttagttccca tgggtgtcct gatgggcttg gcatccttca   19620
ttccaaactt gttgagtatg tcttgaatgt actttgtttg gctgatgaag gtgccatctt   19680
ggagttgctt gacttgaaat cctagaaaat atttcaactt ccccatcata gacatctgga   19740
atttcggaat catgatccta ctaaactctt cacaagtaga tttgttagta gacccaaata   19800
taatatcatc aacataaatt tggcatacaa acaaaacttt tgaaatggtt ttagtaaaga   19860
gagtaggatc ggcttactg actctgaagc cattagtgat aagaaaatct cttaggcatt    19920
cataccatgc tgtttgggct tgcttgagcc cataaagcgc ctttgagagt ttataaacat   19980
ggttagggta ctcactatct tcaaagccga gaggttgctc aacatagacc tattcaccccc   20040
atttgatcac ttttttggtc cttcaggatc taatagttat gtataattta gagtctcttg   20100
tttaatggcc agatatttct aattaatcta agaatttatg atatttttta atttttttatc   20160
atgtctgatg agaattaaca taaggctcta attgggtcct gaattaataa tagagtgaaa   20220
attaatccag aggctctatt agaaccttca attagtaata ccaagatata tataagatag   20280
tagagtatag tttaaatgtt ggcattgttc attctttctt ttgttattta atttatgctt   20340
tccacggtgg ttagtggtta cttctgaagg gtccaaataa tgcatgaaga gtttgaggac   20400
```

```
aagaagtctg ccctaaaaat agcgatgcaa aggcatggtg tccaagccat acatatagcg   20460
cactaatttt atcagcagaa caatggtatt tataggtcct agtgcccagg caacaagaga   20520
cacgaataaa gcatcgatca cgacaagatg ctgtgtctca cctcctcttc ctcctccgcg   20580
cccgctccgc tccttccctc tctcgctgat cgaccgagcc caggaatcgc gggcggggt    20640
ggcaatgttc gcctgagcgt ggtttcttcg ccgcggcggt cgtggcctgg aaaggtcaag   20700
accaatttct cagttcctgc gactgcgcga aaaaacaaaa ccatggtgac tgttgtggag   20760
gagatcgctt gttctggtac tggatctgga tttgaaatat tgtgtcaagg atttaactgg   20820
gaatctcata agtcaggaaa atggtatgtg gaacttggct caaaggccaa ggagttgtca   20880
tccatgggtt tcaccattgt ctggtcacca ccacctactg attctgtgtc gcctgaagga   20940
tacatgccaa gggatttgta taatctaaat tccagatatg ggaccatgga agagttgaag   21000
gaggctgtga aacgttttca tgaagccggt atgaaggttc ttggtgatgc cgtcctgaat   21060
cacaggtgtg ctcaatttca gaaccaaaat ggcgtctgga atattttgg tggacgcctt    21120
aactgggatg atcgagcagt tgttgcagat gatccacatt tccagggaag aggaaacaag   21180
agcagtggag ataacttcca tgcagcccca aacattgatc actcgcaaga gtttgtgagg   21240
agtgatctta agaatggct  ttgttggatg agaaaggaag ttggatacga tggatggcga   21300
cttgattttg ttcgcggatt ttgggggtgga tatgtccacg attacttgga agcaagcgaa   21360
ccatattttg cagtaggaga gtactgggat tctctcagtt acacctatgg tgaaatggat   21420
tataatcaag atgcccacag gcagagaata gttgattgga taaatgctac aaatggaact   21480
gctggtgcat ttgatgttac cacgaaagga atacttcact ctgcactgga aagatctgag   21540
tactggcgtc tgtctgatga aaaaggaaaa ccccctggag tgttaggttg gtggccttcg   21600
cgtgctgtca catttataga aaatcatgac actggttcta ctcagggtca ttggagattc   21660
cccttttggta tggagttgca aggctatgtc tacatcttca ctcacccagg cactcctgca   21720
atcttctatg atcatatatt ttcgcattta cagccagaga ttgctaaatt aatttctatt   21780
agaaatcgcc aaaagatcca ttgccgtagc aagatcaaga tactgaaagc agagggaaat   21840
ttatatgcgg cagagattga tgagagggta acaatgaaga ttggcgcagg acattttgag   21900
ccaagcggcc ccacaaactg ggtagttgct gccgagggac aggattacaa ggtctgggaa   21960
gtgtcatcgt agacttgccg cgctggtact tgcagaactt ctattgtaga cagtatacaa   22020
ccattcggta tagctcacaa aagggatcgt tcaaacattt ggcaataaag tttcttaaga   22080
ttgaatcctg ttgccggtct tgcgatgatt atcatataat ttctgttgaa ttacgttaag   22140
catgtaataa ttaacatgta atgcatgacg ttatttatga gatgggtttt tatgattaga   22200
gtcccgcaat tatacattta atacgcgata gaaaacaaaa tatagcgcgc aaactaggat   22260
aaattatcgc gcgcggtgtc atctatgtta ctagatccct aggcacgtgt acgtatttt    22320
taccaggtga actccaagtc ctggaccctt ttttggcac tggccgtcgt tttaagctta    22380
gattgtcgtt tcccgccttc agtttaaact atcagtgttt gacaggatat attggcgggt   22440
aaacctaaga gaaaagacg  tttattagaa taacggatat ttaaagggc gtgaaaaggt   22500
ttatccgttc gtccatttgt atgtgcatgc caaccacagg gttcccctcg ggatcaaagt   22560
actttgatcc aaccccctccg ctgctatagt gcagtcggct tctgacgttc agtgcagccg   22620
tcttctgaaa acgacatgtc gcacaagtcc taagttacgc gacaggctgc cgccctgccc   22680
ttttcctggc gttttcttgt cgcgtgtttt agtcgcataa agtagaatac ttgcgactag   22740
aaccggagac attacgccat gaacaagagc gccgccgctg gcctgctggg ctatgcccgc   22800
gtcagcaccg acgaccagga cttgaccaac caacgggccg aactgcacgc ggccggctgc   22860
accaagctgt tttccgagaa gatcaccggc accaggcgcg accgcccgga gctggccagg   22920
atgcttgacc acctacgccc tggcgacgtt gtgacagtga ccaggctaga ccgcctggcc   22980
cgcagcaccc gcgacctact ggacattgcc gagcgcatcc aggaggcggg cgcgggcctg   23040
cgtagcctgg cagagccgtg ggccgacacc accacgccgg ccggccgcat ggtgttgacc   23100
gtgttcgccg gcattgccga gttcgagcgt tcccctaatca tcgaccgcac ccggagcggg   23160
cgcgagcgcc ccaaggcccg aggcgtgaag tttggccccc gccctaccct caccccggca   23220
cagatcgcgc acgcccgcga gctgatcgac caggaaggcc gcaccgtgaa agaggcggct   23280
gcactgcttg gcgtgcatcg ctcgaccctg taccgcgcac ttgagcgcag cgaggaagtg   23340
acgcccaccg aggccaggcg gcgcggtgcc ttccgtgagg acgcattgac cgaggccgac   23400
gccctggccg ccgcgagaa  tgaacgccaa gaggaacaag catgaaaccg caccaggacg   23460
gccaggacga accgttttc  attaccgaag agatcgaggc ggagatgatc gcggccgggt   23520
acgtgttcga gccgccgcg  cacgtctcaa ccgtgcggct gcatgaaatc ctggccggtt   23580
tgtctgatgc caagctggcg gcctggccgg ccagcttggc cgctgaagaa accgagcgcc   23640
gccgtctaaa aaggtgatgt gtatttgagt aaaacagctt gcgtcatgcg gtcgctgcgt   23700
atatgatgcg atgagtaaat aaacaaatac gcaagggaaa cgcatgaagg ttatcgctgt   23760
acttaaccag aaaggcgggt caggcaagac gaccatcgca acccatctag cccgcgccct   23820
gcaactcgcc ggggccgatg ttctgttagt cgattccgat ccccagggca gtgcccgcga   23880
ttgggcggcc gtgcgggaag atcaaccgct aaccgttgtc ggcatcgacc gcccgacgat   23940
tgaccgcgac gtgaaggcca tcggccgcg  cgacttcgta gtgatcgacg gagcgcccca   24000
ggcggcggac ttggctgtgt ccgcgatcaa ggcagccgac ttcgtgctga ttccggtgca   24060
gccaagccct tacgacatat gggccaccgc cgacctggtg gagctggtta agcagcgcat   24120
tgaggtcacg gatggaaggc tacaagcggc ctttgtcgtg tcgcgggcga tcaaaggcac   24180
gcgcatcggc ggtgaggttg ccgaggcgct ggccgggtac gagctgccca ttcttgagtc   24240
ccgtatcacg cagcgcgtga gctacccagg cactgccgcc gccggacaca ccgttcttga   24300
atcagaaccc gagggcgacg ctgccgcgca ggtccaggcg ctggccgctg aaattaaatc   24360
aaaactcatt tgagttaatg aggtaaagag aaaatgagca aaagcacaaa cacgctaagt   24420
gccggccgtc cgagcgcacg cagcagcaag gctgcaacgt tggccagcct ggcagacacg   24480
ccagccatga agcgggtcaa ctttcagttg cggcgaagca atacaccaa  gctgaagatg   24540
tacgcggtac gccaaggcaa gaccattacc gagctgctat ctgaatacat cgcgcagcta   24600
ccagagtaaa tgagcaaatg aataaatgag tagatgaatt ttagcggcta aaggaggcgg   24660
catgaaaat  caagaacaac caggcaccga cgccgtggaa tgcccccatgt gtggaggaac   24720
gggcggttgg ccaggcgtaa gcggctgggt tgtctgccgg ccctgcaatg gcactggaac   24780
ccccaagccc gaggaatcgg cgtgacggtc gcaaaccatc caatcccgtg acaatcgcg    24840
cggcgctggg tgatgacctg gtggagaagt tgaaggccgc gcaggccgcc cagcggcaac   24900
gcatcgagcg agaagcacgc cccgtgaat  cgtggcaagc ggcgctgat  cgaatccgca   24960
aagaatcccg gcaaccgccg gcagccggtg cgccgtcgat taggaagccg cccaaggcgc   25020
acgagcaacc agattttttc gttccgatgc tctatgacgt gggcacccgc gatagtcgca   25080
gcatcatgga cgtggccgtt ttccgtctgt cgaagcgtga ccgacgagct ggcgaggtga   25140
```

```
tccgctacga gcttccagac gggcacgtag aggtttccgc agggccggcc ggcatggcca   25200
gtgtgtggga ttacgacctg gtactgatgg cggtttccca tctaaccgaa tccatgaacc   25260
gataccggga agggaaggga gacaagcccg gccgcgtgtt ccgtccacac gttgcggacg   25320
tactcaagtt ctgccggcga gccgatggcg gaaagcagaa agacgacctg gtagaaacct   25380
gcattcggtt aaacaccacg cacgttgcca tgcagcgtat gaagaaggcc aagaacggcc   25440
gcctggtgac ggtatccgag ggtgaagcct tgattagccg ctacaagatc gtaaagagcg   25500
aaaccgggcg gccggagtac atcgagatcg agctagctga ttggatgtac cgcgagatca   25560
cagaaggcaa gaacccggac gtgctgacgg ttcaccccga ttacttttg atcgatcccg    25620
gcatcggccg ttttctctac cgcctggcac gccgcgccgc aggcaaggca gaagccagat   25680
ggttgttcaa gacgatctac gaacgcagtg gcagcgccgg agagttcaag aagttctgtt   25740
tcaccgtgcg caagctgatc gggtcaaatg acctgccgga gtacgatttg aaggaggagg   25800
cggggcaggc tggcccgatc ctagtcatgc gctaccgcaa cctgatcgag ggcgaagcat   25860
ccgccggttc ctaatgtacg gagcagatgc tagggcaaat tgccctagca ggggaaaaag   25920
gtcgaaaagg tctctttcct gtggatagca cgtacattgg gaaccaaag ccgtacattg    25980
ggaaccggaa cccgtacatt gggaacccaa agccgtacat tgggaaccgg tcacacatgt   26040
aagtgactga tataaaagag aaaaaggcg attttccgc ctaaaactct ttaaaactta     26100
ttaaaactct taaaacccgc ctggcctgtg cataactgtc tggccagcgc acagccgaag   26160
agctgcaaaa agcgcctacc cttcggtcgc tgcgctcccc acgccccgcc gcttcgcgtc   26220
ggcctatcgc ggccgctggc cgctcaaaaa tggctggcct acgccaggc aatctaccag     26280
ggcgcggaca agccgcgccg tcgccactcg accgccggcg cccacatcaa ggcaccctgc   26340
ctcgcgcgtt tcggtgatga cggtgaaaac ctctgacaca tgcagctccc ggagacggtc   26400
acagcttgtc tgtaagcgga tgccgggagc agacaagccc gtcagggcg gtcagcgggt    26460
gttggcgggt gtcggggcgc agccatgacc cagtcacgta gcgatagcgg agtgtatact   26520
ggcttaacta tgcggcatca gagcagattg tactgagagt gcaccatatg cggtgtgaaa   26580
taccgcacag atgcgtaagg agaaaatacc gcatcaggcg ctcttccgct tcctcgctca   26640
ctgactcgct gcgctcggtc gttcgctctg gcgagcggt atcagctcac tcaaaggcgg    26700
taatacggtt atccacagaa tcaggggata acgcaggaaa gaacatgtga gcaaaaggcc   26760
agcaaaaggc caggaaccgt aaaaaggccg cgttgctggc gtttttccat aggctccgcc   26820
cccctgacga gcatcacaaa aatcgacgct caagtcagag gtggcgaaac ccgacaggac   26880
tataaagata ccaggcgttt ccccctggaa gctccctcgt gcgctctcct gttccgaccc   26940
tgccgcttac cggatacctg tccgcctttc tcccttcggg aagcgtggcg ctttctcata   27000
gctcacgctg taggtatctc agttcggtgt aggtcgttcg ctccaagctg ggctgtgtgc   27060
acgaaccccc cgttcagccc gaccgctgcg ccttatccgg taactatcgt cttgagtcca   27120
acccggtaag acacgactta tcgccactgg cagcagccac tggtaacagg attagcagag   27180
cgaggtatgt aggcggtgct acagagttct tgaagtggtg gcctaactac ggctacacta   27240
gaaggacagt atttggtatc tgcgctctgc tgaagccagt taccttcgga aaaagagttg   27300
gtagctcttg atccggcaaa caaaccaccg ctggtagcgg tggttttttt gtttgcaagc   27360
agcagattac gcgcagaaaa aaaggatctc aagaagatcc tttgatcttt tctacggggt   27420
ctgacgctca gtggaacgaa aactcacgtt aagggatttt ggtcatgcat tctaggtact   27480
aaaacaattc atccagtaaa atataatatt ttattttctc ccaatcaggc ttgatcccca   27540
gtaagtcaaa aaatagctcg acatactgtt cttccccgat atcctccctg atcgaccgga   27600
cgcagaaggc aatgtcatac cacttgtccg ccctgccgct tctcccaaga tcaataaagc   27660
cacttacttt gccatctttc acaaagatgt tgctgtctcc caggtcgccg tgggaaaaga   27720
caagttcctc ttcgggcttt tccgtcttta aaaaatcata cagctcgcgc ggatctttaa   27780
atggagtgtc ttcttcccag ttttcgcaat ccacatcggc cagatcgtta ttcagtaagt   27840
aatccaattc ggctaagcgg ctgtctaagc tattcgtata gggacaatcc gatatgtcga   27900
tggagtgaaa gagcctgatg cactccgcat acagctccat aatcttttca gggctttgtt   27960
catcttcata ctcttccgag caaggacgc catcggcctc actcatgagc agattgctcc    28020
agccatcatg ccgttcaaag tgcaggacct ttggaacagg cagctttcct tccagccata   28080
gcatcatgtc cttttcccgt tccacatcat aggtggtccc tttataccgg ctgtccgtca   28140
tttttaaata taggttttca ttttctccca ccagcttata taccttagca gggagacattc  28200
cttccgtatc ttttacgcag cggtattttt cgatcagttt tttcaattcc ggtgatattc   28260
tcattttagc catttattat ttccttcctc ttttctacag tatttaaaga tacccccaaga  28320
agctaattat aacaagacga actccaattc actgttcctt gcattctaaa accttaaata   28380
ccagaaaaca gcttttttcaa agttgttttc aaagttggcg tataacatag tatcgacgga   28440
gccgattttg aaaccgcggt gatcacaggc agcaacgctc tgtcatcgtt acaatcaaca   28500
tgctaccctc cgcgagatca tccgtgtttc aaacccggca gcttagttgc cgttcttccg   28560
aatagcatcg gtaacatgag caaagtctgc cgccttacaa cggctctccc gctgacgccg   28620
tcccggactg atgggctgcc tgtatcgagt ggtgattttg tgccgagctg ccggtcgggg   28680
agctgttggc tggctggtgg caggatatat tgtggtgtaa aca                     28723
```

SEQ ID NO: 5        moltype = DNA   length = 28469
FEATURE             Location/Qualifiers
source              1..28469
                     mol_type = other DNA
                     organism = synthetic construct
SEQUENCE: 5

```
aattgacgct tagacaactt aataacacat tgcggacgtt tttaatgtac tgcaggataa    60
tgacagccta ggcggaggtg cggtaaagct tgccgaaaac atgcagaaga gcaacgacgg   120
caatgaaccc aatgctcatg atgaggacta gttcgggga catcttgcgc ccagcagcct    180
catcggtgta gaactggagc attgtgctgg caccgcctcc accagtgcca ctgctggtgg   240
ttctacgcct gcgcaagctt gcagcagctg ctgcactccc tctagccggg gcatctccat   300
tggccaccat cttgctttat ccctctgcat gataatatga gtttcaaatg taaggtttgc   360
agcactaata ttacagaaaa ccaacagaac aacagagttt catccaaagt cgtattgcat   420
atacatagga agtgttaaaa tatgtctatc attttggaag atacggttta tgctgtcaca   480
cagcattttg gaagtgacta ttttataagc acagaagttt cttcaatgtg gaatatgtca   540
aaaggcaaaa taagaagcac agaagttcct tcaatgtgga atatgtcaga aggcagaata   600
aggtacacat cttggaagtg tatgatagta ctacaccaat accagtgaag ttttagttgt   660
cacatttgag tgctaataaa aatataaaaa agaaatggtt gctgttgctc atgcctatat   720
```

```
acattcataa tctatcaaac taactgctcc tggatgctgc ataactataa ctaaacaagc    780
ttaagttaaa tttaccacag aaaaagaaaa aatgacaact agtcccagaa ttctgctgaa    840
aaattttggg gctgtcctgg gcttggccaa acacccattg acatgatgct gcccaagtgt    900
aagaactgta aaacaagtat agtgtctgtg tatgtacagg gatggcagca tattcattgc    960
tgcaacacaa gctacgctac atgaaaccaa tttcttactg tggaatatga acaaacaaca   1020
tggaggagag atttcgtaat agaattttga gcaaatatgt tggtacggac aaaatgatcc   1080
cccacaaaaa tccgcagaga agatcatgag tgacacgcga tatatgaggt aacacacgaa   1140
catcttatca agaattcaga tccattccca gatcctgaca agcactaga actacaacag   1200
aaatacttcg ataaaacaat tcgatttccc ttcatgacac atcctaacat cacatcaaac   1260
ccccgcagc caatctgaat tctgaacagc aagatctgga acagaagcgg tacccatccc   1320
agaattctaa atcggccaaa ccaaacaagc ccgatctaag acatcgattc aacatgaacg   1380
cgtacggaat caaagcaggc taatcggaga gatggcgaaa agaggatgat tttcgcgcgc   1440
acctgatgaa tctgccctgc gccaatcgct cgtgctcccg tcccaacttg gtcactcgtc   1500
ttctcgcccg aaaatctgag tgcggaattc agaattctct ccgcgtctga acccgcgtgc   1560
tgatatctac ccaactggct ggattaacgg gttccgttca agatccgata tcaagtgacg   1620
tggtcggcgc gatctgattg gccggagcgc gtctccgcgc gtcgatctga gccgtccgat   1680
tcgttgccgg gtcccgatcg cgcggcctgg tgtgaaacgg gtggcgtcac cgcgtgcggc   1740
gtggcactgt gacgtggcaa cggttatgcg gttatgcaca gtcatgggct ggaccttttg   1800
gcccaacatc tgtggactcg tggacccggg ttcggccctt ttatccgctc tacggacgca   1860
gtccacgtca gccgacgtgg gtcccaccac gaagggcgtg cctccctcta aaaattgcca   1920
atgacgataa gagcaaagac ggacgggagg ggaggggtcc aaattaaaac tccaaaatcc   1980
attcgaacag cgaaggaaat ttgttggaaa attttgagat ttggattttt gttctaggag   2040
aggggaaggt tagaagaagt tgagatcggt ggagaactgg agatcgaggg gagatgctgt   2100
gtctcacctc ctcttcctcc tccgcgcccg ctccgctcct tccctctctc gctgatcgac   2160
cgagcccagg aatcgcgggc gggggtggca atgttcgcct gagcgtggtt tcttcgccgc   2220
gccggtccgtg gcctggaaag gtcaagacca atttctcagt tcctgcgact gcgcgaaaaa   2280
acaaaaccat ggtgactgtt gtggaggaga tcgcgtccgg ccaccaagtc ctctttcagg   2340
ggttcaactg ggagtcgtgg aagcagacg gcgggtggta caacatgatg atgggcaagg   2400
tcgacgacat cgccgctgcc ggagtcaccc acgtctggct gccaccgccg tcgcactccg   2460
tctccaacga aggttacatg cctggtcggc tgtacgacgt cc aagtacggca   2520
acgcggcgga gctcaagtcg ctcatcggcg cgctccacgg caagggcgtg caggccatcg   2580
ccgacatcgt catcaaccac cgctgcgccg actacaagga tagccgcggc atctactgca   2640
tcttcgaggg cggcacctcc gacggccgcc tcgactgggg cccccacatg atctgtcgcg   2700
acgacaccaa atactccgat ggcaccgcaa acctcgacac cggagccgac ttccgccgcg   2760
cgcccgacat cgaccacctc aacgaccggg tccagccgcg gctcaaggag tggctcctct   2820
ggctcaagag cgacctcggc ttcgacgcgt ggcgccttga cttcgctagg gctactcgc    2880
cggagatggc caaggtgtac atcgacggca catcccgag cctcgccgtg gccgaggtgt   2940
gggacaatat ggccaccggc ggcgacggca agcccaacta cgaccaggac gcgcaccggc   3000
agaatctggt gaactgggtg gacaaggtgg gcggcgcggc ctcggcaggc atggtgttcg   3060
acttcacgac caaagggata ctgaactgtg ccgtggaggg cgagctgtgg aggctgatcg   3120
accgcaggg gaaggccccc ggcgtgatgg gatggtggcc ggccaaggcc gccaccttcg   3180
tcgacaacca cgatacaggc tccacgcagg ccatgtggcc attcccctcc gacaaggtca   3240
tgcagggcta cgccatcatc ctcaccccac ccggcatcc atgcatcttc tacgaccatt   3300
tcttcaactg ggggtttaag gaccagatcc cggcgctggt ggcgatcagg aagcgcaacg   3360
gcatcacggc gacgagcgcc ctgaagatcc tcatgcacga aggagatgcc tacgtcgccg   3420
agatagacg caaggtggtg gtgaagatcg ggtccaggta cgacgtcggg gcggtgatcc   3480
cggccggtt cgtgacctcg gcacacggca acgactacgc cgtctgggag aagaacggtg   3540
ccgcggcaac actacaacgg agctgaagtc tgcactgatc cgtcattcga tcggacaaag   3600
cagcattagt ccgttgatcg gtggaagacc actcgtcagt gttgagttga atgtttgatc   3660
aataaaatac ggcaatgctg taaggggttgt ttttatgcc attgataata cactgtactg   3720
ttcagttgtt gaactctatt tcttagccat gccaagtgct tttcttattt tgaataacat   3780
tacagcaaaa agttgaaaga caaaaaaaaa aaccccgaa cagagtgctt tggcgatcgc   3840
gccccgggctt aattaagaca aatttgtttg tcagatcaaa ttttttaagca aaacataaga   3900
aacagcacaa aagggtatag cagaagcaaa atttggacac aatgattagg gatcacttat   3960
tcattatagt tcttccatgc tgctctacca cagcaaaacg tttcagacac catcaaacca   4020
gacttaagga tacacattac aggtaaatag tacacaatga aacgggacac gaccaaggac   4080
cagaccagac aaccatagct ccattgggga agacaaatag gcagacttgt gaaccctaga   4140
acagcagcag ctctatggct gaggacggta cctctagagg cgcgccact ttgtgaggcc    4200
tttaatacac agtcctgcca tcaccatcca ggatcatgtc cttgaatgcg ccccaattg    4260
ggatcatagg cagcacatgc tcctggtgcg ggacgatgat atccaacaag tatggccctg   4320
gagtctcgag catcttcttg atggcggcac ggacttcact cttctttgtt acacggactg   4380
ccggaatatt gaaccccta gcaatagtca caaaatctgg atatatctcg ctctcacatt   4440
ccgggttgcc caagtatgta tgcgcccctat tcgccttgta aaacctatcc tccaattgca   4500
ccaccatacc caaatgtttgg ttgttcaaca ccatcaccctt cacagggagg ttctcaatgc   4560
ggatcaatgc cagctcctga atgttcatga ggaagctacc atccccatca atatcaacaa   4620
ctgtgacacc tgggttagcc acagaagcac cagctgcggc aggcagccca aatcccattg   4680
cgcccagacc agccgaagac agccactgcc gtggccgctt gtaggtgtaa tattgtgccg   4740
cccacatctg gtgctgccca acaccagtag cgatgattgc ctcacctttc gtcagctcat   4800
ccagcacctg aatggcatat tgcggtggga tctcttcacc aaaagttttg taccccagag   4860
gaaactccct cttctgctgg tccaactcat tgtgccatgc actaaaatca gaacttgtct   4920
ttgttgtgct ctgttgtagc agagcattca agccctgtaa agcagctta acatctgcgc   4980
aaaattgcac atgtggttgc ttgttctttc caatctctgc tggatcaatg tcaatgtgca   5040
caatcttggc cctgcttgca aaagcctcaa ttttccctgt cacacgatca tcaaaccgca   5100
caccaaacgc aagcaacagg tggccttat ccacggcata atttgcgtac accgtgccat    5160
gcatcccaag catccgcagg acaacgggt cgtcactggg gaaattgccg aggcccatca    5220
gagtggttgt aactgggata ccagtcagct caacaaacca gcgcaattcg tcaccagatg   5280
cagagcagcc accaccgaca tagagaatcg ggcgccgtga ctcgcaacc agacgcaaga   5340
cctgctcaag caattctgtc gcgggtggct tgggcaggcg tgcgatgtac cctggtagat   5400
tcatcgaggt gtcccagacc ggcacggcca tctgctgctg gatgtccttg gggatgtcca   5460
```

```
ccagcaccgg gccaggacgg cccgaggacg cgaggaagaa ggcttcctgt atgacgcggg   5520
ggatgtcctc cacatcaagg acaaggtaat tgtgcttggt gatggagcgg gtgacctcga   5580
ctatgggcgt ctcctggaag gcgtcggtgc cgatcatgcg gcggggggacc tggcccgtga   5640
tggcgaccat cgggacggag tcgagcagcg cgtcggcgag cgcggacacg aggttggttg   5700
cgccggggcc ggaggtggcg acgcagaccc cgacgcgcgc ggctgcgcgc gcgtacccgg   5760
acgccgcgaa cgcctcgccc tgctcgtggc ggaagaggtg gttggtgatg accggggagc   5820
gcgtcagcgc ctggtggatc tccatcgacg cgccgcctgg gtaggcgaac acgtcgctga   5880
cgccgcaccg ctccagcgcc tccacgagga tgtccgcgcc cttgcgggc tcggccggcc   5940
cccacggccg gagcggcgtg gccggcggcg ccggggacgg cggggtgacc ggggacaccg   6000
ccgagcacct gaccgccgcc gcccccaccc ggcctcgagc gggaaggacg tggtgtcgct   6060
ggtggttctt acggccggtc ttggccgtcg cggcggcgga cagggcggcg gccgcggccg   6120
cggcggtcgt agccatggtg ggtggtggcg gcggcggcgg cggcgagggt ttctgggttt   6180
gggcgagagg gagagagggg tggagagtgt ggggtgtgg gtgttttgtc cgcgcgcggt   6240
gacgcagcgt gaggcgatgt gtggctcgga tgggatcggt tgggccacg tcacagtggg   6300
ccccatatgt cggtgggata ggatgacaca cagccacgtc ggggtcgatc tgggcccgcg   6360
tgtcagtcga ttggatgagg atgacaggtg ggtcagtccc aataacgggt ggagggtaca   6420
gaacccgata aaaatcgat ctcaaagtcg gatgcggatg caaccgcgag acctagcagt   6480
ctagcacccg cacccgcacc cgcacaaacg cagcgcaaga tgagcagtgg cggcgagaag   6540
tccggctcgg gcggcggcgg cggtggcggc ggcggcgggg cggtgaagac gccctccgac   6600
ttcctcaagt ccatcagggg gcgccccgtc gtcgtcaagc tcaactccgg cgtcgactac   6660
cgcggtaacc ccctgctcaa ttccctcccc ctttttgcct caaccctaga cccgcctccc   6720
gaaaaccctg gcacgagacg aatgcgatgt ttgttgtcat ccgtatctct ttctccttaa   6780
ttggaactct gcgtttcttt tcgttaatta gtgggggaa ggaaaggcgt ggactctgta   6840
ggatttttctt ttcgatttga tgaccaaggg agatacttat tttagtgctg tttaagatcc   6900
tgctagtgcc cggtgtagct aggccatttg agaagcagat aaccgtgttt ttctgtagga   6960
ccttctctaa tcttgagcta tttttgatatt ctaattactt atggttaaac cctagaacct   7020
cagtatgttt taacttagta agagattgct acagtatttt tatttgtagg aacaacattg   7080
taggtggtta tcatgctact gactgtcttg tgtagagccc tcctatcatt aaggggcttt   7140
tatgtttact aatagttagt tttagtaccc attttctgt gagctactaa aaagaatatt   7200
tccaattcaa cctatggtaa tttaaagtac tttatgctgt atgtccattt actgaggatt   7260
atgattaata tttaagaggg aggacatctg tgcttaaggt ttgcattgca atatttgata   7320
gatttatgct aaacaaaggt aattgtgcat gcttgagata gaaagggatt tcccttctttt   7380
gggtttgata ataagggtt ggcattccat gatcaggagc atagtgcatt tatatttat   7440
aatgtggcta tgtgtatgca gttctcaatt tcacattggc ggtacaccca tgatatattt   7500
aattgttacc cagaaccata taatagccta ataagagcat atggtattcc attgattggg   7560
gccttcggaa gtgtacctgt gtatgtaact atgcatataa ggtttacttt ctggtagttc   7620
tttcttctcc tcatcactta agacatctgg atcgctgtta tcaagtcgta gactagtcat   7680
aacgtcagtc aagtcagacg actagagggc tacgactcga ccaaatagca agtcgcacaa   7740
ttagtcgtag attagtcata gcaaatcatc atttcaccat gctaattgc ttattgtgtt   7800
tagtacttta aatttatttc ttgttaactt attgtcttgc tggctactcc ataaaccgta   7860
gtttataata ctatatatag tgcttagtac aatagaatag tactagagac tatatagtgc   7920
atccattgtt ttcacacgac caaatcatgg actagtcgtg gactagattt tgaatggaac   7980
agttttacca gaaatacact tgttcttttt ttttctgaat agtgttgaat cagtagctgc   8040
aatgcatagc ttgtgcaata aaatcattat atactatcac caatttcatg gaatcttact   8100
tattggaaat ttgtaacaaa tctatttat cccctgagtt accgtgttgg tctaaaatca   8160
actcgcatgt gagacaagat gaagaggacc atgaagattg cctctttcat ttattcattt   8220
gctgactgct tgcaatgcca ctataaacct aatcggatga ctggttgtca tgtctccgct   8280
aactagagag aaaggggag gagtgaagac tttacgtgta cacagtcttt caccaggacg   8340
gttgtatcgg ttcagcagtc gcgatccggg cagcgctgaa gaacttcccc gatcagtaa   8400
catagatgac accgcgcgcg ataatttatc ctagtttgcg cgctatatt tgttttctat   8460
cgcgtattaa atgtataatt gcgggactct aatcataaaa acccatctca taaataaagt   8520
catgcattac atgttaatta ttacatgctt aacgtaattc aacagaaatt atatgataat   8580
catcgcaaga ccggcaacag gattcaatct taagaaacca cctgcaagtg acttcctcag   8640
caggcctact agtttttatg ccaaatgttt gaacgatcgg ggaaattcca gtgcaccaga   8700
gtcacagaaa cacatcacac attcgtgagc tcagcttagc catggataac gcctacatta   8760
ttgccattct ctctgtagct atcctccttct tgctccacta ctacctcctc ggccgcggca   8820
atggcggggc ggcgcggctg ccgccgggtc caccggccgt cccgatcctg ggacacctcc   8880
acctcgtcaa gaagccgatg cacgccacca tgtcccgcct cgccgagcgg tacgggccgg   8940
tgttctctgct gcgcctcggg tcgcggcgcg ccgtggtggt gtcgtcgccg gggtcgcgca   9000
gggagtgctt caccgagcac gacgtgacct tcgcgaaccg gcccaggttc gagtcgcagc   9060
tgctggtctc gttcaacggc gccgcgctcg ccaggcgag ctacggcgcg cactggcgca   9120
acctccgccg gatcgtcgcc gtgcagctgc tctccgcgca ccgcgtcggc ctcatgtctg   9180
aaaatctcga acagccgtg tcatagtcaa tcattaggtg ttataggaac aatcaaaggt   9240
tttttcaagt gttaatcttc atactaatat atacagtggg tactctttat ctactgccgt   9300
ggaactgtca tatttgatta tgaaatttta gctctagaaa atatttgatc atcaatgtca   9360
agactttatg accttgcaaa atacatttcc taattgagaa cagggtaaaa ttatgaacta   9420
tgcctctgaa ccttcataca caggcagcac atttttttgtt gtaaaattca tcttaatatc   9480
agcggaaaga ctgaccagaa gaaagaaaaa gttaagacag gcatatactc ttgatcctct   9540
aaaagagatg aggcggtaca atgatcaacc atgaacatta aagtgatacg tggaacatga   9600
gaacacaaat aattgtcact ggaacataaa tacaaaaagg tttgtagtaa cttaccgaca   9660
tgaggccgac gcgtgcgcg gagagcagct gcacggcgac gatccggcgg aggttgcgcc   9720
agtgcgcgcc gtagctcgcc gtggcgagcg cggcgccgtt aacgagacc agcagctgcg   9780
actcgaacct gggccggttc gcgaaggtca cgtcgtgctc ggtgaagcac tccctggcgc   9840
accccggcga cgacaccacc acggcgcgcc gcgacccgg aacaccggcc   9900
cgtaccgctc ggcgaggcgg gacatggtgg cgtgcatcgg cttcttgacg aggtggaggt   9960
gtccaggat cgggacggcc ggtggacccg cggcagccg cgcgccccg ccattgccgc   10020
ggccgaggag gtagtagtgg agcaagaaga ggatagctac agagagaatg gcaataatgt   10080
aggcgttatc catggctaag ctgagctcac gaatgtgtga tgtgttttctg tgactctggt   10140
gcactgggat ccctgagggg gtcaccgact tcaggtcaag taacaccaaa caacagggtg   10200
```

```
agcatcgaca aaagaaacag taccaagcaa ataaatagcg tatgaaggca gggctaaaaa   10260
aatccacata tagctgctgc atatgccatc atccaagtat atcaagatca aaataattat   10320
aaaacatact tgtttattat aatagatagg tactcaaggt tagagcatat gaatagatgc   10380
tgcatatgcc atcatgtata tgcatcagta aaacccacat caacatgtat acctatccta   10440
gatcgatatt tccatccatc ttaaactcgt aactatgaag atgtatgaca cacacataca   10500
gttccaaaat taataaatac accaggtagt ttgaaacagt attctactcc gatctagaac   10560
gaatgaacga ccgcccaacc acaccacatc atcacaacca agcgaacaaa aagcatctct   10620
gtatatgcat cagtaaaacc cgcatcaaca tgtataccta tcctagatcg atatttccat   10680
ccatcatctt caattcgtaa ctatgaatat gtatggcaca cacatacaga tccaaaatta   10740
ataaatccac caggtagttt gaaacagaat tctactccga tctagaacga ccgcccaacc   10800
agaccacatc atcacaacca agacaaaaaa aagcatgaaa agatgacccg acaaacaagt   10860
gcacggcata tattgaaata aaggaaaagg gcaaaccaaa ccctatgcaa cgaaacaaaa   10920
aaaatcatga aatcgatccc gtctgcgaaa cggctagagc catcccagga ttcccaaaag   10980
agaaacactg gcaagttagc aatcagaagca tgtctgacgt acaggtcgca tccgtgtacg   11040
aacgctagca gcacggatct aacacaaaca cggatctaac acaaacatga acagaagtag   11100
aactaccggg ccctaaccat ggaccggaac gccgatctag agaaggtaga gagggggggg   11160
gggggaggac gagcggcgta ccttgaagcg gaggtgccga cgggtggatt tggggagagat   11220
ctggttgtgt gtgtgtcgcg tccgaacaac acgaggttgg ggaaagaggg tgtggagggg   11280
gtgtctattt attacggcgg gcgaggaagg gaaagcgaag gagcggtggg aaaggaatcc   11340
cccgtagctg ccggtgccgt gagaggagga ggaggccgcc tgccgtgccg gctcacgtct   11400
gccgctccgc cacgcaattt ctggatgccg acagcggagc aagtccaacg gtggagcgga   11460
actctcgaga ggggtccaga ggcagcgaca gagatgccgt gccgtctgct tcgcttggcc   11520
cgacgcgacg ctgctggttc gctggttggt gtccgttaga ctcgtcgacg gcgtttaaca   11580
ggctggcatt atctactcga aacaagaaaa atgtttcctt agttttttta atttcttaaa   11640
gggtatttgt ttaattttta gtcacttat tttattctat tttatatcta aattattaaa    11700
taaaaaaact aaaatagagt tttagttttc ttaatttaga ggctaaaata gaataaaata   11760
gatgtactaa aaaaattagt ctataaaaac cattaaccct aaaccctaaa tggatgtact   11820
aataaaatgg atgaagtatt ataggtga agctatttgc aaaaaaaaag gagaacacat    11880
gcacactaaa aagataaaac tgtagagtcc tgttgtcaaa atactcaatt gtcctttaga   11940
ccatgtctaa ctgttcattt atatgattct ctaaaacact gatattattg tagtactata   12000
gattatatta ttcgtagagt aaagtttaaa tatatgtata aagatagata aactgcactt   12060
caaacaagtg tgacaaaaaa aatatgtggt aattttttat aacttagaca tgcaatgctc   12120
attatctcta gagaggggca cgaccgggtc acgctgcacg ttaacgacac ctgtctccgg   12180
atcgcatgcg cattctagag gatccctcag agtctcagtc cactagcctt gtccacgtcg   12240
ccaatgttta aatccagtcc caccatttgt agcgtagaat ggaacagctt tcgataaaat   12300
ttctcaacca tttagatgaa attcgcaccg tttcaagcag ggtctaggac caacaaatcc   12360
tagaatcaaa catggtacat tcaaatttca aattcaaacc agattacata ggcttattta   12420
ctactccggt aagcgatacg ggcggcggcg gcgcggctgc cggcgagcgg cggcggggt    12480
cagacggagg tggagacgcg gaccttgagg ccgtgacgca tggagaggat ggtcatcatc   12540
cggtacttga cggggtggtc ctcgacgagg tcgaaggtgt agaagcggaa gaggatggcg   12600
agcgccatct tcatctggag gtaggcggag tccttgccga ggcagatccg cggcccggcc   12660
tggaacgcgg tgaacttgaa cggcgaggcg ttgcggaacg cgccgccgtc gccgctgagc   12720
caccgctccg gccggaagct cgccgccgtcg gggccccagt tgtactccat cctccccatc   12780
gagtagggca cgtacgtcac catcccgccg gcgcgcacct tggtgccgtc ggggagcacg   12840
tcgtcctcca cgatcccctt gggtcctgc ggcaccgccg ggtagaggcg gagcgtctcc    12900
gtcacgcagg cgtgcaggta caccagcttc cccaccgcgt cgtagctcag cagcgacgcg   12960
aactgcgcca cgccgccgc gaatgacgcc tcgccggcg cgtcggcgag cgcgagcccc     13020
tcctcgcgcg cgcgctcagc ctcgaacgcg gccagctcgc gccggagctt gtcggcgacg   13080
gctgggtgcg tcatcgccat gtacgtgaac cacgacagcg tcgtcgccgt cgtgtcacgc   13140
ccggcgatca cgaagttgag caccacgtcg cggaggctct tgtcgtcccc gaagctgccg   13200
ccccctcgt cgccgccggc ctcccccagc tcgatgaacc gcgacagtat gtcgtgcttg    13260
atctgctcgc cattacaaat caaccatatc aagaaacaaa acctttccg atctgatcat    13320
cgccattacc atgtcagttc agttctactg attctttgag caagagagga aggatcacct   13380
tctcttgctt gccgctggct cgagcctgca agatctcagc cttgcggcgg cggatcacgc   13440
tgtaggtgaa gtcatcaacc agcttcatgc tctgctcagg gagagcctct gatccgacgt   13500
gcaagaactt cttgagacgc cacagaggat cgatgaaccg cagcgtgacg atgatgttga   13560
cagcgtcgaa ggcctgggca aagctgttcc cgggagatc aggtgacagc gtcccgatct    13620
caaccccaaa cccgaccttg cagatcgagt ccagtgtcat cctcatgaac aattcctgaa   13680
ttttggttag ttcttgcatc acaattctga acaattttggt ttctcaagaa atgtttagat   13740
attaggcaag gaaatcagtt ggttaccctgc atgtctacaa ctctgccggc cttgcacgct   13800
tggctcagaa tgcttgatag cttcaggag tactccctga acaccacagt gctgaagtct    13860
ctcaagttct tggaggcaaa ctcgaagctc gccgtcttcc tttgcttcct ccacatctcg   13920
ccgtcggcat tgaatatgcc atcaccgagc agcacatcca tgtaagacct gtagacttca   13980
ccctgcatat tttcagacat tttttgtgtc agtgttagta ctgtgcaagg cacattttac   14040
agtacactga agatcctatg gttcttttac cttgggtaa ttggtcaagt tggtcttcag    14100
gacatgctcg acgttcaccg ggtcggcaat gtaggtgtag gaggtgaaag gcatgtcgac   14160
ggtcaccgtc ctgtccttcg acaagtactc gacaagccag tcatgcatcc tgtggtagtt   14220
cttcagttgc tccactgtcg cgccgatgat tggcatgat cttgggcctt tctgcttcct    14280
caggctccac ttgtggaacca agatccatga gaggacaaca aggaagatag ctatgagctt   14340
gtggattcct gctactggga agaatgatgt cactggcatt gcatgagctt cctccatggg   14400
gctcttcatg aagggttcag tctacaagag atgctatgta gcattttgga tgccatagtt   14460
aggtgatata ttgggaactg atgctaccaa ccttgagaca atctttgtgt gaccaagaat   14520
taagattgtc tcattcatat ggtgtcccta acctaacacc cttaggagtt ggatcttagc   14580
tttagttttc ttttttgtgat ctgtccacct agaaaagaat cgttactcat gtaaacacaa   14640
aatgaatgct acagtatttt tttccctgc tcagccaagt tcgttgtttt gttcagataa    14700
ctgaagcgtt tgcagcgact aaaggtatgg caccttctaa tatcagaacc atatccatct   14760
gaattctgtt aaattgtcac caactgaaac caggcttacc attttctgtc gatattgtct   14820
agtctttgat gacaactaaa atgaaatggg gtatcctcaa aagaaatata aattgtgaac   14880
ccaaagtagt tggtttctac ttcacctgaa ttctacttca tctgaatagg ctattttaat   14940
```

```
gaagagaaaa tccaagaaat gccatttaca aacacccaaa tccaagaaat gctatcgacg   15000
agtacgagtt ccataaaatg ctattgtaga agcgattttg tcccagaaat cagttgccat   15060
ctagttaaaa cattctcaca taaacaagca atataaaata ctattgccaa gatatatcca   15120
atactttgca tctctaaaac ttctagttat tgacaactaa tttcttttcc agtcaataca   15180
aataagccat ctatcaaaga tttgagaaat tgcagggcac aattctacag aaaattaaag   15240
aacatcactt gaaaggaag atttttttcta tagaacttat cctttgtgat gtaacaacaa   15300
atactcgaat gaattgagaa ataaccaatg tcaacactga aacaagtctg aaaccaagat   15360
cagaagagca tgaaaatagt gctcttatgg attgaccttg attcttgccc acactcttat   15420
tacaaccttc gagcaaaccg gagcatttgc tgaataaatc tctcatctgt tactgaagat   15480
actaggtaac taaataaaca atcaatcaag agtatcaaaa cattttgcag gatctagtaa   15540
catagatgac accgcgcgcg ataatttatc ctagttgcg cgctatattt tgttttctat    15600
cgcgtattaa atgtataatt gcgggactct aatcataaaa acccatctca taaataacgt   15660
catgcattac atgttaatta ttacatgctt aacgtaattc aacagaaatt atatgataat   15720
catcgcaaga ccggcaacag gattcaatct taagaaactt tattgccaaa tgtttgaacg   15780
atctcagctg tgccccagtt tgctaggcag gtcgcagtac ctggccacag ccatctcgtg   15840
ctgctccacg taggtctctt tgtcggcctc cttgattctt tccagtctcc tgtccacgaa   15900
gtagaagccg ggcatcttga ggttcttagc gggtttcttg gatctgtatg tggtcttgag   15960
ggagcagtgc aggtagcccc cgcccacgag cttcagggcc atctggctat ggcctctcag   16020
gccgctgtca gcggggtaca gcatctcggt gctggcctcc cagccgagtg ttttcttctg   16080
catcacaggg ccgttggatg ggaagttgac cccgttgatc ttgacgttgt agatgaggca   16140
gccgttctgg aggctggtgt cctgggtagc ggtcagcacg ccccgtctt cgtatgtggt    16200
gatcctctcc catgtgaagc cctcagggaa ggactgctta aagaagtcgg ggatgccctg   16260
ggtgtggttg ataaaggttt tgctgccgta catgaagctg gtagccagga tgtcgaaggc   16320
gaaggggaga gggccgccct cgaccaccttt gatcttcatg gtctgggtgc cctcgtaggg   16380
cttgccttcg ccctcggatg tgcacttgaa gtggtggtcg ttcacggtgc cctccatgta   16440
gagtttcatg tgcatgttct cggtgatcag cacgctatcc tcacccactg cggaagcgtt   16500
gcatgcaaca atagcaagga gagcaaatac gaaaatgatc ttcatttttg taggattcta   16560
ctactatgct tcaactataa tgtttgaatt gtgtgaagga tgaggagggt tttcattatg   16620
cttgtctatt tatagatgtt tccctatcgg ttgcttttaga gtgttagttt tgcttgatgc   16680
tatattagga tctaagtgag tcatattatt tggatattct gttaggtgca cctaaaaatg   16740
ttctttgata tcatcatcaa agtaactttt atgcccatca tatatacatg atggtgagca   16800
aaaaaataat gacatgactc atcgctcact ttatgtgtca atgtgataag gattgcaact   16860
tttgaaacta agtttgttat gttttgtaag ctattatttt gataatgcac tacacgtgga   16920
actttacgac tgtgtgggtt tatgctcttt gaattatata atttcagtaa gaaaaaaaat   16980
tatagtatgt tcaatggttt tcattgttcc attaatactc ttgtgaaaac ttgtttgtga   17040
tacgaaataa gttaatgcaa taacttttaa attaactttg cagagcttta caataactca   17100
ccaacttact ctaattgtgg ttggggattg atttaattca tactttttata gaccaaattg   17160
atattgtgtt gctaaataaa aattatagtg gtgttgctac acctacacag acacagaagg   17220
aatcctgata tcatcagcta tctactgctt cctccacatg gactcaagaa gcagaagcaa   17280
aaaagaagaa ggcatttgct ccaacaaagt tttccggtga aagcaacac attgttctga    17340
acttcctggc atgtattatg tgaatctagc aaattaacca aacattgaca caatgcgaca   17400
ccttgtaatg tagccgtgcc gagaattgta tatctcactt accattgtat atcacacgtg   17460
ccgagaatag gagattgatt tttgccaacc aaaacgctct aggcagacca attgggcgtc   17520
cggccggatt aataaatttc gaaacgcgtc ggaccggcac cggacactgt ctggtggcat   17580
accagacagt ccggtgtgcc agatcagggc acccttcggt tcctttgctc ctttgctttt   17640
gaaccctaac tttgatcgtt tattggtttg tgttgaacct ttatgcacct gtggaatata   17700
taatctagaa caaactagtt agtccaatca tttgtgttgg gcattcaacc accaaaatta   17760
tttataggaa aaggttaaac cttatttccc tttcaatctc cccctttttg gtgattgatg   17820
ccaacacaaa ccaaagaaaa tatataagtg cagaattgaa ctagtttgca taaggtaagt   17880
gcataggtta cttagaatta aatcaattta tacttttact tgatatgcat ggttgctttc   17940
ttttattta acattttgga ccacatttgc accacttgtt ttgtttttttg caaatctttt    18000
tggaaattct ttttcaaagt cttttgcaaa tagtcaaagg tatatgaata agattgtaag   18060
aagcattttc aagatttgaa atttctcccc ctgtttcaaa tgcttttcct ttgactaaac   18120
aaaactcccc ctgaataaaa ttctcctctt agctttcaag agggtttaa atagatatca    18180
attggaaata tatttagatg ctaattttga aaatatacca attgaaaatc aacataccaa   18240
tttgaaatta aacataccaa tttaaaaaat ttcaaaaagt ggtggtgcgg tccttttgct   18300
ttgggcttaa tatttctccc cctttggcat taatcgccaa aaacggagac tttgtgagcc   18360
atttatactt tctccccatt ggtaaatgaa atatgagtga agattatac caaatttgga    18420
cagtgatgcg gagtgacggc gaaggataaa cgataccgtt agagtgggag ggaagccttg   18480
tcttcgccga agactccatt tccctttcaa tctacgactt agcatagaaa tacacttgaa   18540
aacacattag tcgtagccac gaaagagata tgatcaaagg tatacaaatg agctatgtgt   18600
gtaatgtttc aatcaaagtt tcgagaatca agaatattta gctcattcct aagtttgcta   18660
aaggttttat catctcaatgg tttggtaaag atatcgacta attgttcttt ggtgctaaca    18720
taagcaatct cgatatcacc cctttgttgg tgatccctca aaaagtgata ccgaatgtct   18780
atgtgcttag tgcggctgtg ttcaacggga ttatccgcca tgcagatagc actctcattg   18840
tcacatagga gagggacttt gctcaatttg tagccatagt ccctaaggtt ttgcctcatc   18900
caaagtaatt gcacacaaca atgtcctgcg gcaatatact tggcttcggc ggtagaaaga   18960
gctattgagt tttgtttctt tgaagtccaa gacaccaggg atctccctag aaactgacaa   19020
gtccctgatg tgctcttcct atcaattta cacctgccc aatcggcatc tgaatatcct     19080
attaaatcaa aggtggatcc cttggggtac caaagaccaa atttaggagt gtaaactaaa   19140
tatctcatga ttcttttcac ggccctaagg tgaacttcct taggatcggc ttggaatctt    19200
gcacacatgc atatagaaag catactatct ggtcgagatg cacataaata gagtaaagat   19260
cctatcatcg accggtatac cttttggtct acggatttac ctcccgtgtc gaggtcgaga   19320
tgccattag ttcccatggg tgtcctgatg ggcttggcat ggcttcattcc aaacttgttg    19380
agtatgtctt gaatgtactt tgtttggctg atgaaggtgc catcttggag ttgcttgact   19440
tgaaatccta gaaaatattt caacttcccc atcatagaca tctcgaattt cggaatcatg   19500
atcctactaa actcttcaca gtagatttg ttagtagacc caaatataat atcatcaaca     19560
taaatttggc atacaaacaa aactttgaa atggtttag taaagagagt aggatcggct      19620
ttactgactc tgaagccatt agtgataaga aaatctctta ggcattcata ccatgctgtt   19680
```

```
ggggcttgct tgagcccata aagcgccttt gagagtttat aaacatggtt agggtactca  19740
ctatcttcaa agccgagagg ttgctcaaca tagaccattt cacccccattt gatcactttt  19800
ttggtccttc aggatctaat agttatgtat aatttagagt ctcttgttta atggccagat  19860
atttctaatt aatctaagaa tttatgatat tttttaattt tttatcatgt ctgatgaaaa  19920
ttaacataaa ggctcaattg ggtcctgaat taataataga gtgaaaatta atccagaggc  19980
tctattagaa ccttcaatta gtaataccaa gatatatata agatagtaga gtatagttta  20040
aatgttggca ttgttcattc tttctttttgt tatttaattt atgctttcca cggtggttag  20100
tggttacttc tgaagggtcc aaataatgca tgaagagttt gaggacaaga agtctgccct  20160
aaaaatagcg atgcaaaggc atggtgtcca agccatacat atagcgcact aatttttatca  20220
gcagaacaat ggtatttata ggtcctagtg cccaggcaac aagagacacg aataaagcat  20280
cgatcacgac aagatgctgt gtctcacctc ctcttcctcc tccgcgcccg ctccgctcct  20340
tccctctctc gctgatcgac cgagcccagg aatcgcgggc gggggtggca atgttcgcct  20400
gagcgtggtt tcttcgccgc ggcggtcgtg gcctggaaag gtcaagacca atttctcagt  20460
tcctgcgact gcgcgaaaaa acaaaaccat ggtgactgtt gtggaggaga tcgcttgttc  20520
tggtactgga tctggatttg aaatattgtg tcaaggattt aactgggaat ctcataagtc  20580
aggaaaatgg tatgtggaac ttggctcaaa ggccaaggag ttgtcatcca tgggtttcac  20640
cattgtctgg tcaccaccac ctactgattc tgtgtcgcct gaaggataca tgccaaggga  20700
tttgtataat ctaaattcca gatatgggac catggaagag ttgaaggagg ctgtgaaacg  20760
ttttcatgaa gccggtatga aggttcttgg tgatgccgtc ctgaatcaca ggtgtgctca  20820
atttcagaac caaaatggcg tctggaatat ttttggtgga cgccttaact gggatgatcg  20880
agcagttgtt gcagatgatc cacatttcca gggaagagga aacaagagca gtggagataa  20940
cttccatgca gccccaaaca ttgatcactc gcaaagagtt gtgaggagtg atcttaaaga  21000
atggctttgt tggatgagaa aggaagttgg atacgatgga tggcgacttg attttgttcg  21060
cggattttgg ggtggatatg tccacgatta cttggaagca agcgaaccat attttgcagt  21120
aggagagtac tgggattctc tcagttacac ctatggtgaa atggattata atcaagatgc  21180
ccacaggcag agaatagttg attggataaa tgctacaagt ggaactgctg gtgcattttga  21240
tgttaccacg aaaggaatac ttcactctgc actgaaaaga tctgagtact ggcgtctgtc  21300
tgatgaaaaa ggaaaaccc ctggagtgtt aggttggtgg ccttcgcgtg ctgtcacatt  21360
tatagaaaat catgacactg gttctactca gggtcattgg agattcccct ttggtatgga  21420
gttgcaaggc tatgtctaca tcttaactca cccaggcact cctgcaatct tctatgatca  21480
tatattttcg catttacagc cagagattgc taaattaatt tctattagaa atcgccaaaa  21540
gatccattgc cgtagcaaga tcaagatact gaaagcagag ggaaatttat atgcggcaga  21600
gattgatgag agggtaacaa tgaagattgg cgcaggacat tttgagccaa gcggccccac  21660
aaactgggta gttgctgccg agggacagga ttacaaggtc tgggaagtgt catcgtagac  21720
ttgccgcgct ggtacttgca gaacttctat tgtagacagt atacaaccat tcggtatagc  21780
tcacaaaagg gatcgttcaa acatttggca ataaagtttc ttaagattga atcctgttgc  21840
cggtcttgcg atgattatca tataatttct gttgaattac gttaagcatg taataattaa  21900
catgtaatgc atgacgttat ttatgagatg ggtttttatg attagagtcc cgcaattata  21960
catttaatac gcgataaaa acaaaatata gcgcgcaaac taggataaat tatcgcgcgc  22020
ggtgtcatct atgttactag atccctaggc acgtgtacgt atttttttacc aggtgaactc  22080
caagtcctgg accctttttt tggcactggc cgtcgtttta agcttagatt gtcgtttccc  22140
gccttcagtt taaactatca gtgtttgaca ggatatattg gcgggtaaac ctaagagaaa  22200
agagcgttta ttagaataac ggatatttaa aagggcgtga aaaggtttat ccgttcgtcc  22260
atttgtatgt gcatgccaac cacagggttc ccctcgggat caaagtactt tgatccaacc  22320
cctccgctgc tatagtcag tcggcttctg acgttcagtg cagccgtctt ctgaaaacga  22380
catgtcgcac aagtcctaag ttacgcgaca ggctgccgcc ctgccttttt cctggcgttt  22440
tcttgtcgcg tgttttagtc gcataaagta gaatacttgc gactagaacc ggagacatta  22500
cgccatgaac aagagcgccg ccgctggcct gctgggctat gcccgcgtca gcaccgacga  22560
ccaggacttg accaaccaac gggccggaact gcacgcggcc ggctgcacca agctgttttc  22620
cgagaagatc accggcacca ggcgcgaccg cccggagctg gccaggatgc ttgaccacct  22680
acgccctggc gacgttgtga cagtgaccag gctagacgcc ctgccccgca gcaccgcgga  22740
cctactggac attgccgagc gcatccagga ggcggcgcg ggcctgcgta gcctggcaga  22800
gccgtgggcc gacaccacca cgccggccgg ccgcatggtg ttgaccgtgt cgccggcat  22860
tgccgagttc gagcgttccc taatcatcga ccgcacccgg agcgggcgcg aggccgccaa  22920
gggccgaggc gtgaagtttg gccccccgcc taccctcacc ccggcacaga tcgcgcacgc  22980
ccgcgagctg atcgaccagg aaggccgcac cgtgaaagag gcggctgcac tgcttggcgt  23040
gcatcgctcg accctgtacc gcgcacttga gcgcagcgag gaagtgacgc ccaccgaggc  23100
caggcggcgc ggtgccttcc gtgaggacgc attgaccgag gccgacgccc tggcggccgc  23160
cgagaatgaa cgccaagagg aacaagcatg aaaccgcacc aggacggcca ggacgaaccg  23220
tttttcatta ccgaagagat cgaggcggag atgatcgcgg ccgggtacgt gttcgagccg  23280
cccgcgcacg tctcaaccgt gcggctgcat gaaatcctgg ccgtttgtc tgatgccaag  23340
ctggcggcct ggcggccag cttggccgct gaagaaaccg agcgccgccg tctaaaaagg  23400
tgatgtgtat ttgagtaaaa cagcttgcgt catgcggtcg ctgcgtatat gatgcgatga  23460
gtaaataaac aaatacgcaa gggaacgca tgaaggttat cgctgtactt aaccagaaag  23520
gcgggtcagg caagacgacc atcgcaaccc atctagcccg cgccctgcaa ctcgccgggg  23580
ccgatgttct gttagtcgat tccgatcccc agggcagtgc ccgcgattgg cggccgtgc  23640
gggaagatca accgctaacc gttgtcggca tcgaccgccc gacgattgac cgcgacgtga  23700
aggccatcgg ccggcgcgac ttcgtagtga tcgacgagc gcccaggcg gcggacttgg  23760
ctgtgtccgc gatcaaggca gccgacttcg tgctgattcc ggtgcagcca agcccttacg  23820
acatatgggc caccgccgac ctggtggagc tggttaagca gcgcattgag gtcacggatg  23880
gaaggctaca gcggcctttt gtcgtgtcgc gggcgatcaa aggcacgcgc atcggcggtg  23940
aggttgccga ggcgctggcc gggtacgagc tgcccattct tgagtccgt atcacgcagc  24000
gcgtgagcta cccaggcact gccgccgccg cacaaccgt tcttgaatca gaacccgagg  24060
gcgacgctgg cgcagaggc cgcgaaggtg cggtgaaat taaatcaaaa ctcatttgag  24120
ttaatgaggt aaagagaaaa tgagcaaaag cacaaacacg ctaagtgccg gccgtccgag  24180
cgcacgcagc agcaaggctg caacgttggc cagcctggca gacacgccag ccatgaagcg  24240
ggtcaacttt cagttgccgg cggaggatca caccaagctg aagatgtacg cggtacgcca  24300
aggcaagacc attaccgagc tgctatctga atacatcgcg cagctaccag agtaaatgag  24360
caaatgaata aatgagtaga tgaattttag cggctaaagg aggcggcatg gaaaatcaag  24420
```

```
aacaaccagg caccgacgcc gtggaatgcc ccatgtgtgg aggaacgggc ggttggccag 24480
gcgtaagcgg ctgggttgtc tgccggcccc gcaatggcac tggaaccccc aagcccgagg 24540
aatcggcgtg acggtcgcaa accatccggc ccggtacaaa tcggcgcggc gctgggtgat 24600
gacctggtgt agaagttgaa ggccgcgcag gccgcccagc ggcaacgcat cgaggcagaa 24660
gcacgcccg  gtgaatcgtg gcaagcgcc  gctgatcgaa tccgcaaaga atcccggcaa 24720
ccgccggcag ccggtgcgcc gtcgattagg aagccgccca agggcgacga gcaaccagat 24780
ttttcgttc  cgatgctcta tgacgtgggc acccgcgata gtcgcagcat catggacgtg 24840
gccgttttcc gtctgtcgaa gcgtgaccga cgagctggcg aggtgatccg ctacgagctt 24900
ccagacgggc acgtagaggt ttccgcaggg ccggccggca tggccagtgt gtgggattac 24960
gacctggtac tgatggcggt ttcccatcta accgaatcca tgaaccgata ccgggaaggg 25020
aagggagaca agcccggccg cgtgttccgt ccacacgttg cggacgtact caagttctgc 25080
cggcgagccg atggcggaaa gcagaaagac gacctggtag aaacctgcat tcggttaaac 25140
accacgcacg ttgccatgca gcgtacgaag aaggccaaga acggccgcct ggtgacggta 25200
tccgagggtg aagccttgat tagccgctac aagatcgtaa agagcgaaac cgggcggccg 25260
gagtacatcg agatcgagct agctgattgg atgtaccgcg agatcacaga aggcaagaac 25320
ccggacgtgc tgacggttca ccccgattac ttttgatcg  atcccggcat cggccgtttt 25380
ctctaccgcc tggcacgccg cgccgcaggc aaggcagaag ccagatggtt gttcaagacg 25440
atctacgaac gcagtggcag cgccggagag ttcaagaagt tctgtttcac cgtcgcaag  25500
ctgatcgggt caaatgacct gccggagtac gatttgaagg aggaggcggg gcaggctggc 25560
ccgatcctag tcatgcgcta ccgcaacctg atcgagggcg aagcatccgc cggttcctaa 25620
tgtacggagc agatgctagg gcaaattgcc ctagcagggg aaaaggtcg  aaaaggtctc 25680
tttcctgtgg atagcacgta cattgggaac ccaaagccgt acattgggaa ccggaacccg 25740
tacattggga acccaaagcc gtacattggg aaccggtcac acatgtaagt gactgatata 25800
aaagagaaaa aaggcgattt ttccgcctaa aactctttaa aacttattaa aactcttaaa 25860
acccgcctgg cctgtgcata actgtctggc cagcgcacag ccgaagagct gcaaaaagcg 25920
cctaccctc  ggtcgctgcg ctccctacgc cccgccgctt ccgctcggcc tatcgcggcg 25980
gctggccgct caaaaatggc tggcctacgg ccaggcaatc taccagggcg cggacaagcc 26040
gcgccgtcgc cactcgaccg ccggcgccca catcaaggca ccctgcctcg cgcgtttcgg 26100
tgatgacggt gaaaacctct gacacatgca gctcccggag acgtcacag  cttgtctgta 26160
agcggatgcc gggagcagac aagcccgtca gggcgcgtca gcgggtgttg gcgggtgtcg 26220
gggcgcagcc atgacccagt cacgtagcga tagcggagtg tatactggct taactatgcg 26280
gcatcagagc agattgtact gagagtgcac catatgcggt gtgaaatacc gcacagatgc 26340
gtaaggagaa aataccgcat caggcgctct tccgcttcct cgctcactga ctcgctgcgc 26400
tcggtcgttc ggctgcggcg agcggtatca gctcactcaa aggcggtaat acggttatcc 26460
acagaatcag gggataacgc aggaaagaac atgtgagcaa aaggccagca aaaggccagg 26520
aaccgtaaaa aggccgcgtt gctggcgttt ttccataggc tccgcccccc tgacgagcat 26580
cacaaaaatc gacgctcaag tcagaggtgg cgaaacccga caggactata agataccag  26640
gcgtttcccc ctggaagctc cctcgtgcgc tctcctgttc cgaccctgcc gcttaccgga 26700
tacctgtccg cctttctccc ttcgggaagc gtggcgcttt ctcatagctc acgctgtagg 26760
tatctcagtt cggtgtaggt cgttcgctcc aagctgggct gtgtgcacga accccccgtt 26820
cagcccgacc gctgcgcctt atccggtaac tatcgtcttg agtccaaccc ggtaagacac 26880
gacttatcgc cactggcagc agccactggt aacaggatta gcagagcgag gtatgtaggc 26940
ggtgctacag agttcttgaa gtggtggcct aactacggct acactagaag gacagtattt 27000
ggtatctgcg ctctgctgaa gccagttacc ttcggaaaaa gagttggtag ctcttgatcc 27060
ggcaaacaaa ccaccgctgg tagcggtggt ttttttgttt gcaagcagca gattacgcgc 27120
agaaaaaaag gatctcaaga agatcctttg atcttttcta cggggtctga cgctcagtgg 27180
aacgaaaact cacgttaagg gattttggtc atgcattcta ggtactaaaa caattcatcc 27240
agtaaaatat aatattttat ttctcccaa  tcaggcttga tcccagtaa  gtcaaaaaat 27300
agctcgacat actgttcttc cccgatatcc tccctgatcg accggacgca gaaggcaatg 27360
tcataccact tgtccgccct gccgcttctc ccaagatcaa taaagccact tactttgcca 27420
tctttcacaa agatgttgct gtctcccagg tcgccgtggg aaaagacaag ttcctcttcg 27480
ggcttttccg tctttaaaaa atcatacagc tcgcgcggat cttaaatgg  agtgtcttct 27540
tcccagtttt cgcaatccac atcggccaga tcgttattca gtaagtaatc caattcggct 27600
aagcggctgt ctaagctatt cgtataggga caatccgata tgtcgatgga gtgaaagagc 27660
ctgatgcact ccgcatacag ctcgataatc ttttcagggc tttgttcatc ttcatactct 27720
tccgagcaaa ggacgccatc ggcctcactc atgagcagat tgctccagcc atcatgccgt 27780
tcaaagtgca ggaccttggt aacaggcagc tttcttcca  gccatagcat catgtccttt 27840
tcccgttcca catcataggt ggtcccttta taccggctgt ccgtcatttt taaatatagg 27900
ttttcatttt ctcccaccag cttatatacc ttagcaggaa acattcctc  cgtatctttt 27960
acgcagcggt attttcgat  cagtttttc  aattccggtg atattctcat tttagccatt 28020
tattatttcc ttcctctttt ctacagtatt taaagatacc ccaagaagct aattataaca 28080
agacgaactc caattcactg ttccttgcat tctaaaacct taaataccag aaaacagctt 28140
tttcaaagtt gttttcaaag ttggcgtata acatagtatc gacggagccg attttgaaac 28200
cgcggtgatc acaggcagca acgctctgtc atcgttacaa tcaacatgct accctccgcg 28260
agatcatccg tgtttcaaac ccggcagctt agttgccgtt cttccgaata gcatcggtaa 28320
catgagcaaa gtctgccgcc ttacaacggc tctcccgctg acgccgtccc ggactgatgg 28380
gctgcctgta tcgagtggtg attttgtgcc gagctgccgg tcggggagct gttggctggc 28440
tggtggcagg atatattgtg gtgtaaaca                                   28469
```

SEQ ID NO: 6        moltype = DNA   length = 3316
FEATURE           Location/Qualifiers
source            1..3316
                     mol_type = other DNA
                     organism = synthetic construct
SEQUENCE: 6

```
ctcagagtct cagtccacta gccttgtcca cgtcgccaat gtttaaatcc agtcccacca  60
tttgtagcgt agaatggaac agctttcgat aaaatttctc aaccatttag atgaaattcg 120
caccgtttca agcagggtct aggaccaaca aatcctagaa tcaaacatgg tacattcaaa 180
tttcaaattc aaaccagatt acataggctt atttactact ccggtaagcg atacgggcgg 240
```

```
cggcggcgcg gctgccggcg agcggcggcg ggggtcagac ggaggtggag acgcggacct    300
tgaggccgtg agccatggag aggatggtca tcatccggta cttgacgggg tggtcctcga    360
cgaggtcgaa ggtgtagaag cggaagagga tggcgagcgc catcttcatc tggaggtagg    420
cggagtcctt gccgaggcag atccgcggcc cggcctggaa cgcggtgaac ttgaacggcg    480
aggcgttgcg gaacgcgccg ccgtcgccgc tgagccaccg ctccggccgg aagctcgccg    540
cgtcggggcc ccagttgtac tccatcctcc ccatcgagta gggcacgtac gtcaccatcc    600
cgccggcgcg caccttggtg ccgtcgggga gcacgtcgtc ctccacgatc cccttggggt    660
cctgcggcac cgccgggtag aggcggagcg tctccgtcac gcaggcgtgc aggtacacca    720
gcttccccac cgccgtcgtag ctcagcagcg acgcgaactg cgccacgcgc gccgcgaatg    780
acgcctcgcc ggcggcgtcg gcgagccgca cgccctcctc gcgcgcgcgc tcagcctcga    840
acgcggccag ctcgcgccgg agcttgtcgg cgacggctgg gtgcgtcatc gccatgtacg    900
tgaaccacga cagcgtcgtc gccgtcgtgt cacgcccggc gatcacgaag ttgagcacca    960
cgtcgcggag gctcttgtcg tccccgaagc tgccgccccc ctcgtcgccg ccggcctccc   1020
ccagctcgat gaaccgcgac agtatgtcgt gcttgatctg ctcgccatta caaatcaacc   1080
atatcaagaa acaaaacctt ttccgatctg atcatcgcca ttaccatgtc agttcagttc   1140
tactgattct ttgagcaaga gaggaaggat caccttctct tgcttgccgc tggctcgagc   1200
ctgcaagatc tcagccttgc ggcggcggat cacgctgtag gtgaagtcat caaccagctt   1260
catgctctgc tcgaggagag cctctgatcc gacgtgcaag aacttcttga gacgccacag   1320
aggatcgatg aaccgcagcg tgacgatgat gttggcagcg tcgaaggcct gggcaaagct   1380
gttctccggg agatcaggtg acagcgtccc gatctcaacc ccaaaccgga ccttgcagat   1440
cgagtccagt gtcatcctca tgaacaattc ctgaattttg ttagttctt gcatcacaat   1500
tctgaacaat ttggtttctc aagaaatgtt tagatattag aggaaat cagttggtta    1560
cctgcatgtc tacaactctg ccggccttgc acgcttggct cagaatgctt gatagcttca   1620
gggagtactc cctgaacacc acagtgctga agtctctcaa gttcttggag caaactcga   1680
agctcgccgt cttcctttgc ttcctccaca tctcgccgtc ggcattgaat atgccatcac   1740
cgagcagcac atccatgtaa gacctgtaga cttcaccctg catatttttca gacatttttt   1800
gtgtcagtgt tagtactgtg caaggcacat tttacagtac actgaagatc ctatggttct   1860
tttaccttgg ggtaattggt gaagttggtc ttcaggacat gctcgacgtt caccgggtcg   1920
gcaatgtagg tgtaggaggt gaaaggcatg tcgacggtca ccgtcctgtc cttcgacaag   1980
tactcgacaa gccagtcatg catcctgtgg tagttcttca gttgctccac tgtcgccgca   2040
atgattggcc atgatcttgg ccctttctgg ttcctcaggc tccacttgtg gaccaagatc   2100
catgagagga caacaaggaa gatagctatg agcttgtgga ttcctgctac tgggaagaat   2160
gatgtcactg gcattgcatg agcttcctcc atggggctct tcatgaaggg ttcagtctac   2220
aagagatgct atgtagcatt ttggatgcca tagttaggtg atatattggg aactgatgct   2280
accaaccttg agacaatctt tgtgtgacca agaattagaa ttgtctcatt catatggtgt   2340
ccctaaccta acacccttag gagttggatc ttagctttag ttttctttt gtgatctgtc   2400
cacctagaaa agaatcgtta ctcatgtaaa cacaaaatga atgctacagt atttttttcc   2460
cctgctcagc caagttcgtt gttttgttca gataactgaa gcgtttgcag cgactaaagg   2520
tatggcacct tctaatatca gaaccatatc catctgaatt ctgtttaaatt gtcaccaact   2580
gaaaccaggc ttaccatttt ctgtcgatat tgtctagtct ttgatgacaa ctaaaatgaa   2640
atggggtatc ctcaaaagaa atataaattg tgaacccaaa gtagttggtt tctacttcac   2700
ctgaattcta cttcatctga ataggctatt ttaatgaaga gaaatccaa gaaatgccat   2760
ttacaaacac ccaaatccaa gaaatgctat cgacgagtac ggttccata aaatgctatt   2820
gtagaagcga ttttgtccca gaaatcagtt gccatctagt taaaacattc tcacataaac   2880
aagcaatata aatactatt gccaagatat atccaatact ttgcatctct aaaacttcta   2940
gttattgaca actaatttct tttccagtca atacaaataa gccatctatc aaagatttga   3000
gaaattgcag ggcacaattc tacagaaaat taaagaacat cacttgaaaa ggaagatttt   3060
ttctatagaa cttatccttt gtgatgtaac aacaaatact cgaatgaatt gagaaataac   3120
caatgtcaac actgaaacaa gtctgaaacc aagatcagaa gagcatgaaa atagtgctct   3180
tatgattga ccttgattct tgcccacact cttattacaa ccttcgagca aaccggagca   3240
tttgctgaat aaatctctca tctgttactg aagatactag gtaactaaat aaacaatcaa   3300
tcaagagtat caaaac                                                   3316
SEQ ID NO: 7            moltype = DNA   length = 4647
FEATURE                 Location/Qualifiers
source                  1..4647
                        mol_type = other DNA
                        organism = synthetic construct
SEQUENCE: 7
tgcaccggac actgtctggt ggcataccag acagtccggt gtgccagatc agggcaccct     60
tcggttcctt tgctcctttg cttttgaacc ctaactttga tcgtttattg gtttgtgttg    120
aacctttatg cacctgtgga atatataatc tagaacaaac tagttagtcc aatcatttgt    180
gttgggcatt caaccaccaa aattatttat aggaaaaggt taaaccttat ttcccttcca    240
atctccccct ttttggtgat tgatgccaac acaaaccaaa gaaaatatat aagtgcagaa    300
ttgaactagt ttgcataagg taagtgcata ggttacttag aattaaatca atttatactt    360
ttacttgata tgcatggttg ctttctttta ttttaacatt ttggaccaca tttgcaccac    420
ttgtttttgtt ttttgcaaat cttttttgaa attcttttttc aaagtctttt gcaaatagtc    480
aaaggtatat gaataagatt gtaagaagca ttttcaagat ttgaaatttc tccccctgtt    540
tcaaatgctt ttccttttgac taaacaaaac tcccccctgaa taaaattctc ctcttagctt    600
tcaagagggt tttaaataga tatcaattgg aaatatattt agatgctaat tttgaaaata    660
taccaattga aaatcaacat accaatttga aattaaacat accaatttaa aaaatttcaa    720
aaagtggtg tgcggtcctt ttgctttggg cttaataattt ctcccccttt ggcattaatc    780
gccaaaaacg gagactttgt gagccattta tacttctcc ccattggtaa atgaaaatatg    840
agtgaaagat tataccaaat ttggacagtg atgcggagtg acggcgaagg ataacgata    900
ccgttagagt gggagtggaag ccttgtcttc gccgaagagt ccatttccct ttcaatctac    960
gacttagcat agaaatacac ttgaaaacac attagtcgta gccacgaaag agatatgatc   1020
aaaggtatac aaatgagcta tgtgtgtaat gtttcaatca aagtttcgag aatcaagaat   1080
atttagctca ttcctaagtt tgctaaaggt tttatcatct aatggtttgg taagagatc   1140
gactaattgt tctttggtgc taacataagc aatctcgata tcaccccttt gttggtgatc   1200
```

```
cctcaaaaag tgataccgaa tgtctatgtg cttagtgcgg ctgtgttcaa cgggattatc   1260
cgccatgcag atagcactct cattgtcaca taggagaggg actttgctca atttgtagcc   1320
atagtccccta aggttttgcc tcatccaaag taattgcaca caacaatgtc ctgcggcaat   1380
atacttggct tcggcggtag aaagagctat tgagttttgt ttctttgaag tccaagacac   1440
caggggatctc cctagaaact gacaagtccc tgatgtgctc ttcctatcaa ttttacaccc   1500
tgcccaatcg gcatctgaat atcctattaa atcaaaggtg gatcccttgg ggtaccaaag   1560
accaaaattta ggagtgtaaa ctaaatatct catgattctt ttcacggccc taaggtgaac   1620
ttccttagga tcggcttgga atcttgcaca catgcatata gaaagcatac tatctggtcg   1680
agatgcacat aaatagagta aagatcctat catcgaccgg tataccttt ggtctacgga   1740
tttacctccc gtgtcgaggt cgagatgccc attagttccc atgggtgtcc tgatgggctt   1800
ggcatccttc attccaaact tgttgagtat gtcttgaatg tacttgttt ggctgatgaa   1860
ggtgccatct tggagttgct tgacttgaaa tcctagaaaa tatttcaact tccccatcat   1920
agacatctcg aatttcggaa tcatgatcct actaaactct tcacaagtag atttgttagt   1980
agacccaaat ataatatcat caacataaat ttggcataca aacaaaactt ttgaaatgat   2040
tttagtaaag agtaggat cggctttact gactctgaag ccattagtga taagaaaatc   2100
tcttaggcat tcataccatg ctgttggggc ttgcttgagc ccataaagcg cctttgagag   2160
tttataaaca tggttagggt actcactatc ttcaaagccg agaggttgct caacatagac   2220
ctattcaccc catttgatca cttttttggt ccttcaggat ctaatagtta tgtataattt   2280
agagtctctt gtttaatggc cagatatttc taattaatct aagaatttat gatatttttt   2340
aattttttat catgtctgat gagaattaac ataaaggctc aattgggtcc tgaattaata   2400
atagagtgaa aattaatcca gaggctctat tagaaccttc aattagtaat accaagatat   2460
atataagata gtagagtata gtttaaatgt tggcattgtt cattctttct tttgttattt   2520
aatttatgct ttccacggtg gttagtggtt acttctgaag ggtccaaata atgcatgaag   2580
agtttgagga caagaagtct gccctaaaaa tagcgatgca aaggcatggt gtccaagcca   2640
tacatatagc gcactaattt tatcagcaga acaatgtat ttataggtcc tagtgcccag   2700
gcaacaagag acacgaataa agcatcgatc acgacaccat ggcggcgaca atggcagtga   2760
cgacgatggt gacgaggagc aaggagagct ggtcgtcatt gcaggtcccg gcggtggcat   2820
tcccttggaa gccacgaggt ggcaagaccg cgggcctcga gttccctcgc cgggcgatgt   2880
tcgccagcgt cggcctcaac gtgtgcccag gcgtcccggc ggggcgcgac ccgcgggagc   2940
ccgatcccaa ggtcgtccgg gcggcctgcg gcctggtcca ggcacaagtc ctcttccagg   3000
ggtttaactg ggagtcgtcg aagcagcagg gaggctggta caacaggctc aaggcccagg   3060
tggacgacat cgccaaggcc ggcgtcacgc acgtctggct gcctccaccc tcgcactccg   3120
tctcgccaca aggctacatg ccaggccgcc tatacgacct ggacgcctcc aagtacggca   3180
cggcggcgga gctgaagtcc ctgatagcgg cgttccacgg caggggcgtg cagtgcgtgg   3240
cggacatcgt catcaaccac cggtgcgcgg aaaagaagga cgcgcgcggc gtgtactgca   3300
tcttcgaggg cgggactccc gacgaccgcc tggactgggg ccccggcatg atttgcagcg   3360
acgacacgca gtactcggac gggacgggc accgcgacac gggcgagggg ttcgcggcgg   3420
cgcccgacat cgaccacctc aacccgcgcg tgcagcggga gctgtccgcc tggctcaact   3480
ggctcaggtc cgacgccgtg gggttcgacg gctggccgct cgacttccgc aagggctact   3540
cgccggccgt cgccagaatg tacgtggaga gcacggggcc gccgagcttc gtcgtcgcgg   3600
agatatggaa ctcgctgagc tacagcgggg acggcaagcc ggcgcccaac caggaccagt   3660
gccgcagga gctgctggac tggacgcggg ccgtcggcgg gcccgcgatg gcgttcgact   3720
tccccaccaa gggcctgctc caggcgggcg tgcaggggga gctgtggcgg ctgcgcgaca   3780
gctccggcaa cgcggccggc ctgatcgggt gggcgcccga gaaggccgtc accttcgtgg   3840
acaaccatga caccggctcg acgcagaagc tctggccgtt cccatccgac aaggtcatgc   3900
agggctacgc ctacatcctc acccatccag gagtcccctg cattttctac gaccacacgt   3960
tcgactggaa cctgaagcag gagatatcca cgctgtctgc catcagggcg ggaacggca   4020
tccgcgccgg gagcaagctg cgcatcctcg tggcggacgc ggacgcctac gtggccgtcg   4080
tggacgagaa ggtcatggtg aagatcggga caaggtacgg cgtgagcagc gtggtcccgt   4140
cggatttcca cccggcggcg cacggcaagg actactgcgt ctgggagaaa gcgagcctcc   4200
gcgtcccggc ggggcgccac ctctagcagc tcagattgct cagtcttgtg ctgcattgca   4260
aacacagcag cacgcacctg cataacgtct tttccttaag atctgacaaa gcagcattag   4320
tccgttgatc ggtggaagac cactcgtcag tgttgagttg aatgtttgat caataaaata   4380
cggcaatgct gtaaggggttg ttttttatgc cattgataat acactgtact gttcagttgt   4440
tgaactctat ttcttagcca tgccaagtgc ttttcttatt ttgaataaca ttacagcaaa   4500
aagttgaaag acaaaaaaaa aaacccccga acagagtgct ttgggtccca agctacttta   4560
gactgtgttc ggcgttcccc ctaaattct cccctatat ctcactcact tgtcacatca   4620
gcgttctctt tcccctatat ctccacg                                      4647
```

SEQ ID NO: 8          moltype = DNA   length = 4487
FEATURE               Location/Qualifiers
source                1..4487
                      mol_type = other DNA
                      organism = synthetic construct
SEQUENCE: 8

```
gcaccggaca ctgtctggtg gcataccaga cagtccggtg tgccagatca gggcacccctt    60
cggttccttt gctcctttgc ttttgaaccc taactttgat cgtttattgg tttgtgttga   120
acctttatgc acctgtggaa tatataatct agaacaatct agttagtcca atcatttgtg   180
ttgggcattc aaccaccaaa attatttata ggaaaaggtt aaaccttatt tcccttcaa    240
tctccccctt tttggtgatt gatgccaaca caaaccaaag aaaatatata agtgcagaat   300
tgaactagtt tgcataaggt aagtgcatag gttacttaga attaaatcaa tttatacttt   360
tacttgatat gcatggttgc tttctttat tttaacattt tggaccacat ttgcaccact   420
tgttttgttt tttgcaaatc ttttggaaa ttctttttca aagtcttttg caaatagtca   480
aaggtatatg aataagattg taagaagcat tttcaagatt tgaaatttct cccctgtttt   540
caaatgcttt tccttttgact aaacaaaact cccctgaat aaaattcc tcttagcttt   600
caagaggggt ttaaatagat atcaattgga aatatattta gatgctaatt ttgaaaatat   660
accaattgaa aatcaacata ccaatttgaa attaaacata ccaatttaaa aaatttcaaa   720
aagtggtggt gcggtccttt tgctttgggc ttaatatttc tccccctttg gcattaatcg   780
ccaaaaacgg agactttgtg agccatttat actttctccc cattggtaaa tgaaatatga   840
```

```
gtgaaagatt ataccaaatt tggacagtga tgcggagtga cggcgaagga taaacgatac   900
cgttagagtg gagtggaagc cttgtcttcg ccgaagactc catttccctt tcaatctacg   960
acttagcata gaaatacact tgaaaacaca ttagtcgtag ccacgaaaga gatatgatca  1020
aaggtataca aatgagctat gtgtgtaatg tttcaatcaa agtttcgaga atcaagaata  1080
tttagctcat tcctaagttt gctaaaggtt ttatcatcta atggttttggt aaagatatcg  1140
actaattgtt ctttggtgct aacataagca atctcgatat caccccttttg ttggtgatcc  1200
ctcaaaaagt gataccgaat gtctatgtgc ttagtcgggc tgtgttcaac gggattatcc  1260
gccatgcaga tagcactctc attgtcacat aggagaggga cttttgctcaa tttgtagcca  1320
tagtccctaa ggttttgcct catccaaagt aattgcacac aacaatgtcc tgcggcaata  1380
tacttggctt cggcggtaga aagagctatt gagttttgtt tctttgaagt ccaagacacc  1440
agggatctcc ctagaaactg acaagtccct gatgtgctct tcctatcaat tttacaccct  1500
gcccaatcgg catctgaata tcctattaaa tcaaaggtgg atcccttggg gtaccaaaga  1560
ccaaatttag gagtgtaaac taaatatctc atgattcttt tcacggccct aaggtgaact  1620
tccttaggat cggcttggaa tcttgcacac atgcatatag aaagcatact atctggtcga  1680
gatgcacata aatagagtaa agatcctatc atcgaccggt ataccttttg gtctacggat  1740
ttacctcccg tgtcgaggtc gagatgccca ttagttccca tgggtgtcct gatgggcttg  1800
gcatccttca ttccaaactt gttgagtatg tcttgaatgt actttgtttg gctgatgaag  1860
gtgccatctt ggagttgctt gacttgaaat cctagaaaat atttcaactt ccccatcata  1920
gacatctcga atttcggaat catgatccta ctaaactctt cacaagtaga tttgttagta  1980
gacccaaata taatatcatc aacataaatt tggcatacaa acaaaacttt tgaaatggtt  2040
ttagtaaaga gagtaggatc ggctttactg actctgaagc cattagtgat aagaaaatct  2100
cttaggcatt catccatgc tgttgggct tgcttgagcc cataaagcgc ctttgagagt  2160
ttataaacat ggttagggta ctcactatct tcaaagccga gaggttgctc aacatagacc  2220
tattcacccc atttgatcac tttttttggtc cttcaggatc taatagttat gtataattta  2280
gagtctcttg tttaatggcc agatatttct aattaatcta agaattaatg atatttttta  2340
atttttttatc atgtctgatg agaattaaca taaaggctca atttgggtcct gaattaataa  2400
tagagtgaaa attaatccag aggctctatt agaaccttca attagtaata ccaagatata  2460
tataagatag tagagtatag tttaaatgtt ggcattgttc attctttctt ttgttattta  2520
atttatgctt tccacggtgg ttagtggtta cttctgaagg gtccaaataa tgcatgaaga  2580
gtttgaggac aagaagtctg ccctaaaaat agcgatgcaa agcatggtg tccaagccat  2640
acatatagcg cactaatttt atcagcagaa caatggtatt tataggtcct agtgcccagg  2700
caacaagaga cacgaataaa gcatcgatca cgacaagatg ctgtgtctca cctcctcttc  2760
ctcctccgcg cccgctccgc tccttccctc tctcgctgat cgaccgagcc caggaatcgc  2820
gggcgggggt ggcaatgttc gcctgagcgt ggtttcttcg ccgcggcggt cgtggcctgg  2880
aaaggtcaag accaatttct cagttcctgc gactgcgcga aaaaacaaaa ccatggtgac  2940
tgttgtggag gagatcgctt gttctggtac tggatcggta tttgaaatat tgtgtcaagg  3000
atttaactgg gaatctcata agtcaggaaa atggtatgtg gaacttggct caaaggccaa  3060
ggagttgtca tccatgggtt tcaccattgt ctggtcacca ccacctactg attctgtgtc  3120
gcctgaagga tacatgccaa gggatttgta taatctaaat tccagatatg ggaccatgga  3180
agagttgaag gaggctgtga aacgttttca tgaagccggt atgaaggttc ttggtgatgc  3240
cgtcctgaat cacaggtgtg ctcaatttca gaaccaaaat ggcgtctgga atattttggg  3300
tggacgcctt aactgggatg atcgagcagt tgttgcagat gatccacatt tccagggaag  3360
aggaaaacaag agcagtggag ataacttcca tgcagccccca aacattgatc actcgcaaga  3420
gtttgtgagg agtgatctta agaatggct ttgttggatg agaaaggaag ttggatacga  3480
tggatgcgcga cttgattttg ttcgcggatt ttggggtgga tatgtccacg attacttgga  3540
agcaagcgaa ccatatttg cagtaggaga gtactgggat tctctcagtt acacctatgg  3600
tgaaatggat tataatcaag atgcccacag gcagagaata gttgattgga taaatgctac  3660
aaatggaact gctggtgcat ttgatgttac cacgaaagga atacttcact ctgcactgga  3720
aagatctgag tactggcgtc tgtctgatga aaaaggaaaa cccccctggag tgttaggttg  3780
gtggccttcg cgtgctgtca catttataga aaatcatgac actggttcta ctcagggtca  3840
ttggagattc ccctttggta tggagttgca aggctatgtc tacatcttaa ctcacccagg  3900
cactcctgca atcttctatg atcatatatt ttcgcattta cagccagaga ttgctaaatt  3960
aattctatt agaaatcgcc aaaagatcca ttgccgtagc aagatcaaga tactgaaagc  4020
agagggaaat ttatatgcgg cagagattga tgagggtca acaatgaaga ttggcgcagg  4080
acattttgag ccaagcggcc ccacaaactg ggtagttgct gccgagggac aggattacaa  4140
ggtctgggaa gtgtcatcgt agacttgccg cgctggtact tgcagaactt ctattgtaga  4200
cagtatacaa ccattcggta tagctcacaa aagggatcgt tcaaacattt ggcaataaag  4260
tttcttaaga ttgaatcctg ttgccggtct tgcgatgatt atcatataat ttctgttgaa  4320
ttacgttaag catgtaataa ttaacatgta atgcatgacg ttatttatga gatgggtttt  4380
tatgattaga gtcccgcaat tatacattta atacgcgata gaaacaaaa tatagcgcgc  4440
aaactaggat aaattatcgc gcgcggtgtc atctatgtta ctagatc              4487
SEQ ID NO: 9          moltype = DNA   length = 3813
FEATURE               Location/Qualifiers
source                1..3813
                      mol_type = other DNA
                      organism = synthetic construct
SEQUENCE: 9
ctgcaggata atgacagcct aggcggaggt gcggtaaagc ttgccgaaaa catgcagaag    60
agcaacgacg gcaatgaacc caatgctcat gatgaggact gagttcgggg acatcttgcg   120
cccagcagcc tcatcggtgt agaactggag cattgtgctg gcaccgcctc caccagtgcc   180
actgctggtg gttctacgcc tgcgcaagct tgcagcagct gctgcactcc ctctagccgg   240
ggcatctcca ttggccacca tcttgcttta tccctctgca tgataaatatg agtttcaaat   300
gtaaggtttg cagcactaat attacagaaa accaacaga caacagagtt tcatccaaag    360
tcgtattgca tatacatagg aagtgttaaa atatgtctat cattttggaa gatacgtttt   420
atgctgtcac acagcatttt ggaagtgact attttataag cacagaagtt tcttcaatgt   480
ggaatatgtc aaaaggcaaa ataagaagca cagaagtttc ttcaatgtgg aatatgtcag   540
aaggcagaat aaggtacaca tcttggaagt gtatgatagt actacaccaa taccagtgaa   600
gttttagttg tcacatttga gtgctaataa aaatatataaa aagaaatggt tgctgttgct   660
```

```
catgcctata tacattcata atctatcaaa ctaactgctc ctggatgctg cataactata   720
actaaacaag cttaagttaa atttaccaca gaaaaagaaa aaatgacaac tagtcccaga   780
attctgctga aaaattttgg ggctgtcctg ggcttggcca aacacccatt gacatgatgc   840
tgcccaagtg taagaactgt aaaacaagta tagtgtctgt gtatgtacag ggatggcagc   900
atattcattg ctgcaacaca agctacgcta catgaaacca atttcttacg ctggaatatg   960
aacaaacaac atggaggaga gatttcgtaa tagaattttg agcaaatatg ttggtacgga  1020
caaaatgatc ccccacaaaa atccgcagag aagatcatga gtgacacgcg atatatgagg  1080
taacacacga acatcttatc aagaattcag atccattccc agatcctgac aaagcactag  1140
aactacaaca gaaatacttc gataaaacaa ttcgatttcc cttcatgaca catcctaaca  1200
tcacatcaaa cccccgcag ccaatctgaa ttctgaacag caagatctgg aacagaagcg  1260
gtacccatcc cagaattcta aatcggcaa accaaacaag cccgatctaa gacatcgatt  1320
caacatgaac gcgtacggaa tcaaagcagg ctaatcggag agatggcgaa aagaggatga  1380
ttttcgcgcg cacctgatga atctgccctg cgccaatcgc tcgtgctccc gtcccaactt  1440
ggtcactcgt cttctcgccc gaaaatctga gtgcggaatt cagaattctc tccgcgtctg  1500
aacccgcgcg ctgatatcta cccaactggc tggattaacg ggttccgttc aagatccgat  1560
atcaagtgac gtggtcggcg cgatctgatt ggccggagcg cgtctccgcg cgtcgatctg  1620
agccgtccga ttcgttgccg ggtcccgatc gcgcggcctg tgtgaaacg ggtggcgtca  1680
ccgcgtgcgg cgtggcactg tgacgtggca acggttatgc ggttatgcac agtcatgggc  1740
tggaccttttt ggcccaacat ctgtggactc gtggaccggg tttcggccct tttatccgct  1800
ctacggacgc agtccacgtc agccgacgtg ggtcccacca cgaagggcgt gcctccctct  1860
aaaaattgcc aatgacgata agagcaaaga cggacgggag gggaggggtc caaattaaaa  1920
ctccaaaatc cattcgaaca gcgaaggaaa tttgttggaa aattttgaa tttggatttt  1980
tgttctagga gaggggaagg ttagaagaag ttgagatcgg tggagaactg gagatcgagg  2040
ggagatgctg tgtctcacct cctcttcctc ctccgcgccc gctccgctcc ttccctctct  2100
cgctgatcga ccgagcccag gaatcgcggg cggggtggc aatgttcgcc tgagcgtggt  2160
ttcttcgccg cgccggtcgt ggcctggaaa gtcaagacc aatttctcag ttcctgcgac  2220
tgcgcgaaaa aacaaaacca tggtgactgt tgtggaggag atcgcgtccg gccaccaagt  2280
cctctttcag gggttcaact gggagtcgtg gaagcagagc ggcgggtggt acaacatgat  2340
gatgggcaag gtcgacgaca tcgccgctgc cggagtcacc cacgtctggc tgccaccgcc  2400
gtcgcactcc gtctccaacg aaggttacat gcctggtcgg ctgtacgaca tcgacgacgt  2460
caagtacggc aacgcggcgg agctcaagtc gctcatcggc gcgctccacg gcaagggcgt  2520
gcaggccatc gccgacatcg tcatcaacca ccgctgcgcc gactacaagg atagccgcgg  2580
catctactgc atcttcgagg gcggcacctc cgacggccgc ctcgactggg gcccccacat  2640
gatctgtcgc gacgacacca aatactccga tggcaccgca aacctcgaca ccggagccga  2700
cttcgccgcc gcgcccgaca tcgaccacct caacgacgcg gtccagcgcg agtcaaagga  2760
gtggctcctc tggctcaaga gcgacctcgg cttcgacgcg tggcgccttg acttcgctag  2820
gggctactcg ccggagatgg ccaaggtgta catcgacggc acatccccga gcctcgccgt  2880
ggccgaggtg tgggacaata tggccaccgg cggcgacggc aagcccaact acgaccagga  2940
cgcgcaccgg cagaatctgg tgaactgggt ggacaaggtg ggcgcgggg cctcggcagg  3000
catggtgttc gacttcacga ccaaagggat actgaacgct gccgtggagg gcgagctgtg  3060
gaggctgatc gacccgcagg ggaaggcccc cggcgtgatg ggatggtggc cggcaaggc  3120
cgccaccttc gtcgacaacc acgatacagg ctccacgcag gccatgtggc cattcccctc  3180
cgacaaggtc atgcagggct acgcgtacat cctcacccac cccggcatcc catgcatctt  3240
ctacgaccat ttcttcaact ggggggttaa ggaccagatc gcggcgctgg tggcgatcag  3300
gaagcgcaac ggcatcacgg cgacgagcgc cctgaagatc ctcatgcacg aaggagatgc  3360
ctacgtcgcc gagatagacg gcaaggtggt ggtgaagatc gggtccaggt acgacgtcgg  3420
ggcggtcgac ccggccgggt tcgtgacctc ggcacacgg aacgactacg ccgtctggga  3480
gaagaacggt gccgcggcaa cactacaacg gagctgaagt ctgcactgat ccgtcattcg  3540
atcggacaaa gcagcattag tccgttgatc ggtggaagac cactcgtcag tgttgagttg  3600
aatgtttgat caataaaata cggcaatgct gtaagggttg ttttttatgc cattgataat  3660
acactgtact gttcagttgt tgaactctat ttcttagcca tgccaagtgc ttttcttatt  3720
ttgaataaca ttacagcaaa aagttgaaag acaaaaaaaa aaacccccga acagagtgct  3780
ttggcgatcg cgcccgggct taattaactg cag                              3813

SEQ ID NO: 10          moltype = DNA  length = 3005
FEATURE                Location/Qualifiers
source                 1..3005
                       mol_type = other DNA
                       organism = synthetic construct
SEQUENCE: 10
cccgatctag taacatagat gacaccgcgc gcgataattt atcctagttt gcgcgctata    60
ttttgttttc tatcgcgtat taaatgtata attgcgggac tctaatcata aaaacccatc   120
tcataaataa cgtcatgcat tacatgttaa ttattacatg cttaacgtaa ttcaacagaa   180
attatatgat aatcatcgca agaccggcaa caggattcaa tcttaagaaa cggtacctct   240
agaggcgcgc ccactttgtg aggccttttaa tacacagtcc tgccatcacc atccaggatc   300
atgtccttga atgcgccccc aattgggatc ataggcagca catgctcctg gtgcgggacg   360
atgatatcca acaagtatgg ccctggagtc tcgagcatct tcttgatggc ggcacggact   420
tcactcttct ttgttacacg gactgccgga atattgaacc cttagcaat agtcacaaaa   480
tctggatata tctcgctctc acattccggg ttgcccaagt atgtatgcgc cctattcgcc   540
ttgtaaaacc tatcctccaa ttgcaccacc ataccaaat gttggttgtt caacaccatc   600
accttcacag ggaggttctc aatgcggatc aatgccagct cctgaatgtt catgaggaag   660
ctaccatccc catcaatatc aacaactgtg cacctgggt tagccacaga agcaccagct   720
gcggcaggca gcccaaaatcc cattgcgccc agaccagccg aagacagcca ctgccgtggc   780
cgcttgtgg tgtaatattg tgccgcccac atcggtgct gccaacacc agtagccagc   840
attgcctcac ctttcgtcag ctcatccagc acctgaatgg catattgcgg tgggatctct   900
tcaccaaaag ttttgtaccc cagaggaaac tccctcttct gctggtccaa ctcattgtgc   960
catgcactaa aatcagaact tgtctttgtt gtgctctgtt gtagcagagc attcaagccc  1020
tgtaaagcga gcttaacatc tgcgcaaatt gacacatgtg gttgcttgtt cttttccaatc  1080
tctgctggat caatgtcaat gtgcacaatc ttggccctgc ttgcaaaagc ctcaatttc  1140
```

```
cctgtcacac gatcatcaaa ccgcacacca aacgcaagca acaggtcagc cttatccacg   1200
gcataatttg cgtacaccgt gccatgcatc ccaagcatcc gcaggacaa cgggtcgtca    1260
ctggggaaat tgccgaggcc catcagagtg gttgtaactg ggataccagt cagctcaaca   1320
aaccagcgca attcgtcacc agatgcagag cagccaccac cgacatagag aatcgggcgc   1380
cgtgactcgc caaccagacg caagacctgc tcaagcaatt ctgtcgcggg tggcttgggc   1440
aggcgtgcga tgtaccctgg tagattcatc gaggtgtccc agaccggcac ggccatctgc   1500
tgctggatgt ccttggggat gtccaccagc accgggccag gacggcccga ggacgcgagg   1560
aagaaggctt cctgtatgac gcggggatg tcctccacat caaggacaag gtaattgtgc    1620
ttggtgatgg agcgggtgac ctcgactatg ggcgtctcct ggaaggcgtc ggtgccgatc   1680
atgcggcggg ggacctggcc cgtgatggcg accatcggga cggagtcgag cagcgcgtcg   1740
gcgagcgcgg acacgaggtt ggttgcgccg gggccggagg tggcgacgca gaccccgacg   1800
cggccggacg cgcgcgcgta cccggacgcc gcgaacgcct cgccctgctc gtggcggaag   1860
aggtggttgg tgatgaccgg ggagcgcgtc agcgcctggt ggatctccat cgacgcgccg   1920
cctgggtagg cgaacacgtc gctgacgccg caccgctcca gcgcctccac gaggatgtcc   1980
gcgcccttgc ggggctcggc cggccccac ggccggagcg gcgtggccgg cggcgccggg    2040
gacggcgggg tgaccgggga caccgccgag cacctgaccg ccgccgcccc cacccggcct   2100
cgagcgggaa ggacgtggtg tcgctggtgg ttcttacggc cggtcttggc cgtcgcggcg   2160
gcggacaggg cggcggccgc ggccgcggcg gtcgtagcca tggtctacct acaaaaaagc   2220
tccgcacgag gctgcatttg tcacaaatca tgaaaagaaa aactaccgat gaacaatgct   2280
gagggattca aattctaccc acaaaaagaa gaaagaaaga tctagcacat ctaagcctga   2340
cgaagcagca gaaatatata aaaatataaa ccatagtgcc cttttcccct cttcctgatc   2400
ttgtttagca tggcggaaat tttaaacccc ccatcatctc ccccaacaac ggcggatcgc   2460
agatctacat ccgagagccc cattcccgc gagatccggg ccggatccac gccggcgaga     2520
gccccagccg cgagatcccg cccctcccgc gcaccgatct gggcgcgcac gaagccgcct   2580
ctcgcccacc caaactacca aggccaaaga tcgagaccga gacggaaaaa aaaacggag    2640
aaagaaagag gaggggggcg gggtggttac cggcgcgggg gcggcggagg ggaggggggg   2700
aggagctcgt cgtccggcag cgaggggga ggaggtggag gtggtggtgg tggtggtggt     2760
agggttgggg ggatgggagg agaggggggg gtatgtatat agtggcgatg ggggcgttt    2820
ctttggaagc ggagggaggg ccggcctcgt cgctggctcg cgatcctcct cgcgtttccg   2880
gcccccacga cccggaccca cctgctgttt tttcttttc ttttttttct ttctttttt     2940
tttttggct gcgagacgtg cggtgcgtgc ggacaactca cggtgatagt ggggggtgt     3000
ggaga                                                              3005
SEQ ID NO: 11       moltype = DNA  length = 4460
FEATURE             Location/Qualifiers
source              1..4460
                    mol_type = other DNA
                    organism = synthetic construct
SEQUENCE: 11
gacaaatttg tttgtcagat caaatttta agcaaaacat aagaaacagc acaaagggt      60
atagcagaag caaatttgg acacaatgat tagggatcac ttattcatta tagttcttcc    120
atgctgctct accacagcaa aacgtttcag acaccatcaa accagactta aggatacaca   180
ttacaggtaa atagtacaca atgaaacggg acacgaccaa ggaccagaca agacaaccat   240
agctccattg gggaagacaa ataggcagac ttgtgaaccc tagaacagca gcagctctat   300
ggctgaggac ggtacctcta gaggcgcgcc cactttgtga ggcctttaat acacagtcct   360
gccatcacca tccaggatca tgtccttgaa tgcgccccca attgggatca taggcagcac   420
atgctcctgg tgcgggacga tgatatccaa caagtatggc ctggagtct cgagcatctt    480
cttgatggcg gcacggactt cactcttctt tgttacacgg actgccgaa tattgaaccc    540
cttagcaata gtcacaaaat ctggatatat ctcgctctca cattccgggt tgcccaagta   600
tgtatgcgcc ctattcgcct tgtaaaacct atcctccaat tgcaccacca tacccaaatg   660
ttggttgttc aacaccatca ccttcacagg gaggttctca atgcggatca atgccagctc   720
ctgaatgttc atgaggaagc taccatcccc atcaatatca acaactgtga cacctgggtt   780
agccacagaa gcaccagctg cggcaggcag cccaaatccc attgcgccca gaccagccga   840
agacagccac tgccgtggcc gcttgtaggt gtaatattgt gccgcccaca tctggtgctg   900
cccaacacca gtagcgatga ttgcctcacc tttcgtcagc tcatccagca cctgaattgc   960
atattgcggt gggatctctt caccaaaagt tttgtacccc agaggaaaact ccctcttctg  1020
ctggtccaac tcattgtgcc atgcactaaa atcagaactt gtcttttgtt gctctctgttg  1080
tagcagagca ttcaagccct gtaaagcgag cttaacatct gcgcaaattg acacatgtgg   1140
ttgcttgttc ttcaatct ctgctggatc aatgtcaatg tgcaaatct tggccctgct     1200
tgcaaaagcc tcaatttcc cgtgtcacacg atcatcaaac cgcacaccaa acgcaagcaa   1260
caggtcagcc ttatccacgg cataatttgc gtacaccgtg ccatgcatcc caagcatccg   1320
caggacaaac gggtcgtcac tggggaaatt gccgaggccc atcagagtgg ttgtaactgg   1380
gataccagtc agctcaacaa accagcgcaa ttcgtcacca gatgcagagc agccaccacc   1440
gacatagaga atcgggcgcc gtgactcgcc aaccagacgc aagacctgct caagcaattc   1500
tgtcgcgggt ggcttgggca ggcgtgcgat gtaccctggt agattcatcg aggtgtccca   1560
gaccggcacg gccatctgct gctggatgtc cttggggatg tccaccagca ccgggccagg   1620
acggcccgag gacgcgagga agaaggcttc ctgtatgacg cggggatgt cctccacatc    1680
aaggacaagg taattgtgct tggtgatgga gcgggtgacc tcgactatgg ggcgtctcctg   1740
gaaggcgtcg gtgccgatca tgcggcgggg gacctggccc gtgatggcgc ccatcggac    1800
ggagtcgagc agcgcgtcgg cgagcgcgga cacgaggttg gttgcgccgg ggccggaggt   1860
ggcgacgcag accccgacgc ggccggacgc gcgcgcgtac ccggacgccg caacgcctc    1920
gccctgctcg tggcggaaga ggtggttggt gatgaccggg gagcgcgtca gcgcctggtg   1980
gatctccatc gacgcgccgc ctgggtaggc gaacacgtcg ctgacgccgc accgctccag   2040
cgcctccacg aggatgtccg cgcccttgcg gggctcggcc ggccccac ggccggagcg     2100
cgtggccgg ggcgccgggg acggcgggt gaccggggac accgccgagc acctgaccgc     2160
cgccgcccc acccggcctc gagcgggaag gacgtggtgt cgctggtggt tcttacggcc    2220
ggtcttggcc gtcgcggcgg cggacaggggc ggcggccgcg gccgcggcgg tcgtagccat  2280
ggtctacct acaaaaaagc tccgcacgag gctgcatttg tcacaaatca tgaaaagaaa    2340
aactaccgat gaacaatgct gagggattca aattctaccc acaaaaagaa gaaagaaaga   2400
```

```
atgtgtggct cggatgggat cgtgtgggc cacgtcacag tgggcccat atgtcggtgg  2460
gataggatga cacacagcca cgtcgggtc gatctgggcc cgcgtgtcag tcgattggat  2520
gaggatgaca ggtgggtcag tcccaataac gggtggaggg tacagaaccc gataaaaaat  2580
cgatctcaaa gtcggatgcg gatgcaaccg cgagacctag cagtctagca cccgcacccg  2640
cacccgcaca aacgcagcgc aagatgagca gtggcggcga gaagtccggc tcgggcggcg  2700
gcggcggtgg cggcggcggc ggggcggtga agacgccctc cgacttcctc aagtccatca  2760
gggggcgccc cgtcgtcgtc aagctcaact ccggcgtcga ctaccgcggt aaccccctgc  2820
tcaattccct cccccttttt gcctcaaccc tagacccgcc tcccgaaaac cctagcacga  2880
gacgaatgcg atgtttgttg tacccgtat ctctttctcc ttaattggaa ctctgcgttt  2940
cttttcgtta attagtgggg ggaaggaaag gcgtggactc tgtaggattt tcttttcgat  3000
ttgatgacca agggagatac ttatttagt gctgtttaag atcctgctag tgcccggtgt  3060
agctaggcca tttgagaagc agataaccgt gttttctgt aggaccttct ctaatcttga  3120
gctattttga tattctaatt acttatggtt aaacccctaga acctcagtat gttttaactt  3180
agtaagagat tgctacagta tttttatttg taggaacaac attgtaggtg gttatcatgc  3240
tactgactgt cttgtgtaga gccctcctat cattaagggg cttttatgtt tactaatagt  3300
tagttttagt acccattttt ctgtgagcta ctaaaaagaa tatttccaat tcaacctatg  3360
gtaatttaaa gtactttatg ctgtatgtcc atttactgag gattatgatt aatatttaag  3420
agggaggaca tctgtgctta aggtttgcat tgcaatattt gatagatta tgctaaacaa  3480
aggtaattgt gcatgcttga gatagaaagg gatttccctt ctttgggttt gataataagg  3540
ggttggcatt ccatgatcag gagcatagtg catttatatt ttataatgtg gctatgtgta  3600
tgcagttctc aatttcacat tggcggtaca cccatgatat atttaattgt tacccagaac  3660
catataatag cctaataaga gcatatggta ttccattgat tggggcctttc ggaagtgtac  3720
ctgtgtatgt aactatgcat ataaggttta ctttctggta gttcttcctt ctcctcatca  3780
cttaagacat ctggatcgct gttatcaagt cgtagactag tcataacgtc agtcaagtca  3840
gacgactaga gggctacgac tcgaccaaat agcaagtcgc acaattagtc gtagattagt  3900
catagcaaat catcatttca ccatgctaat tggcttattg tgtttagtac tttaaattta  3960
tttcttgtta acttattgtc ttgctggcta ctccataaac cgtagtttat aatactatat  4020
atagtgctta gtacaataga atagtactag agactatata gtgcatccat tgttttcaca  4080
cgaccaaatc atggactagt cgtggactag attttgaatg gaacagtttt accagaaata  4140
cacttgttct tttttttct gaatagtgtt gaatcagtag ctgcaatgca tagcttgtgc  4200
aataaaatca ttatatacta tcaccaattt catggaatct tacttattgg aaatttgtaa  4260
caaatctatt ttatccctg agttaccgtg ttggtctaaa atcaactcgc atgtgagaca  4320
agatgaagag gaccatgaag attgcctctt tcatttattc atttgctgac tgcttgcaat  4380
gccactataa acctaatcgg atgactggtt gtcatgtctc cgctaactag agagaaaggg  4440
ggaggagtga agactttacg                                             4460
```

SEQ ID NO: 12           moltype = DNA   length = 3935
FEATURE                 Location/Qualifiers
source                  1..3935
                        mol_type = other DNA
                        organism = synthetic construct
SEQUENCE: 12
```
gagctcgtgc agcgtgaccc ggtcgtgccc ctctctagag ataatgagca ttgcatgtct   60
aagttataaa aaattaccac atatttttt tgtcacactt gtttgaagtg cagtttatct   120
atctttatac atatatttaa actttactct acgaataata taatctatag tactacaata   180
atatcagtgt tttagagaat catataaatg aacagttaga catggtctaa aggacaattg   240
agtattttga caacaggact ctacagtttt atctttttag tgtgcatgtg ttctcctttt   300
tttttgcaaa tagcttcacc tatataatac ttcatccatt ttattagtac atccatttag   360
ggtttagggt taatggtttt tatagactaa tttttttagt acatctattt tattctattt   420
tagcctctaa attaagaaaa ctaaaactct attttagttt tttatttaa taatttagat   480
ataaaataga ataaaataaa gtgactaaaa attaaacaaa tacccttttaa gaaattaaaa   540
aaactaagga aacatttttc ttgtttcgag tagataatgc cagcctgtta aacgccgtcg   600
acgagtctaa cggacaccaa ccagcgaacc agcagcgtcg cgtcgggcca agcgaagcag   660
acggcacggc atctctgtcg ctgcctctgg acccctctcg agagttccgc tccaccgttg   720
gacttgctcc gctgtcggca tccagaaatt gcgtggcgga gcggcagacg tgagccggca   780
cggcaggcgg cctcctcctc ctctcacggc accggcagct acgggggatt cctttcccac   840
cgctccttcg ctttcccttc ctcgcccgcc gtaataaata gacacccct ccacaccctc   900
tttcccaac ctcgtgttgt tcggagcgca cacacacaca accagatctc ccccaaatcc   960
accgcgggc acctccgctt caaggtacgc cgctcgtcct cccccccccc ccctctctac  1020
cttctctaga tcggcgttcc ggtccatggt tagggccgg tagttctact tctgttcatg  1080
tttgtgttag atccgtgttt gtgttagatc cgtgctgcta gcgttcgtac acggatgcga  1140
cctgtacgtc agacacgttc tgattgctaa cttgccagtg tttctctttg gggaatcctg  1200
ggatggctct agccgttccg cagacgggat cgatttcatg atttttttg tttcgttgca  1260
tagggttttgg tttgcccttt tcctttattt caatatatgc cgtgcacttg ttttgtcggt  1320
catcttttca tgcttttttt tgtcttggtt gtgatgatgt ggtctgcttg ggcggtcgtt  1380
ctagatcgga gtagaattct gtttcaaact acctggtgga tttattaatt ttggatctgt  1440
atgtgtgtgc catacatatt catagttacg aattgaagat gatggatgga aatatcgatc  1500
taggataggt atacatgttg atgcgggttt tactgatgca tatacagaga tgcttttttgt  1560
tcgcttggtt gtgatgatgt ggtcgtggttg ggcggtcgtt cattcgttct agatcggagt  1620
agaatactgt ttcaaactac ctggtgtatt tattaatttt ggaactgtat gtgtgtgtca  1680
tacatcttca tagttacgag tttaagatgg atggaaatat cgatctagga taggtataca  1740
tgttgatgtg ggttttactg atgcatatac atgatgcat atgcagcatc tattcatatg  1800
ctctaacctt gagtacctat ctattataat aaacaagtat gttttataat tatttttgatc  1860
ttgatatact tggatgatgt catatgcagc agctatatgt gatttttttt agccctgcct  1920
tcatacgcta tttatttgct tggtactgtt tcttttgtcg atgctcaccc tgttgtttgg  1980
tgttacttgt attttttacaa caattaccaa caacaacaaa caacaaacaa cattacaatt  2040
actatttaca attacaacca tggcacagat cagtagcatg ggccaaggca ttcggactcc  2100
caacctcaat tcctacctcc ctaagaccca gaaagttcct ctgttctcac attctatctt  2160
catcggaagc aagaagatca cccagaactc cgccaagtct ttgtgggtgt ccaaggaaga  2220
```

```
ttccgtcctg agggtcgcta agtcaccatt ccggatttct gccagcgtgg tcactgcaca   2280
gatgcaggca ggagcagagg aggtggtcct ccagccaatc aaggagatca gcggcgtggt   2340
caagctgcct ggctcgaagt ccctcagcaa ccgcatcctc ctgctctcag cactcgcaga   2400
gggcaccaca gtggtggaca acctgctcaa ttcggaggat gtccactaca tgctgggagc   2460
actcaagacc ctgggactct cagtggaggc agacaaggca caaagaggg cagtggtcgt   2520
gggatgcggc ggcaagttcc cggtcgagaa ggatgccaag gaggaggtgc agctgttcct   2580
cggaaacgca ggaatcgcaa tgcggtccct gaccgccgcg gtgacagccc cgggcggcaa   2640
tgcaacatac gtcctggacg gcgtgccgag gatgagggag aggccaatcg gcgatctcgt   2700
cgtgggactg aagcagctcg gagcagacgt cgattgcttc ctcggcacgg actgcccacc   2760
agtccgcgtg aaggggaatcg gaggaggcaag gtgaagctct ctggctcaat   2820
ctccagccag tacctgtctg cgctgctcat ggcagcacct ctggcactcg gcgacgtgga   2880
gatcgagatc atcgacaagc tcatctcaat cccatacgtg gagatgaccc tgcgcctcat   2940
ggagaggttc ggcgtgaagg ccgagcattc ggactcctgg gataggttct acatcaaggg   3000
cggccagaag tacaagagcc ctaagaatgc ctacgtggca ggcgacgcct cttcagcgtc   3060
ttacttcctc gcaggagcag caatcacagg aggcacagtc acggtggagg gatgcggcac   3120
gacctccctc cagggcgatg tcaagttcgc ggaggtgctg gagatgatgg gcgccaaggt   3180
gacctggaca gagacctccg tcaccgtgac aggaccacag agggagcctt cggaaggaa   3240
gcacctcaag gcgatcgacg tcaacatgaa taagatgccg gatcgtggcca tgacactggc   3300
agtcgtggca ctcttcgcag acggaccaac ggcaatccgc gatgtcgcat cctggagggt   3360
gaaggagacc gagaggatgg tcgcgatccg gacggagctg accaagctcg gagcaagcgt   3420
ggaggagggc ctggactact gcatcatcac ccctccggga aagctcaacg tgacggcgat   3480
cgacacctac gacgatcata ggatggcaat ggcgttcagc ctggcagcat gcgcagacgt   3540
ccctgtgacc atccgcgacc cgggatgcac acgaagacg ttcccagact acttcgatgt   3600
cctctctaca ttcgtgaaga attgagtcct cagccataga gctgctgctg ttctagggtt   3660
cacaagtctg cctatttgtc ttccccaatg gagctatggt tgtctggtct ggtccttggt   3720
cgtgtcccgt ttcattgtgt actatttacc tgtaatgtca atccttaagt ctggtttgtt   3780
ggtgtctgaa acgttttgct gtggtagagc agcatggaag aactataatg aataagtgat   3840
ccctaatcat tgtgtccaaa ttttgcttct gctataccct tttgtgctgt ttcttatgtt   3900
ttgcttaaaa atttgatctg acaaacaaat ttgtc                              3935

SEQ ID NO: 13            moltype = DNA  length = 1536
FEATURE                  Location/Qualifiers
source                   1..1536
                         mol_type = other DNA
                         organism = synthetic construct
SEQUENCE: 13
cgacactctc gtctactcca agaatatcaa agatacagtc tcagaagacc aaagggctat    60
tgagactttt caacaagggg taatatcggg aaacctcctc ggattccatt gcccagctat   120
ctgtcacttc atcaaaagga cagtagaaaa ggaaggtgc aacctacaaa gccatcattg   180
cgataaagga aaggctatcg ttcaagatgc ctctgccgac agtggtccca agatggacc    240
cccaccacg aggagcatcg tggaaaaaga agacgttcca accacgtctt caaagcaagt   300
ggattgatgt gataacatgg tggagcacga cactctcgtc tactccaaga atatcaaaga   360
tacagtctca gaagaccaaa gggctattga gacttttcaa caagggtaa tatcgggaaa   420
cctcctcgga ttccattgcc cagctatctg tcacttcatc aaaaggacag tagaaaagga   480
aggtggcacc tacaaatgcc atcattgcga taaggaaag gctatcgttc aagatgcctc   540
tgccgacagt ggtcccaaag atggaccccc acccacgagg agcatcgtgg aaaaagaaga   600
cgttccaacc acgtcttcaa agcaagtgga ttgatgtgat atctccactg acgtaaggga   660
tgacgcacaa tcccactatc cttcgcaaga ccttcctcta tataaggaag ttcatttcat   720
ttggagagga cacgctgaaa tcaccagtct ctctctacaa atctatctct ctcgagtcta   780
ccatgagccc agaacgacgc ccggccgaca tccgccgtgc caccgaggcg acatgccgg    840
cggtctgcac catcgtcaac cactacatcg agacaagcac ggtcaacttc cgtaccggcc   900
cgcaggaacc gcaggagtgg acggacgacc tcgtccgtct gcgggagcgc tatccctggc   960
tcgtcgccga ggtggacggc gaggtcgccg gcatcgccta cgcggcccc tggaaggcac  1020
gcaacgccta cgactggacg gccgagtcga ccgtgtacgt ctcccccgc caccagcgga  1080
cgggactggg ctccacgctc tacacccacc tgctgaagtc cctgggagca cagggcttca  1140
agagcgtggt cgctgtcatc gggctgccca acgaccgag cgtgcgcatg cacgaggcgc  1200
tcggatatgc ccccgcggc atgctgcggg cggccggctt caagcacggg aactggcatg  1260
acgtgggttt ctggcagctg gacttcagcc tgccggtacc gccccgtccg gtcctgcccg  1320
tcaccgagat ttgatttctc cataataatg tgtgagtagt tcccagataa gggaattagg  1380
gttcctatag ggtttcgctc atgtgttagg catataagaa acccttagta tgtatttgta  1440
tttgtaaaat acttctatca ataaaatttc taattcctaa aaccaaaatc cagtactaaa  1500
atccagatcc cccgaattaa ttcggcgtta attcag                            1536

SEQ ID NO: 14            moltype = DNA  length = 3772
FEATURE                  Location/Qualifiers
source                   1..3772
                         mol_type = other DNA
                         organism = synthetic construct
SEQUENCE: 14
cccgatctag taacatagat gacaccgcgc gcgataattt atcctagttt gcgcgctata    60
ttttgttttc tatcgcgtat taaatgtata attgcgggac tctaatcata aaaacccatc   120
tcataaataa cgtcatgcat tacatgttaa ttattacatg cttaacgtaa ttcaacgaaa   180
attatatgat aatcatcgca agaccggcaa caggattcaa tcttaagaaa ccacctgcaa   240
gtgacttcct cagcaaatgcct actagtttta ttgccaaatg cggggaaatt   300
ccagtgcacc agagtcacag aaacacatca cacattcgtg agctcagctt agccatggat   360
aacgcctaca ttattgccat tctctctgta gctatcctct tcttgctcca ctactacctc   420
ctcggccgcg gcaatggcgg ggcggcgcgg ctgccgccgg tccaccggc cgtcccgatc   480
ctgggacacc tccacctcgt caagaagccg atgcacgcca ccatgtcccg cctcgccgag   540
cggtacgggc cggtgttctc gctgcgcctc gggtcgcggc gcgccgtggt ggtgtcgtcg   600
```

-continued

```
ccggggtgcg ccagggagtg cttcaccgag cacgacgtga ccttcgcgaa ccggcccagg    660
ttcgagtcgc agctgctggt ctcgttcaac ggcgccgcgc tcgccacggc gagctacggc    720
gcgcactggc gcaacctccg ccggatcgtc gccgtgcagc tgctctccgc gcaccgcgtc    780
ggcctcatgt ctgaaaatct cgaaacagcc gtgtcatagt caatcattag gtgttatagg    840
aacaatcaaa ggttttttca agtgttaatc ttcatactaa tatatacagt gggtactctt    900
tatctactgc cgtggaactg tcatatttga ttatgaaatt ttagctctag aaaatatttg    960
atcatcaatg tcaagacttt atgaccttgc aaaatacatt tcctaattga aacagggta   1020
aaattatgaa ctatgcctct gaaccttcat acacaggcag cacatttttt gttgtaaaat   1080
tcatcttaat atcagcggaa agactggacc agagaaagaa aaagttaaga caggcatata   1140
ctcttgatcc tctaaaagag atgaggcggt acaatgatca accatgaaca ttaaagtgat   1200
acgtggaaca tgagaacaca aataattgtc actggaacat aaatacaaaa aggttttgtag  1260
taacttaccg acatgaggcc gacgcggtgc gcggagagca gctgcacggc gacgatccgg   1320
cggaggttgc gccagtgcgc gccgtagctc gccgtggcga gcgcggcgcc gttgaacgag   1380
accagcagct gcgactcgaa cctgggcgg ttcgcgaagg tcacgtcgtg ctcggtgaag    1440
cactccctgg cgcaccccgg cgacgacacc accacggcgg gccgcgaccc gaggcgcagc   1500
gagaacaccg gcccgtaccg ctcggcgagg cgggacatgg tggcgtgcat cggcttcttg   1560
acgaggtgga ggtgtcccag gatcgggacg gccggtggac ccggcggcag ccgcgccgcc   1620
ccgccattgc cgcggccgag gaggtagtag tggagcaaga agggatagc tacagagaga    1680
atggcaataa tgtaggcgtt atccatggct aagctgagct cacgaatgtg tgatgtgttt   1740
ctgtgactct ggtgcactgg gatcccctga ggggtcaccg acttcaggtc aagtaacacc   1800
aaacaacagg gtgagcatcg acaaaagaaa cagtaccaag caaataaata gcgtatgaag   1860
gcagggctaa aaaaatccac atatagctgc tgcatatgcc atcatccaag tatatcagaa   1920
tcaaaataat tataaaacat acttgtttat tataatagat aggtactcaa ggttagagca   1980
tatgaataga tgctgcatat gccatcatgt atatgcatca gtaaacccca catcaacatg   2040
tatacctatc ctagatcgat atttccatcc atcttaaact cgtaactatg aagatgtatg   2100
acacacacat acagttccaa aattaataaa tacaccaggt agtttgaaac agtattctac   2160
tccgatctag aacgaatgaa cgaccgccca accacaccaa atcatcacaa ccaagcgaac   2220
aaaaagcatc tctgtatatg catcagtaaa acccgcatca acatgtatac ctatcctaga   2280
tcgatatttc catccatcat cttcaattcg taactatgaa tatgtatggc acacacatac   2340
agatccaaaa ttaataaatc caccaggtag tttgaaacag aattctactc cgatctagaa   2400
cgaccgccca accagaccac atcatcacaa ccaagacaaa aaaaagcatg aaaagatgac   2460
ccgacaaaca agtgcacggc atatattgaa ataaggaaa agggcaaacc aaaccctatg    2520
caacgaaaca aaaaaaatca tgaaatcgat cccgtctgcg gaacggctag agccatccca   2580
ggattcccca aagagaaaca ctggcaagtt agcaatcaga acgtgtctga cgtacaggtc   2640
gcatccgtgt acgaacgcta gcagcacgga tctaacacaa acacggatct aacacaaaca   2700
tgaacagaag tagaactacc gggccctaac catggaccgg aacgccgatc tagagaaggt   2760
agagaggggg gggggggag gacgagcggc gtaccttgaa gcggaggtgc cgacgggtgg    2820
atttggggga gatctggttg tgtgtgtgtg cgctccgaac aacacgaggt tggggaaaga   2880
gggtgtggag ggggtgtcta tttattacgg cgggcgaaga agggaaagcg aaggagcggt   2940
gggaaaggaa tcccccgtag ctgccggtgc cgtgagagga ggaggaggcc gcctgccgtg   3000
ccggctcacg tctgccgctc cgccacgcaa tttctggatg ccgacagcgg agcaagtcca   3060
acggtggagc ggaactctcg agaggggtcc agaggcagcg acagagatgc cgtgccgtct   3120
gcttcgcttg gcccgacgcg acgctgcttg ttcgctggtt ggtgtccgtt agactcgtcg   3180
acggcgttta acaggctggc attatctact cgaaacaaga aaaatgtttc cttagttttt   3240
ttaatttctt aaagggtatt tgtttaattt ttagtcactt tattttattc tattttatat    3300
ctaaattatt aaataaaaaa actaaatag agttttagtt ttcttaattt agaggctaaa    3360
atagaataaa atagatgtac taaaaaaatt agtctataaa aaccattaac cctaaaccct   3420
aaatggatgt actaataaaa tggatgaagt attatatagg tgaagctatt tgcaaaaaaa   3480
aaggagaaca catgcacact aaaaagataa aactgtagag tcctgttgtc aaaatactca   3540
attgtccttt agaccatgtc taactgttca tttatatgat tctctaaaac actgatatta   3600
ttgtagtact atagattata ttattcgtag agtaaagttt aaatatatgt aaaagatata   3660
ataaactgca cttcaaacaa gtgtgacaaa aaaaatatgt ggtaattttt tataacttag   3720
acatgcaatg ctcattatct ctagagaggg gcacgaccgg gtcacgctgc ac           3772
```

```
SEQ ID NO: 15           moltype = DNA   length = 3762
FEATURE                 Location/Qualifiers
source                  1..3762
                        mol_type = other DNA
                        organism = synthetic construct
SEQUENCE: 15
cccgatctag taacatagat gacaccgcgc gcgataattt atcctagttt gcgcgctata     60
ttttgttttc tatcgcgtat taaatgtata attgcgggac tctaatcata aaacccatc    120
tcataaataa cgtcatgcat tacatgttaa ttattacatg cttaacgtaa ttcaacagaa   180
attatatgat aatcatcgca agccggcaa caggattcaa tcttaagaa ctttattgcc     240
aaatgtttga acgatcgggg aaattcgagc tctctagaac tagtgcatgc gaagcggagg    300
ctgttcgagg tctccctcag cgtgctcatg agaccatcg cccacaccaa ggcgacccgc    360
cccgagacgg acccggacac cgacatgtcc gtggaagccc aggagtttaa gcaggtcgtc   420
gacgagatca tcccgcacat cggcgcggcc aacctgtggg actacttgcc ggcgctccgg   480
tggttcgacg tgttcgcgt caggaggaag atcctcgcg ctgtaagccg gagggacgcg    540
ttccttcgcc gcctgatcga cgcggagcgg cggaggctgg acgacggcga cgaggcggag   600
aagaagagca tgatcgccgt gctgctcact ctgcagaaga cagagccgga ggtgtacacc   660
gataacatga tcacagctct aacgcgcaac ttgttcggag caggaacaga gacaacctcg   720
acgacatcag aatgggcgat gtcgctactg ctgaaccacc ccgacacact caagaaagcg   780
caagtgaaaa tctcgaaaca gccgtgtcat agtcaatcat taggtgttat aggaacaatc    840
aaaggttttt tcaagtgtta atcttcatac taatatatac agtgggtact ctttatctac   900
tgccgtggaa ctgtcatatt tgattatgaa atttagctc tagaaaatat ttgatcatca    960
atgtcaagac tttatgacct tgcaaaatac atttcctaat tgagaacagg gtaaaattat   1020
gaactatgcc tctgaacctt catacacagg cagcacattt tttgttgtaa aattcatctt   1080
aatatcagcg gaaagactgg accagagaaa gaaaaagtta agacaggcat atactcttga   1140
```

```
tcctctaaaa gagatgaggc ggtacaatga tcaaccatga acattaaagt gatacgtgga   1200
acatgagaac acaaataatt gtcactggaa cataaataca aaaaggtttg tagtaactta   1260
cccttgcgct ttcttgagtg tgtcggggtg gttcagcagt agcgacatcg cccattctga   1320
tgtcgtcgag gttgtctctg ttcctgctcc gaacaagttc gccgttagag ctgtgatcat   1380
gttatcggtg tacacctccg gctctgtctt ctgcagagtg agcagcacgg cgatcatgct   1440
cttcttctcg ccctcgtcgc cgtcgtccaa cctccgccgc tccgcgtcga tcaggcggcg   1500
aaggaacgcg tccctccggc ttacagcggc gaggatcttc ctcctgacgc cgaacacgtc   1560
gaaccaccgg agcgccggca agtagtccca caggttggcc gcgccgatgt gcgggatgat   1620
ctcgtcgacg acctgcttaa actcctgggc ttccacggac atgtcggtgt ccgggtccgt   1680
ctcggggcgg gtcgccttgg tgtgggcgat ggtctccatg agcacgctga gggagacctc   1740
gaacagcctc cgcttcggat cctctagagt cgacctgcag aagtaacacc aaacaacagg   1800
gtgagcatcg acaaaagaaa cagtaccaag caaataaata gcgtatgaag gcagggctaa   1860
aaaaatccac atatagctgc tgcatatgcc atcatccaag tatatcaaga tcaaaataat   1920
tataaaacat acttgtttat tataatagat aggtactcaa ggttagagca tatgaataga   1980
tgctgcatat gccatcatgt atatgcatca gtaaacccca catcaacatg tataccatc    2040
ctagatcgat atttccatcc atcttaaact cgtaactatg aagatgtatg acacacacat   2100
acagttccaa aattaataaa tacaccaggt agtttgaaac agtattctac tccgatctag   2160
aacgaatgaa cgaccgccca accacaccac atcatcacaa ccaagcgaac aaaaagcatc   2220
tctgtatatg catcagtaaa acccgcatca acatgtatac ctatcctaga tcgatatttc   2280
catccatcat cttcaattcg taactatgaa tatgtatggc acacacatac agatccaaaa   2340
ttaataaatc caccaggtag tttgaaacag aattctactc cgatctagaa cgaccgccca   2400
accagaccac atcatcacaa ccaagacaaa aaaaagcatg aaaagatgac ccgacaaaca   2460
agtgcacggc atatattgaa ataaggaaa agggcaaacc aaaccctatg caacgaaaca   2520
aaaaaaatca tgaaatcgat cccgtctgcg aacggctagc agccatccca ggattcccca   2580
aagagaaaca ctggcaagtt agcaatcaga acgtgtctga cgtacaggtc gcatccgtgt   2640
acgaacgcta gcagcacgga tctaaacaca acacggatct aacacaaaca tgaacagaag   2700
tagaactacc gggccctaac catgaccggg aacgccgatc tagagaaggt agagagggg    2760
ggggggggag gacgagcggc gtaccttgaa gcggaggtgc cgacgggtgg atttgggga    2820
gatctggttg tgtgtgtgtg cgctccgaac aacacgaggt tggggaaaga gggtgtggag   2880
ggggtgtcta tttattacgg cgggcgcaga agggaaagcg aaggagcggt gggaaaggaa   2940
tcccccgtag ctgccggtgc cgtgagagga ggaggaggcc gcctgccgtg ccggctcacg   3000
tctgccgctc cgccacgcaa tttctggatg ccgacagcgg agcaagtcca acggtggagc   3060
ggaactctcg agaggggtcc agaggcagcg acagagatgc cgtgccgtct gcttcgcttg   3120
gcccgacgcg acgctgctgg ttcgctggtt ggtgtccgtt agactcgtcg acggcgttta   3180
acaggctggc attatctact cgaaacaaga aaaatgtttc cttagttttt ttaatttctt   3240
aaagggtatt tgtttaattt ttagtcactt tattttattc tattttatat ctaaattatt   3300
aaataaaaaa actaaaatag agttttagtt ttcttaattt agaggctaaa atagaataaa   3360
atagatgtac taaaaaaatt agtctataaa aaccattaac cctaaaccct aaatggatgt   3420
actaataaaa tggatgaagt attatatagg tgaagctatt tgcaaaaaaa aaggagaaca   3480
catgcacact aaaaagataa aactgtagag tcctgttgtc aaaatactca attgtccttt   3540
agaccatgtc taactgttca tttatatgat tctctaaaac actgatatta ttgtagtact   3600
atagattata ttattcgtag agtaaagttt aaatatatgt ataagatag ataaactgca    3660
cttcaaacaa gtgtgacaaa aaaaaatatgt ggtaatttt tataacttag acatgcaatg   3720
ctcattatct ctagagaggg gcacgaccgg gtcacgctgc ac                      3762

SEQ ID NO: 16           moltype = DNA   length = 3716
FEATURE                 Location/Qualifiers
source                  1..3716
                        mol_type = other DNA
                        organism = synthetic construct
SEQUENCE: 16
cccgatctag taacatagat gacaccgcgc gcgataattt atcctagttt gcgcgctata     60
ttttgttttc tatcgcgtat taaatgtata attgcgggac tctaatcata aaacccatc    120
tcataaataa cgtcatgcat tacatgttaa ttattacatg cttaacgtaa ttcaacagaa   180
attatatgat aatcatcgca agaccggcaa caggattcaa ctttaagaca ctttattgcc   240
aaatgtttga acgatcgggg aaattcgagc tctctagaac tagtctgcag cgcatccgtc   300
ggcaactctc gcctgatcac cgccgacgac gtgactcgcc tcggctacct ccagtgcatc   360
gtcaggggaga cgctccgcct gtaccccgcc gcgccgatgc tcctcccgca cgagtcctcc   420
gccgactgca aggtcggcgg ctacaacatc ccgcgcgggt cgatgttgct catcaacgcg   480
tacgccatcc accgtgaccc ggcggtgtgg gaggagccgg agaagttcat gccggagagg   540
ttcgaggacg gcgggtgcga cggcaatctc ttgatgccgt tcgggatggg gaggcggagg   600
tgccccggcg agacgctggc gctgcgcaca gtggggttgg tgctgggcac gctgatccag   660
tgcttcgact gggagagggt cgacggcgtg gaggtcgaca tgactgaagg tggcgggctc   720
accatcccca aggtcgtgcc gttggaggcc atgtgcaggc ctgaaaatct cgaaacagcc   780
gtgtcatagt caatcattag gtgttatagg aacaatcaaa ggttttttca agtgttaatc   840
ttcatactaa tatatacagt gggtactctt tatctactgc cgtggaactg tcatatttga   900
ttatgaaatt ttagctctag aaaatatttg atcatcaatg tcaagacttt atgaccttgc   960
aaaatacatt tcctaattga gaacaggggta aaattatgaa ctatgcctgt gaaccttcat  1020
acacaggcag cacatttttt gttgtaaaat tcatcttaat atcagcggaa agactggacc  1080
agagaaagaa aaagttaaga caggcatata ctccttgatcc tctaaaagag atgaggcggt  1140
acaatgatca accatgaaca ttaaagtgat acgtggaaca tgagaacaca aataattgtc  1200
actgaacat aaatacaaaa aggtttgtag taacttaccg gcctgcacat ggcctccaac    1260
ggcacgacct tggggatggt gagcccgcca ccttcagtca tgtcgacctc cacgccgtcg  1320
accctctccc agtcgaagca ctggatcagc gtgccagcca caacccccac tgtgcgcagc  1380
gccagcgtct cgccggggca cctccgcctc cccatcccga acggcatcaa gagattgccg  1440
tcgcacccgc cgtcctcgaa cctctccggc atgaacttct ccggctcctc ccacaccgcc  1500
gggtcacggt ggatgcgta cgcgttgatg agcaacatcg acccgcgcgg gatgttgtag   1560
ccgccgacct tgcagtcggc ggaggactcg tgcgggagga gcatcggcgc ggcggggtac  1620
aggcggagcg tctccctgac gatgcactgg aggtagccga ggcgagtcac gtcgtcggcg  1680
```

-continued

```
gtgatcaggc gagagttgcc gacggatgcg ggatcctcta gagtcgacct gcagaagtaa    1740
caccaaacaa cagggtgagc atcgacaaaa gaaacagtac caagcaaata aatagcgtat    1800
gaaggcaggg ctaaaaaaat ccacatatag ctgctgcata tgccatcatc caagtatatc    1860
aagatcaaaa taattataaa acatacttgt ttattataat agataggtac tcaaggttag    1920
agcatatgaa tagatgctgc atatgccatc atgtatatgc atcagtaaaa cccacatcaa    1980
catgtatacc tatcctagat cgatatttcc atccatctta aactcgtaac tatgaagatg    2040
tatgacacac acatacagtt ccaaaattaa taaatacacc aggtagtttg aaacagtatt    2100
ctactccgat ctagaacgaa tgaacgaccg cccaaccaca ccacatcatc acaaccaagc    2160
gaacaaaaag catctctgta tatgcatcag taaaacccgc atcaacatgt ataccta tcc   2220
tagatcgata tttccatcca tcatcttcaa ttcgtaacta tgaatatgta tggcacacac    2280
atacagatcc aaaattaata aatccaccag gtagtttgaa acagaattct actccgatct    2340
agaacgaccg cccaaccaga ccacatcatc acaaccaaga caaaaaaag catgaaagaa     2400
tgacccgaca aacaagtgca cggcatatat tgaaataaag gaaaagggca aaccaaaccc    2460
catgcaacga aacaaaaaaa atcatgaaat cgatcccgtc tgcggaacgg ctagagccat    2520
cccaggattc cccaaagaga aacactggca agttagcaat cagaacgtgt ctgacgtaca    2580
ggtcgcatcc gtgtacgaac gctagcagca cggatctaac acaaacacgg atctaacaca    2640
aacatgaaca gaagtagaac taccgggccc taaccatgga ccggaacgcc gatctagaga    2700
aggtagagag gggggggggg ggaggacgag cggcgtacct tgaagcggag gtgccgacgg    2760
gtggatttgg gggagatctg gttgtgtgtg tgtgcgctcc gaacaacacg aggttgggga    2820
aagagggtgt ggagggggtg tctatttatt acggcgggcg aggaagggaa agcgaaggag    2880
cggtgggaaa ggatccccc gtagctgccg gtgccgtgag aggaggagga ggccgcctgc     2940
cgtgccggct cacgtctgcc gctccgccac gcaatttctg gatgccgaca gcggagcaag    3000
tccaacggtg gagcggaact ctcgagaggg gtccagaggc agcgacagag atgccgtgcc    3060
gtctgcttcg cttggcccga cgcgacgctg ctggttcgct ggtggtgtc cgttagactc     3120
gtcgacggcg tttaacaggc tggcattatc tactcgaaac aagaaaaatg tttccttagt    3180
ttttttaatt tcttaaaggg tatttgttta attttaagtt actttatttt attctatttt    3240
atatctaaat tattaaataa aaaaactaaa atagagtttt agttttctta atttagaggc    3300
taaaatagaa taaaatagat gtactaaaaa aattagtcta taaaaaccat taaccctaaa    3360
ccctaaatgg atgtactaat aaaatggatg aagtattata taggtgaagc tatttgcaaa    3420
aaaaaaggag aacacatgca cactaaaaag ataaaactgt agagtcctgt tgtcaaaata    3480
ctcaattgtc ctttagacca tgtctaactg ttcatttata tgattctcta aaacactgat    3540
attattgtag tactatagat tatattattc gtagagtaaa gtttaaatat atgtataaag    3600
atagataaac tgcacttcaa acaagtgtga caaaaaaaat atgtggtaat ttttttataac   3660
ttagacatgc aatgctcatt atctctagag aggggcacga ccgggtcacg ctgcac        3716

SEQ ID NO: 17         moltype = DNA   length = 1987
FEATURE               Location/Qualifiers
source                1..1987
                      mol_type = other DNA
                      organism = synthetic construct
SEQUENCE: 17
gatctagtaa catagatgac accgcgcgcg ataatttatc ctagtttgcg cgctatattt      60
tgttttctat cgcgtattaa atgtataatt gcgggactct aatcataaaa acccatctca    120
taaataacgt catgcattac atgttaatta ttacatgctt aacgtaattc aacagaaatt    180
atatgataat catcgcaaga ccggcaacag gattcaatct taagaaactt tattgccaaa    240
tgtttgaacg atctcagctg tgccccagtt tgctaggcag gtcgcagtac ctggccacag    300
ccatcgcgtg ctgctccacg taggtctctt tgtcggcctc cttgattctt tccagtctcc    360
tgtccacgaa gtagaagccg ggcatcttga ggttcttagc gggtttcttg gatctgtatg    420
tggtcttgag ggagcagtgc aggtagcccc cgcccacgag cttcagggcc atctggctat    480
ggcctctcag gccgctgtca gcggggtaca gcatctcggt gctggcctcc cagccgagtg    540
ttttcttctg catcacaggg ccgttggatg ggaagttgac cccgttgatc ttgacgttgt    600
agatgaggca gccgttctgg aggctggtgt cctgggtagc ggtcagcagc ccccgctctt    660
cgtatgtggt gatcctctcc catgtgaagc cctcagggaa ggactgctta agaagtcgg     720
ggatgccctg ggtgtggttg ataaaggttt tgctgccgta catgaagctg gtagccagga    780
tgtcgaaggc gaagggggaga gggccgccct cgaccacctt gatcttcatg gtctgggtgc   840
cctcgtaggg cttgccttcg ccctcggatg tgcacttgaa gtggtggtcg ttcacggtgc    900
cctccatgta gagtttcatg tgcatgttct cggtgatcac cacgctatcc tcacccactg    960
cggaagcgtt gcatgcaaca atagcaagga gagcaaatac gaaaatgatc ttcattttgt    1020
taggattcta ctactatgct tcaactataa tgtttgaatt gtgtgaagga tgaggagggt    1080
tttcattatg cttgtctatt tatagatgtt tccctatcgg ttgctttaga gtgttagttt    1140
tgcttgatgc tatattagga tctaagtgag tcatattatt tggatattct gttaggtgca    1200
cctaaaaatg ttctttgata tcatcatcaa agtaactttt atgcccatca tatatacatg    1260
atggtgagca aaaaataat gacatgactc atcgctcact ttatgtgtca atgtgataag     1320
gattgcaact tttgaaacta agtttgttat gttttgtaag ctattatttt gataatgcac    1380
tacacgtgga actttacgac tgtgtgggtt tatgctcttt gaattatata atttcagtaa    1440
gaaaaaaaat tatagtatgt tcaatggttt tcattgttcc attaatactc ttgtgaaaac    1500
ttgtttgtga tacgaaataa gttaatgcaa taactttaa attaactttg cagagcttta    1560
caataactca ccaacttact ctaattgtgg ttggggattg atttaattca tacttttata    1620
gaccaaattg atattgtgtt gctaaataaa aattatagtg gtgttgctac acctacacag    1680
acacagaagg aatcctgata tcatcagcta tctactgctt cctccacatg gactcaagaa    1740
gcagaagcaa aaagaagaa ggcatttgct ccaacaaagt tttccggtga aaggcaacac     1800
attgttctga acttcctggc atgtattatg tgaatctagc aaattaacca acattgaca     1860
caatgcgaca ccttgtaatg tagccgtgcc gagaattgta tatctcactt accattgtat    1920
atcacacgtg ccgagaatag gagattgatt tttgccaacc aaaacgctct aggcagacca    1980
attgggc                                                              1987

SEQ ID NO: 18         moltype = DNA   length = 30
FEATURE               Location/Qualifiers
```

```
source                  1..30
                        mol_type = other DNA
                        organism = synthetic construct
SEQUENCE: 18
ctgcaggccc gggcagcgct gaagaacttc                                          30

SEQ ID NO: 19           moltype = DNA   length = 30
FEATURE                 Location/Qualifiers
source                  1..30
                        mol_type = other DNA
                        organism = synthetic construct
SEQUENCE: 19
gttaacgaca cctgtctccg gattaattaa                                          30

SEQ ID NO: 20           moltype = DNA   length = 60
FEATURE                 Location/Qualifiers
source                  1..60
                        mol_type = other DNA
                        organism = synthetic construct
SEQUENCE: 20
tgtacacagt ctttcaccag gacggttgta tcggttcagc agtcgcgatc gcatgcgcat         60

SEQ ID NO: 21           moltype = DNA   length = 27
FEATURE                 Location/Qualifiers
source                  1..27
                        mol_type = other DNA
                        organism = synthetic construct
SEQUENCE: 21
atttaaattt cgaaacgcgt cggaccg                                             27

SEQ ID NO: 22           moltype = DNA   length = 57
FEATURE                 Location/Qualifiers
source                  1..57
                        mol_type = other DNA
                        organism = synthetic construct
SEQUENCE: 22
cctaggcacg tgtacgtatt ttttaccagg tgaactccaa gtcctggacc cttttt            57

SEQ ID NO: 23           moltype = DNA   length = 2190
FEATURE                 Location/Qualifiers
misc_feature            1..2190
                        note = rice
source                  1..2190
                        mol_type = other DNA
                        organism = synthetic construct
SEQUENCE: 23
ccatggtggg tggtggcggc ggcggcggcg gcgagggttt ctgggtttgg gcgagaggga         60
gagaggggtg gagagtgtgg gggtgtgggt gttttgtccg cgcgcggtga cgcagcgtga        120
ggcgatgtgt ggctcggatg ggatcgtgtg gggccacgtc acagtgggcc ccatatgtcg        180
gtgggatagg atgacacaca gccacgtcgg ggtcgatctg ggcccgcgtg tcagtcgatt        240
ggatgaggat gacaggtggg tcagtcccaa taacggtgg agggtacaga acccgataaa        300
aaatcgatct caaagtcgga tgcggatgca accgcgagac ctagcagtct agcacccgca        360
cccgcacccg cacaaacgca gcgcaagatg agcagtggcg gcgagaagtc cggctcgggc        420
ggcggcggcg gtggcggcgg cggcggggcg gtgaagacgc cctccgactt cctcaagtcc        480
atcaggggc gccccgtcgt cgtcaagctc aactccggcg tcgactaccg cggtaaccec        540
ctgctcaatt ccctcccccct ttttgcctca accctagacc cgcctcccga aaaccctagc        600
acgagacgaa tgcgatgttt gttgtacccc gtatctcttt ctccttaatt ggaactctgc        660
gtttcttttc gttaattagt gggggaagg aaaggcgtgg actctgtagg attttctttt        720
cgatttgatg accaagggag atacttattt tagtgctgtt taagatcctg ctagtgcccg        780
gtgtagctag gccatttgag aagcagataa ccgtgttttt ctgtaggacc ttctctaatc        840
ttgagctatt ttgatattct aattacttat ggttaaaccc tagaacctca gtatgtttta        900
acttagtaag agattgctac agtatttta tttgtaggaa caacattgta ggtggttatc        960
atgctactga ctgtcttgtg tagagcccte ctatcattaa ggggcttta tgtttactaa       1020
tagttagttt tagtacccat ttttctgtga gctactaaaa agaatatttc caattcaacc       1080
tatggtaatt taaagtactt tatgctgtat gtccatttac tgaggattat gattaatatt       1140
taagagggag gacatctgtg cttaaggttt gcattgcaat atttgataga tttatgctaa       1200
acaaggtaa ttgtgcatgc ttgagataga aagggatttc ccttctttgg gtttgataat       1260
aaggggttgg cattccatga tcaggagcat agtgcattta tattttataa tgtggctatg       1320
tgtatgcagt tctcaatttc acattggcgg tacacccatg atatatttaa ttgttaccca       1380
gaaccatata atagcctaat aagagcatat ggtattccat tgattgggc cttcggaagt       1440
gtacctgtgt atgtaactat gcatataagg tttactttct ggtagttctt tcttctcctc       1500
atcacttaag acatctggat cgctgttatc aagtcgtaga ctagtcataa cgtcagtcaa       1560
gtcagacgac tagagggcta cgactcgacc aaatagcaag tcgcacaatt agtcgtagat       1620
tagtcatagc aaatcatcat ttcaccatgc taattggctt attgtgttta gtactttaaa       1680
tttatttctt gttaacttat tgtcttgctg gctactccat aaaccgtagt ttataatact       1740
atatatagtg cttagtacaa tagaatagta ctagagacta tatagtgcat ccattgtttt       1800
cacacgacca aatcatggac tagtcgtgga ctagattttg aatggaacag ttttaccaga       1860
aatacacttg ttcttttttt ttctgaatag tgttgaatca gtagctgcaa tgcatagctt       1920
gtgcaataaa atcattatat actatcacca atttcatgga atcttactta ttggaaattt       1980
```

```
gtaacaaatc tatttatcc cctgagttac cgtgttggtc taaaatcaac tcgcatgtga    2040
gacaagatga agaggaccat gaagattgcc tctttcattt attcatttgc tgactgcttg    2100
caatgccact ataaacctaa tcggatgact ggttgtcatg tctccgctaa ctagagagaa    2160
agggggagga gtgaagactt tacgtgtaca                                     2190

SEQ ID NO: 24          moltype = DNA   length = 330
FEATURE                Location/Qualifiers
misc_feature           1..330
                       note = rice
source                 1..330
                       mol_type = other DNA
                       organism = synthetic construct
SEQUENCE: 24
tccggattaa ttaagacaaa tttgtttgtc agatcaaatt tttaagcaaa acataagaaa    60
cagcacaaaa gggtatagca gaagcaaaat ttggacacaa tgattaggga tcacttattc    120
attatagttc ttccatgctg ctctaccaca gcaaaacgtt tcagacacca tcaaaccaga    180
cttaaggata cacattacag gtaaaatagta cacaatgaaa cggacacga ccaaggacca     240
gaccagacaa ccatagctcc attggggaag acaaataggc agacttgtga accctagaac    300
agcagcagct ctatggctga ggacggtacc                                     330

SEQ ID NO: 25          moltype = DNA   length = 6486
FEATURE                Location/Qualifiers
source                 1..6486
                       mol_type = other DNA
                       organism = synthetic construct
SEQUENCE: 25
ctgcaggccc gggcagcgct gaagaacttc cctaggcacg tgtacgtatt ttttaccagg    60
tgaactccaa gtcctggacc cttttttaag cttagattgt cgtttcccgc cttcagttta    120
aactatcagt gtttgacagg atatattggc gggtaaacct aagagaaaag agcgtttatt    180
agaataacgg atatttaaaa gggcgtgaaa aggtttatcg gttcgtccat ttgtatgtgc    240
atgccaacca cagggttccc ctcgggatca aagtactttg atccaacccc tccgctgcta    300
tagtgcagtc ggcttctgac gttcagtgca gccgtcttct gaaaacgaca tgtcgcacaa    360
gtcctaagtt acgcgacagg ctgccgcccct gccctttttcc tggcgttttc ttgtcgcgtg    420
ttttagtcgc ataaagtaga atacttgcga ctagaaccgg agacattacg ccatgaacaa    480
gagcgccgcc gctggcctgc tgggctatgc ccgcgtcagc accgacgacc aggacttgac    540
caaccaacgg gccgaactgc acgcggccgg ctgcaccaag ctgttttccg agaagatcac    600
cggcaccagg cgcgaccgcc cggagctggc caggatgctt gaccacctac gccctggcga    660
cgttgtgaca gtgaccaggc tagaccgcct ggcccgcagc cccgcgacc tactggacat    720
tgccgagcgc atccaggagg ccggcgcggg cctgcgtagc ctggcagagc cgtgggccga    780
caccaccacg ccggccggcc gcatggtgtt gaccgtgttc gccggcattg ccgagttcga    840
gcgttcccta atcatcgacc gcacccgag cgggcgcgag gccgcaagg cccgaggcgt     900
gaagtttggc ccccgcccta ccctcacccc ggcacagatc gcgcacgccc gcgagctgat    960
cgaccaggaa ggccgcactg tgaaagaggc ggctgcactg cttggcgtgc atcgctcgac    1020
cctgtaccgc gcacttgagc gcagcgagga agtgacgccc accgaggcca ggcggcgcgg    1080
tgccttccgt gaggacgcat tgaccgaggc cgacgccctg gcggccgccg agaatgaacg    1140
ccaagaggaa caagcatgaa accgcaccag gacgccagg acgaaccgtt tttcattacc    1200
gaagatcg aggcggagat gatcgcggcc gggtacgtgt tcgagccgcg cgcgcacgtc     1260
tcaaccgtgc ggctgcatga atcctggcc ggtttgtctg atgccaagct ggcggcctga     1320
ccggccagct tggccgctga agaaaccgag cgccgccgtc taaaaggtg atgtgtattt     1380
gagtaaaaca gcttgcgtca tgcggtcgct gcgtatatga tgcgatgagt aaataaacaa    1440
atacgcaagg gaacgcatg aaggttatcg ctgtacttaa ccagaaaggc gggtcaggca     1500
agacgaccat cgcaacccat ctagcccgcg ccctgcaact cgccgggccc gatgttctgt    1560
tagtcgattc cgatccccag gcagtgcccc gcgattgggc ggccgtgcgg gaagatcaac    1620
cgctaaccgt tgtcggcatc gaccgcccga cgattgaccg cgacgtgaag gccatcggcc    1680
ggcgcacttt cgtagtgatc gacggagcgc cccaggcgcg gcatgc ggtgtccgcaa       1740
tcaaggcagc cgacttcgtg ctgattccgg tgcagccaag cccttacgac atatgggcca    1800
ccgccgacct ggtggagctg gttaagcagc gcattgaggt cacggatgga aggctacaag    1860
cggcctttgt cgtgtcgcgg gcgatcaag gcacgcgcat cggcggtgag gttgccgagg    1920
cgctggccgg gtacgagctg cccattcttg agtccgtat cacgcagcgc gtgagctacc    1980
caggcactgc cgccgccggc acaaccgttc ttgaatcaga acccgagggc gacgctgccc    2040
gcgaggtcca ggcgctggcc gctgaaatta atcaaaact catttgagtt aatgaggtaa    2100
agagaaaatg agcaaaagca caaacacgct aagtgccggc cgtccgagcg cacgcagcag    2160
caaggctgca acgttggcca gcctggcaga cacgccagcc atgaagcggg tcaactttca    2220
gttgccggcg gaggatcaca ccaagctgaa gatgtacgcg gtacgccaag gcaagaccat    2280
taccgagctg ctatctgaat acatcgcgca gctaccagag taaatgagca aatgaataaa    2340
tgagtagatg aattttagcg gctaaaggag cggcatgga aaatcaagaa caaccaggca    2400
ccgacgccgg gaatgcccc atgtgtggag gaacgggcgg ttggcaggc gtaagcggct     2460
gggttgtctg ccggccctgc aatggcactg gaacccccaa gcccgaggaa tcggcgtgac    2520
ggtcgcaaac catccggccc ggtacaaatc ggcgcggcgc tgggtgatga cctggtggag    2580
aagttgaagg ccgcgcaggc cgcccagcgg caacgcatcg aggcagaagc acgccccggt    2640
gaatcgtggc aagcggccgc tgatcgaatc cgcaaagaat cccggcaacc gccggcagcc    2700
ggtgcgccgt cgattaggaa gccgcccaag ggcgacgagc aaccagattt tttcgttccg    2760
atgctctatg acgtgggcac ccgcgatagt gcagcatca tggacgtggc cgttttccgt    2820
ctgtcgaagc gtgaccgacg agctggcgag gtgatccgct acgagcttcc agacgggcac    2880
gtagaggttt ccgcagggcc ggccggcatg ccagtgtgt gggattacga cctggtactg    2940
atggcggttt cccatctaac cgaatccatg aaccgatacc gggaagggaa gggagacaag    3000
cccgccgcgc tgttccgtcc acacgttgcg gacgtactca agttctgccg gcgagccgat    3060
gcggaaaagc agaagacgg cctggtagaa acctgcattc ggttaaacac cacgcacgtt    3120
gccatgcagc gtacgaagaa ggccaagaac ggccgcctg tgacgtatc cgagggtgaa    3180
```

```
gccttgatta gccgctacaa gatcgtaaag agcgaaaccg ggcggccgga gtacatcgag   3240
atcgagctag ctgattggat gtaccgcgag atcacagaag gcaagaaccc ggacgtgctg   3300
acggttcacc ccgattactt tttgatcgat cccggcatcg gccgttttct ctaccgcctg   3360
gcacgccgcg ccgcaggcaa ggcagaagcc agatggttgt tcaagacgat ctacgaacgc   3420
agtggcagcg ccggagagtt caagaagttc tgtttcaccg tgcgcaagct gatcgggtca   3480
aatgacctgc cggagtacga tttgaaggag gaggcgggc aggctggccc gatcctagtc   3540
atgcgctacc gcaacctgat cgagggcgaa gcatccgccg gttcctaatg tacgagcag    3600
atgctagggc aaattgccct agcaggggaa aaggtcgaa aaggtctctt tcctgtggat    3660
agcacgtaca ttgggaaccc aaagccgtac atttgggaac ggaacccgta cattgggaac   3720
ccaaagccgt acattgggaa ccggtcacac atgtaagtga ctgatataaa agagaaaaaa   3780
ggcgattttt ccgcctaaaa ctctttaaaa cttattaaaa ctcttaaaac ccgcctggcc   3840
tgtgcataac tgtctggcca gcgcacagcc gaagagctgc aaaaagcgcc tacccttcgg   3900
tcgctgcgct ccctacgccc cgccgcttcg cgtcggccta tcgcggccgc tggccgctca   3960
aaaatggctg gcctacgcc aggcaatcta ccagggcgg gacaagccgc gccgtcgcca    4020
ctcgaccgcc ggcgcccaca tcaaggcacc ctgcctcgcg cgtttcggtg atgacggtga   4080
aaacctctga cacatgcagc tcccggagac ggtcacagct tgtctgtaag cggatgccgg   4140
gagcagacaa gcccgtcagg gcgcgtcagc gggtgttggc gggtgtcggg gcgcagccat   4200
gacccagtca cgtagcgata gcggagtgta tactggctta actatgcggc atcagagcag   4260
attgtactga gagtgcacca tatgcggtgt gaaataccgc acagatgcgt aaggagaaaa   4320
taccgcatca ggcgctcttc cgcttcctcg ctcactgact cgctgcgctc ggtcgttcgg   4380
ctgcggcgag cggtatcagc tcactcaaag gcggtaatac ggttatccac agaatcaggg   4440
gataacgcag gaaagaacat gtgagcaaaa ggccagcaaa aggccaggaa ccgtaaaaag   4500
gccgcgttgc tggcgttttt ccataggctc cgcccccctg acgagcatca caaaaatcga   4560
cgctcaagtc agaggtggcg aaacccgaca ggactataaa gataccaggc gtttccccct   4620
ggaagctccc tcgtgcgctc tcctgttccg accctgccgc ttaccggata cctgtccgcc   4680
tttctccctt cgggaagcgt ggcgctttct catgctcgac gctgtaggta tctcagttcg   4740
gtgtaggtcg ttcgctccaa gctgggctgt gtgcacgaac ccccgttca gcccgaccgc    4800
tgcgccttat ccggtaacta tcgtcttgag tccaacccgg taagacacga cttatcgcca   4860
ctggcagcag ccactggtaa caggattagc agagcgaggt atgtaggcgg tgctacagag   4920
ttcttgaagt ggtggcctaa ctacggctac actagaagga cagtatttgg tatctgcgct   4980
ctgctgaagc cagttacctt cggaaaaaga gttggtagct cttgatccgg caaacaaacc   5040
accgctggta gcggtggttt ttttgtttgc aagcagcaga ttacgcgcag aaaaaaagga   5100
tctcaagaag atcctttgat cttttctacg ggtctgacg ctcagtggaa cgaaaactca    5160
cgttaaggga ttttggtcat gcattctagg tactaaaaca attcatccag taaaatataa   5220
tatttttattt tctcccaatc aggcttgatc cccagtaagt caaaaaatag ctcgacatac   5280
tgttcttccc cgatatcctc cctgatcgac cggacgcaga aggcaatgtc ataccacttg   5340
tccgccctgc cgcttctccc aagatcaata agccactta ctttgccatc tttcacaaag    5400
atgttgctgt ctcccaggtc gccgtgggaa aagacaagtt cctcttcggg cttttccgtc   5460
tttaaaaaat catacagctc gcgcggatct ttaaatggag tgtcttcttc ccagttttcg   5520
caatccacat cggccagatc gttattcagt aagtaatcca attcggctaa gcggctgtct   5580
aagctattcg tatagggaca atccgatatg tcgatggagt gaaagagcct gatgcactcc   5640
gcatacagct cgataatctt ttcagggctt tgttcatctt catactcttc cgagcaaagg   5700
acgccatcgg cctcactcat gagcagattg ttccagccat catgccgttc aaagtgcagg   5760
acctttggaa caggcagctt tccttccagc catagcatca tgtcctttc ccgttccaca    5820
tcataggtgg tccctttata ccggctgtcc gtcattttta aatataggtt ttcatttct    5880
cccaccagct tatataccttt agcaggagac attccttccg tatcttttac gcagcggtat   5940
tttcgatca gttttttcaa ttccggtgat atttctcattt tagccattta ttatttcctt   6000
cctcttttct acagtattta aagataccccc aagaagctaa ttataacaag acgaactcca   6060
attcactgtt ccttgcattc taaaaacctta aataccagaa aacagctttt tcaaagttgt   6120
tttcaaagtt ggcgtataac atagtatcga cggaccgat tttgaaaccg cggtgatcac    6180
aggcagcaac gctctgtcat cgttacaatc aacatgctac cctccgcgag atcatccgtg   6240
tttcaaaccc ggcagcttag ttgccgttct tccgaatagc atcggtaaca tgagcaaagt   6300
ctgccgcctt acaacggctc tcccgctgac gccgtcccgg actgatgggc tgcctgtatc   6360
gagtggtgat tttgtgccga gctgccggtc ggggagctgt tggctggctg gtggcaggat   6420
atattgtggt gtaaacaaat tgacgcttag acaacttaat aacacattgc ggacgttttt   6480
aatgta                                                              6486
SEQ ID NO: 26         moltype = DNA   length = 6378
FEATURE               Location/Qualifiers
source                1..6378
                      mol_type = other DNA
                      organism = synthetic construct
SEQUENCE: 26
ctgcaggccc gggcagcgct gaagaacttc cctaggcacg tgtacgtatt ttttaccagg    60
tgaactccaa gtcctggacc ctttttttaag cttgtaaacc taagagaaaa gagcgtttat   120
tagaataacg gatatttaaa agggcgtgaa aaggtttatc cgttcgtcca tttgtatgtg   180
catgccaacc acagggttcc cctcgggatc aaagtacttt gatccaaccc ctccgctgct   240
atagtgcagt cggcttctga cgttcagtgc agccgtcttc tgaaaacgac atgtcgcaca   300
agtcctaagt tacgcgacag gctgccgccc tgcccttttc ctggcgtttt cttgtcgcgt   360
gttttagtcg cataaagtag aatacttgcg actagaaccg gagacattac gccatgaaca   420
agagcgccgc cgctggcctg ctgggctatg cccgcgtcag caccgacgac caggacttga   480
ccaaccaacg ggccgaactg cacgcggccg gctgcaccaa gctgttttcc gagaagatca   540
ccggcaccag gcgcgaccgc ccggagctgg ccaggatgct tgaccaccta cgccctggcg   600
acgttgtgac agtgaccagg ctagaccgcc tggcccgcag cacccgcgac ctactggaca   660
ttgccgagcg catccaggag gccggcgcgg gcctgcgtag cctggcagag ccgtgggccg   720
acaccaccac gccggccggc cgcatggtgt tgaccgtgtt cgccggcatt gccgagttcg   780
agcgttccct aatcatcgac cgcacccgga gcgggcgcga ggccgccaag gcccgaggcg   840
tgaagtttgg cccccgccct accctcaccc cggcacagat cgcgcacgcc cgcgagctga   900
tcgaccagga aggccgcacc gtgaaagagg cggctgcact gcttggcgtg catcgctcga   960
```

```
ccctgtaccg cgcacttgag cgcagcgagg aagtgacgcc caccgaggcc aggcggcgcg    1020
gtgccttccg tgaggacgca ttgaccgagg ccgacgccct ggcggccgcc gagaatgaac    1080
gccaagagga acaagcatga aaccgcacca ggacggccag gacgaaccgt ttttcattac    1140
cgaagagatc gaggcggaga tgatcgcggc cgggtacgtg ttcgagccgc ccgcgcacgt    1200
ctcaaccgtg cggctgcatg aaatcctggc cggtttgtct gatgccaagc tggcggcctg    1260
gccggccagc ttggccgctg aagaaaccga gcgccgccgt ctaaaaaggt gatgtgtatt    1320
tgagtaaaac agcttgcgtc atgcggtcgc tgcctatatg atgcgatgag taaataaaca    1380
aatacgcaag gggaacgcat gaaggttatc gctgtactta accagaaagg cgggtcaggc    1440
aagacgacca tcgcaaccca tctagccgc gccctgcaac tcgccgggc cgatgttctg      1500
ttagtcgatt ccgatcccca gggcagtgcc cgcgattggg cggccgtgcg ggaagatcaa    1560
ccgctaaccg ttgtcggcat cgaccgcccg acgattgacc gcgacgtgaa ggccatcggc    1620
cggcgcgact tcgtagtgat cgacggagcg ccccaggcgg cggacttggc tgtgtccgcg    1680
atcaaggcag ccgacttcgt gctgattccg gtgcagccaa gcccttacga catatgggcc    1740
accgccgacc tggtgggagct ggttaagcag cgcattgagg tcacgggatg aaggctacaa   1800
gcggcctttg tcgtgtcgcg ggcgatcaaa ggcacgcgca tcggcggtga ggttgccgag    1860
gcgctggccg ggtacgagct gcccattctt gagtccgta tcacgcagcg cgtgagctac     1920
ccaggcactg ccgccgccgg cacaaccgtt cttgaatcag aacccgaggg cgacgctgcc    1980
cgcgaggtcc aggcgctggc cgctgaaatt aaatcaaaac tcatttgagt taatgaggta    2040
aagagaaaat gagcaaaagc acaaacacgc taagtgccgg ccgtccgagc gcacgcagca    2100
gcaaggctgc aacgttggcc agcctggcag acacgccagc catgaagcgg gtcaactttc    2160
agttgccggc ggaggatcac accaagctga agatgtacgc ggtacgccaa ggcaagacca    2220
ttaccgagct gctatctgaa tacatcgcgc tgctaccaga gtaaatggc aaatgaataa     2280
atgagtagat gaattttagc ggctaaagga ggcggcatgg aaaatcaaga caaccaggc    2340
accgacgccg tggaatgccc catgtgtgga ggaacgggcg gttggccagg cgtaagcggc    2400
tgggttgtct gccggccctg caatggcact ggaaccccca gcccgaggga tcggcgtga    2460
cggtcgcaaa ccatccggcc cggtacaaat cggcgcggcg ctggtgatg acctggtgga    2520
gaagttgaag gccgcgcagg ccgcccagcg gcaacgcatc gaggcagaag cacgccccgg    2580
tgaatcgtgg caagcggccg ctgatcgaat ccgcaaagaa tcccggcaac cgccggcagc    2640
cggtgcgccg tcgattagga agccgcccaa gggcgacgag caaccagatt ttttcgttcc    2700
gatgctctat gacgtgggca cccgcgatag tcgcagcatc atggacgtgg ccgttttccg    2760
tctgtcgaag cgtgaccgac gagctggcga ggtgatccgc tacgagcttc cagacgggca    2820
cgtagaggtt tccgcagggc cggccggcat ggccagtgtg tgggattacg acctggtact    2880
gatggcggtt tcccatctaa ccgaatccat gaaccgatac cggaaggga agggagacaa    2940
gccggccgc gtgttccgtc cacacgttgc ggacgtactc aagttctgcc ggcgagccga    3000
tggcggaaag cagaaagacg acctggtaga aacctgcatt cggttaaaca ccacgcacgt   3060
tgccatgcag cgtacgaaga aggccaagaa cggccgcctg gtgacggtat ccagggtga   3120
agccttgatt agccgctaca agatcgtaaa gagcgaaacc gggcggccgg agtacatcga    3180
gatcgagcta gctgattgga tgtaccgcga gatcacagaa ggcaagaacc cggacgtgct    3240
gacggttcac cccgattact ttttgatcga tcccggcact ggcgttttc tctaccgcct    3300
ggcacgccgc gccgcaggca aggcagaagc cagatggttg ttcaagacga tctacgaacg    3360
cagtggcagc gccggagagt tcaagaagtt ctgtttcacc gtgcgcaagc tgatcgggtc    3420
aaaatgacctg ccggagtacg atttgaagga ggaggcgggg caggctggcc cgatcctagt    3480
catgcgctac cgcaacctga tcgagggcaa agcatccgcc ggttcctaat gtacggagca    3540
gatgctaggg caaattgccc tagcagggga aaaggtcga aaaggtctct ttcctgtgga    3600
tagcacgtac attgggaacc caagccgta cattgggaac cggaaccgt acattgggaa    3660
cccaaagccg tacattggga accggtcaca catgtaagtg actgatataa aagagaaaaa    3720
aggcgatttt tccgcctaaa actctttaaa acttattaaa actcttaaaa cccgcctggc    3780
ctgtgcataa ctgtctggcc agcgcacagc cgaagagctg caaaaagcgc ctacccttcg    3840
gtcgctcgc tccctacgcc ccgccgcttc gcgtcggcct atcgcggccg ctggccgctc    3900
aaaaatggct ggcctacggc caggcaatct accagggcgc ggacaagccg cgccgtcgcc    3960
actcgaccgc cggcgcccac atcaaggcac cctgcctcgc gcgtttcggt gatgacggtg    4020
aaaacctctg acacatgcag ctcccggaga cggtcacagc ttgtctgtaa gcggatgccg    4080
ggagcagaca agcccgtcag gcgcgtcag cgggtgttgg cgggtgtcgg ggcgcagcca    4140
tgacccagtc acgtagcgat agcggagtgt atactggctt aactatgcgg catcagagca    4200
gattgtactg agagtgcacc atatgcggtg tgaaataccg cacagatgcg taaggagaaa    4260
ataccgcatc aggcgctctt ccgcttcctc gctcactgac tcgctgcgct cggtcgttcg    4320
gctgcggcga gcggtatcag ctcactcaaa ggcggtaata cggttatcca cagaatcagg    4380
ggataacgca ggaaagaaca tgtgagcaaa aggccagcaa aaggccagga accgtaaaaa    4440
ggccgcgttg ctggcgtttt tccataggct ccgcccccct gacgagcatc acaaaaatcg    4500
acgctcaagt cagaggtggc gaaacccgac aggactataa agataccagg cgtttccccc    4560
tggaagctcc ctcgtgcgct ctcctgttcc gaccctgccg cttaccggat acctgtccgc    4620
ctttctccct tcgggaagcg tggcgctttc tcatagctca cgctgtaggt atctcagttc    4680
ggtgtaggtc gttcgctcca agctgggctg tgtgcacgaa ccccccgttc agcccgaccg    4740
ctgcgcctta tccggtaact atcgtcttga gtccaacccg gtaagacacg acttatcgcc    4800
actggcagca gccactggta acaggattag cagagcgagg tatgtaggcg gtgctacaga    4860
gttcttgaag tggtggccta actacggcta cactagaagg acagtatttg gtatctgcgc    4920
tctgctgaag ccagttacct tcggaaaaag agttggtagc tcttgatccg gcaaacaaac    4980
caccgctggt agcggtggtt tttttgtttg caagcagcag attacgcgca gaaaaaaagg    5040
atctcaagaa gatcctttga tcttttctac ggggtctgac gctcagtgga acgaaaactc    5100
acgttaaggg attttggtca tgcattctag gtactaaaac aattcatcca gtaaaatata    5160
atatttatt ttctcccaat caggcttgat ccccagtaag tcaaaaaata gctcgacata    5220
ctgttcttcc ccgatatcct ccctgatcga ccggacgcag aaggcaatgt cataccactt    5280
gtccgccctg ccgcttctcc caagatcaat aaagccactt actttgccat cttttcacaaa   5340
gatgttgctg tctcccaggt cgccgtggga aagacaagt tcctcttcgg gcttttccgg    5400
ctttaaaaaa tcatacagct cgcgcggatc tttaaatgga gtgtcttctt cccagttttc    5460
gcaatccaca tcggccagat cgttattcag taagtaatcc aattcggcta gcggctgtc    5520
taagctattc gtagggac aatccgatat gtcgatggag tgaaagagcc tgatgcactc    5580
cgcatacagc tcgataatct tttcagggct tgttcatct tcatactctt ccgagcaaag    5640
gacgccatcg gcctcactca tgagcagatt gctccagcca tcatgccgtt caaagtgcag    5700
```

```
gacctttgga acaggcagct ttccttccag ccatagcatc atgtcctttt cccgttccac   5760
atcataggtg gtcccttat accggctgtc cgtcatttt aaatataggt tttcatttc     5820
tcccaccagc ttatataccct tagcaggaga cattccttcc gtatctttta cgcagcggta  5880
ttttttcgatc agttttttca attccggtga tattctcatt ttagccattt attatttcct  5940
tcctcttttc tacagtattt aaagataccc caagaagcta attataacaa gacgaactcc   6000
aattcactgt tccttgcatt ctaaaacctt aaataccaga aaacagcttt ttcaaagttg   6060
ttttcaaagt tggcgtataa catagtatcg acggagccga ttttgaaacc gcggtgatca   6120
caggcagcaa cgctctgtca tcgttacaat caacatgcta ccctccgcga gatcatccgt   6180
gtttcaaacc cggcagctta gttgccgttc ttccgaatag catcggtaac atgagcaaag   6240
tctgccgcct tacaacggct ctcccgctga cgccgtcccg gactgatggg ctgcctgtat   6300
cgagtggtga ttttgtgccg agctgccggt cggggagctg ttggctggct ggtggcagga   6360
tatattgtgg tgtaaaca                                                6378

SEQ ID NO: 27           moltype = DNA   length = 6740
FEATURE                 Location/Qualifiers
source                  1..6740
                        mol_type = other DNA
                        organism = synthetic construct
SEQUENCE: 27
ctgcaggccc gggcagcgct gaagaacttc cctaggcacg tgtacgtatt ttttaccagg   60
tgaactccaa gtcctggacc ctttttaag cttagattgt cgtttcccgc cttcagttta   120
aactatcagt gtttgacagg atatattggc gggtaaacct aagagaaaag agcgtttatt   180
agaataacgg atatttaaaa gggcgtgaaa aggtttatcc gttcgtccat ttgtatgtgc   240
atgccaacca caggggttccc ctcgggatca aagtactttg atccaacccc tccgctgcta   300
tagtgcagtc ggcttctgac gttcagtgca gccgtcttct gaaaacgaca tgtcgcacaa   360
gtcctaagtt acgcgacagg ctgccgcccct gcccttttcc ttgcgttttc ttgtcgtcaa   420
ttttagtcgc ataaagtaga atacttgcga ctagaaccgg agacattacg ccatgaacaa   480
gagcgccgcc gctggcctgc tgggctatgc ccgcgtcagc accgacgacc aggacttgac   540
caaccaacgg gccgaactgc acgcggccgg ctgcaccaag ctgttttccg agaagatcac   600
cggcaccagg cgcgaccgcc cggagctggc caggatgctt gaccacctac gccctggcga   660
cgttgtgaca gtgaccaggc tagaccgcct ggcccgcagc acccgcgacc tactggacat   720
tgccgagcgc atccaggagg ccggcgcggg cctgcgtagc ctggcagagc cgtgggccga   780
caccaccacg ccggccggcc gcatggtgtt gaccgtgttc gccggcattg ccgagttcga   840
gcgttcccta atcatcgacc gcacccggag cgggcgcgag gccgccaagg ccccgaggcgt  900
gaagtttggc ccccgcccta ccctcacccc ggcacagatc gcgcacggcc gcgagctgat   960
cgaccaggaa ggccgcaccg tgaaagaggc ggctgcactg cttggcgtgc atcgctcgac   1020
cctgtaccgc gcacttgagc gcagcgagga agtgacgccc accgaggcca ggcggcgcgg   1080
tgccttccgt gaggacgcat tgaccgaggc cgacgccctg gcggccgccg agaatgaacg   1140
ccaagaggaa caagcatgaa accgcaccag gacggccagg acgaaccgtt tttcattacc   1200
gaagagatcg aggcggagat gatcgcggcc gggtacgtgt tcgagccgcc gcgcacgtc    1260
tcaaccgtgc ggctgcatga atcctggccc ggtttgtctg atgccaagct ggcggcctgg   1320
ccggccagct tggccgctga agaaaccgag cgccgccgtc taaaaggtg atgtgtattt    1380
gagtaaaaca gcttgcgtca tgcggtcgct gcgtatatga tgcgatgagt aaataaacaa   1440
atacgcaagg ggaacgcatg aaggttatcg ctgtacttaa ccagaaaggc gggtcaggca   1500
agacgaccat cgcaacccat ctagcccgcg ccctgcaact cgccggggcc gatgttctgt   1560
tagtcgattc cgatccccag ggcagtgccc gcgattgggc ggccgtgcgg gaagatcaac   1620
cgctaaccgt tgtcggcatc gaccgcccga cgattgacca ggcgtgaag gccatccgcc   1680
ggcgcgactt cgtagtgatc gacgagcgc cccaggcggc ggacttggct gtgtccgcga   1740
tcaaggcagc cgacttcgtg ctgattccgg tgcagcaag cccttacgac atatgggcca   1800
ccgccgacct ggtggagctg gttaagcagc gcattgaggt cacggatgga aggctacaag   1860
cggccttttgt cgtgtcgcgg gcgatcaaag gcacgcgcat cggcggtgag gttgccgagc   1920
cgctggccgg gtacgagctg cccattcttg agtcccgtat cacgcagcgc gtgagctacc   1980
caggcactgc cgccgccggc acaaccgttc ttgaatcaga acccgagggc gacgctgccc   2040
gcgaggtcca ggcgctggcc gctgaaatta aatcaaaact catttgagtt aatgaggtaa   2100
agagaaaatg agcaaaagca caaacacgct aagtgccggc cgtccgagcg cacgcagcag   2160
caaggctgca acgttggcca gcctggcaga cacgccagcc atgaagcggg tcaactttca   2220
gttgccggcg gaggatcaca ccaagctgaa gatgtacgcg gtacgccaag caagaccat    2280
taccgagctg ctatctgaat acatcgcgca gctaccagag taaatgagca aatgaataaa   2340
tgagtagatg aattttagcg gctaaaggag gcggcatgga aaatcaagaa caaccaggca   2400
ccgacgccgt ggaatgcccc atgtgtggag gaacgggcgg ttggccaggc gtaagcggct   2460
gggttgtctg ccgcccctgc aatggcactg gaacccccaa gcccgaggaa tcggcgtgac   2520
ggtcgcaaac catccggccc ggtacaaatc ggcgcggcgc tgggtgatga cctggtggag   2580
aagttgaagg ccgcgcaggc cgcccagcgg caacgcatcg aggcagaagc acgccccggt   2640
gaatcgtggc aagcggcgc tgatcgaatc cgcaaagaat cccggcaacc gccggcagcc   2700
ggtgcgccgt cgattaggaa gccgcccaag ggcgacgagc aaccagattt tttcgttccg   2760
atgctctatg acgtgggcac ccgcgatagt gcgacgatca tggacgtggc cgttttccgt   2820
ctgtcgaagc gtgaccgacg agctggcgag gtgatccgct acgagcttcc agacgggcac   2880
gtagaggttt ccgcagggcc ggccggcatg ccagtgtgt gggattacga cctggtactg   2940
gcggtttt atggcggtt cccatctaac cgaatccatg aaccgatacc gggaagggaa gggagacaag  3000
cccggccgcg tgttccgtcc acacgttgcg gacgtactca agttctgccg gcgagccgat   3060
ggcggaaagc agaaagacga cctggtagaa acctgcattc ggttaaacac cacgcacgtt   3120
gccatgcagc gtacgaagaa ggccaagaac ggccgcctgg tgacggtatc cgagggtgaa   3180
gccttgatta gccgctacaa gatcgtaaag agcgaaaccg gcggccgga gtacatcgag   3240
atcgagctag ctgattggat gtaccgcgag atcacagag tcaagaaccc gacgtgctga   3300
acggttcacc ccgattactt tttgatcgat cccggcatcg gccgttttct ctaccgcctg   3360
gcacgccgcg ccgcaggcaa ggcagaagcc agatggttgt tcaagacgat ctacgaacgc   3420
agtggcagcg ccggagagtt caagaagttc tgtttcaccg tgcgcaagct gatcgggtca   3480
aatgacctgc cggagtacga tttgaaggag gaggcggggc aggctggccc gatcctagtc   3540
atgcgctacc gcaacctgat cgagggcgaa gcatccgccg gttcctaatg tacggagcag   3600
```

```
atgctagggc aaattgccct agcaggggaa aaaggtcgaa aaggtctctt tcctgtggat   3660
agcacgtaca ttgggaaccc aaagccgtac attgggaacc ggaacccgta cattgggaac   3720
ccaaagccgt acattgggaa ccggtcacac atgtaagtga ctgatataaa agagaaaaaa   3780
ggcgattttt ccgcctaaaa ctctttaaaa cttattaaaa ctcttaaaac ccgcctggcc   3840
tgtgcataac tgtctggcca gcgcacagcc gaagagctgc aaaaagcgcc taccctccgg   3900
tcgctgcgct ccctacgccc cgccgcttcg cgtcggccta tcgcggccgc tggccgctca   3960
aaaatggctg gcctacggcc aggcaatcta ccagggcgcg gacaagccgc gccgtcgcca   4020
ctcgaccgcc ggcgcccaca tcaaggcacc ctgcctcgcg cgtttcggtg atgacggtga   4080
aaacctctga cacatgcagc tcccggagac ggtcacagct tgtctgtaag cggatgccgg   4140
gagcagacaa gcccgtcagg gcgcgtcagc gggtgttggc gggtgtcggg gcgcagccat   4200
gacccagtca cgtagcgata gcggagtgta tactggctta actatgcggc atcagagcag   4260
attgtactga gagtgcacca tatgcggtgt gaaataccgc acagatgcgt aaggagaaaa   4320
taccgcatca ggcgctcttc cgcttcctcg ctcactgact cgctgcgctc ggtcgttcgg   4380
ctgcggcgag cggtatcagc tcactcaaag gcggtaatac ggttatccac agaatcaggg   4440
gataacgcag gaaagaacat gtgagcaaaa ggccagcaaa aggccaggaa ccgtaaaaag   4500
gccgcgttgc tggcgttttt ccataggctc cgcccccctg acgagcatca caaaaatcga   4560
cgctcaagtc agaggtggcg aaacccgaca ggactataaa gataccaggc gtttccccct   4620
ggaagctccc tcgtgcgctc tcctgttccg accctgccgc ttaccggata cctgtccgcc   4680
tttctccctt cgggaagcgt ggcgctttct catagctcac gctgtaggta tctcagttcg   4740
gtgtaggtcg ttcgctccaa gctgggctgt gtgcacgaac cccccgttca gcccgaccgc   4800
tgcgccttat ccggtaacta tcgtcttgag tccaacccgg taagacacga cttatcgcca   4860
ctggcagcag ccactggtaa caggattagc agagcgaggt atgtaggcgg tgctacagag   4920
ttcttgaagt ggtggcctaa ctacggctac actagaagga cagtatttgg tatctgcgct   4980
ctgctgaagc cagttacctt cggaaaaaga gttggtagct cttgatccgg caaacaaacc   5040
accgctggta gcggtggttt ttttgtttgc aagcagcaga ttacgcgcag aaaaaaagga   5100
tctcaagaag atcctttgat cttttctacg ggtctgacg ctcagtggaa cgaaaactca   5160
cgttaaggga ttttggtcat gcattctagg tactaaaaca attcatccag taaaatataa   5220
tatttttattt tctcccaatc aggcttgatc cccagtaagt caaaaaatag ctcgacatac   5280
tgttcttccc cgatatcctc cctgatcgac cggacgcaga aggcaatgtc ataccacttg   5340
tccgccctgc cgcttctccc aagatcaata aagccactta ctttgccatc tttcacaaag   5400
atgttgctgt ctcccaggtc gccgtgggaa aagacaagtt cctcttcggg cttttccgtc   5460
tttaaaaaat catacagctc gcgcggatct taaatggag tgtcttcttc ccagttttcg   5520
caatccacat cggccagatc gttattcagt aagtaatcca attcggctaa gcggctgtct   5580
aagctattcg tatagggaca atccgatatg tcgatggcgt gaaagagcct gatgcactcc   5640
gcatacagct cgataatctt ttcagggctt tgttcatctt catactcttc cgagcaaagg   5700
acgccatcgg cctcactcat gagcagattg ctccagccat catgccgttc aaagtgcagg   5760
acctttggaa caggcagctt tccttccagc catagcatca tgtcctttc ccgttccaca   5820
tcataggtgg tccctttata ccggctgtcc gtcattttta aatataggtt ttcattttct   5880
cccaccagct tatatacctt agcaggagac attccttccg tatcttttac gcagcggtat   5940
ttttcgatca gttttttcaa ttccggtgat attctcattt tagccattta ttatttcctt   6000
cctctttttct acagtattta aagatacccc aagaagctaa ttataacaag acgaactcca   6060
attcactgtt ccttgcattc taaaacctta aataccagaa aacagctttt tcaaagttgt   6120
tttcaaagtt ggcgtataac atagtatcga cggagccgat tttgaaaccg ggtgatcac   6180
aggcagcaac gctctgtcat cgttacaatc aacatgctac cctccgcgag atcatccgtg   6240
tttcaaaccc ggcagcttag ttgccgttct tccgaatagc atcggtaaca tgagcaaagt   6300
ctgccgcctt acaacggctc tcccgctgac gccgtcccgg actgatgggc tgcctgtatc   6360
gagtggtgat tttgtgccga gctgccggtc ggggaggtgt tggctggtcg gtggcaggat   6420
atattgtggt gtaaacaaat tgacgcttag acaacttaat aacacattgc ggacgttttt   6480
aatgtatgct ccaccatgtt ggcaagctgc tctagccaat acgcaaaccg cctctccccg   6540
cgcgttggcc gattcattaa tgcagctggc acgacaggtt tcccgactgg aaagcgggca   6600
gtgagcgcaa cgcaattaat gtgagttagc tcactcatta ggcaccccag gctttacact   6660
ttatgcttcc ggctcgtatg ttgtgtggaa ttgtgagcgg ataacaattt cacacaggaa   6720
acagctatga ccatgattac                                               6740

SEQ ID NO: 28            moltype = DNA  length = 17
FEATURE                  Location/Qualifiers
source                   1..17
                         mol_type = other DNA
                         organism = synthetic construct
SEQUENCE: 28
aggtcgggtt tggggtt                                                   17

SEQ ID NO: 29            moltype = DNA  length = 18
FEATURE                  Location/Qualifiers
source                   1..18
                         mol_type = other DNA
                         organism = synthetic construct
SEQUENCE: 29
gatgttggca gcgtcgaa                                                  18

SEQ ID NO: 30            moltype = DNA  length = 22
FEATURE                  Location/Qualifiers
source                   1..22
                         mol_type = other DNA
                         organism = synthetic construct
SEQUENCE: 30
ccaaacttgt tgagtatgtc tt                                             22

SEQ ID NO: 31            moltype = DNA  length = 19
```

```
FEATURE              Location/Qualifiers
source               1..19
                     mol_type = other DNA
                     organism = synthetic construct
SEQUENCE: 31
cgatgcttta ttcgtgtct                                                 19

SEQ ID NO: 32        moltype = DNA   length = 19
FEATURE              Location/Qualifiers
source               1..19
                     mol_type = other DNA
                     organism = synthetic construct
SEQUENCE: 32
gtgtccgtta gactcgtcg                                                 19

SEQ ID NO: 33        moltype = DNA   length = 17
FEATURE              Location/Qualifiers
source               1..17
                     mol_type = other DNA
                     organism = synthetic construct
SEQUENCE: 33
ttggtcgtgt cccgttt                                                   17

SEQ ID NO: 34        moltype = DNA   length = 22
FEATURE              Location/Qualifiers
source               1..22
                     mol_type = other DNA
                     organism = synthetic construct
SEQUENCE: 34
gtgggtactc tttatctact gc                                             22

SEQ ID NO: 35        moltype = DNA   length = 19
FEATURE              Location/Qualifiers
source               1..19
                     mol_type = other DNA
                     organism = synthetic construct
SEQUENCE: 35
ccctgttgtt tggtgttac                                                 19

SEQ ID NO: 36        moltype = DNA   length = 18
FEATURE              Location/Qualifiers
source               1..18
                     mol_type = other DNA
                     organism = synthetic construct
SEQUENCE: 36
gcctccttga ttctttcc                                                  18

SEQ ID NO: 37        moltype = DNA   length = 20
FEATURE              Location/Qualifiers
source               1..20
                     mol_type = other DNA
                     organism = synthetic construct
SEQUENCE: 37
cttctgcttc ttgagtccat                                                20

SEQ ID NO: 38        moltype = DNA   length = 442
FEATURE              Location/Qualifiers
source               1..442
                     mol_type = other DNA
                     organism = synthetic construct
SEQUENCE: 38
ccgcggtgat cacaggcagc aacgctctgt catcgttaca atcaacatgc taccctccgc     60
gagatcatcc gtgtttcaaa cccggcagct tagttgccgt tcttccgaat agcatcggta    120
acatgagcaa agtctgccgc cttacaacgg ctctcccgct gacgccgtcc cggactgatg    180
ggctgcctgt atcgagtggt gattttgtgc cgagctgccg gtcggggagc tgttggctga    240
ctggtggcag gatatattgt ggtgtaaaca aattgacgct tagacaactt aataacacat    300
tgcggacgtt tttaatgtac tgcaggcccg ggcagcgctg aagaacttcc ctaggcacgt    360
gtacgtattt tttaccaggt gaactccaag tcctggaccc tttttttaagc ttagattgtc    420
gtttcccgcc ttcagtttaa ac                                            442

SEQ ID NO: 39        moltype = DNA   length = 455
FEATURE              Location/Qualifiers
source               1..455
                     mol_type = other DNA
                     organism = synthetic construct
SEQUENCE: 39
ccgcggtgat cacaggcagc aacgctctgt catcgttaca atcaacatgc taccctccgc     60
gagatcatcc gtgtttcaaa cccggcagct tagttgccgt tcttccgaat agcatcggta    120
acatgagcaa agtctgccgc cttacaacgg ctctcccgct gacgccgtcc cggactgatg    180
```

```
ggctgcctgt atcgagtggt gattttgtgc cgagctgccg gtcggggagc tgttggctgg 240
ctggtggcag gatatattgt ggtgtaaaca ctgcaggccc gggcagcgct gaagaacttc 300
cctaggcacg tgtacgtatt ttttaccagg tgaactccaa gtcctggacc cttttttaag 360
cttgtaaacc taagagaaaa gagcgtttat tagaataacg gatatttaaa agggcgtgaa 420
aaggtttatc cgttcgtcca tttgtatgtg catgc                             455

SEQ ID NO: 40           moltype = DNA  length = 696
FEATURE                 Location/Qualifiers
source                  1..696
                        mol_type = other DNA
                        organism = synthetic construct
SEQUENCE: 40
ccgcggtgat cacaggcagc aacgctctgt catcgttaca atcaacatgc taccctccgc 60
gagatcatcc gtgtttcaaa cccggcagct tagttgccgt tcttccgaat agcatcggta 120
acatgagcaa agtctgccgc cttacaacgg ctctcccgct gacgccgtcc cggactgatg 180
ggctgcctgt atcgagtggt gattttgtgc cgagctgccg gtcggggagc tgttggctgg 240
ctggtggcag gatatattgt ggtgtaaaca aattgacgct tagacaactt aataacacat 300
tgcggacgtt tttaatgtat gctccaccat gttggcaagc tgctctagcc aatacgcaaa 360
ccgcctctcc ccgcgcgttg gccgattcat taatgcagct ggcacgacag gtttcccgac 420
tggaaagcgg gcagtgagcg caacgcaatt aatgtgagtt agctcactca ttaggcaccc 480
caggctttac actttatgct tccggctcgt atgttgtgtg gaattgtgag cggataacaa 540
tttcacacag gaaacagcta tgaccatgat tacctgcagg cccgggcagc gctgaagaac 600
ttccctaggc acgtgtacgt attttttacc aggtgaactc caagtcctgg accctttttt 660
aagcttagat tgtcgtttcc cgccttcagt ttaaac                            696
```

INTELLIGENT GENETIC BREEDING AND SEED PRODUCTION SYSTEM FOR CROP CROSS BREEDING AND HYBRID SEED PRODUCTION, AND APPLICATION THEREOF

CROSS-REFERENCE TO RELATED APPLICATIONS

The present application is a continuation of PCT/CN2021/092017 filed on May 7, 2021, which claims priority to Chinese Patent Application No. 2020103792879, entitled "INTELLIGENT GENETIC BREEDING AND SEED PRODUCTION SYSTEM FOR CROP CROSS BREEDING AND HYBRID SEED PRODUCTION, AND APPLICATION THEREOF" filed on May 7, 2020, the entire contents of which are incorporated herein by reference in their entireties.

SEQUENCE LISTING

The present application is being filed along with a Sequence Listing in XML format. The Sequence Listing is provided as a file entitled 05_CNKNNZ02000_20230517_sequence_file.xml, created May 12, 2023, which is 236 KB in size. The information in the electronic format of the Sequence Listing is incorporated herein by reference in its entirety.

TECHNICAL FIELD

The present invention relates to the field of agricultural biotechnology, and specifically, to an intelligent genetic breeding and seed production system for crop cross breeding and hybrid seed production, and an application thereof.

BACKGROUND

Hybrid vigor is a phenomenon that the hybrid offspring surpass both parents in one or more traits, and is commonly found in the biological world. The utilization of crop hybrid vigor is an important means of increasing agricultural production, and the core of the industrialization of the utilization of crop hybrid vigor lies in the male sterility of the female parent or the male sterile line.

Taking rice as an example, China is the most successful country in the industrialization of hybrid rice in the world and is in the leading position in the research field of hybrid rice breeding and seed production. At present, the breeding and seed production methods of hybrid rice in China are mainly divided into "three-line method" and "two-line method", each of which has its own advantages and disadvantages. The "three-line method" has been applied to rice since the 1970s and its main principle is to use sterile lines, maintainer lines and restorer lines to make hybrids. The basic process is to use the maintainer line to self-breed the maintainer line, the sterile line to cross the maintainer line to reproduce the sterile line, and the restorer line to cross the sterile line to produce hybrid seeds. Since the male sterility of the sterile line in "three-line method" is caused by genetic interactions between the nucleus and the cytoplasm, there is a defect in the method that the fertility of the hybrid can be restored only after a restorer line having a specific restoring gene in the nucleus is hybridized with the sterile line, thereby producing hybrid rice seeds. Therefore, the utilization rate of germplasm resources with "three-line method" is low, and the homogenization of cytoplasm also has potential risk of plant diseases and insect pests. The principle of "two-line method" is to use photo-thermo-sensitive genic male sterile line and restorer line to make the hybrids. If the ambient temperature is higher than 23.5 degrees, the male of the sterile line will keep sterile in a specific period of rice development, and the hybrid can be successfully prepared with the restorer line; and if the ambient temperature is lower than 23.5 degrees, the male fertility of the male sterile line is restored to normal, and the male sterile line is self-bred and propagated. Therefore, the two-line method only needs a sterile line and a restorer line, thereby saving seed production cost. However, because the fertility conversion of PTGMS line with "two-line method" is affected by the light and temperature environment, it results in great environmental risk in the process of CMS line reproduction and hybrid seed production in this technology. At the same time, due to the special requirements on temperature, the production season and region are greatly limited.

The recessive genetic male sterility is different from "three-line" and "two-line", its male fertility is only controlled by a pair of recessive nuclear genes and is not affected by light and temperature environment; besides, because its gene is a very rare recessive mutation, and because the above-mentioned loci in genome of most varieties are wild-type dominant genes, thus, theoretically, almost any variety can be used as restorer line of recessive nuclear male sterility and hybridized with it to produce fertile offspring. The discovery of recessive genetic male sterility has a very long history. When it hybridizes with wild-type materials, the F1 generation is in a heterozygous state and fertile, and the F2 generation shows a segregation of fertility (segregation ratio is 3:1 in the case of single gene control). However, when the seeds (i.e., F2) are harvested through selfing of F1 generation, it is impossible to distinguish which part of the seeds will be fertile after developing into plants and which part will be sterile due to the identical appearance of the seeds. Therefore, it has long been limited by the inability to maintain the male sterility of its offspring on a large scale and cannot be used industrially. Therefore, it is necessary to develop a technology that can maintain and reproduce the recessive genic male sterile material and accompany it with commercial production, which is also the urgent need of the majority of breeders.

SUMMARY

It is an object of the present invention to provide a method for the maintenance and propagation of a recessive genic male sterile lines for industrialization.

To achieve this object, the present invention provides a GAT vector for mediating the regulation of male fertility of a plant recessive genic male sterile mutant (sterile line) and an application thereof. The present invention also provides a crop hybridization breeding and seed production technical system (GAT technical system) and an application thereof. GAT (Genetic Automation Technology) is a new breeding and seed production technology of the hybrid seeds, which can successfully use the recessive genic male sterile line. Its core idea is to use modern biotechnology to construct crop pollen fertility restoring gene, pollen abortion gene, herbicide-sensitive gene, screening marker gene and the like in a specific sequence and direction in close linkage on the GAT vector, which is introduced into the recessive genic male sterile line through high-throughput gene transformation technology to obtain a large number of transformation events. Due to the problems such as partial gene transfer, the inability of each transgenic element to function simultaneously, and transgene silencing, etc., during multi-gene transformation, transformation events that cannot screen and obtain all the desired traits occur frequently. In the present invention, after screening each functional element, 14 initial maintainer lines of which each element plays a normal function are screened and obtained from 563 conversion events, and the maintainer lines of the recessive genic male sterile line are created and used for the production of GAT sterile lines and hybrids, so that the maintenance and the reproduction of the recessive genic male sterile line are successfully realized, and the commercial utilization of the recessive genic male sterile line is further realized.

When the gene of the recessive genic male sterile mutant described in the present invention is in a recessive homozygous state, the plant is in a male sterile state; and when the gene is in a heterozygous or dominant homozygous state, the plant is in a male fertile state. The control genes of this recessive genic male sterile mutant may be a mutant gene of MS1, MS2, MS3, MS5, MS7, MS8, MS9, MS10, MS11, MS12, MS13, MS14, MS17, MS20, MS22, MS23, MS24, MS25, OsCYP704B2, MS27, MS28, MS29, MS30, MS31, MS32, MS33, MS34, MS36, MS37, MS38, MS43, MS45, MS48 and MS50 nucleotide sequence and the like. Preferably, it is a mutant of OsCYP704B2 (oscyp704b2), and correspondingly, its restoring gene is OsCYP704B2.

The present invention firstly provides an intelligent genetic breeding and seed production system for crop cross breeding seed production, called GAT system, and includes three lines of a plant recessive genic male sterile line, i.e., GAT sterile line, a recessive genic male sterile maintainer line, i.e., GAT maintainer line and a common restorer line; wherein the GAT maintainer line contains a GAT vector which includes five functional element expression cassettes: (1) a plant male fertility restoration genetic element expression cassette, used for restoring the male fertility of a recessive genic male sterile mutant; (2) a plant pollen abortion genetic element expression cassette, used for clearing GAT-containing pollen and maintaining a heterozygous state or a hemizygous state of the GAT maintainer line; (3) a gene transformation and maintainer line screening element expression cassette, used for gene transformation and impurity removal and purification for the GAT maintainer line; (4) a herbicide-sensitive element expression cassette, used for clearing pollen and seed escape of a herbicide-sensitive GAT maintainer line and impurity removal and purification for a GAT sterile line; (5) a seed screening element expression cassette, used for mechanical sorting of seeds; said five functional element expression cassettes are constructed on a final vector to obtain a GAT system vector.

In the above GAT system, the GAT vector is introduced into the GAT sterile line to create the GAT maintainer line, and the GAT vector exists in the genome of the GAT maintainer line in a single copy form.

In the above GAT system, the GAT sterile line is a sterile line controlled by a single recessive nuclear gene, and is male sterile when a gene locus is in a recessive homozygous state; and is male fertile when a gene locus is in a heterozygous state or a dominant homozygous state.

Further, in said GAT system, the GAT maintainer line is self-fertilized and fructified, and the obtained seeds are separated to obtain the GAT maintainer line and the GAT sterile line in a ratio of 1:1; the two seeds are separated by seed screening elements to realize self-propagation of GAT maintainer line; the GAT maintainer line pollinate GAT sterile line to make GAT sterile line bear and maintain male sterility in their progeny, thus realizing the propagation of recessive male genetic sterile line. The recessive genic male sterile seeds (GAT sterile lines) and the fertile seeds (GAT maintainer lines) can be separated on a large scale by seed screening, and the functions of a maintainer line screening element and a herbicide-sensitive element are supplemented for removing impurities and maintaining purity of the subsequent GAT maintainer line and the sterile line, thereby creatively solving the problems of large-scale reproduction and maintenance of the recessive genic male sterile line in the prior art and making the industrialization of the recessive genic male sterility possible.

The present invention provides a vector for intelligent genetic breeding and seed production of the crop, called GAT vector, which is obtained by constructing five functional element expression cassettes on the final vector by linking them by a linker, said five functional element expression cassettes are respectively:

(1) a plant male fertility restoration genetic element expression cassette, used for restoring the male fertility of a recessive genic male sterile mutant;
(2) a plant pollen abortion genetic element expression cassette, used for clearing GAT-containing pollen and maintaining a heterozygous state or a hemizygous state of the GAT maintainer line;
(3) a gene transformation and maintainer line screening element expression cassette, used for gene transformation and impurity removal and purification for the GAT maintainer line;
(4) a herbicide-sensitive element expression cassette, used for clearing pollen and seed escape of a herbicide-sensitive GAT maintainer line and impurity removal and purification for a GAT sterile line;
(5) a seed screening element expression cassette, used for mechanical sorting of seeds; said five functional element expression cassettes are constructed by linking the linker to obtain the GAT system vector.

In the GAT vector of the present invention, said (1) a plant male fertility restoration genetic element expression cassette is sequentially and functionally linked by a promoter, a male fertility restoration gene coding region and a terminator;

said male fertility restoration genes are MS1, MS2, MS3, MS5, MS7, MS8, MS9, MS10, MS11, MS12, MS13, MS14, MS17, MS20, MS22, MS23, MS24, MS25, OsCYP704B2, MS27, MS28, MS29, MS30, MS31, MS32, MS33, MS34, MS36, MS37, MS38, MS43, MS45, MS48, MS50, or a wild-type gene of the OsCYP704B2 gene, and preferably, the wild-type gene of the OsCYP704B2 gene.

Preferably, in (1) a plant male fertility restoration genetic element expression cassette described by the present invention, the promoter is a sequence of 1112 bp upstream of the initiation codon ATG of the rice OsCYP704B2 gene, the coding region is the coding region of the OsCYP704B2 gene, and the terminator is a 274 bp sequence downstream of the stop codon TGA of the OsCYP704B2 gene. The expression cassette serves to restore male fertility in the recessive homozygous mutant oscyp704b2 of the OsCYP704B2 gene.

The sequence of said (1) a plant male fertility restoration genetic element expression cassette is represented by SEQ ID NO. 6. is represented by SEQ ID NO. 6.

In the GAT vector of the present invention, said (2) a plant pollen abortion genetic element expression cassette is sequentially and functionally linked by a plant pollen specific promoter, an abortion gene coding region and a terminator; preferably the promoter is corn PG47 promoter, rice PCHF15, OsPC32 promoters, preferably the abortion gene is rice α-amylase gene OsAA, corn α-amylase gene Zm-AA1, barley α-amylase gene HvAA1, millet α-amylase gene SiAA, cytokinin oxidase, cysteine protease and gibberellin oxidase, and the terminator is corn IN2-1 or bacterial NosT terminator.

Preferably, the expression cassette Killer sequence of the plant pollen abortion genetic element expression cassette described in the present invention consisting of promoter PG47, Zm-AA1 coding region and terminator IN2-1 is represented by SEQ ID NO. 7; or the sequence of the plant pollen abortion genetic element expression cassette Killer 5400, consisting of promoter PG47, OsAA coding region and Nos terminator (NosT) is represented by SEQ ID NO. 8; or the sequence of the plant pollen abortion genetic element expression cassette Killer Hv, consisting of promoter OsPC32, barley α-amylase gene HvAA1 coding region and NosT, is represented by SEQ ID NO. 9.

The role of this element is to make the GAT element-containing pollen abortive, to maintain the heterozygous or hemizygous state of the GAT transformants or GAT maintainer lines and to prevent the GAT element from drifting.

In the GAT vector of the present invention, said (3) a gene transformation and maintainer line screening element expression cassette is sequentially and functionally linked by a promoter, a screening marker gene coding region and a terminator; preferably the promoter is any one of OsUbi promoter, Actin promoter or a 2180 bp sequence upstream of OsALS gene initiation codon ATG, preferably the screening marker gene coding region is any one of OsALSm1, OsALSm2, OsALSm3 sequence, glyphosate resistant gene EPSPSm sequence, glyphosate N-acetyltransferase sequence or glufosinate resistant gene Bar sequence; and the terminator is an OsUbiT terminator or a NosT terminator.

Preferably, the sequence of said gene transformation and maintainer line screening element expression cassette Marker2 consisting of ActinP, OsALSm1 and NosT is represented by SEQ ID NO. 10. Another sequence of gene transformation and maintainer line screening element expression cassette Marker2AAU consisting of OsALSP, OsALSm1 and OsUbiT is represented by SEQ ID NO. 11, or EPSPS expression cassette, the sequence of which is represented by SEQ ID NO. 12, or Bar expression cassette, the sequence of which is represented by SEQ ID NO. 13. The above expression cassettes serve for gene transformation screening for resistance markers and screening to distinguish GAT maintainer lines from sterile lines.

In the GAT vector of the present invention, said (4) a herbicide-sensitive element expression cassette is sequentially and functionally linked by a promoter, a herbicide-dominant sensitive element and a terminator, preferably the promoter is a ZmUbi promoter, the herbicide-dominant sensitive element is an RNAi structural sequence P450i of cytochrome p450 gene CYP81A6, and the terminator is a PinII terminator and a NosT terminator.

Preferably, the sequence of herbicide-sensitive element expression cassette Marker1 consisting of ZmUbiP, P450i and NosT is represented by SEQ ID NO. 14, or represented by SEQ ID NO. 15 (P450i-2) or represented by SEQ ID NO. 16 (P450i-3). This element serves to prevent drifting of the GAT element, mixing of GAT maintainer lines into other materials and for seed production of GAT sterile lines.

In the GAT vector of the present invention, said (5) a seed screening element expression cassette is sequentially and functionally linked by a promoter, a seed coat chromogenic gene and a terminator, preferably, the promoter is a seed specific promoter ZZ1 promoter, the seed coat chromogenic gene is crimson fluorescent protein FP635, red fluorescent protein RFP or green fluorescent protein GFP, and the terminator is OS-T28 terminator and NosT terminator.

Preferably, the sequence of the seed screening element expression cassette Marker3 ZFN consisting of seed screening element expression cassette Marker3 ZFN is represented by SEQ ID NO. 17. The role of this element is to screen and distinguish the seeds of the GAT maintainer lines from the GAT sterile lines or the GAT hybrids.

In the GAT vector of the present invention, the linker includes a multiple cloning site MCSI, the sequence thereof is represented by SEQ ID NO. 18; a multiple cloning site MCSII, the sequence thereof is represented by SEQ ID NO. 19; a multiple cloning site MCSIII, the sequence thereof is represented by SEQ ID NO. 20; a multiple cloning site MCSIV, the sequence thereof is represented by SEQ ID NO. 21; or a multiple cloning site MCSV, and the sequence thereof is represented by SEQ ID NO. 22.

Preferably, the final vector described in the present invention is pC0307, see FIG. 6, the sequence thereof is represented by SEQ ID NO. 25, or the final vector is pC0308, see FIG. 7, the sequence thereof is represented by SEQ ID NO. 26, or the final vector is pC0309, see FIG. 8, and the sequence thereof is represented by SEQ ID NO. 27.

Preferably, the GAT vector described in the present invention is pC1300-MMCK (FIG. 1), pC0308-MMCK (FIG. 2), pC0308-MMMaauCK5400 (FIG. 4A, nucleotide sequence is represented by SEQ ID NO. 1), pC0308-KhvM-MaauMCK5400 (FIG. 4B, nucleotide sequence is represented by SEQ ID NO. 2), pC0308-KhvMaauMCMK5400 (FIG. 4C, nucleotide sequence is represented by SEQ ID NO. 3), pC0309-KhvMaauMCMK5400 (FIG. 4D, nucleotide sequence is represented by SEQ ID NO. 4) and pC0307-KhvMaauMCMK5400 (FIG. 3, nucleotide sequence is represented by SEQ ID NO. 5).

The present invention provides a method for constructing a vector, the vector is obtained by constructing five functional element expression cassettes on the final vector by linking them by a linker, said five functional element expression cassettes are respectively:

(1) a plant male fertility restoration genetic element expression cassette, used for restoring the male fertility of a recessive genic male sterile mutant; the expression cassette is sequentially and functionally linked by a promoter, a male fertility restoration gene coding region and a terminator;

(2) a plant pollen abortion genetic element expression cassette, used for clearing GAT-containing pollen and maintaining a heterozygous state or a hemizygous state of the GAT maintainer line; the expression cassette is sequentially and functionally linked by a plant pollen specific promoter, an abortion gene coding region and a terminator;

(3) a gene transformation and maintainer line screening element expression cassette, used for gene transformation and impurity removal and purification for the GAT maintainer line; the expression cassette is sequentially and functionally linked by a promoter, a screening marker gene coding region and a terminator;

(4) a herbicide-sensitive element expression cassette, used for clearing pollen and seed escape of a herbicide-sensitive GAT maintainer line and impurity removal and purification for a GAT sterile line; the expression cassette is sequentially and functionally linked by a promoter, a herbicide-dominant sensitive element and a terminator;

(5) a seed screening element expression cassette, used for mechanical sorting of seeds; said five functional element expression cassettes are constructed by linking the linker to obtain the GAT system vector; the expression cassette is sequentially and functionally linked by a promoter, a seed coat chromogenic gene and a terminator.

In the above construction method, preferably, the linker includes: a multiple cloning site MCSI, the sequence thereof is represented by SEQ ID NO. 18; a multiple cloning site MCSII, the sequence thereof is represented by SEQ ID NO. 19; a multiple cloning site MCSIII, the sequence thereof is represented by SEQ ID NO. 20; a multiple cloning site MCSIV, the sequence thereof is represented by SEQ ID NO. 21; or a multiple cloning site MCSV, and the sequence thereof is represented by SEQ ID NO. 22.

In the above construction method, preferably, the final vector described in the present invention is pC0307, see FIG. 6, the sequence thereof is represented by SEQ ID NO. 25, or the final vector is pC0308, see FIG. 7, the sequence thereof is represented by SEQ ID NO. 26, or the final vector is pC0309, see FIG. 8, and the sequence thereof is represented by SEQ ID NO. 27.

The present invention provides the application of the intelligent genetic breeding and seed production system (GAT system) or the GAT vector in plant cross breeding and seed production.

The present invention provides the application of the intelligent genetic breeding and seed production system (GAT system) or the GAT vector in the production of non-transgenic hybrids.

The present invention provides the application of the intelligent genetic breeding and seed production system (GAT system) or the GAT vector in the maintenance and propagation of the plant recessive male genetic sterile line on a large scale.

The present invention provides an application of the intelligent genetic breeding and seed production system (GAT system) or the GAT vector in the production of new varieties of plants having high quality, high yield, wide adaptability and high resistance.

In the present invention, said plant includes rice, corn, wheat, barley, soybean, cotton, rape, sorghum, millet, oat, rye, highland barley, pepper, watermelon and the like.

Further, the present invention provides a method for maintaining male sterility and propagating a plant recessive genic male sterile material (GAT sterile material), namely a method for maintaining a male sterile gene in a recessive homozygous state, which includes the following steps: the intelligent genetic breeding and seed production system is adopted to introduce a GAT vector into a GAT sterile line with recessive homozygous genotype to create a GAT transformant containing only a single copy of the GAT vector, and the genotype of the GAT transformant is recessive homozygous/GAT–. Subject the GAT transformant pollinate GAT sterile lines, the genotype of the seeds obtained remain a recessive homozygous state, thus maintaining male sterility in the progeny of the GAT sterile line.

Specifically, ms represents a recessive genic male sterility mutant gene, and MS represents a wild-type gene, and a GAT element is introduced into a GAT sterile material (genotype: ms ms) to create a GAT transformant containing only a single copy of a GAT vector (genotype: ms ms/GAT–). Since the GAT vector contains a restoring gene element, male fertility can be restored. Both pollen and female gametes produced by the GAT transformants have two types: (ms GAT) and (ms–), in which the (ms GAT) type pollen will be aborted because it contains pollen abortion gene elements in GAT vector, so only (ms–) type pollen will survive. Therefore, when GAT transformants pollinate GAT sterile plants, the genotype of the obtained seeds is still in recessive homozygous state (ms ms), which can keep the male sterility of the progeny of GAT sterile plants. Because the genetic background of GAT sterile plants and GAT transformants is completely the same except for GAT elements, all genotypes of the GAT sterile strain obtained by this method remain unchanged and the phenotypes are identical.

The present invention provides a method for maintaining a heterozygous state/hemizygous state of a GAT element of a maintainer line material (a GAT transformant or a GAT maintainer line) of a plant recessive genic male sterile plant, in which the intelligent genetic breeding and seed production system is adopted to introduce a GAT vector into a GAT sterile line with recessive homozygous genotype to create a GAT transformant containing only a single copy of the GAT vector, and the genotype of the GAT transformant is recessive homozygous/GAT–. The GAT transformant self-fertilizes and produces two genotypes of seeds, one genotype is recessive homozygous/– –, which is a GAT sterile strain, and the other genotype is recessive homozygous/GAT–, which is a GAT sterile strain maintainer material; according to the law of inheritance, the two are separated in 1:1, that is to say, the GAT locus with a genotype of recessive homozygous/GAT– in the self-progeny of a GAT transformant remained in the heterozygous state or the hemizygous state.

The present invention provides a method for screening or distinguishing seeds obtained by self-breeding of a GAT transformant, said GAT transformant is a GAT transformant containing only a single copy of the GAT vector created by introducing a GAT vector into a GAT sterile line with a recessive homozygous genotype adopting the intelligent genetic breeding and seed production system of the present invention, the genotype of the GAT transformant is recessive homozygous/GAT–, the seeds obtained by self-breeding and fruiting of the GAT transformant are separated in a ratio of 1:1, wherein 50% of the seeds are seeds containing a GAT vector, the genotype is recessive homozygous/GAT–, and fluorescence is observed under excitation light; and 50% of the seeds are seeds without GAT vector, and the genotype was recessive homozygous, without GAT element, and no fluorescence is observed under excitation light.

The present invention provides a method for screening or distinguishing seeds and plants obtained by self-breeding of a GAT transformant, said GAT transformant is a GAT transformant containing only a single copy of the GAT vector created by introducing a GAT vector into a GAT sterile line with a recessive homozygous genotype adopting the intelligent genetic breeding and seed production system (GAT system), the genotype of the GAT transformant is recessive homozygous/GAT–, the seeds obtained by self-breeding and fruiting of the GAT transformant are separated in a ratio of 1:1, wherein 50% are seeds and plants containing a GAT vector, the genotype thereof is recessive homozygous/GAT–, with high resistance to all types of herbicides directed against acetolactate synthase or EPSPS or Bar genes, including but not limited to bispyribac-sodium, imazethapyr, methomyl, glyphosate, glufosinate or glufosinate ammonium; and 50% of the seeds are seeds without GAT vector and the genotype is recessive homozygous and do not have this high resistance.

The present invention provides a method for preventing pollen drift of plants, in which the GAT vector is transferred into a plant, so that when the pollen of the GAT vector-containing plant material is mature, the GAT vector-containing pollen abortion specifically due to the presence of pollen abortion gene element, while ensuring normal development of GAT carrier-free pollen and dispersing pollen, thus reducing the probability of the GAT vector-containing pollen escaping.

The present invention provides a method for preventing drift or intermixing of GAT-containing seeds or plants, in which said seeds or plants are made to contain the GAT vector, and the material containing the GAT-containing seeds or plants can be killed in a specific period by applying a specific concentration of a herbicide, including bentazone or bensulfuron-methyl or nicosulfuron, by coating at seed time or from a seedling stage to a flowering stage to prevent intermixing of GAT seeds or plants into other common materials.

The present invention provides a method for producing sterile line seeds using plant recessive genic male sterile line, in which the intelligent genetic breeding and seed production system is adopted, the GAT maintainer line and the GAT sterile line are mixed and sowed in a certain ratio, the GAT maintainer line is used to pollinate to the GAT sterile line, and after the pollination is completed, herbicides including bentazone or bensulfuron or nicosulfuron are applied to specifically kill the GAT maintainer line and only the GAT sterile line is reserved for seeds harvesting.

The present invention provides a method for purifying a plant recessive genic male sterile line, in which the intelligent genetic breeding and seed production system is adopted, and the purity of GAT sterile line can be ensured by seed coating or applying a specific concentration of herbicides including bentazone or bensulfuron or nicosulfuron from the seedling stage to the flowering stage.

The present invention provide a method for hybrid seed production using a plant recessive genic male sterile line, in which the intelligent genetic breeding and seed production system is adopted to produce GAT maintainer line seeds and GAT sterile line seeds by self-crossing of the GAT maintainer line; GAT sterile line seeds are produced using GAT maintainer lines pollinated to GAT sterile lines; common commercial hybrids are produced using crosses between GAT sterile lines and conventional material.

The present invention provides a method for cross breeding using a plant recessive genic male sterile line, in which the intelligent genetic breeding and seed production system is adopted, and GAT maintainer line and common materials are used for cross breeding, GAT maintainer lines and sterile lines breeding is by either conventional backcross breeding, or by genealogical breeding, and the breeding process is supplemented by various molecular markers of GAT, herbicide screening, seed color selection, etc. to accelerate selection.

The present invention also provides primers for detecting the GAT vector or a transgenic positive plant containing GAT vector, wherein the primer is any one of the following:
the primer sequences for detecting the plant male fertility restoration genetic element expression cassette are represented by SEQ ID NOs. 28-29; or
the primer sequences for detecting the plant pollen abortion genetic element expression cassette are represented by SEQ ID NOs. 30-31; or
the molecular primer sequences for detecting the gene transformation and maintainer line screening element expression cassette are represented by SEQ ID NOs. 32-33; or
the primer sequences for detecting the herbicide-sensitive element expression cassette are represented by SEQ ID NOs. 34-35.

The molecular marker primer sequences for detecting the seed screening element expression cassette are represented by SEQ ID NOs. 36-37.

The present invention provides a method for detecting a transgenic positive plant containing the GAT vector:
if SEQ ID NOs. 28-29 are used as the primers for amplification, the amplification product is electrophoresed after digestion with HaeIII, and 3 band types might appear in the final product: 86 bp is a band type of the wild-type CYP704B2, 84 bp is a band type of cyp704b2-3 mutant, and 66 bp is a band type of a plant male fertility restoration genetic element expression cassette on the GAT vector. If 84 bp and 66 bp band types appear but no 88 bp band type, it indicates that the plant is in a male sterile mutant background and the plant male fertility restoration genetic element expression cassette is present;
if primers SEQ ID NOs. 30-31 are used for amplification, if a 914 bp band can be amplified, it indicates that the plant pollen abortion genetic element expression cassette is present;
if primers SEQ ID NOs. 32-33 are used for amplification, if a 831 bp band can be amplified, it indicates that the gene transformation and maintainer line screening element expression cassette is present;
if primers SEQ ID NOs. 34-35 are used for amplification, if a 923 bp band can be amplified, it indicates that the herbicide-sensitive element expression cassette is present; if primers SEQ ID NOs. 36-37 are used for amplification, if a 1412 bp band can be amplified, it indicates that the seed screening element expression cassette is present.

The present invention provides a method for sorting plants and progeny with different functions, the GAT vector is transferred into plants, and (3) a gene transformation and maintainer line screening element expression cassette, (4) a herbicide-sensitive element expression cassette and (5) a seed screening element expression cassette in the GAT vector are used to sort the plants and progeny with different functions based on a combination of positive and negative bi-directional selection with chemical herbicides and mechanical color selection; preferably, said positive and negative bi-directional selection with chemical herbicides being the same plant showing resistance to one herbicide and sensitivity to another herbicide.

More preferably, the chemical herbicide for positive selection is resistant to bispyribac-sodium, imazethapyr, methomyl, resistant to glyphosate, resistant to glufosinate or glufosinate ammonium, and the chemical herbicide for negative selection is sensitive to bendazone, bensulfuron or nicosulfuron.

More preferably, the chemical herbicide for positive selection is resistant to bispyribac-sodium, imazethapyr, methomyl, and the chemical herbicide for negative selection is sensitive to bendazone, bensulfuron.

The present invention construct a GAT vector including five functional element expression cassettes: a plant male fertility restoration genetic element expression cassette, used for restoring the male fertility of a recessive genic male sterile mutant; a plant pollen abortion genetic element expression cassette, used for clearing GAT containing pollen and maintaining a heterozygous state or a hemizygous state of a GAT maintainer line; a chemical herbicide positive selection expression cassette, used for gene transformation and impurity removal and purification for the GAT maintainer line; a chemical herbicide negative selection expression cassette, used for clearing pollen and seed escape of a herbicide-sensitive GAT maintainer line and impurity removal and purification for a GAT sterile line; and a seed screening element expression cassette, used for mechanical sorting of seeds. In breeding practice, since the recessive genic male sterile material is sterile, seeds cannot be generated, and long-term preservation is very difficult, if they are preserved through hybridization, fertility traits of offspring will be separated, and which are breeder seeds and which are sterile seeds cannot be determined in the seed stage, leading to inaccurate seed conservation and selection, so the operation is very complicated, let alone used for large-scale production, therefore, industrialized utilization of the recessive genic male sterility has not been realized so far. In the present application, the GAT vector is introduced into the GAT sterile line (recessive genic male sterile line) to create the GAT maintainer line and establishes an intelligent genetic breeding and seed production system capable of maintaining and propagating the recessive genic male sterile line. By using this system, subsequent impurity removal and purification for the GAT maintainer lines and sterile lines can be performed in their progeny by the organic combination of the functions of seed color selection and maintainer line screening elements and herbicide-sensitive elements in their progeny, and the separation of recessive genic male sterile seeds/plants (GAT sterile lines) and fertile seeds/plants (GAT maintainers) can be achieved during the seed period, nutritional growth period and reproductive growth period, successfully solving the problem of propagation and maintenance of recessive genic male sterility on a large scale, and the utilization of cryptic nuclear male sterility has been creatively realized so that commercial production can be realized. The commercial utilization of recessive genic male sterile lines in plants can be successfully realized by the five critical elements in the GAT vector provided by the present invention functioning in organic combination and combining with mechanized and automated processing. The present invention can be applied to cross breeding and hybrid seed production of plant recessive genic male sterile materials, thereby obtaining new varieties of plants having high quality, high yield, wide adaptability and high resistance, and seeds thereof, which have great economic values.

DETAILED DESCRIPTION

The present invention is described in detail below in connection with specific embodiments.

The following Examples are used to illustrate the present invention, but are not intended to limit the scope of the invention. If not specifically indicated, the technical means used in the Examples are conventional means known to a person skilled in the art, and the raw materials used are commercially available commodities.

Example 1. GAT Vector Construction and Validation

I. Construction of GAT Vector

Figure 9:
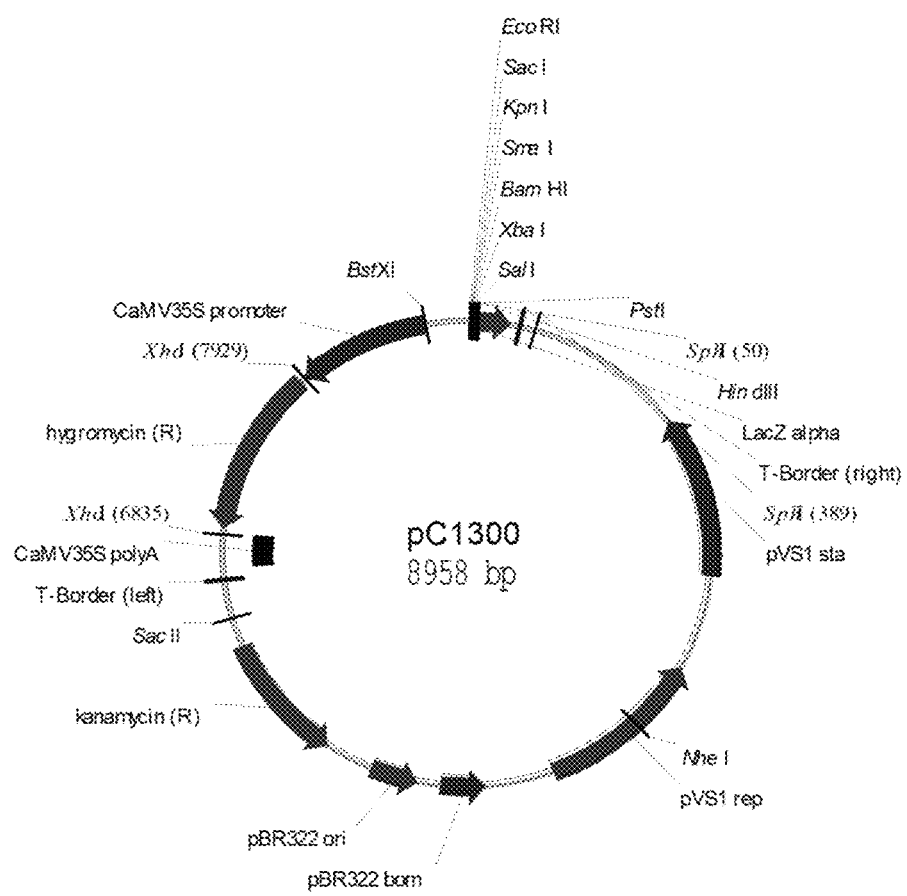
FIG. 9 is a schematic diagram of a pC1300 vector.
Figure 10:
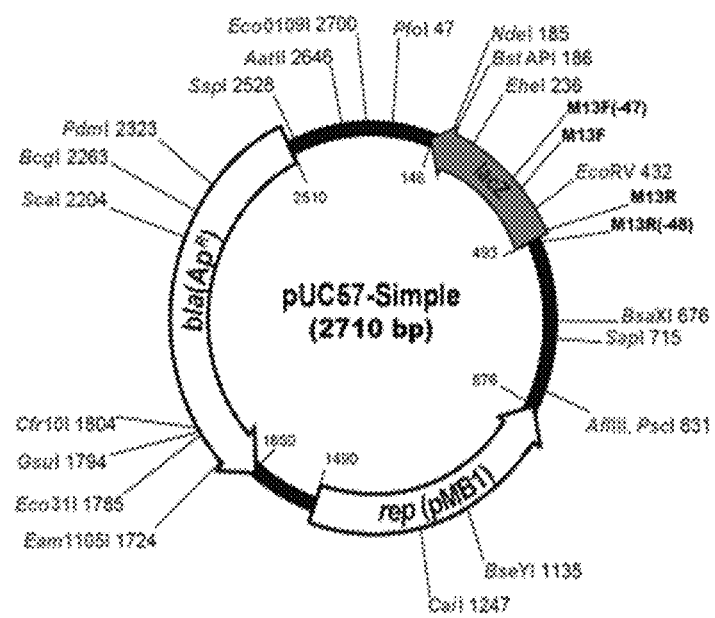
FIG. 10 is a schematic diagram of a pUC57-Simple vector.
Figure 11:
FIG. 11 shows the result of colony PCR assay of the GAT vector. In which lanes 1-12 are colony PCR results using specific primers of SEQ ID NOs. 30-31, in which lane 1 is negative water control, lane 2 is colony PC0308-MM-MaauCK5400 plasmid control, lanes 3-4 are pC1300-MMCK, lanes 5-8 are pC0308-MMCK, lanes 9-12 are PC0308-MMMaauCK5400, lanes 13-24 show the colony PCR assay results with specific primers SEQ ID NOs. 34-35, and the template order is the same as that of lanes 1-12, and M, represents for a D2000 DNA Marker.
Figure 12:
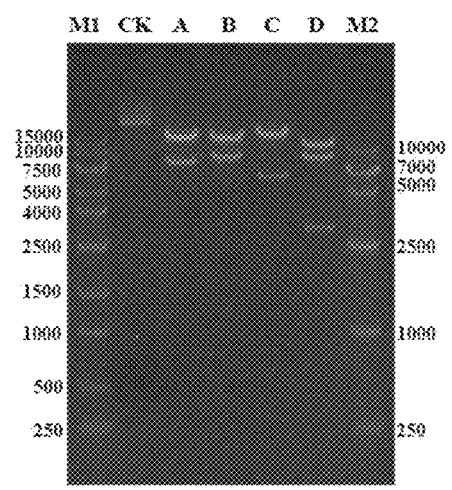
FIG. 12 is a graph showing the enzyme digestion verification result of the pC0308-MMMaauCK5400, M1, D15000 plus DNA Ladder; M2, DNA Marker VI; CK, plasmid; A, Hind III and Sma I; B, Kpn I; C, Hind III and Pst I; D, Hind III and Kpn I.

The GAT vector was constructed in segments with the expression cassette as the unit, and the unit was assembled. The expression cassette was first constructed on the transition vector pC1300 (FIG. 9) and pUC57-Simple (FIG. 10) and verified by enzymatic digestion and sequencing, and then the expression cassette was spliced to the final vector. The specific steps of vector construction were as follows.

Figure 1:
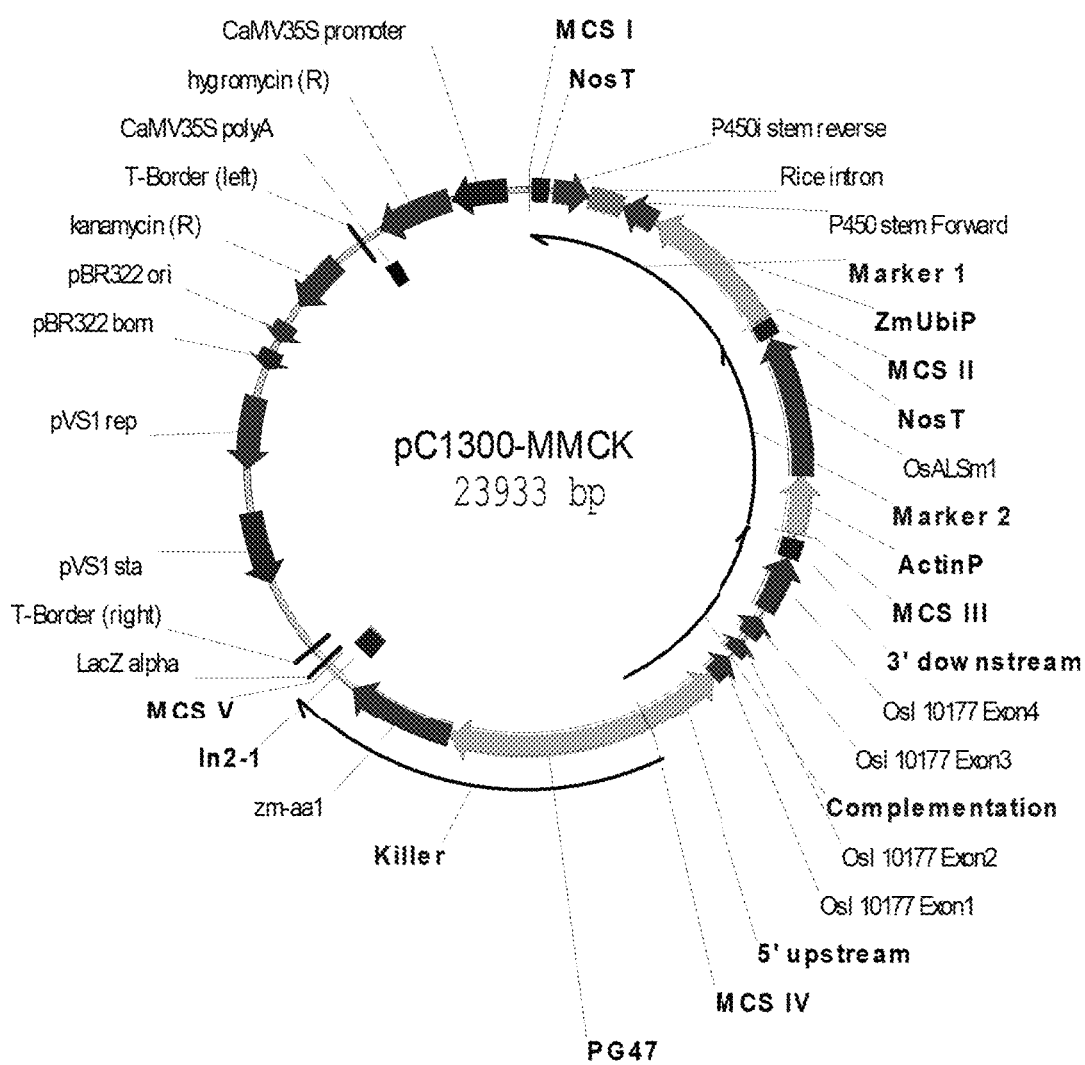
FIG. 1 is a schematic diagram of a pC1300-MMCK vector.
Figure 2:
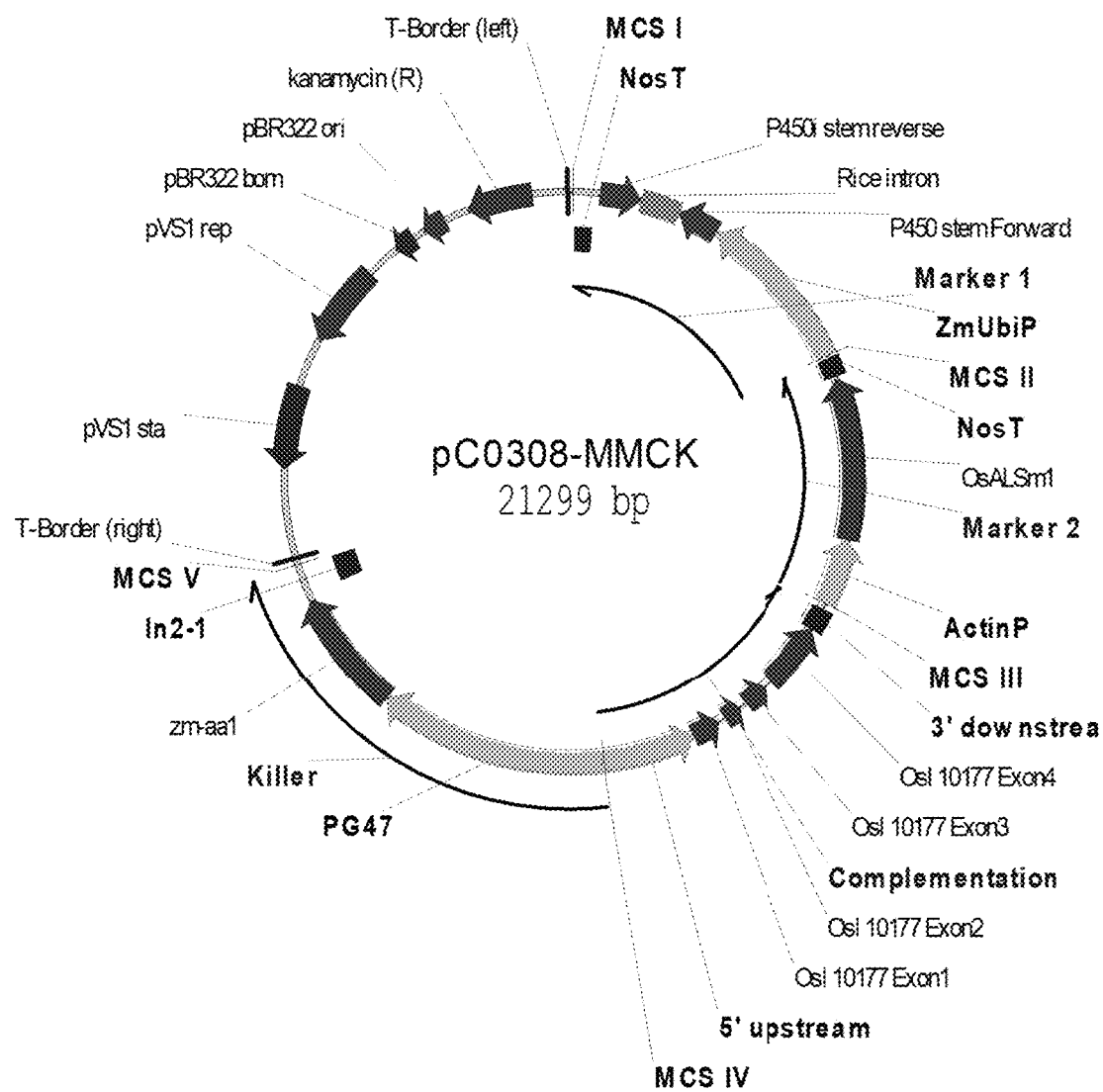
FIG. 2 is a schematic diagram of a pC0308-MMCK vector.
Figure 3:
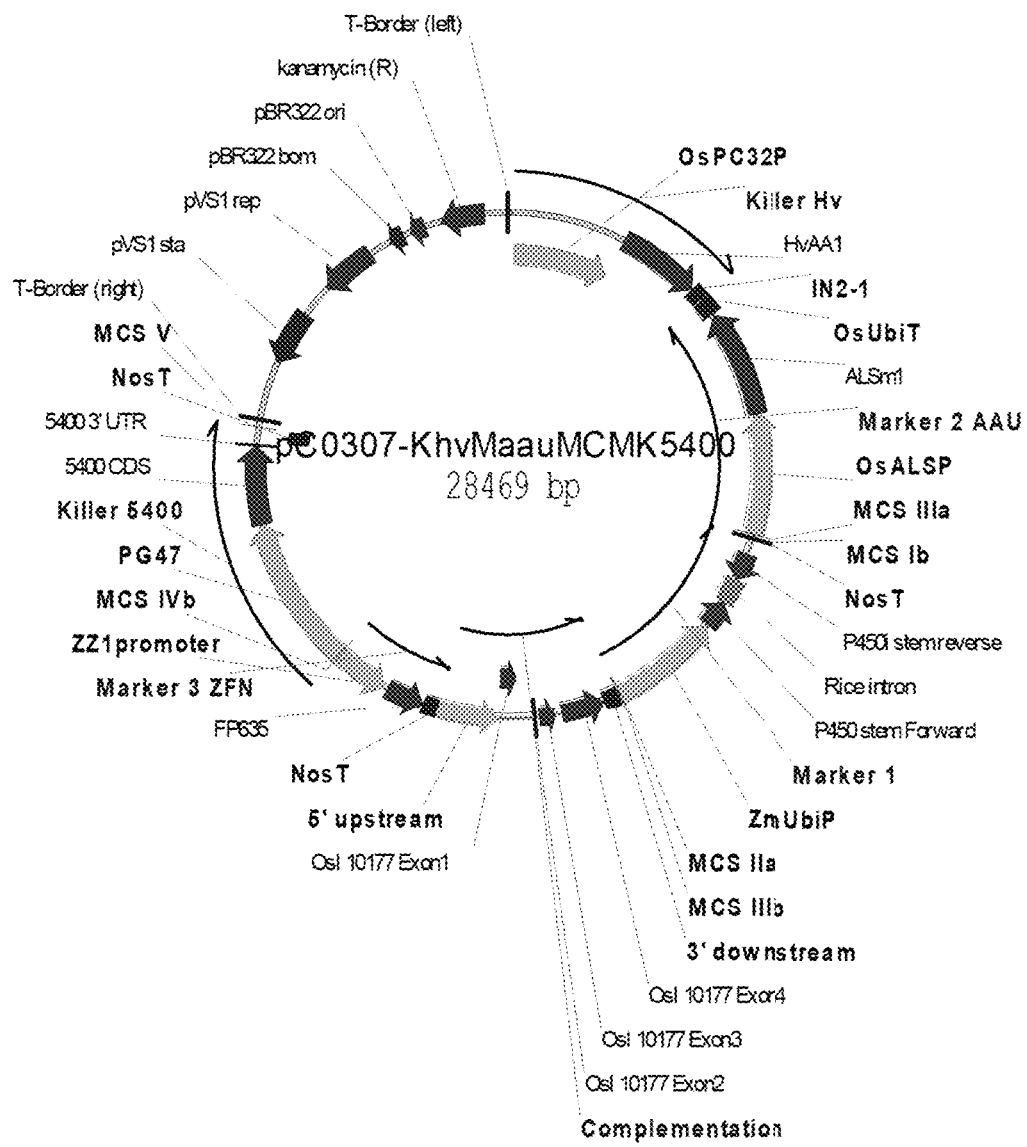
FIG. 3 is a schematic diagram of a pC0307-KhvMaauMCMK5400 vector.
Figure 4A:
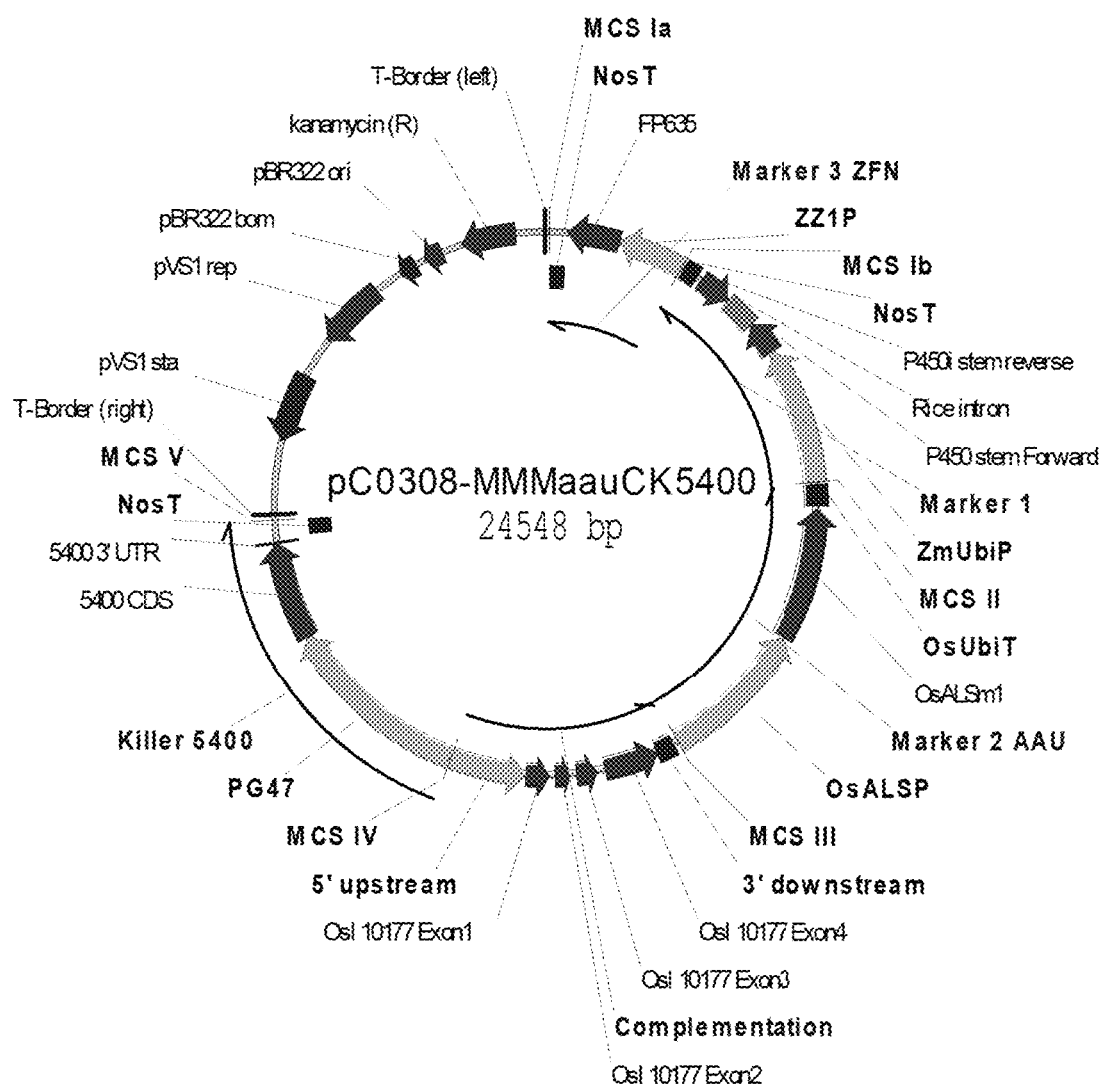
FIG. 4A is a schematic diagram of a pC0308-MM-MaauCK5400 vector.
Figure 6:
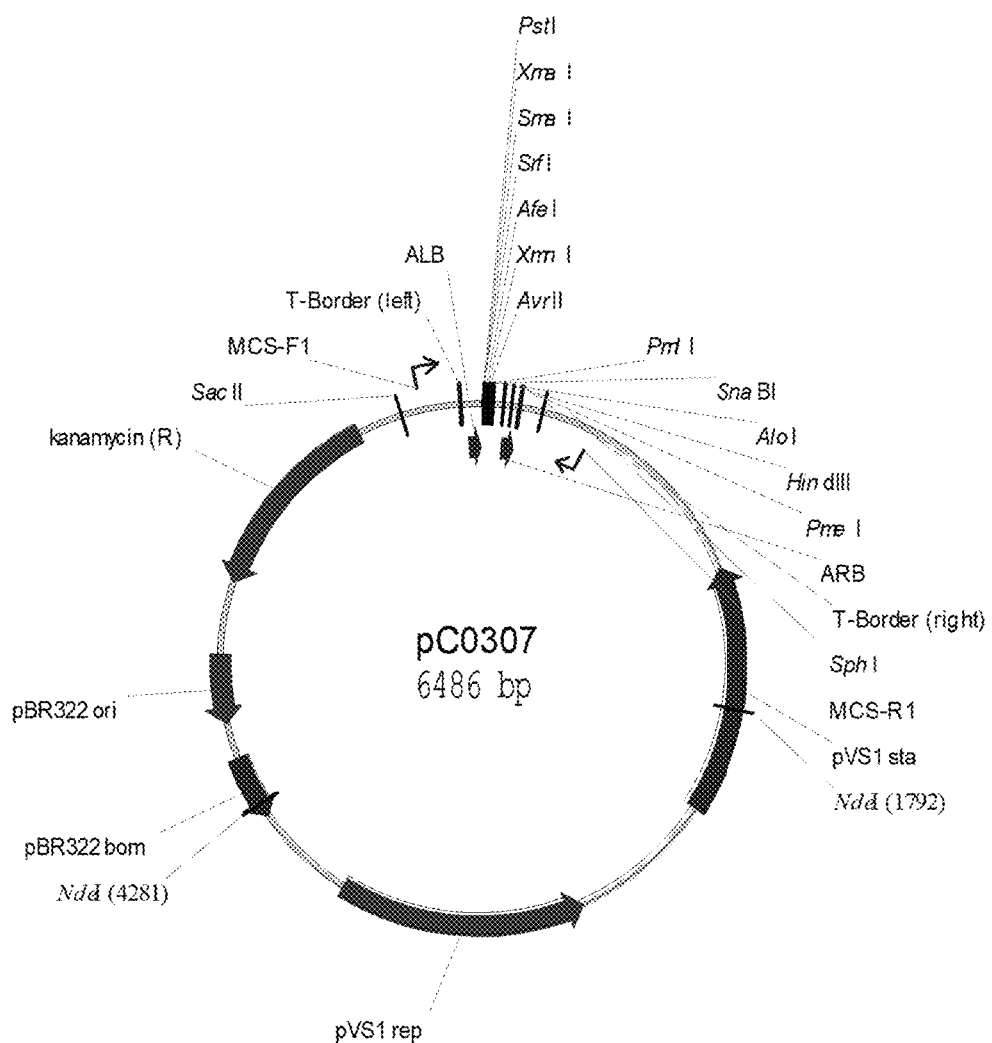
FIG. 6 is a schematic diagram of a pC0307 vector.
Figure 7:
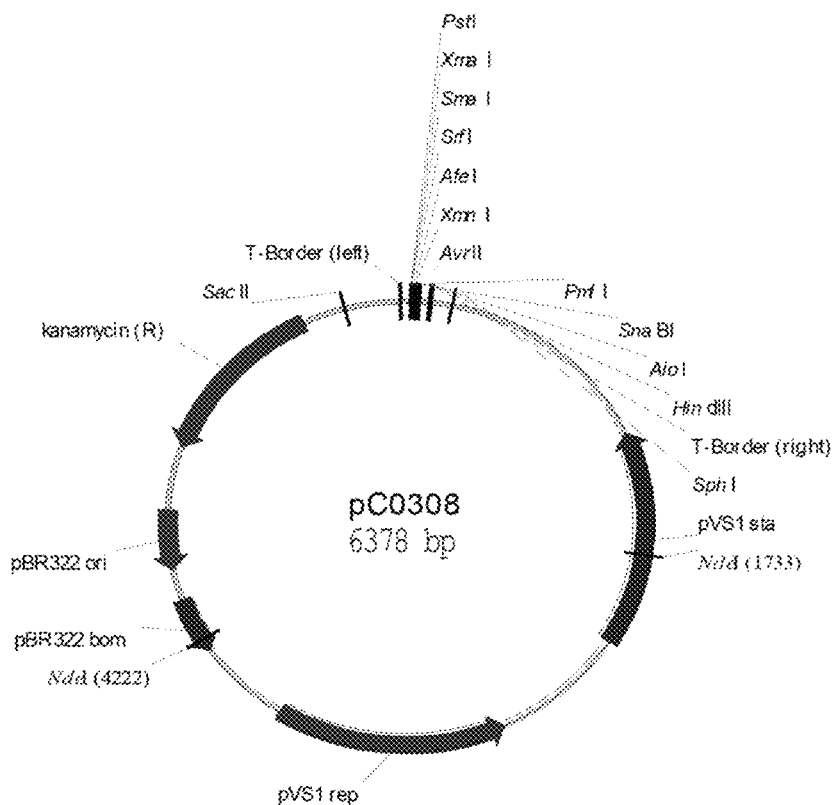
FIG. 7 is a schematic diagram of a pC0308 vector.
Figure 8:
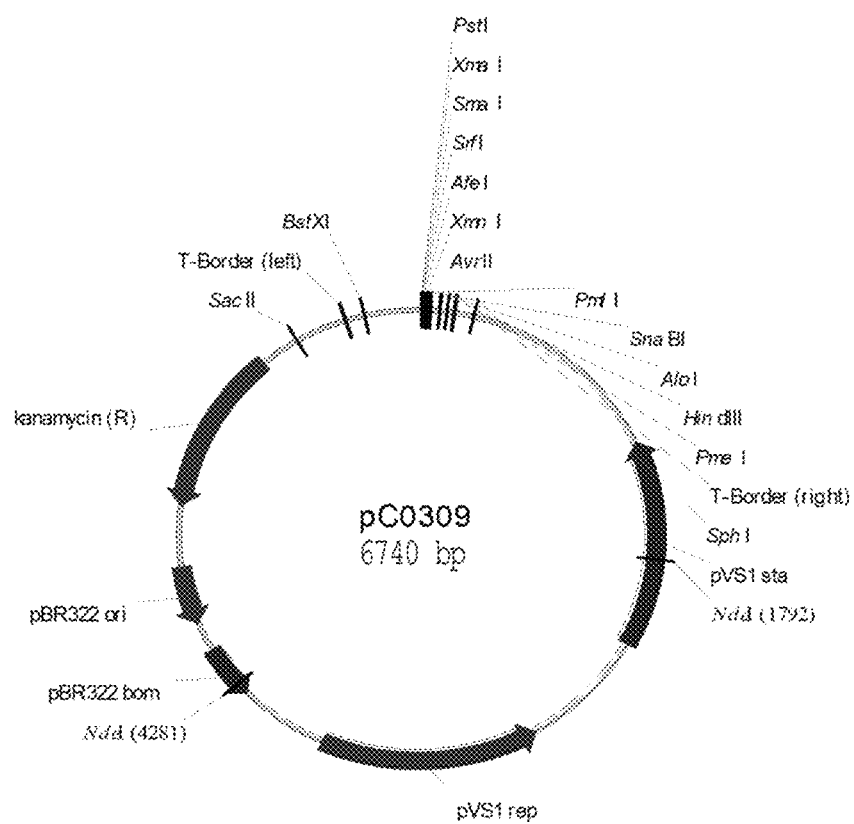
FIG. 8 is a schematic diagram of a pC0309 vector.

1. MCS pC0307 fragment (SEQ ID NO. 38) was synthesized, and Sac II and Pme I were linked into pC1300 to obtain pC0307 (FIG. 6).
2. MCS pC0308 fragment (SEQ ID NO. 39) was synthesized, and Sac II and Sph I were linked into pC1300 to obtain pC0308 (FIG. 7).
3. MCS pC0309 fragment (SEQ ID NO. 40) was synthesized, and Sac II and Pme I were linked into pC1300 to obtain pC0309 (FIG. 8).
4. DNA fragment NSPT-Construct V1.81-Marker 1 was synthesized, and Kpn I+Hind III double digestion were linked into pC1300 to obtain pC1300-Marker 1. The sequence of NSPT-Construct V1.81-Marker 1 consists of Kpn I digestion site ggtacc, MCSI (sequence is represented by SEQ ID NO. 18), herbicide-sensitive element expression cassette Marker 1 (SEQ ID NO. 14), MCSII (SEQ ID NO. 19), the spacer sequence tgcagggacccttgccaac, and the Hind III enzyme cut site aagctt linked in sequence. The sequence of MCSI consists of Pst I, Srf I, Afe I, and Xmn I enzymatic sites linked in sequence. The sequence of herbicide-sensitive element expression cassette Marker 1 consists of NosT terminator, an RNAi stem-loop structural sequence of cytochrome P450 gene CYP81A6, and ZmUbiP promoter linked in sequence. The RNAi stem-loop structural sequence of cytochrome P450 gene CYP81A6 consists of a reverse stem sequence composed of a CYP81A6 coding region, a loop sequence composed of a rice intron, and a forward stem sequence complementary to the CYP81A6 coding region linked in sequence. The sequence of MCSII consists of Hpa I, PshA I, BspE I, Pac I enzyme cleavage sites linked in sequence.
5. The DNA fragment NSPT-Construct V1.9-Marker 2 was synthesized, and EcoR I+Hind III double digestion was linked into pC1300 to obtain pC1300-Marker 2. The sequence of NSPT-Construct V1.9-Marker 2 consisted of EcoR I enzyme cut site gaattc, Pst I digest site ctgcag, spacer sequence ggaccettgccaaca, polyclonal site MCSII (sequence is represented by SEQ ID NO. 19), gene transformation and maintainer line screening element expression cassette Marker 2 (SEQ ID NO. 10), MCSIII (SEQ ID NO. 20), spacer sequence tgcagtcccaaggcttccg, and the Hind III digestion site aagctt linked in sequence. The sequence of MCSII consists of Hpa I, PshA I, BspE I, Pac I enzymatic sites linked in sequence, the sequence of gene transformation and maintainer line screening element expression cassette Marker 2 consists of NosT terminator, ALS gene coding region sequence OsALSm1, ActinP promoter linked in sequence, and the sequence of MCSIII consists of BsrG I, Bae I, AsiS I, and FspAI enzyme cut sites linked in sequence.
6. DNA fragment NSPT-Construct V1.81-Complementation was synthesized, and Sac I+Hind III double digestion was linked into pC1300 to obatin pC1300-Complementation. The sequence of NSPT-Construct V1.81-Complementation consists of Sac I digest site gagctc, Pst I digest site ctgcag, spacer sequence tccaaggcttccga, polyclonal site MCSIII (SEQ ID NO. 20), plant male fertility restoration genetic element expression cassette Complementation (SEQ ID NO. 6), MCSIV (SEQ ID NO. 21), spacer sequence tgcagcctgttgccaggga, and Hind III enzyme cleavage site aagctt linked in sequence. The sequence of MCSIII consists of BsrG I, Bae I, AsiS I, and FspA I enzymatic cut sites linked in sequence. The plant male fertility restoration gene element expression cassette Complementation consisted of the 1112 bp sequence upstream of the rice OsCYP704B2 gene start codon ATG, the codon optimized OsCYP704B2 gene coding region, and the 274 bp sequence downstream of the OsCYP704B2 gene stop codon TGA. The sequence of MCSIV consists of Swa I, BstB I, Mlu I, and Rsr II enzyme cleavage sites linked in sequence.
7. DNA fragment NSPT-Construct V1.81-Killer was synthesized, and Nde I+EcoR V double digestion was linked into pUC57-Simple to obtain pUC57-Simple. The sequence of NSPT-Construct V1.81-Killer consists of Nde I enzyme cut site catatg, spacer sequence cagggacccttgccaaca, Nru I digest site tcgcga, Pac I digest site ttaattaa, Pst I digest site ctgcag, spacer sequence cctgttgccagggaa, polyclonal site MCSIV (SEQ ID NO. 21), plant pollen abortive genetic element expression cassette Killer (SEQ ID NO. 7), spacer sequence tcgacgcggccgatcccccgg, Stu I digest site aggcct, Sac I digest site gagctc, polyclonal site MCSV (SEQ ID NO. 22), spacer sequence tggcactggccgtcgtttt, Hind III enzyme cut site aagctt, EcoR I enzyme cut site gaattc, and the spacer sequence gggcgcgccccca linked in sequence. The sequence of MCSIV consists of Swa I, BstB I, Mlu I, and Rsr II enzymatic sites linked in sequence. The plant pollen abortion genetic element expression cassette Killer consists of promoter PG47, Zm-AA1 coding region and terminator IN2-1 sequence. The sequence of MCSV consists of Avr II, Pml I, SnaB I, Alo I enzyme cleavage sites linked in sequence.
8. pC1300-Marker 1 and pUC57-Simple-Killer were digested with Pac I+Hind III, and the expression cassette Killer was linked into pC1300-Marker 1 to generate pC1300-Marker 1-Killer.
9. pC1300-Marker 2 and pC1300-Complementation were digested with BsrG I+Hind III, and the expression cassette Complementation was linked into pC1300-Marker 2 to generate pC1300-Marker 2-Complementation.
10. pC1300-Marker 1-Killer and pC1300-Marker 2-Complementation were digested with Pac I+Swa I, and two linked expression cassette Marker 2-Complementation were linked into pC1300-Marker 1-Killer to generate GAT vector pC1300-Marker 1-Marker 2-Complementation-Killer (pC1300-MMCK, FIG. 1).
11. pC1300-MMCK, pC0308, pC0309 were digested with Pst I+Hind III, and the four linked expression cassette Marker 1-Marker 2-Complementation-Killer were ligated into pC0308 and pC0309 to generate GAT vector pC0308-MMCK (FIG. 2).
12. DNA fragment Killer 5400 was synthesized, BstB I+Avr II double digestion was linked into pUC57-Simple-Killer, Killer was replaced with expression cassette Killer 5400 to generate pUC57-Simple-Killer 5400. Killer 5400 consists of polyclonal site MCSIV (SEQ ID NO. 21), plant pollen abortion genetic element expression cassetteKiller 5400 (SEQ ID NO. 8), and polyclonal site MCSV (SEQ ID NO. 22) linked in sequence. The plant pollen septic gene component expression cassette Killer 5400 includes PG47 promoter, coding region of rice α-amylase gene OsAA (i.e. 5400) and NosT terminator.
13. pUC57-Simple-Killer 5400 and pC0308-MMCK were double digested with Swa I+SnaB I. The expression cassette Killer 5400 and the digested product pC0308-MMC were recovered, and Killer 5400 was linked into pC0308-MMC to generate pC0308-Marker 1-Marker 2-Complementation-Killer5400 (pC0308-MMCK5400).
14. DNA fragment Marker 3 ZFN was synthesized, and Pst I+Xma I double digestion was linked into pC0308-MMCK5400 to generate pC0308-Marker 3-Marker 1-Marker 2-Complementation-Killer5400 (pC0308-MMMCK). The sequence of the Marker 3 ZFN fragment consists of Pst I digest site ctgcag, seed screening element expression cassette Marker 3 ZFN (SEQ ID NO. 17), spacer sequence g, and Xma I digest site cccggg linked in sequence. The seed screening element expression cassette Marker 3 ZFN sequentially includes NosT terminator, coding region of the deep red fluorescent protein FP635 gene, and ZZ1P promoter.
15. OsALSP fragment (SEQ ID NO. 23) was synthesized, Nco I+BsrG I double digestion was linked into pC1300-NSPT-Construct V1.9-Marker 2 to generate pC1300-Marker 2 AAN. DNA fragment OsUbiT (SEQ ID NO. 24) was synthesized, Pac I+Kpn I double digestion was linked into pC1300-Marker 2 AAN to generate another gene transformation and maintainer line screening element expression cassette Marker 2 AAU (SEQ ID NO. 11) (i.e. the gene transformation and maintainer line screening element expression cassette of the present application), the corresponding vector was pC1300-Marker 2 AAU. Marker 2 AAU expression cassette includes OsUbiT terminator, ALS gene coding region sequence OsALSm1, and OsALSP promoter.
16. pC1300-Marker 2 AAU was double digested with Pac I+BsrG I, and Marker 2 AAU expression cassette was recovered. pC0308-MMMCK5400 was double digested with Pac I+BsrG I, and the larger fragment was recovered and linked with Marker 2 AAU to generate GAT vector pC0308-Marker 3-Marker 1-Marker 2aau-Complementation-Killer5400 (pC0308-MMMaauCK5400, FIG. 4A, SEQ ID NO. 1).
17. Vector pC0308-MMaauCK5400 generated in step 16 was double digested with Xma I+BspE I to obtain a smaller fragment Marker 1 and a larger fragment pC0308-M_MaauCK5400. The ends of the above fragments were flattened with high fidelity Taq enzyme and recovered separately. The pC0308-M_MaauCK5400 was self-associated, and then digested with AsiSA I, and the ends were then flattened with high-fidelity Taq enzyme, and then linked with the flat end of the flattened Marker 1 to obtain the transition vector pC0308-Marker 3-Marker 2aau-Marker 1-Complementation-Killer5400 (pC0308-MMaauMCK5400). Marker 1 transcription direction was kept unchanged.

Figure 4B:
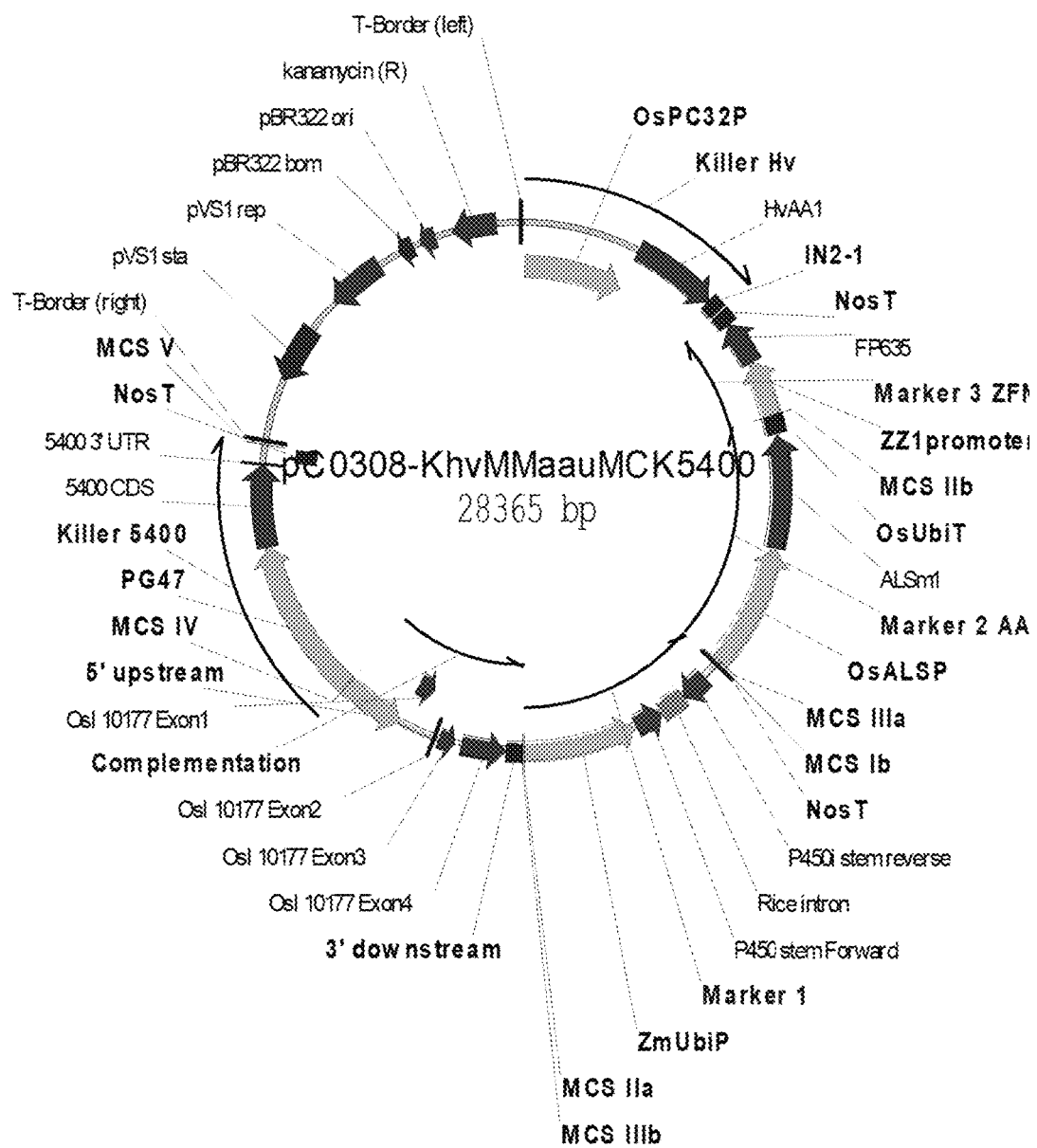
FIG. 4B is a schematic diagram of a pC0308-KhvM-MaauMCK5400 vector.
Figure 4C:
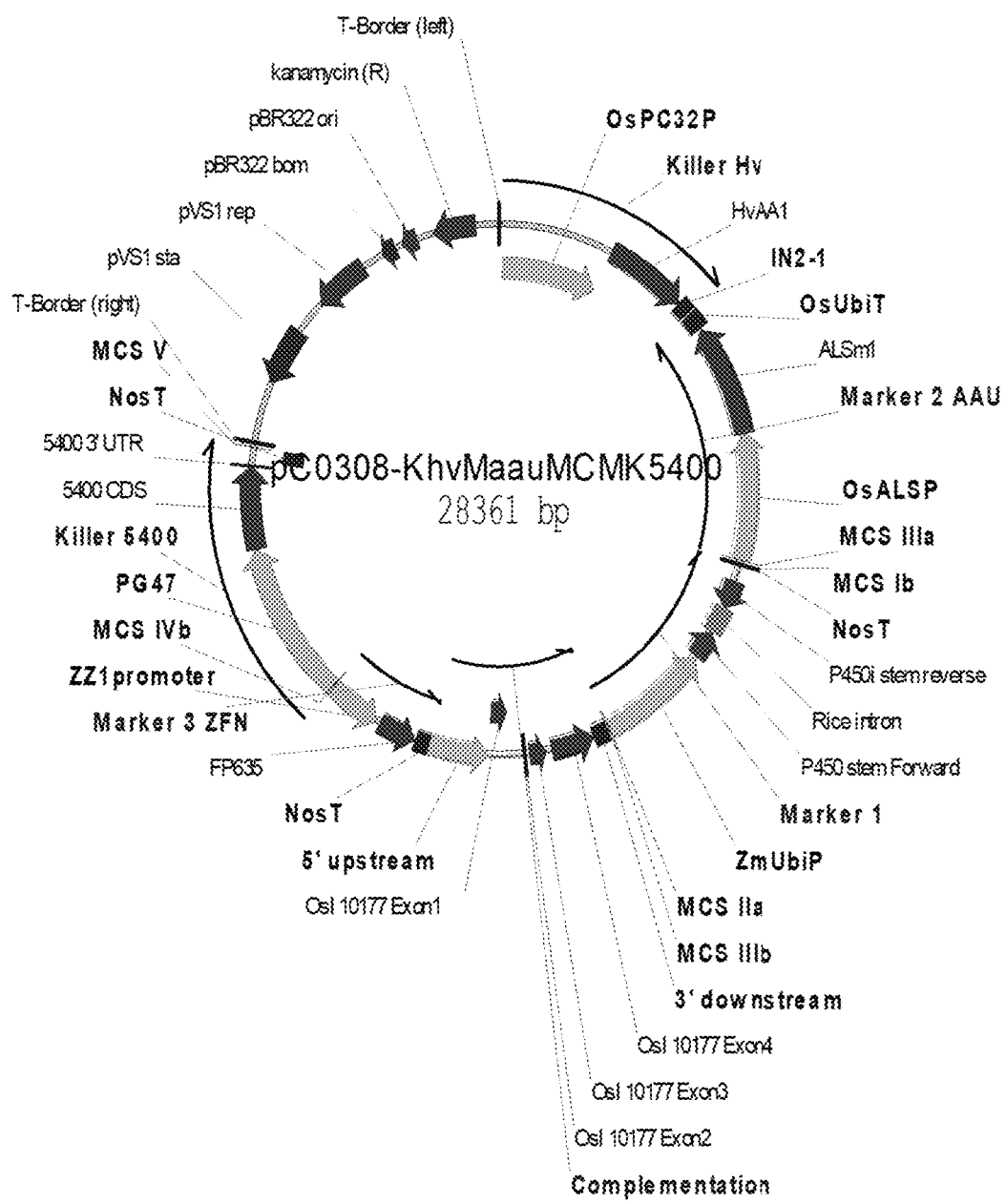
FIG. 4C is a schematic diagram of a pC0308-KhvMaauMCMK5400 vector.
Figure 4D:
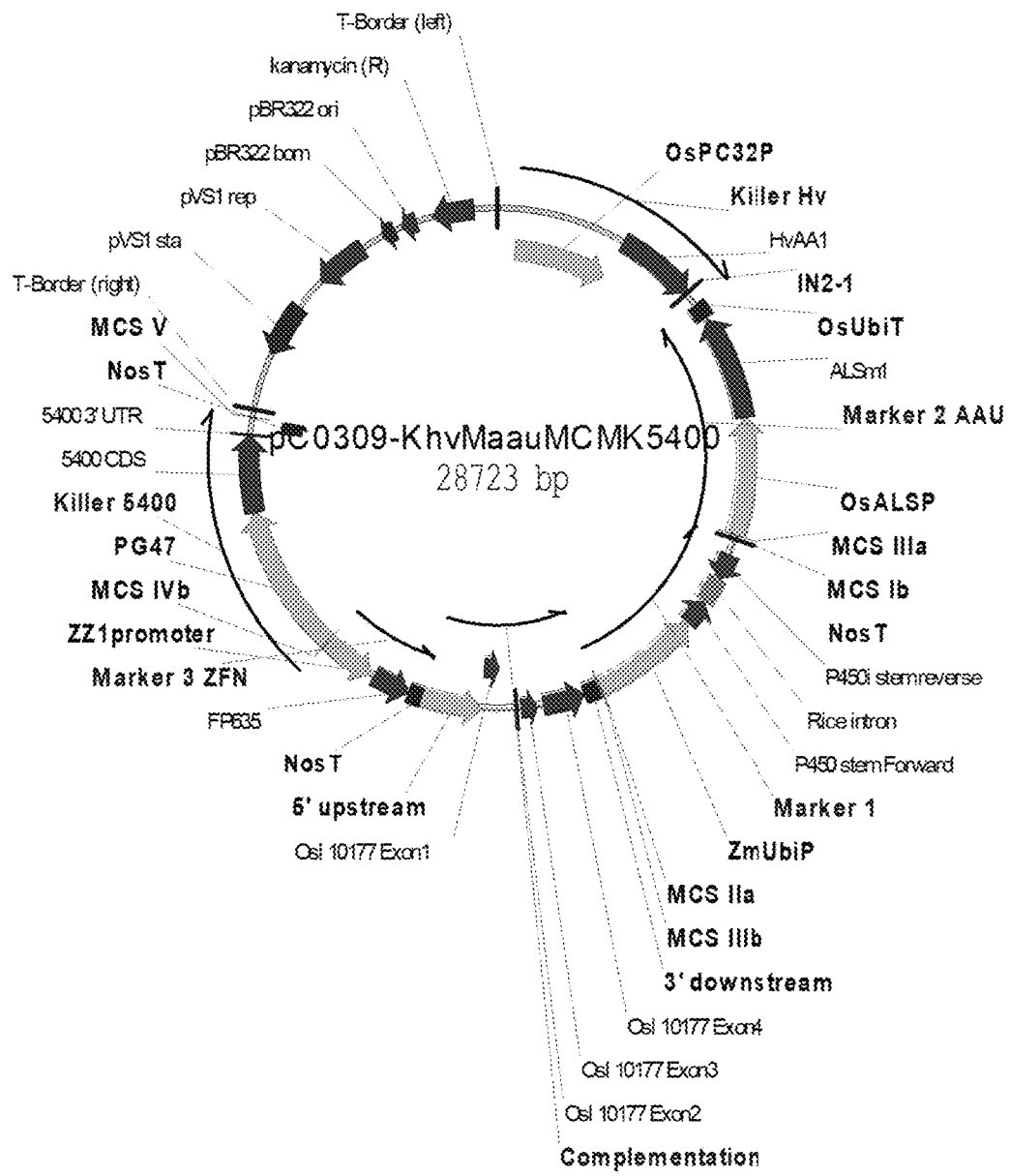
FIG. 4D is a schematic diagram of a pC0309-KhvMaauMCMK5400 vector.

18. Killer Hv fragment was synthesized, and the transition vector pC0308-MMaauMCK5400 generated in step 19 was linked with Pst I single digestion to obtain GAT vector pC0308-Killer Hv-Marker 3-Marker 2aau-Marker 1-Complementation-Killer5400 (pC0308-KhvMMaauMCK5400, FIG. 4B, SEQ ID NO. 2). The transcriptional direction of Killer Hv was opposite to that of Marker3. The sequence of Killer Hv consists of Pst I digest site ctgcag, plant pollen abortion gene element expression cassette Killer Hv (SEQ ID NO. 9), AsiS I digest site gcgatcgc, SrfI digest site gcccgggc, Pac I digest site ttaattaa, and Pst I digest site ctgcag linked in sequence. The plant pollen septic gene element expression cassette Killer Hv consists of promoter OsPC32, HvAA1 coding region and terminator IN2-1 sequence.

19. The Killer Hv fragment synthesized in step 20 was double digested with Pst I+Pac I, and Pst I+Pac I were recovered. The transition vector pC0308-MMaauMCK5400 generated in step 19 was double digested with Pst I+Pac I, and the largest fragment of the digested product pC0308-_MaauMCK5400 were recovered. The digested Killer Hv was linked into pC0308-_MaauMCK5400 to obtain the transition vector pC0308-Killer Hv-Marker 2aau-Marker 1-Complementation-Killer5400 (pC0308-KhvMaauMCK5400).

20. The transition vector pC0308-MMaauMCK5400 generated in step 19 was double digested with Pst I+Pac I. The smaller fragment Marker 3 ZFN in the digested product was revovered, and flattened with high fidelity Taq enzyme. The transition vector pC0308-KhvMaauMCK5400 obtained in step 21 was digested with Swa I, and linked with the flattened Marker 3 ZFN to obtain the GAT vector pC0308-Killer Hv-Marker 2aau-Marker 1-Complementation-Marker 3-Killer5400 (pC0308-KhvMaauMCMK5400, FIG. 4C, SEQ ID NO. 3). The transcriptional orientation of Marker 3 ZFN was kept unchanged.

21. GAT vector pC0308-KhvMaauMCMK5400 obtained in step 22 was double digested with Pst I+SnaB I, and the largest fragment KhvMaauMCMK5400 in the digested product was revovered. pC0309 and pC0307 was double digested with Pst I+SnaB I, respectively, and the linearized pC0309 and pC0307 was revovered. KhvMaauMCMK5400 was linked into pC0309 and pC0307 respectively, to obtain GAT vector pC0309-Killer Hv-Marker 2aau-Marker 1-Complementation-Marker 3-Killer5400 (pC0309-KhvMaauMCMK5400, FIG. 4D, SEQ ID NO. 4) and pC0307-Killer Hv-Marker 2aau-Marker 1-Complementation-Marker 3-Killer5400 (pC0307-KhvMaauMCMK5400, FIG. 3, SEQ ID NO. 5).

II. Validation of the GAT Vector

The above constructed GAT vectors pC0308-MMMaauCK5400, pC0308-KhvMMaauMCK5400, pC0308-KhvMaauMCMK5400, pC0309-KhvMaauMCMK5400 and pC0307-KhvMaauMCMK5400 were subjected to enzyme digestion and Sequencing verification.

1 μl of the above plasmids were mixed with 50 μl of *E. coli* competent cells, respectively, and transformed by 1.8 KV electroshock. The transformation products were coated on LA plates containing kanamycin and incubated at 37° C. for about 16 h. Single colonies were picked and PCR detection of the bacterial broth was performed using specific primers (FIG. 11). The specific primer sequences are represented by SEQ ID NO. 30 and SEQ ID NO. 31 and sequences SEQ ID NO. 34 and SEQ ID NO. 35. Positive single colonies were selected to be inoculated with LB medium containing kanamycin for expansion, and the plasmids were extracted after incubation at 37° C. for about 16 h. The methods were as follows:

1: the cloudy bacterial broth was poured into a 2 ml centrifuge tube, and centrifuged instantaneously for 30 s to precipitate bacteria.
2: the supernatant was poured off, 200 μl Solution I were added, and the resultant was shaked to suspend the bacteria solution at room temperature for 1 min.
3: 300 μl Solution II were added, reversed several times quickly, and placed in ice bath for 1 min.
4: 400 μl Solution III were added, shaked gently, condensed in ice bath for 2 min, and centrifuged instantaneously for 30 s.
5: the supernatant was sucked, and subjected to centrifugation at 12000 rpm for 2 min, the supernatant was transferred to a 1.5 ml EP tube, 0.6 times the volume of isopropanol was added, the resultant was placed at ice bath for 2 min.
6: the resultant was centrifuged instantaneously for 1 min, and the supernatant was poured off.
7: 500 μl of 70% ethanol were added for washing the precipitate 2 times, and the supernatant was air dried.
8: 50p $ddH_2O$ (RNase A has been added, the concentration is 1%) were added to back to melt.

Kpn I, Hind III and Sma I, Hind III and Pst I, Hind III and Kpn I were selected for enzymatic validation of pC0308-MMaauCK5400, Kpn I, Pst I and Sma I were selected for enzymatic validation of pC0308-KhvMMaauMCK5400, Kpn I, BamH I, Sac I, Sma I, and Bgl II were selected for enzymatic validation of pC0308-KhvMaauMCMK5400, Sac I, Sph I, Kpn I, BamH I, Xho I were selected for enzymatic validation of pC0309-KhvMaauMCMK5400, and Sac I, BamH I, Kpn I were selected for enzymatic validation of pC0307-KhvMaauMCMK5400. The digestion system was 10×Buffer 1 μl, plasmid DNA 3 μl, DNA restriction endonuclease 0.21, and 10 μl was made up with $ddH_2O$. the digestion conditions were as follows: incubation at 37° C. for 10-15 min, then inactivation at 70° C. for 5 min. The digested products were detected by electrophoresis in 1% agarose gel.

As shown in FIG. 12, the size of pC0308-MMMaauCK5400 plasmid was 24548 bp; the size of the band in the A-loading well after double digestion by Hind III and Sma I was 8287 bp+16261 bp; the size of the band in the B-loading well after single digestion by Kpn I was 9114 bp+15434 bp; the size of the band in the C-loading well after double digestion by Hind III and Pst I was 6295 bp+18253 bp; the size of the band in the D-loading well after Hind III and Kpn I double digestion was 3010 bp+9114 bp+12424 bp. The digestion result was exactly as expected. The correctly digested plasmid was selected for sequencing, and the sequences are exactly as expected. The sequence is represented by SEQ ID NO. 1.

As shown in FIG. 5A, the size of pC0308-KhvMMaauMCK5400 plasmid was 28365 bp; the size of lane 1 band after Kpn I single digestion was 4870 bp+10564 bp+12931 bp, in which the 10564 bp and 12931 bp bands were not separated because they were too large, and overlapped into a bright band; the size of lane 2 band after Pst I single digestion was 3807 bp+24558 bp; the band size of lane 3 band after Sma I single digestion was 28365 bp. The digestion result was exactly as expected. The correctly digested plasmid was selected for sequencing, and the sequences are exactly as expected. The sequence is represented by SEQ ID NO. 2.

Figure 5A:
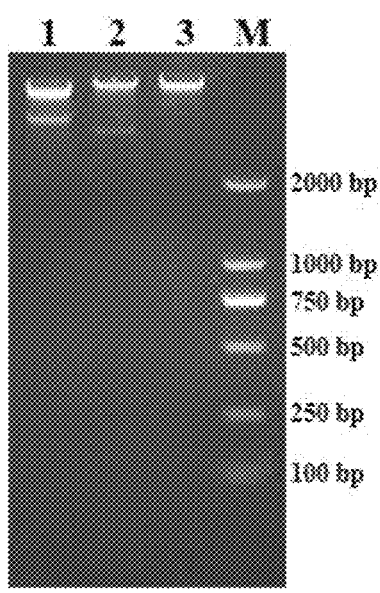
FIG. 5A is a graph showing the enzyme digestion verification result of the pC0308-KhvMMaauMCK5400, in which lane 1 is by Kpn I single digestion; lane 2 is by Pst I single digestion; lane 3 is by Sma I single digestion; and M, represents for a D2000 DNA Marker.
Figure 5B:
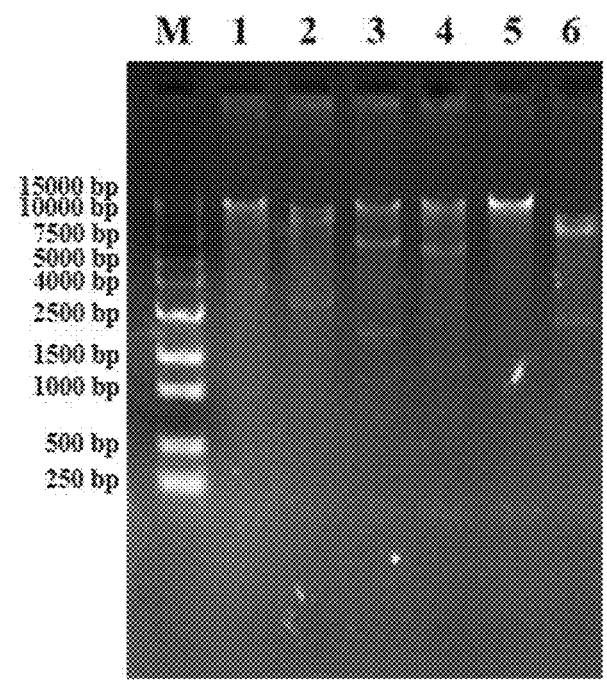
FIG. 5B is a graph showing the enzyme digestion verification result of the pC0308-KhvMaauMCMK5400, in which lane 1 represents for a pC0308-KhvMaauMCMK5400 plasmid that is not digested; lane 2 is by Kpn I single digestion; lane 3 is by BamH I single digestion; lane 4 is by Sac I single digestion; lane 5 is by Sma I single digestion; lane 6 is by Bgl II single digestion; and M, represents for a D15000 DNA Marker.

As shown in FIG. 5B, the size of pC0308-KhvMaauMCMK5400 plasmid was 28361 bp; lane 1 was the control of the unenzyme cut plasmid; the size of the lane 2 band after Kpn I single digestion was 2858 bp+10564 bp+14939 bp; the size of the lane 3 band after BamH I single digestion was 2053 bp+6895 bp+19,413 bp; the size of the lane 4 band after Sac I single digestion was 270 bp+1376 bp+5928 bp+20787 bp; the size of the lane 5 band after Sma I single digestion was 28361 bp; and the size of the lane 6 band after Bgl II single digestion was 2194 bp+7867 bp+8375 bp+9925 bp. The digestion result was exactly as expected. The correctly digested plasmid was selected for sequencing, and the sequences are exactly as expected. The sequence is represented by SEQ ID NO. 3.

Figure 5C:
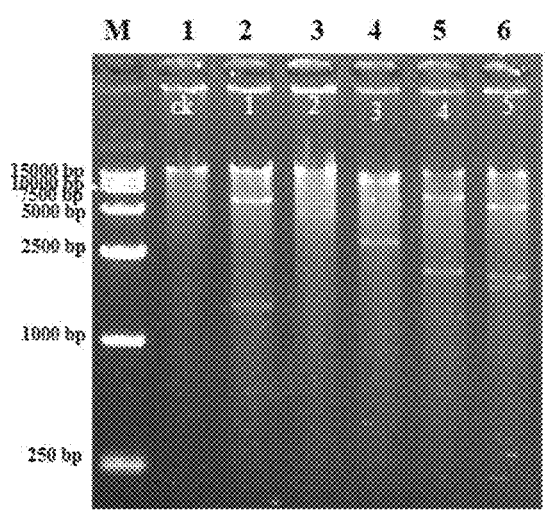
FIG. 5C is a graph showing the enzyme digestion verification result of the pC0309-KhvMaauMCMK5400, in which lane 1 represents for a pC0309-KhvMaauMCMK5400 plasmid that is not digested; lane 2 is by Sac I single digestion; lane 3 is by Sph I single digestion; lane 4 is by Kpn I single digestion; lane 5 is by BamH I single digestion; lane 6 is by Xho I single digestion; and M, represents for a D15000 DNA Marker.

As shown in FIG. 5C, the size of pC0309-KhvMaauMCMK5400 plasmid is 28723 bp; lane 1 was the control of unselected plasmid; the size of the lane 2 band after Sac I single digestion was 270 bp+1376 bp+5928 bp+21149 bp; the size of the lane 3 band after Sph I single digestion was 4317 bp+4837 bp+5770 bp+13799 bp; the size of the lane 4 band after Kpn I single digestion was 2858 bp+10926 bp+14939 bp; the size of the lane 5 band after BamH I single digestion was 2053 bp+6895 bp+19775 bp; and the size of the lane 6 band after Xho I single digestion was 76 bp+1709 bp+1935. The digestion result was exactly as expected. The correctly digested plasmid was selected for sequencing, and the sequences are exactly as expected. The sequence is represented by SEQ ID NO. 4.

Figure 5D:
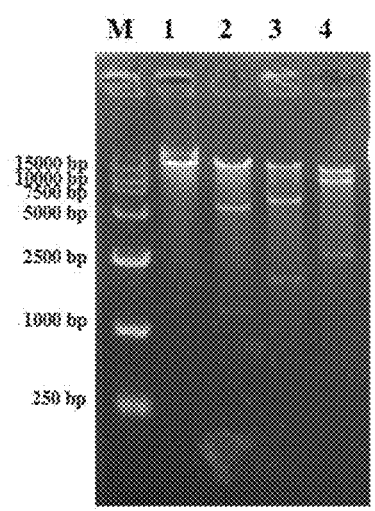
FIG. 5D is a graph showing the enzyme digestion verification result of the pC0307-KhvMaauMCMK5400, in which lane 1 represents for a pC0307-KhvMaauMCMK5400 plasmid that is not digested; lane 2 is by Sac I single digestion; lane 3 is by BamH I single digestion; lane 4 is by Kpn I single digestion; and M, represents for a D15000 DNA Marker.

As shown in FIG. 5D, the size of pC0307-KhvMaauMCMK5400 plasmid was 28469 bp; lane 1 was the control of the unenzyme cut plasmid; the size of lane 2 band after Sac I single digestion was 270 bp+1376 bp+5928 bp+20895 bp; the size of lane 3 band after BamH I single digestion was 2053 bp+6895 bp+19521 bp; and the size of the lane 4 band after Kpn I single digestion was 2858 bp+10672 bp+14939 bp. The digestion result was exactly as expected. The correctly digested plasmid was selected for sequencing, and the sequences are exactly as expected. The sequence is represented by SEQ ID NO. 5.

Example 2. *Agrobacterium*-Mediated Genetic Transformation of Rice with GAT Vector 1. Transformation of *Agrobacterium tumefaciens* with the GAT Vector Constructed in Example 1 and Validation.

*Agrobacterium tumefaciens* EHA105 stored at −80° C. was taken and subjected to plate streaking in YEP containing rifampicin (25 μg/ml)+streptomycin (50 μg/ml) at 28° C. A single colony was picked and inoculated in 5 ml of YEP liquid medium containing the above antibiotics, and incubated at 220 rpm for 12 to 16 h at 28° C. 2 ml of bacterial broth were transferred to 100 ml of YEP liquid medium containing the above antibiotics, and incubated at 28° C. and 220 rpm until $OD_{600}$=0.5. The resultant was pre-cooled on ice for 10 min, and centrifuged at 4° C., 5000 rpm for 10 min (pre-cooled to 4° C. by frozen centrifuge). The resultant was washed 2 times with sterile deionized water (10 ml each time), 1 time with 10% sterile glycerol, 4° C., centrifuge at 5000 rpm for 10 min, and the bacteria were resuspended in 3 ml of 10% sterile glycerol. 1 μl of the correctly sequenced GAT plasmid pC0308-MMMaauCK5400 obtained in Example 1 were taken and added with 50 μl of *Agrobacterium tumefaciens* competent cells, the resultant was subjected to 1.8 KV electric shock transformation. The cells were coated on YEP plates containing kanamycin, rifampicin and streptomycin, incubated at 28° C. for about 48 h, and single colonies were picked and shaken overnight.

Figure 5E:
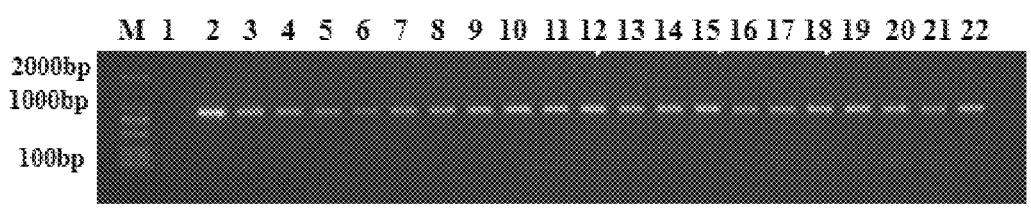
FIG. 5E is a graph showing the colony PCR test results of *Agrobacterium tumefaciens* transformed with pC0308-MM-MaauCK5400, in which lanes 1-22 show the test results by specific primers of SEQ ID NOs. 34-35, in which lane 1 is the negative water control, lane 2 is the pC0308-MM-MaauCK5400 plasmid control, lanes 3-22 are different single colonies, and M is D2000 DNA Marker.
Figure 13:
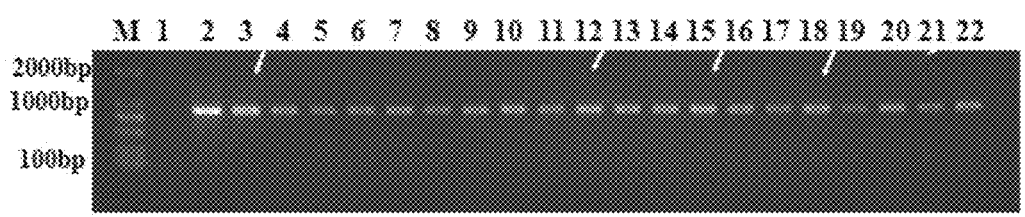
FIG. 13 is a graph showing the colony PCR test results of *Agrobacterium tumefaciens* transformed with pC0308-MM-MaauCK5400, in which lanes 1-22 show the test results using specific primers of SEQ ID NOs. 30-31, in which lane 1 is the negative water control, lane 2 is the pC0308-MMMaauCK5400 plasmid control, lanes 3-22 are different single colonies, and M is D2000 DNA Marker.

Colony PCR validation of pC0308-MMMaauCK5400 transformed *Agrobacterium* monoclonal was performed using specific primers SEQ ID NO. 30-31 and SEQ ID NO. 34-35 (as in FIG. 13 and FIG. 5E) resulted in amplification of 914 bp and 923 bp target fragments. Positive clones were selected, shaken for 36 to 48 h, and the bacterial broth was preserved for infestation.

2. *Agrobacterium*-Mediated Genetic Transformation

Induction: Seeds from the Zhonghua 11 (ZH11) background and carrying the pure recessive male sterility gene Oscyp704b2-3 were sterilized by sodium hypochlorite and placed on induction medium ($N_6$+2.4-D 3 mg/L+CH 0.6 g/L+Pro0.5 g/L+Sucrose 30 g/L+Phytagel 3 g/L) and incubated at 28° C. in the dark at room temperature for 30-40 d, the obtained induced healing wounds was subjected to secondary culture for 30-40 d.

Screening: The engineered *Agrobacterium* obtained in the present Example was transformed into the above healing tissue by *Agrobacterium*-mediated genetic transformation method, and after a total of 3 d of culture, the resultant was washed 5 to 6 times and transferred to a screening medium containing bispyribac-sodium resistance ($N_6$+2.4-D 2 mg/L+CH 0.6 g/L+Pro0.5 g/L+sucrose 30 g/L+Phytagel 3 g/L+Cn 500 mg/L+bispyribac-sodium 0.3-0.6 μm/L or hygromycin 50 mg/L), and cultured in the dark at 30° C. for 30-50 d to screen for resistant healing.

Differentiation: resistant healings obtained by screening were transferred to a resistant differentiation medium containing bispyribac-sodium (MS+KT 2 mg/L+NAA 0.5-2 mg/L+sorbitol 20-30 g/L+sucrose 30 g/L+Phytagel 3 g/L+bispyribac-sodium 0.1-0.3 μm/L), and positive seedlings were obtained by differentiation for 25-30 d.

Rooting: positive seedlings obtained by differentiation were transferred to a rooting medium containing bispyribac-sodium resistance (½ MS+sucrose 20 g/L+paclobutrazol 0.5-1 mg/L+Phytagel 3 g/L+bispyribac-sodium 0.15-0.5 μm/L), and rooted for 7-15 d to finally obtain positive transgenic plants.

Hardening-seedling and transplanting: the sealing film of the bottle for the transformed strains with vigorous root growth was opened, sterile water was added to cover the medium 1-2 cm high, the resultant was placed in contact with air at room temperature for 2-3 d for hardening-seedling, and then transplanted to the greenhouse for cultivation. A total of 574 GAT transformed lines were obtained from the screening, and 563 plants survived 7-14 days after transplanting. At the time of transplanting GAT transformed lines, a certain number of ZH11 at the period of two leaves and a centre was transplanted as a control.

Example 3. Molecular Identification of GAT T0 Generation Transformed Material

The leaves of the transgenic plants obtained in Example 2 were taken at the period of five leaves to extract total genomic DNA by CTAB method as follows: 2-4 cm leaves were taken into a mortar, and 800-900 ul of 1.5% CTAB solution were added for grinding, then the ground liquid was transferred into a 1.5 ml centrifuge tube, and placed on ice or in a low-temperature refrigerator to be used. Sample was placed at water bath at 65° C. for 30 min, during which the resultant was inverted several times for mixing well. In a fume hood, chloroform and isoamyl alcohol solution were added with a glass pipette (chloroform:isoamyl alcohol=24:

1, i.e., 500 ml chloroform vs 22 ml isoamyl alcohol, the resultant was mixed gently) 650 ul, after mixing well, and the resultant was shaken on a shaker for 30 min or hand shaken for about 10 min, and then obvious stratification can be seen. The shaken sample was centrifuged at 8000-10000 rpm for 8 min; about 400 ul of supernatant was sucked, and transferred to a new centrifuge tube, −20° C. pre-cooled 95% ethanol 800 ul were added and, gently inverted and mixed, the resultant was placed into −20° C. refrigerator for 30 min. The frozen sample at −20° C. was taken, and centrifuged at 12000 rpm for 10 min, the supernatant was removed; 75% ethanol was added, the resultant was stood for about 1 min, and the supernatant was removed, then subjected to air dry; 200-300 ul of sterilized water ($ddH_2O$) were added, the air-dried sample DNA was dissolved to be used.

Figure 14:
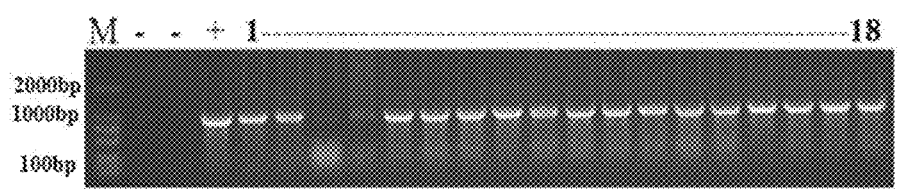
FIG. 14 is a graph showing the PCR positive test results for PC0308-MMMAAUCK5400 transgenic plants. The test primer sequences are represented by SEQ ID NOs. 30-31. M is D2000 DNA Marker, the first "−" is the negative control of water, the second "−" is the negative control wild-type Zhonghua 11, "+" is the positive control pC0308-MM-MaauCK5400 plasmid, and lanes 1-18 are transgenic T0 plants.
Figure 15:
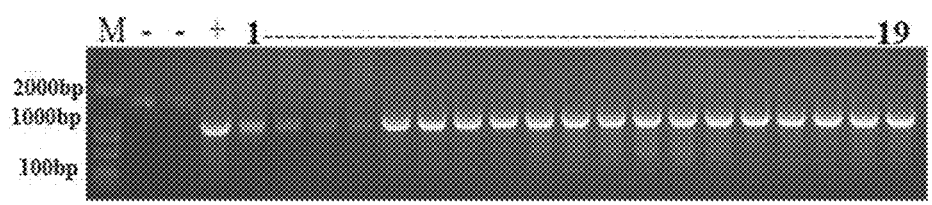
FIG. 15 is a graph showing the PCR positive test results of pC0308-MMMaauCK5400 transgenic plant, and the test primer sequences are represented by SEQ ID NOs. 32-33. M is D2000 DNA Marker, the first "−" is the negative control water, the second "−" is the negative control wild-type Zhonghua 11, "+" is the positive control pC0308-MM-MaauCK5400 plasmid, and lanes 1-19 are transgenic T0 plants.

The total DNA of T0 transgenic plants of pC0308-MM-MaauCK5400 was subjected to positive assay by PCR using specific primers SEQ ID NO. 30-31 (FIG. 14) and SEQ ID NO. 32-33 (FIG. 15). The plants that could amplify both 914 bp and 831 bp bands were selected to be used.

Figure 16:
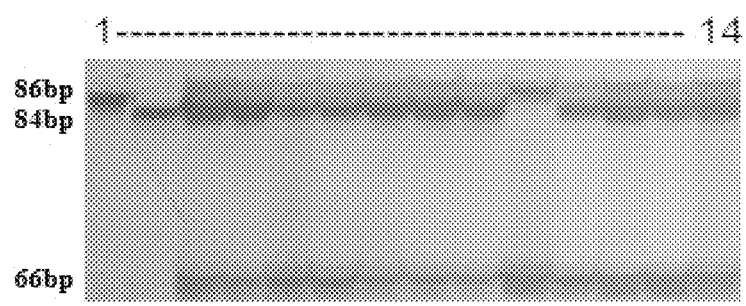
FIG. 16 is a graph showing the results of complementary element detection for pC1300-MMCK, pC0308-MM-MauCK5400 transgenic T0 plants, and the test primer sequences are represented by SEQ ID NOs. 28-29. Lane 1 is a wild-type Zhonghua 11, lane 2 is a cyp704b2-3 homozygous mutant, lanes 3-8 are pC1300-MMCK transgenic plants, and lanes 9-14 are pC0308-MMMaauCK5400 transgenic plants.

The DNA of T0 transgenic positive plants of pC0308-MMMaauCK540 screened by PCR positive assay above was firstly amplified by PCR with specific primers SEQ ID NO. 28 and SEQ ID NO. 29, and then the amplified products were digested with HaeIII enzyme, and finally detected by 6% SDS-PAGE gel. As shown in FIG. 16, plants that could only show 84 bp and 66 bp bands were selected for subsequent phenotypic identification.

The amplified regions of the specific primers SEQ ID NO. 28 and SEQ ID NO. 29 contain the cyp704b2-3 mutant variant site, and the presence of a 2-base deletion mutation in cyp704b2-3 mutant background plants can be observed in polyacrylamide gel electrophoresis. The amplified regions of the primers also contain an A→C SNP introduced in the coding region (CDS position 660) of CYP704B2 in the plant male fertility restoration genetic element expression cassette during vector construction. The SNP introduces a HaeIII cleavage site that allows the plant male fertility restoration genetic element expression cassette to be digested by HaeIII, whereas wild-type CYP704B2 cannot be digested by HaeIII. After amplifying the DNA of the trans-GAT vector plants with the above primer pair and subjecting to digestion with HaeIII, there are three possible fragments: 86 bp for the wild-type genotype of rice's own genome, 84 bp for the cyp704b2-3 mutant genotype, and 66 bp for the genotype of the transformed fragment. Plants with a genetic background of cyp704b2-3 pure mutant and containing the GAT vector were identified using the above method.

Figure 17:
FIG. 17 shows the results of spraying bispyribac-sodium on some of the GAT T0 generation transformants of Example 4.

Example 4 Phenotype Identification of Transformation Materials of GAT T0 Generation Herbicide Screening-Phenotype Identification of Bispyribac-Sodium Resistance In order to test the working efficiency of screening marker elements in the GAT system, a 600 mg/L bispyribac-sodium solution was prepared with 10% bispyribac-sodium (Nominee, Japan), and 563 GATT0 generation obtained in example 2 and wild-type control ZH11 3 to 5 leaf stage seedlings were sprayed. After spraying, continuous observation was carried out. The leaves of the control ZH11 appeared withered and yellow on the third day after spraying. The control ZH11 appeared withered and yellow and was dying on the seventh day after spraying. Most of the GAT transformants grew normally, and some of them showed yellowing or their growth was inhibited. the control ZH11 had completely died on the 14th day after spraying, but the GAT transformants showed three types of normal growth, growth inhibition and near death or irreversible death. Among them, the normal growth strains were highly resistant to bispyribac-sodium with 184 strains in total, indicating that the working efficiency of screening marker elements in these strains was high; the growth inhibited strains were mediumly resistant to bispyribac-sodium with 163 strains in total, indicating that the working efficiency of screening marker elements in these strains was average; the irreversible death strains or the near-death strains were non-resistant or low resistant to bispyribac-sodium with 216 strains in total, indicating that the working efficiency of screening marker elements in these strains was poor (FIG. 17).

In this experiment, the bispyribac-sodium resistance strains were screened for later screening and differentiation of maintainer and sterile lines, as well as impurity removal and purity maintenance of the maintainer line. In this process, it can be seen that the more functional elements are integrated on a vector, the less likely to have a transformation event where all the corresponding phenotypes of functional elements can be shown, which also confirms the consensus reached in the field at present, that is, the more elements integrated on the same vector, the more difficult to achieve simultaneously consistent traits, that is, the more functional elements, the less likely the expected phenotype occurred in the transformation event. However, in the process of screening the working efficiency of marker elements in the GAT system constructed by the present invention, the inventors screened on each phenotype, and found that the probability of the GAT transformants showing normal growth strains highly resistant to bispyribac-sodium was 32.68%, which was much more than the success rate of transformation events currently integrated with three functional elements or four functional elements in the art. Because in actual transgenic events, the success rate of single trait phenotype is 30% to 50%. Theoretically, for the transformation event integrated with multi-functional element, the probability that all elements meet the expectation should be between 30% to 50% of the N power, and N is the number of functional elements.

2. Herbicide Screening—Identification of Bentazon Sensitive Phenotype

Figure 18:
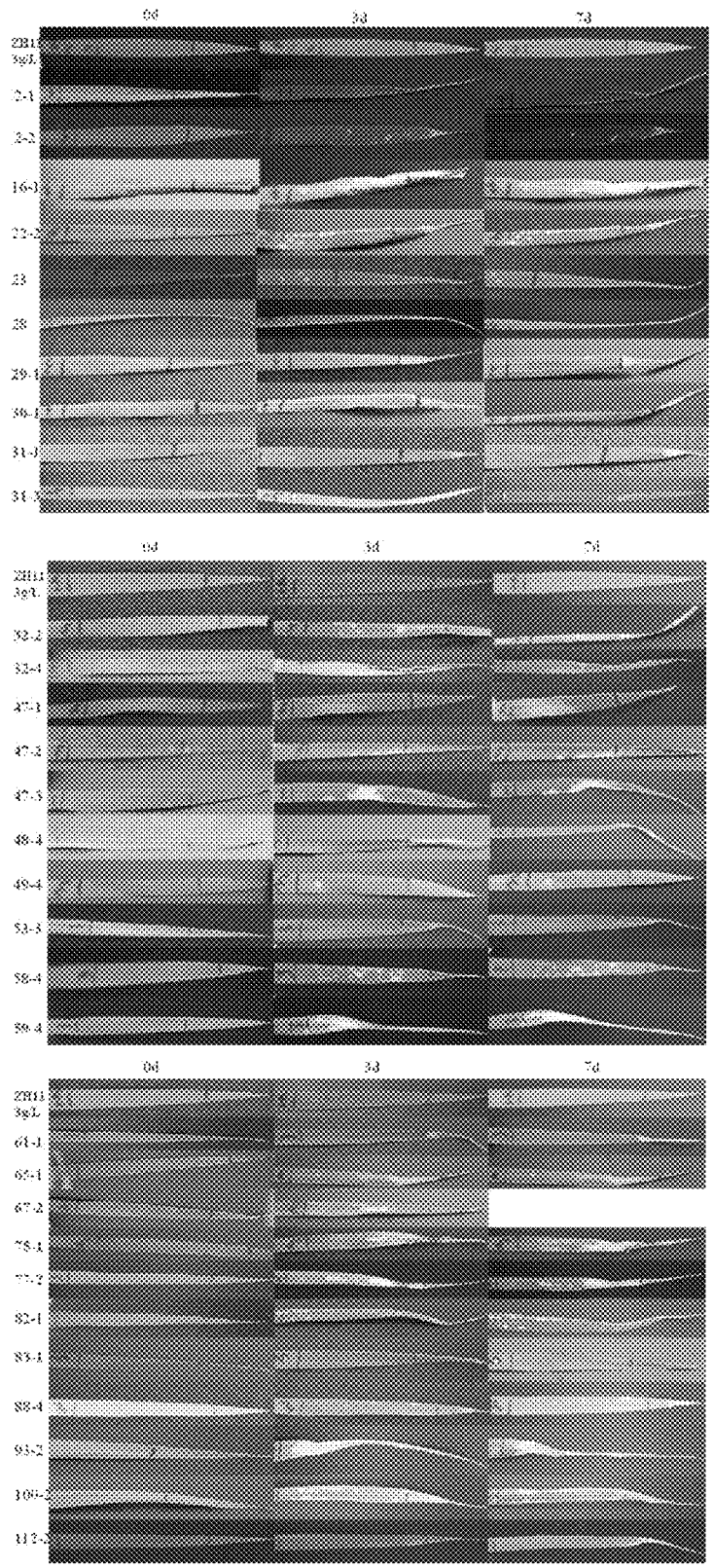
FIG. 18 shows the results of segmental spraying of bentazone on the leaves of some GAT T0 generation transformants of Example 4.

In order to test the working efficiency of herbicide sensitive elements in the GAT system, after the identification of bispyribac-sodium resistance phenotype, a 3 g/L bentazone solution was prepared with 48% bentazone mother liquor (Changzhou Precision Biotechnology Co., Ltd.). The scribed area of plant leaves of surviving GAT T0 generation (347 strains) in the last spraying experiment with bispyribac-sodium and the wild-type control ZH11 were sprayed with the resultant solution, and were continuously observed after spraying. Some GAT transformants T0 had curly and yellow leaf tips on the third day after spraying. From the 7th day to the 14th day after spraying, 144 strains showed irreversible leaf wilt, belonging to highly sensitive strains, indicating that the working efficiency of herbicide sensitive elements in these strains was high; the leaves of 81 strains withered severely at the early stage but gradually recovered, belonging to moderately sensitive strains, indicating that the working efficiency of herbicide sensitive elements in these strains was average; 122 strains had obvious changes before and after being sprayed with bentazone, belonging to low sensitive or non-phenotypic strains, indicating that the working efficiency of herbicide sensitive elements in these strains was poor (FIG. 18). Meanwhile, 86 strains were highly resistant to bispyribac-sodium and highly sensitive to bentazone. Based on the similar analysis of the transformation events of the above bispyribac-sodium resistance strains, it can be seen that this experiment confirmed that the working efficiency of herbicide sensitive elements in the GAT system is high, and the created GAT seed breeding system can quickly and accurately identify the corresponding phenotype thereof.

After spraying the herbicide such as bispyribac-sodium and bentazone, it was observed that there was no significant morphological difference between these GAT transformed strains and the control ZH11, and they continued to grow until flowering for the next experiment.

3. Identification of Pollen Fertility

In order to identify the working efficiency of restoring gene elements and pollen abortion gene elements, the pollen of GAT transformants was tested by iodine staining during flowering to detect pollen fertility of the transformed strains. Because the GAT vector contains the restoring gene element, if the restoring gene elements work normally, the male fertility can be restored. There are two types of pollen (ms/GAT) and (ms/−) produced. Because the (ms/GAT) type of pollen contains the pollen abortion gene element in the GAT vector, if it works normally, the pollen will be aborted, thus only (ms/−) type of pollen will survive. Therefore, if the GAT transformants contains only one copy of the GAT vector, and the restoring gene elements and the pollen abortion gene elements work normally, its pollens were separated that fertile pollen:sterile pollen=1:1.

Therefore, about 50% of iodine stained fertile pollens are blue black and 50% are sterile pollens without staining. The specific methods of iodine staining microscopy are as follows:

(1) Preparing potassium iodide dye solution (2 g KI was taken and dissolved in 5-10 mL of distilled water, then 1 g $I_2$ (dissolved with an appropriate amount of absolute ethanol) was added, and after completely dissolving, the distilled water was added to the volume of 300 mL. The resultant was stored in a brown bottle for standby, and was diluted to iodine dye working solution according to the ratio of potassium iodide:deionized water=1:1 during use).

(2) Pollen collection: the fully mature anthers to be scattered was taken and peeled off with the glume, and the anthers were taken out and placed on the slide.

(3) Microscopic examination: about 70 µl iodine dye working solution was dropped on the anther, and the anther was fully crushed with tweezers to release the pollen grains. The cover glass was covered and the pollen grains were observed under a low power microscope. The pollen grains dyed to blue black are fertile pollen grains, while those in light yellow are sterile pollen grains.

Figure 19:
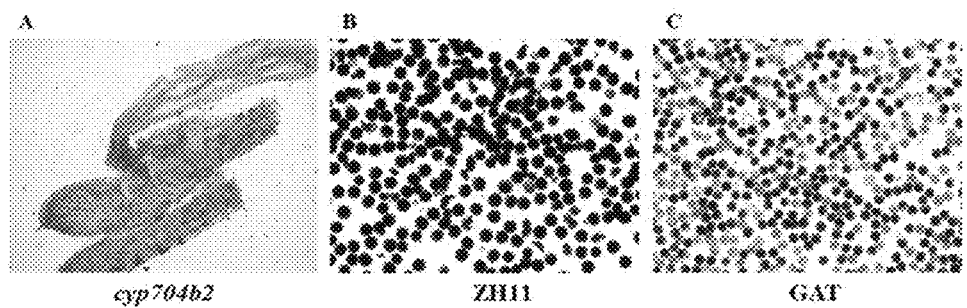
FIG. 19 shows the results of iodine staining of mature pollen of GAT T0 generation transformed plants, black represents for fertile pollen; and light color represents for abortive pollen.

Iodine staining microscopy examination showed that the cyp704b2-3 mutant on the background of Zhonghua 11 had no pollen (A in FIG. 19); In contrast to ZH11, most of the pollen can be dyed blue black, which is male fertile pollen (B in FIG. 19). About 50% of the GAT transformants of 102 strains can be dyed blue black, showing normal fertility; about 50% of the pollen can not be dyed blue black, which is shown as sterile pollen (as shown in GAT of C in FIG. 19), that is, fertile pollen: the sterile pollen conforms to the 1:1 segregation ratio, indicating that the restoring gene elements and pollen abortion gene elements exist in a single copy in these lines and their work efficiency is high. This is because if the GAT transformants contain only one copy of the GAT vector, and the restoring gene elements and the pollen abortion gene elements work normally, then the pollens thereof present fertile pollen: abortive pollen=1:1 separation, which is the rule of gene separation and free combination in the genetic law. Therefore, if 1:1 separation phenotype occurs, it indicates that the working efficiency of the above elements was normal and meets the expectation. The fertile pollen: the sterile pollen of other strains did not conform to the 1:1 segregation ratio, and partial segregation occurred, indicating that the working efficiency of the restoring gene elements and the pollen abortion gene elements in these strains was poor or the genome contains multiple copies.

4. Fluorescence Identification of Seeds

Figure 20:
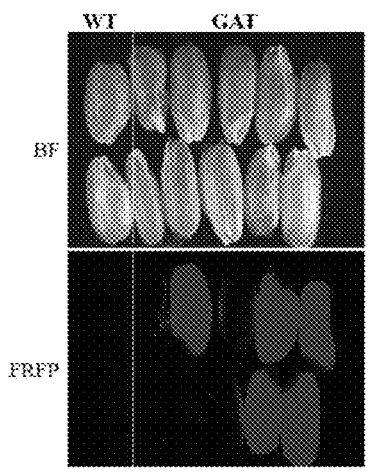
FIG. 20 shows the results of seed fluorescence identification of GAT transformed strain (T0 generation).

There are 26 strains with excellent herbicide phenotype and pollen staining phenotype, as shown in Table 1. The seeds of T0 generation (T1 generation) were harvested by self pollination of the above strains. According to the results of the identification of pollen fertility, if the GAT transformants contains only one copy of the GAT vector, and the restoring gene elements and the pollen abortion gene elements work normally, its self-pollinated seeds will also show 1:1 separation, that is, wherein 50% of the seeds containing the GAT vector (genotype is ms ms/GAT−) will show dark red fluorescence under 560 nm to 595 nm excitation light; 50% of the seeds without GAT vector (genotype: ms ms) showed no fluorescence under 560 nm to 595 nm excitation light. The results showed that the control ZH11 seed had no fluorescence (WT in FIG. 20). Some seeds of the GAT transformants showed dark red fluorescence (GAT in FIG. 20). Chi-square analysis showed that the T0 generation seeds of 18 GAT transformants were in line with fluorescent seeds:non fluorescent seeds=1:1 separation (as shown in Table 1), indicating that the seed screening elements in these strains were single copy and their work efficiency was high. The segregation ratio of 1 strain was close to 1:1, which may be caused by the low seed setting rate of T0 generation, so it was also an excellent transformed strain. Another 7 strains did not conform to 1:1 segregation, showing partial segregation and weak fluorescence, indicating that the working efficiency of seed screening elements in these strains was poor or the genome contained multiple copies.

TABLE 1

Summary of fluorescence of T0 generation seed of GAT transformants

| No. | Strains | Fluorescence intensity | Total number of seeds | Fluorescent seeds | Non-fluorescent seeds | Theoretical value | $X^2c$ | P | Whether 1:1 is met |
|---|---|---|---|---|---|---|---|---|---|
| 1 | 2-1 | Weak/none | 643 | 162 | 481 | 321.5 | 158.26 | P < 0.05 | No |
| 2 | 2-2 | Weak | 38 | 24 | 14 | 19 | 2.66 | P > 0.05 | Yes |
| 3 | 11-1 | Medium | 269 | 120 | 149 | 134.5 | 3.13 | P > 0.05 | Yes |
| 4 | 23-2 | Strong | 143 | 74 | 69 | 71.5 | 0.18 | P > 0.05 | Yes |
| 5 | 53-3 | Strong | 70 | 29 | 41 | 35 | 2.07 | P > 0.05 | Yes |
| 6 | 77-2 | Strong | 428 | 193 | 235 | 214 | 4.12 | P < 0.05 | About |

TABLE 1-continued

Summary of fluorescence of T0 generation seed of GAT transformants

| No. | Strains | Fluorescence intensity | Total number of seeds | Fluorescent seeds | Non-fluorescent seeds | Theoretical value | $X^2c$ | P | Whether 1:1 is met |
|---|---|---|---|---|---|---|---|---|---|
| 7 | 82-1 | None | 361 | 29 | 332 | 180.5 | 254.32 | $P < 0.05$ | No |
| 8 | 83-1 | None | 511 | 34 | 477 | 255.5 | 384.05 | $P < 0.05$ | No |
| 9 | 88-4 | Strong | 582 | 285 | 297 | 291 | 0.25 | $P > 0.05$ | Yes |
| 10 | 93-2 | Strong | 339 | 155 | 184 | 169.5 | 2.48 | $P > 0.05$ | Yes |
| 11 | 95-2 | Strong | 193 | 85 | 108 | 96.5 | 2.75 | $P > 0.05$ | Yes |
| 12 | 140-3 | None | 8 | 0 | 8 | 4 | 8.13 | $P < 0.05$ | No |
| 13 | 147-3 | Strong | 15 | 4 | 11 | 7.5 | 3.33 | $P > 0.05$ | Yes |
| 14 | 150-2 | Strong | 5 | 3 | 2 | 2.5 | 0.40 | $P > 0.05$ | Yes |
| 15 | 174-3 | Strong | 122 | 58 | 64 | 61 | 0.30 | $P > 0.05$ | Yes |
| 16 | 175-2 | Strong | 30 | 15 | 15 | 15 | 0.03 | $P > 0.05$ | Yes |
| 17 | 175-4 | Strong | 52 | 24 | 28 | 26 | 0.33 | $P > 0.05$ | Yes |
| 18 | 179-1 | Strong | 2 | 2 | 0 | 1 | 2.50 | $P > 0.05$ | Yes |
| 19 | 180-2 | None | 43 | 0 | 43 | 21.5 | 43.02 | $P < 0.05$ | No |
| 20 | 180-3 | None | 33 | 0 | 33 | 16.5 | 33.03 | $P < 0.05$ | No |
| 21 | 2 | Weak/none | 286 | 20 | 266 | 143 | 211.60 | $P < 0.05$ | No |
| 22 | 4 | Strong | 99 | 53 | 46 | 49.5 | 0.51 | $P > 0.05$ | Yes |
| 23 | 7 | Strong | 86 | 42 | 44 | 43 | 0.06 | $P > 0.05$ | Yes |
| 24 | 20 | Strong | 181 | 86 | 95 | 90.5 | 0.45 | $P > 0.05$ | Yes |
| 25 | 23 | Strong | 225 | 114 | 111 | 112.5 | 0.04 | $P > 0.05$ | Yes |
| 26 | 28 | Strong | 177 | 80 | 97 | 88.5 | 1.64 | $P > 0.05$ | Yes |

Figure 21:
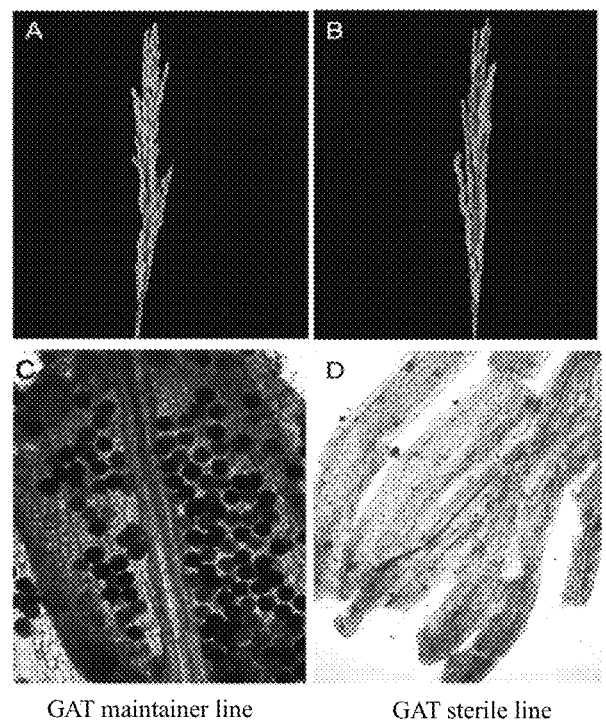
FIG. 21 is a graph showing the identification of pollen fertility and self-fertilization after the development of fluorescent and non-fluorescent seeds into plants, respectively, in GAT representative strain 88-4, A and C are derived from the panicles and anthers of the plants developed from the fluorescent seeds, wherein half of the pollen is fertile and stained blue with iodine; and the other half of the pollen is sterile, and is not colored after iodine staining, and the rice spike can be self-fertilizing. B and D are derived from the panicles and anthers of the plants developed from the non-fluorescent seeds, which are of the pollen-free type and typical feature of the cyp704b2 recessive genic male sterile mutant, and the rice spike are not self-fertile.

5. Identification of Fertility and Screening and Separation of Recessive Nuclear Male Sterile Line and Maintainer Line The fertility of two kinds of seeds (fluorescent seeds and non-fluorescent seeds) of excellent strains obtained in step 4 were observed from germination and transplanting to seedling stage, as shown in FIG. 21. Plants from fluorescent seeds can self pollinate and harvest seeds (A and C in FIG. 21); Plants from non-fluorescent seeds are sterile and unable to self pollinate (B and D in FIG. 21). It shows that the reproduction of the recessive nuclear male sterile material (recessive genic male sterile mutant containing cyp704b2 in this example) and the maintenance of the sterility of recessive nuclear male sterile material have been successfully realized through the GAT system.

Example 5 Phenotype Identification of Transformation Materials of GAT T1 Generation In order to identify the stability and working efficiency of the GAT system in different generations, the following experiments were conducted on 14 strains with more seeds among the 18 excellent strains obtained in T0 generation:
1. Herbicide Screening—Validation of Tissue Culture Screening of Bispyribac-Sodium In order to identify the working efficiency of screening marker elements in the GAT T1 generation, tissue culture germination was used to screen the T1 generation of key strains and candidate strains. If the GAT vector exists in the genome in the form of a single copy and the pollen abortion gene element works normally, the T1 generation of the strains will show 1:1 separation, that is, 50% of the strains contains the GAT vector, which is resistant to bispyribac-sodium and can germinate normally under the screening pressure of bispyribac-sodium; 50% of them do not contain GAT vector, which was not resistant to bispyribac-sodium, and cannot germinate under the screening pressure of bispyribac-sodium.

Therefore, ½MS medium+3 μm bispyribac-sodium was prepared for screening the key strains and the candidate strains of GAT, and the germination results were shown in Table 2. Among them, 10 strains accorded with the germination ratio of 1:1; the germination ratio of one strain was close to 1:1, which indicated that the working efficiency of screening marker elements in these 11 strains was normal and the heredity between generations was relatively stable. It also indicated that screening marker elements could effectively distinguish two different types of seeds or seedlings (i.e., GAT sterile lines and GAT maintainer lines) isolated from the inbred progeny of the GAT transformants; the germination ratio of other strains was not consistent, indicating that there might be abnormal working efficiency of elements or unstable heredity between generations.

TABLE 2

Summary of screening results of BS medium of T0 generation seeds of GAT Key strains

| No. | Strains | The number of seeds | Germination | Non-germination | Theoretical value | $X^2c$ | P | Whether 1:1 is met |
|---|---|---|---|---|---|---|---|---|
| CK | ZH11 | 40 | 0 | 40 | | | | |
| 1 | 11-1 | 58 | 26 | 32 | 29 | 0.64 | $P > 0.05$ | Yes |
| 2 | 23-2 | 30 | 19 | 11 | 15 | 2.17 | $P > 0.05$ | Yes |
| 3 | 53-3 | 19 | 7 | 12 | 9.5 | 1.37 | $P > 0.05$ | Yes |
| 4 | 77-2 | 46 | 29 | 17 | 23 | 3.15 | $P > 0.05$ | Yes |
| 5 | 88-4 | 62 | 30 | 32 | 31 | 0.08 | $P > 0.05$ | Yes |
| 6 | 93-2 | 34 | 15 | 19 | 17 | 0.50 | $P > 0.05$ | Yes |
| 7 | 95-2 | 35 | 10 | 25 | 17.5 | 6.46 | $P < 0.05$ | About |
| 8 | 174-3 | 15.2 | 12 | 3.2 | 7.6 | 5.16 | $P < 0.05$ | No |
| 9 | 175-4 | 27.3 | 14 | 13.3 | 13.65 | 0.05 | $P > 0.05$ | Yes |

TABLE 2-continued

Summary of screening results of BS medium of T0 generation seeds of GAT Key strains

| No. | Strains | The number of seeds | Germination | Non-germination | Theoretical value | $X^2c$ | P | Whether 1:1 is met |
|---|---|---|---|---|---|---|---|---|
| 10 | 4 | 45 | 24 | 21 | 22.5 | 0.22 | $P > 0.05$ | Yes |
| 11 | 7 | 29 | 11 | 18 | 14.5 | 1.72 | $P > 0.05$ | Yes |
| 12 | 20 | 40 | 10 | 30 | 20 | 10.03 | $P < 0.05$ | No |
| 13 | 23 | 110 | 61 | 49 | 55 | 1.32 | $P > 0.05$ | Yes |
| 14 | 28 | 59 | 16 | 43 | 29.5 | 12.37 | $P < 0.05$ | No |

2. Herbicide Screening—Identification of Bentazone Phenotype

Figure 22:
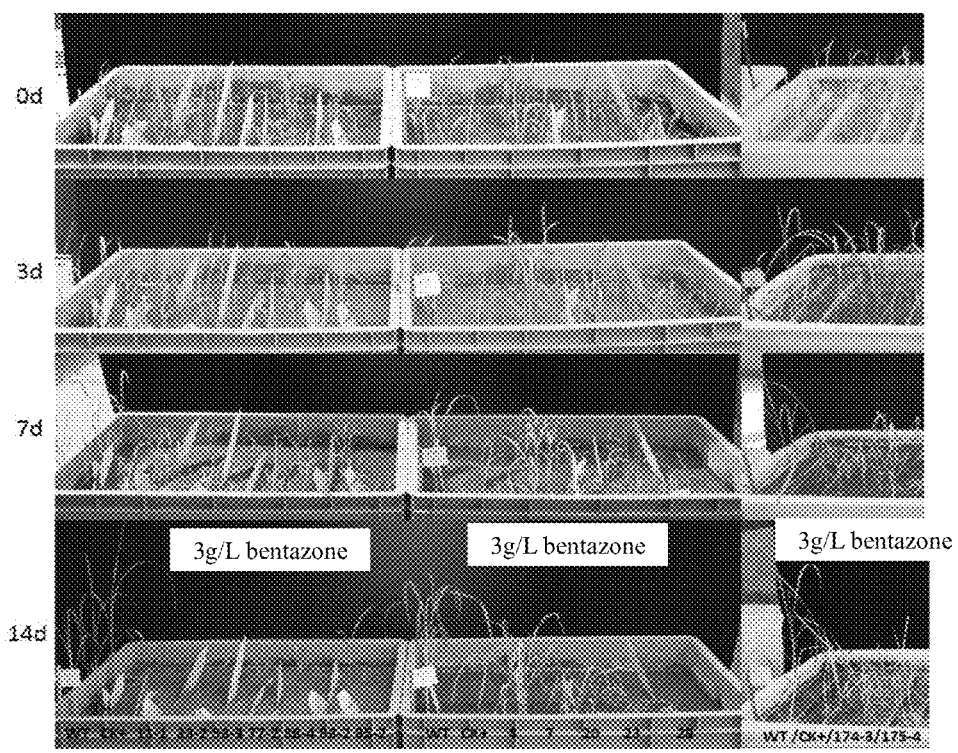
FIG. 22 shows the spraying result of bentazone on the GAT T1 generation focal strain.
Figure 23:
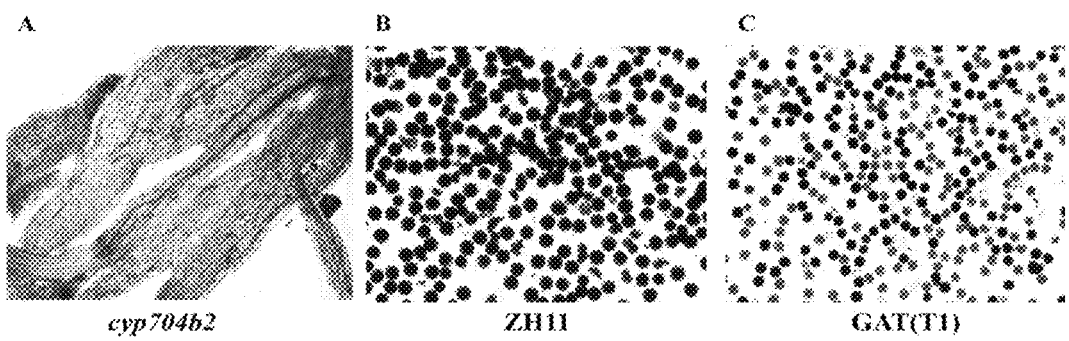
FIG. 23 is a graph showing the results of fertility testing of mature pollen from T1 generation of GAT transformant. A: cyp704b2, sterile mutant material, no pollen by microscopy; B: ZH11, is a common wild-type material of Zhonghua 11, normal pollen fertility by iodine staining by microscopy; C: GAT, is a material with GAT vector transferred into the sterile mutant. half of the pollen shows normal fertility stained with iodine, and the other half is not stained by microscopy.

In order to identify the working efficiency of herbicide sensitive elements in the T1 generation of the GAT transformants, a 3 g/L bentazone solution was prepared with 48% bentazone mother liquor (Changzhou Precision Biotechnology Co., Ltd.). Some plants in the positive strains screened by bispyribac-sodium in Example 5-1 were sprayed, and continuously observed after spraying. Among them, 6 strains of the bispyribac-sodium resistance strains were highly susceptible to wilt and death on the 14th day after spraying, and showed highly sensitive; in 5 strains, individual plants showed slightly less sensitive, but eventually the individual plants died after a long time; more than half of the two strains have poor individual sensitivity and segregation, indicating that there might be abnormal working efficiency of elements or unstable heredity between generations. See Table 3 and FIG. 22 for specific results.

scopic examination, refer to example 4-3. The results show that most of the pollens in the control ZH11 can be dyed blue black, which is completely fertile (as shown in B in FIG. 23); the mutant cyp704b2 has no pollen (as shown in A in FIG. 23), while most of the pollen of the GAT transformants in T1 generation appears half dyed, that is fertile pollen: sterile pollen conforms to the segregation ratio of 1:1 (as shown in C in FIG. 23). Among them, the fertility of 10 GAT transformants of T1 generation maintained the same as that of T0 (Table 4), and none of them were isolated, indicating that the working efficiency of pollen abortion gene elements was normal and the inheritance was stable between generations; In the other 4 strains, there are the pollens of individual plants not conforming to 1:1 separation, indicating that there might be abnormal working efficiency of elements or unstable heredity between generations.

TABLE 3

Summary of screening results of bentazone in T1 generation seedlings of GAT key plants

| No. | Strains | Total number of plants sprayed | Highly sensitive(dead) | Highly sensitive ratio | Medium sensitivity | Low sensitivity | No phenotype |
|---|---|---|---|---|---|---|---|
| 1 | ZH11 | 4 | 0 | 0/4 | 0 | 0 | 4 |
| 2 | CK + (P450i2-30) | 4 | 4 | 4/4 | 0 | 0 | 0 |
| 3 | 11-1 | 8 | 8 | 8/8 | 0 | 0 | 0 |
| 4 | 23-2 | 12 | 11 | 11/12 | 1 | 0 | 0 |
| 5 | 53-3 | 8 | 8 | 8/8 | 0 | 0 | 0 |
| 6 | 77-2 | 2 | 2 | 2/2 | 0 | 0 | 0 |
| 7 | 88-4 | 13 | 12 | 12/13 | 1 | 0 | 0 |
| 8 | 93-2 | 9 | 8 | 8/9 | 0 | 1 | 0 |
| 9 | 95-2 | 2 | 2 | 2/2 | 0 | 0 | 0 |
| 10 | 174-3 | 10 | 4 | 4/10 | 0 | 6 | 0 |
| 11 | 175-4 | 7 | 5 | 5/7 | 2 | 0 | 0 |
| 12 | 4 | 2 | 1 | 1/2 | 1 | 0 | 0 |
| 13 | 7 | 15 | 2 | 2/15 | 0 | 13 | 0 |
| 14 | 20 | 3 | 2 | 2/3 | 1 | 0 | 0 |
| 15 | 23 | 14 | 14 | 14/14 | 0 | 0 | 0 |
| 16 | 28 | 7 | 7 | 7/7 | 0 | 0 | 0 |

ZH11 is Resistance Control, CK+(P450i2-30) is the Sensitive Positive Control

3. Identification of Pollen Fertility

In order to identify the working efficiency of pollen abortion gene elements in the T1 generation of the GAT transformants, the pollen of the other half of the strains with good detection efficiency in examples 5-1 and 5-2 were iodine stained at the time of rice flowering to detect the pollen fertility of the GAT transformants. The fertility of T0 generation pollen is the same as that in Example 4. If the GAT vector in T1 generation exists as a single copy in the genome, and the pollen abortion gene elements works normally, the fertile pollen is 1:1 separated from the sterile pollen. For the specific method of iodine staining micro-

TABLE 4

Identification of pollen fertility of T1 generation plants of GAT transformants

| No. | Strains | The checked number of plants | The number of plants with 1:1 segregation | whether is stable inheritance |
|---|---|---|---|---|
| 1 | 11-1 | 6 | 6 | Yes |
| 2 | 23-2 | 3 | 3 | Yes |
| 3 | 53-3 | 6 | 6 | Yes |
| 4 | 77-2 | 10 | 9 | Separation |
| 5 | 88-4 | 8 | 8 | Yes |
| 6 | 93-2 | 6 | 6 | Yes |
| 7 | 95-2 | 7 | 7 | Yes |
| 8 | 174-3 | 5 | 5 | Yes |

TABLE 4-continued

Identification of pollen fertility of T1 generation plants of GAT transformants

| No. | Strains | The checked number of plants | The number of plants with 1:1 segregation | whether is stable inheritance |
|---|---|---|---|---|
| 9 | 175-4 | 3 | 3 | Yes |
| 10 | 4 | 10 | 7 | Separation |
| 11 | 7 | 7 | 7 | Yes |
| 12 | 20 | 6 | 3 | Separation |
| 13 | 23 | 16 | 14 | Separation |
| 14 | 28 | 1 | 1 | Yes |

4. Fluorescence Identification of Seeds

Figure 24:
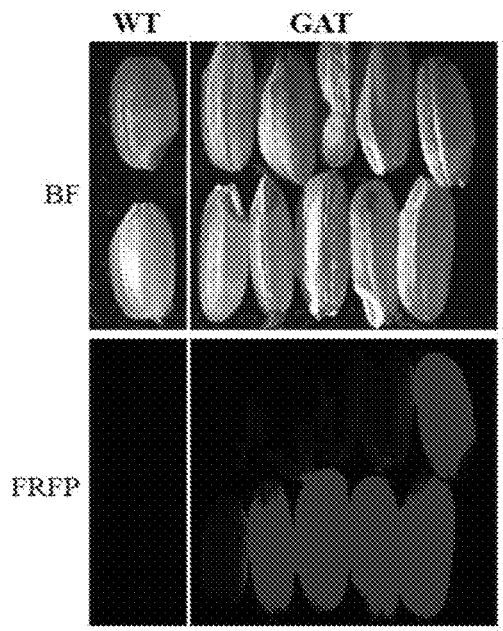
FIG. 24 is a graph showing the results of seed fluorescence identification of GAT transformant (T1 generation).

The fluorescence of the self-pollinated and harvested seeds of the above strains were further tested to test the working efficiency of seed screening elements in the T1 generation of the GAT transformants. The results showed that the seed coat of some seeds in the T1 generation of all strains showed strong dark red fluorescence (GAT in FIG. 24). Chi-square analysis showed that the T1 generation seeds of 6 strains met the expected segregation ratio of 1:1 (Table 5); the segregation ratio of seed fluorescence of 2 strains was close to 1:1. This shows that the working efficiency of pollen abortion gene elements and seed fluorescence elements in these strains is normal and can be inherited stably. It also indicated that the seed screening elements could effectively distinguish two different types of seeds (i.e., GAT sterile line and GAT maintainer line) separated from the progenies of self-pollinated seeds of the GAT transformants. The segregation ratio of seed fluorescence of the other 5 strains did not conform to 1:1, indicating that there might be abnormal working efficiency of seed elements or pollen abortion gene elements, or unstable heredity between generations.

TABLE 5

Fluorescence identification of T1 generation seeds of GAT transformants

| No. | strains | Fluorescence intensity | Total number of seeds | The number of fluorescent seeds | The number of non-fluorescent seeds | Theoretical value | $X^2c$ | P | Whether 1:1 is met |
|---|---|---|---|---|---|---|---|---|---|
| 1 | 11-1 | Strong | 260 | 112 | 148 | 130 | 4.99 | P < 0.05 | About |
| 2 | 23-2 | Strong | 167 | 70 | 97 | 112.5 | 4.37 | P < 0.05 | About |
| 3 | 53-3 | Strong | 310 | 154 | 156 | 155 | 0.02 | P > 0.05 | Yes |
| 4 | 77-2 | Strong | 422 | 193 | 229 | 211 | 3.07 | P > 0.05 | Yes |
| 5 | 88-4 | Strong | 409 | 202 | 207 | 204.5 | 0.06 | P > 0.05 | Yes |
| 6 | 93-2 | Strong | 290 | 130 | 160 | 145 | 3.11 | P > 0.05 | Yes |
| 7 | 95-2 | Strong | 240 | 87 | 153 | 120 | 18.15 | P < 0.05 | No |
| 8 | 174-3 | Strong | 122 | 58 | 64 | 61 | 0.30 | P > 0.05 | Yes |
| 9 | 175-4 | Strong | 52 | 24 | 28 | 26 | 0.33 | P > 0.05 | Yes |
| 10 | 4 | Strong | 315 | 107 | 208 | 157.5 | 32.39 | P < 0.05 | No |
| 11 | 7 | Strong | 514 | 202 | 312 | 257 | 23.54 | P < 0.05 | No |
| 12 | 20 | Strong | 378 | 155 | 223 | 189 | 12.24 | P < 0.05 | No |
| 13 | 23 | Strong | 525 | 240 | 285 | 262.5 | 3.86 | P > 0.05 | Yes |
| 14 | 28 | Strong | 108 | 44 | 64 | 54 | 3.7 | 0.05 | Yes |

Based on the above results, all elements in the T1 generation of the GAT transformants worked normally and the strains with single copy of GAT vector include strains 11-1, 23-2, 53-3, 77-2, 88-4, 93-2, 23 and the like, and strains 95-2, 4, and 175-4 were selected as candidates. The above strains can meet all the requirements of GAT maintainer line and can be used as the excellent initial GAT maintainer line for variety breeding, sterile line and hybrid seed production.

5. Identification of Pollen Drift

Figure 25:
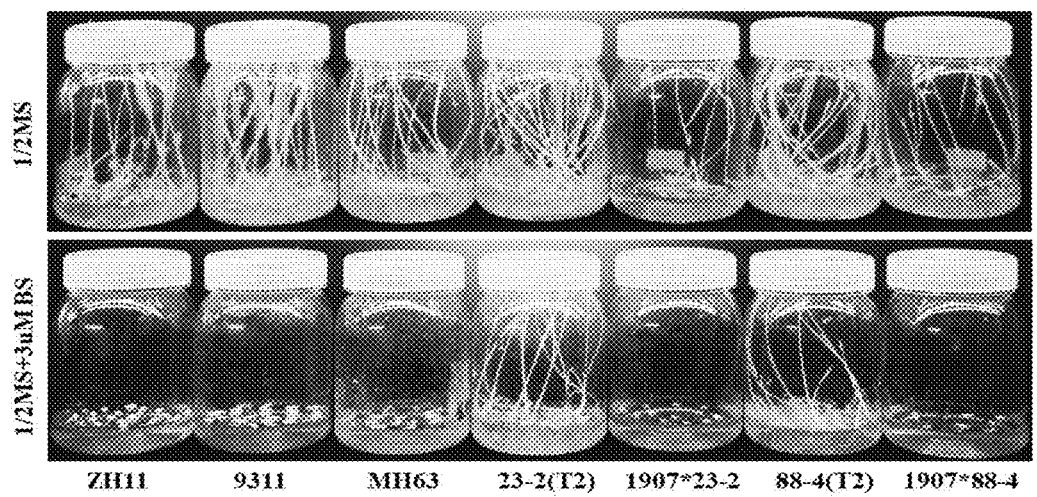
FIG. 25 is a graph showing the escape rate detection of the T1 generation GAT maintainer line.

The pollen and seed in the excellent initial maintainer line of GAT conformed to the segregation ratio of 1:1, which preliminarily indicated that the working efficiency of the pollen abortion elements in GAT was normal. To further detect whether its pollen escapes, in this example, the rice material of common sterile line was pollinated through the strains of the excellent initial maintainer line of GAT, and it was checked whether the hybrid seed has the resistance to bispyribac-sodium (the method is the same as that in Example 5). If so, the pollen containing GAT escapes; If not, it indicated that the pollen abortion elements in GAT had a good working efficiency and could effectively prevent the transformed pollen containing GAT from escaping. GAT strains (23-2, 88-4) were selected as male parents to pollinate female sterile line 1907, and 221 and 373 hybrid seeds were obtained respectively. After 21 days of screening hybrid seeds with bispyribac-sodium, it was observed that under the medium without screening pressure (½MS), the hybrid seeds germinated normally, while under the medium with screening pressure (½MS+3 uM BS), the hybrid seeds were consistent with non-transgenic ZH11, 9311 and MH63, and could not germinate (see FIG. 25) with the germination rate of 0% (see Table 6), indicating that the hybrid seeds did not contain GAT elements, and the pollen containing GAT could not be pollinated to common materials. It is proved that the pollen abortion elements in GAT work normally and can be inherited stably.

TABLE 6

Detection of the escape rate of GAT pollen

| Culture medium | Strains | Survival number | Total number | Survival rate |
|---|---|---|---|---|
| 1/2MS | ZH11 | 190 | 200 | 95.00% |
| | 9311 | 188 | 200 | 94.00% |
| | MH63 | 193 | 200 | 96.50% |

TABLE 6-continued

Detection of the escape rate of GAT pollen

| Culture medium | Strains | Survival number | Total number | Survival rate |
|---|---|---|---|---|
| | 23-2(T2) | 165 | 200 | 82.50% |
| | 1907 × 23-2(T1) | 8 | 10 | 80.00% |
| | 88-4(T2) | 169 | 200 | 84.50% |
| | 1907 × 88-4(T1) | 9 | 10 | 90.00% |

TABLE 6-continued

Detection of the escape rate of GAT pollen

| Culture medium | Strains | Survival number | Total number | Survival rate |
|---|---|---|---|---|
| | ZH11 | 0 | 200 | 0.00% |
| | 9311 | 0 | 200 | 0.00% |
| | MH63 | 0 | 200 | 0.00% |
| 1/2MS + 3uMBS | 23-2(T2) | 95 | 200 | 47.50% |
| | 1907 × 23-2(T1) | 0 | 211 | 0.00% |
| | 88-4(T2) | 83 | 200 | 41.50% |
| | 1907×88-4(T1) | 0 | 363 | 0.00% |

Figure 26:
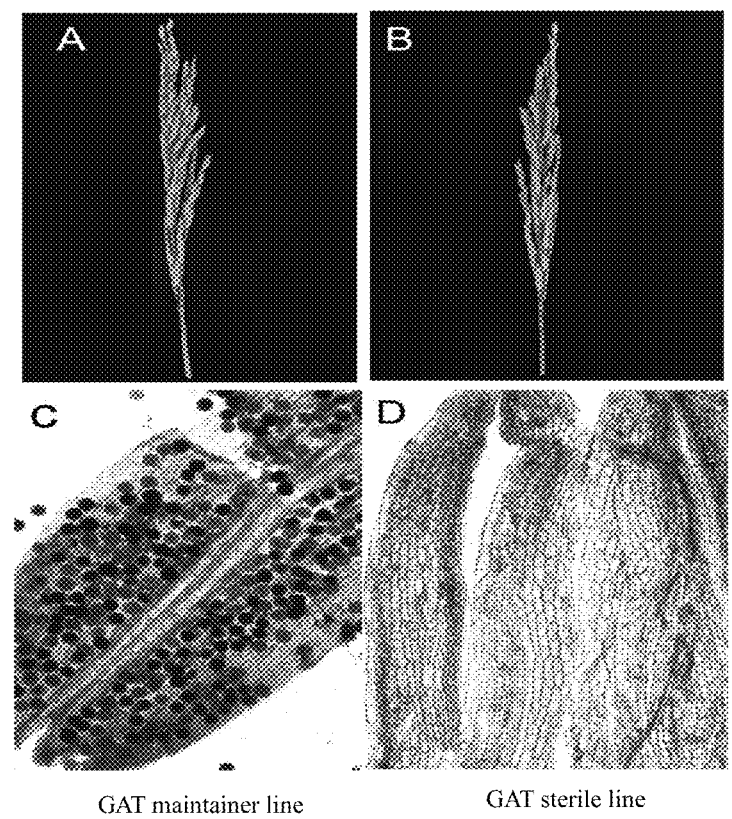
FIG. 26 is a graph showing the identification of pollen fertility and self-fertilization after the development of fluorescent and non-fluorescent seeds into plants, respectively, in the representative strain 88-4-16. A and C are derived from the panicles and anthers of the plants developed from the fluorescent seeds, wherein half of the pollen is fertile and stained blue with iodine; and the other half of the pollen is sterile, and is not colored after iodine staining, and the rice spike can be self-fertilizing. B and D are derived from the panicles and anthers of the plants developed from the non-fluorescent seeds, which are of the pollen-free type and typical feature of the cyp704b2 recessive genic male sterile mutant, and the rice spike are not self-fertile.

6. Fertility Identification and Screening and Separation of Recessive Nuclear Male Sterile Line and Maintainer Line The two kinds of seeds (fluorescent seeds and non-fluorescent seeds) of excellent strains obtained in step 4 were germinated, transplanted, and the fertility is observed in the seedling stage as shown in FIG. 26. Plants from fluorescent seeds can self pollinate and harvest seeds (A and C in FIG. 26); Plants from non-fluorescent seeds are sterile and unable to self pollinate (B and D in FIG. 26). It shows that the reproduction of recessive nuclear male sterile materials (recessive genic male sterile mutant containing cyp704b2 in this example), the maintenance of the sterility of recessive nuclear male sterile materials and the stable intergenerational inheritance of the GAT system have been successfully realized through the GAT system.

In conclusion, the results of Examples 1-5 prove that the present application has successfully achieved the reproduction of recessive nuclear male sterile materials and the maintenance of the sterility of recessive nuclear male sterile materials by using the GAT system. In combination with the seed fluorescent color selection system and the functional organic combination of maintainer line screening elements and herbicide sensitive elements, the subsequent GAT maintainer line and sterile line can be used to remove impurities and maintain purity. In the seed stage, vegetative growth stage and reproductive growth stage, the recessive nuclear male sterile seeds/plants (GAT sterile line) and fertile seeds/plants (GAT retention) can be separated. The present application successfully solves the problem of large-scale reproduction and maintenance of recessive genic male sterile, so as to successfully realize the industrialization of recessive nuclear male sterile materials.

Example 6 GAT Sterile Line Transfer

This example is a recessive nuclear sterile transfer, that is, a GAT sterile line transfer, which replaces the dominant homozygous CYP704B2 in H28B with the mutant recessive homozygous cyp704B2-3, but still retains the remaining H28B traits through backcross transfer, so that the third line maintainer line H28B is finally transferred to GAT sterile line, which is called GAT sterile line transfer.

Cyp704b2-3 is a rice CYP704B2 gene mutant, which is obtained by replacing the GGG after the 794th base of rice CYP704B2 gene with a T, and the mutation site is located in the third exon (disclosed in Chinese patent CN 105002191 B). The mutant cyp704b2-3 was hybridized, backcrossed and self crossed with the normal fertility receptor, and the cyp704b2-3 gene and genetic background were selected with molecular markers in this process. Finally, the recessive nuclear sterile line with homozygous cyp704b2-3 gene in the background of the target receptor was obtained. H28B (H28B is an approved variety of traditional three line male sterile line, belonging to a three line maintainer line, which is a CYP704B2 locus that is dominant homozygous and does not contain GAT vector elements) was taken as an example, the specific steps of transfer are as follows:

1. $F_1$ was obtained by crossing the recipient parent, such as H28B, as male parent with a homozygous mutant containing cyp704b2-3.
2. $BC_1F_1$ was obtained by backcrossing F1 as female parent and recipient parent, such as H28B.
3. $BC_1F_1$ was planted, cyp704b2-3 genotype was detected by using primer with sequence as SEQ ID NO. 28-29. The heterozygous genotype cyp704b2-3 was selected, that is, plants with 86 bp and 84 bp bands could be amplified at the same time.
4. a group of genotypes (such as 100, or 200, etc.) were used with polymorphism between the cyp704b2-3 mutant and the recurrent parent genome, and evenly distributed molecular markers (which can be but not limited to SSR, SNP, INDEL, EST, RFLP, AFLP, RAPD, SCAR and other types of markers), the genetic background of the single plant selected in step 3 was identified, plants with high similarity to the recurrent parent genotype (such as greater than 88% similarity, or 2% selection rate, etc.) were selected.
5. $BC_2F_1$ was obtained by backcrossing the plant selected in step 4 with the recipient parent, such as H28B.
6. $BC_2F_1$ was planted and steps 3 and 4 were repeated to select the plants with cyp704b2-3 genotype heterozygosity and high genetic background recovery rate (such as more than 98%, or 2% of the selection rate), and receive inbred $BC_2F_2$.
7. $BC_2F_2$ was planted and steps 3 and 4 were repeated to select the plant with cyp704b2-3 genotype heterozygosity and the highest homozygous rate of genetic background and receive inbred $BC_2F_3$.

The homozygous plants of cyp704b2-3, namely, cyp704b2-3 recessive nuclear sterile line, were isolated from $BC_2F_3$ offspring. $BC_2F_3$ was used to preserve the germplasm resources of cyp704b2-3 recessive nuclear sterile line. The letter G is used to name the recessive nuclear sterile line, for example, the homozygous recessive nuclear sterile line cyp704b2-3 of H28B in this example is named H28G.

Only H28B was taken as an example of transfer above, but not limited to H28B, which can be any rice material.

Example 7 GAT Maintainer Line Transfer

This example reflects the acquisition of a GAT maintainer line, that is, cyp704B2-3 containing GAT vector elements is obtained, but other traits retain the original traits of the donor. For example, H28B (H28B itself is a CYP704B2 dominant homozygous genotype and does not contain GAT vector elements) was used, through continuous backcross breeding with H28B and molecular marker assisted selection, other traits obtained are the same as H28B, but cyp704B2-3 is recessively homozygous and contains GAT vector elements, the resultant was named H28T. The process is called GAT maintainer line transfer.

The homozygous mutation at CYP704B2 site was selected from the transgenic plants of the GAT large vector obtained in Example 4, and the detection of the GAT transgenic PCR positive was positive. The plants with phenotypes controlled by each GAT element were used as the donor parents for the transformation of the GAT maintainer line. Cyp704b2-3 heterozygous plants obtained in Example 6, such as H28G heterozygous plants, were selected as recipient parents. The donor plants and recipient plants were hybridized, backcrossed and self crossed, and the cyp704b2-3 gene, GAT elements and genetic background were selected with molecular markers in this process. Finally, the GAT maintainer line with homozygous cyp704b2-3 gene and GAT elements in H28B background was obtained. The specific implementation steps are as follows:

1. $F_1$ was obtained by hybridization between donor parents and cyp704b2-3 heterozygous genotype receptor parents, such as H28G of cyp704b2-3 heterozygous genotype.
2. $BC_1F_1$ was obtained by backcrossing $F_1$ with cyp704b2-3 heterozygous receptor parent, such as cyp704b2-3 heterozygous H28G.
3. $BC_1F_1$ was planted, PCR amplification of the genomic DNA of BC1F1 plant was conducted by using primer with sequence as SEQ ID NO. 28-29, and then the amplified product was digested with HaeIII enzyme, and the genotype of the plant was determined according to the bands of the enzyme digestion product. Plants with 84 bp and 66 bp bands, i.e., plants with cyp704b2-3 gene and GAT transgene were selected.
4. a group of genotypes (such as 100, or 200, etc.) were used with polymorphism between the cyp704b2-3 mutant and the recurrent parent genome, and evenly distributed molecular markers (which can be but not limited to SSR, SNP, INDEL, EST, RFLP, AFLP, RAPD, SCAR and other types of markers), the genetic background of the single plant selected in step 3 was identified, plants with high similarity to the recurrent parent genotype (such as greater than 88% similarity, or 2% selection rate, etc.) were selected.
5. $BC_2F_1$ was obtained by backcrossing the plants selected in step 4 with cyp704b2-3 heterozygous receptor parents, such as cyp704b2-3 heterozygous H28G.
6. $BC_2F_1$ was planted and steps 3 and 4 were repeated to select the plants with high genetic background recovery rate (such as more than 98%, or 2% selection rate, etc.), and receive inbred $BC_2F_2$.
7. $BC_2F_2$ was planted and steps 3 and 4 were repeated to select the plant with the highest homozygous rate of genetic background, and receive the inbred $BC_2F_3$, namely the GAT maintainer line. The letter T is used to name the GAT maintainer line, for example, the GAT maintainer line of H28G in this example is named H28T.

Only H28B was taken as an example of transfer above, but not limited to H28B, which can be any rice material.

Example 8 GAT Maintenance Line Production

The seeds of the GAT maintainer line were planted in the legal transgenic area, and the seeds were harvested by self pollination. The seeds with dark red fluorescence were obtained by screening with the fluorescent seed sorter, which were the seeds of the GAT maintainer line. Later, the seeds can be used for the self-reproduction of the GAT maintainer line or pollination to the GAT sterile line for the seed production of the sterile line.

Example 9 Impurity Removal and Purity Maintenance of GAT Maintainer Line

GAT maintainer line is sown, and 30 to 90 mg/m² of bispyribac-sodiumor 50 to 100 mg/L of methomyl or 185 to 750 mg/L of imazethapyr was sprayed at seedling stage to remove impurities and maintain purity; 60-120 mg/m² of bispyribac-sodium or 100 to 200 mg/L of methomyl or 500 to 1500 mg/L of imazethapyr was sprayed from tillering stage to booting stage to remove impurities and maintain purity; 120 to 300 mg/m² of bispyribac-sodium or 200 to 750 mg/L of methomyl or 1000 to 3000 mg/L of imazethapyr at flowering stage to remove impurities and maintain purity; the herbicide mentioned above was sprayed, which can not only kill the non-GAT maintainer line materials, but also help to weed in the field. It plays an important role in the production of maintainer line and in impurity removal and purity maintenance, killing two birds with one stone.

Example 10 Production of GAT Sterile Line (1)

The seeds of the GAT maintainer line were planted in the legal transgenic area, and the seeds were harvested by self pollination. The seeds without fluorescence were obtained by screening with the fluorescent seed sorter, which were the seeds of the GAT sterile line. Later, the seeds can be used as the female parent for seed production with other varieties (male parents), and can also be used to reproduce the GAT male sterile line.

Example 11 Production of GAT Sterile Line (2)

The seeds of the GAT sterile line obtained from example 10 were mixed or interspersed with the seeds of the GAT maintainer line to the statutory transgenic area. When the flowering period came, the GAT maintainer line would disperse powder to seed the GAT sterile line. After the powder was dispersed, the GAT maintainer line was killed by spraying 1 to 3 g/m² bentazone or 500 to 3000 mg/L bensulfuron, and all seeds were harvested. Fluorescent seed sorters were used to screen and obtain non-fluorescent seeds, that is, the seeds of the GAT sterile line. Later, it can be used for seed production with other varieties as male parent, and can also be used for breeding sterile line.

Example 12 Impurity Removal and Purity Maintenance of GAT Sterile Line

GAT sterile line was sown, and 0.1 to 1 g/m² bentazone or 100 to 800 mg/L bensulfuron was sprayed at seedling stage to remove impurities and maintain purity; 0.5 to 1.5 g/m² bentazone or 500 to 2000 mg/L bensulfuron was sprayed from tillering stage to booting stage to remove impurities and maintain purity; 1 to 3 g/m² bentazone or 500 to 3000 mg/L bensulfuron was sprayed at flowering stage to remove impurities and maintain purity; the herbicide mentioned above was sprayed, which can not only kill the GAT maintainer line materials to maintain the purity of the GAT sterile line, but also help to weed in the field, killing two birds with one stone.

Example 13 GAT Hybrid Production

The GAT sterile line obtained in examples 10 and 11 was crossed with the male parent for seed production, and the seeds on the sterile line were harvested after pollination, all of which were non-transgenic hybrid seeds.

INDUSTRIAL APPLICABILITY

The present invention provides an intelligent genetic breeding and seed production system for crop cross breeding and hybrid seed production, and application thereof. The system of the present invention contains GAT system vector, which includes five functional element expression cassettes: a plant male fertility restoration genetic element expression cassette, used for restoring the male fertility of a recessive genic male sterile mutant; a plant pollen abortion genetic element expression cassette, used for clearing GAT containing pollen and maintaining a heterozygous state or a hemizygous state of a GAT maintainer line; a chemical herbicide positive selection expression cassette, used for gene transformation and impurity removal and purification for the GAT maintainer line; a chemical herbicide negative selection expression cassette, used for clearing pollen and seed escape of a herbicide-sensitive GAT maintainer line and impurity removal and purification for a GAT sterile line; and a seed screening element expression cassette, used for mechanical sorting of seeds. The method can be used for cross breeding and hybrid seed production of plant recessive genic male sterile materials, thereby obtaining new varieties of plants having high quality, high yield, wide adaptability and high resistance, and seeds thereof, and has good economic value and application prospects.

What is claimed is:

1. An intelligent genetic breeding and seed production system for crop cross breeding and seed production, called GAT system, characterized by comprising three lines of a plant recessive genic male sterile line, i.e., GAT sterile line, a recessive genic male sterile maintainer line, i.e., GAT maintainer line, and a common restorer line, wherein the plant is rice;

wherein the GAT maintainer line contains a GAT vector, wherein the GAT vector is pC0308-MMMaauCK5400, pC0308-KhvMMaauMCK5400, pC0308-KhvMaauMCMK5400, pC0309-KhvMaauMCMK5400 and pC0307-KhvMaauMCMK5400; and the nucleotide sequences thereof are respectively represented by SEQ ID NOs. 1-5.

2. The intelligent genetic breeding and seed production system according to claim 1, wherein the GAT vector is introduced into the GAT sterile line to create the GAT maintainer line, and the GAT vector exists in the genome of the GAT maintainer line in a single copy form; the GAT sterile line is a sterile line controlled by a single recessive nuclear gene, and is male sterile when a gene locus is in a recessive homozygous state; and is male fertile when a gene locus is in a heterozygous state and a dominant homozygous state;

the GAT maintainer line is self-fertilized and fructified, and the obtained seeds are separated to obtain the GAT maintainer line and the GAT sterile line in a ratio of 1:1; the two seeds are separated by seed screening elements to realize self-propagation of GAT maintainer line; the GAT maintainer line pollinate GAT sterile line to make GAT sterile line bear and maintain male sterility in their progeny, thus realizing the propagation of recessive male genetic sterile line.

3. A vector for intelligent genetic breeding and seed production of the crop, called GAT vector, wherein the GAT vector is pC0308-MMMaauCK5400, pC0308-KhvM-MaauMCK5400, pC0308-KhvMaauMCMK5400, pC0309-KhvMaauMCMK5400 and pC0307-KhvMaauMCMK5400; and the nucleotide sequences thereof are respectively represented by SEQ ID NOs. 1-5.

* * * * *